US007844492B2

(12) United States Patent
Perkowski et al.

(10) Patent No.: US 7,844,492 B2
(45) Date of Patent: Nov. 30, 2010

(54) INTERNET-BASED E-COMMERCE NETWORK FOR ENABLING COMMISSION-BASED E-COMMERCE TRANSACTIONS ALONG THE FABRIC OF THE WORLD WIDE WEB (WWW) USING SERVER-SIDE DRIVEN MULTI-MODE VIRTUAL KIOSKS (MMVKS) AND TRANSACTION AND COMMISSION TRACKING SERVERS

(75) Inventors: Thomas J. Perkowski, Darien, CT (US); Vaibhava Muchhal, Darien, CT (US)

(73) Assignee: IPF, Inc., Darien, CT (US)

( * ) Notice: Subject to any disclaimer, the term of this patent is extended or adjusted under 35 U.S.C. 154(b) by 865 days.

(21) Appl. No.: 11/477,205

(22) Filed: Jun. 28, 2006

(65) Prior Publication Data

US 2007/0094076 A1    Apr. 26, 2007

Related U.S. Application Data

(63) Continuation-in-part of application No. 10/876,261, filed on Jun. 24, 2004, now abandoned, which is a continuation-in-part of application No. 10/812,341, filed on Mar. 29, 2004, which is a continuation-in-part of application No. 10/693,856, filed on Oct. 24, 2003, now abandoned, which is a continuation-in-part of application No. 10/602,990, filed on Jun. 24, 2003, now abandoned, which is a continuation-in-part of application No. 09/716,848, filed on Nov. 17, 2000, now abandoned, which is a continuation-in-part of application No. 09/695,744, filed on Oct. 24, 2000, which is a continuation-in-part of application No. 09/641,908, filed on Aug. 18, 2000, now abandoned, which is a continuation-in-part of application No. 09/599,690, filed on Jun. 22, 2000, now abandoned, which is a continuation-in-part of application No. 09/483,105, filed on Jan. 14, 2000, now abandoned, and a continuation-in-part of application No. 09/465,859, filed on Dec. 17, 1999, now abandoned, which is a continuation-in-part of application No. 09/447,121, filed on Nov. 22, 1999, now Pat. No. 6,625,581, and a continuation-in-part of application No. 09/441,973, filed on Nov. 17, 1999, now Pat. No. 6,961,712.

(51) Int. Cl.
*G06Q 30/00* (2006.01)
(52) U.S. Cl. .................................. 705/14.4; 705/14.73
(58) Field of Classification Search ................ 705/14.4, 705/14.73
See application file for complete search history.

(56) References Cited

U.S. PATENT DOCUMENTS 4,654,482 A    3/1987   DeAngelis (Continued)

FOREIGN PATENT DOCUMENTS

EP          0 744 856 A      11/1996

(Continued)

OTHER PUBLICATIONS

U.S. Appl. No. 08/691,263, filed Jan. 1, 2000, Swift et al.

(Continued)

*Primary Examiner*—Jeffrey D Carlson
(74) *Attorney, Agent, or Firm*—Thomas J. Perkowski, Esq., P.C.

(57) ABSTRACT

Internet-based Enterprise-Level Brand Management And Marketing Communication Network based on an innovative brand command, control and communication architecture (BC3), which gives brand owners complete command and control over the wide range of brand-building assets, messaging and promotions scattered throughout the Web, and how they are communicated to directly consumers at diverse Web touch points, with the efficiency and automation of supply-chain management solutions. The Network supports the deployment, installation and remote programming of brand-building server-side driven Multi-Mode Virtual Kiosks on the World Wide Web (WWW), and provide brand managers, their agents and online trading partners the power to build stronger online brands, drive sales and eliminate existing friction in the retail chain through a collaborative carrier-class, industrial-strength e-marketing communication network.

14 Claims, 71 Drawing Sheets

U.S. PATENT DOCUMENTS

| | | | |
|---|---|---|---|
| 4,775,935 A | 10/1988 | Yourick | |
| 4,841,132 A | 6/1989 | Kajitani et al. | |
| 5,029,104 A | 7/1991 | Dodson | |
| 5,264,822 A | 11/1993 | Vogelman et al. | |
| 5,288,976 A | 2/1994 | Citron et al. | |
| 5,307,456 A | 4/1994 | MacKay | |
| 5,319,542 A | 6/1994 | King, Jr. et al. | |
| 5,333,237 A | 7/1994 | Stefanopoulos | |
| 5,355,472 A | 10/1994 | Lewis | |
| 5,398,336 A | 3/1995 | Tantry et al. | |
| 5,448,046 A | 9/1995 | Swartz | |
| 5,524,195 A | 6/1996 | Clanton et al. | |
| 5,528,490 A | 6/1996 | Hill | |
| 5,532,735 A | 7/1996 | Blahut | |
| 5,572,643 A | 11/1996 | Judson | |
| 5,583,560 A | 12/1996 | Florin | |
| 5,592,378 A | 1/1997 | Cameron et al. | |
| 5,594,509 A | 1/1997 | Florin | |
| 5,612,527 A | 3/1997 | Ovadia | |
| 5,635,694 A | 6/1997 | Tuhro | |
| 5,640,193 A | 6/1997 | Wellner | |
| 5,694,546 A | 12/1997 | Reisman | |
| 5,715,444 A | 2/1998 | Danish et al. | |
| 5,721,827 A | 2/1998 | Logan et al. | |
| 5,724,521 A | 3/1998 | Dedrick | |
| 5,737,619 A | 4/1998 | Judson | |
| 5,737,739 A | 4/1998 | Shirley et al. | |
| 5,740,549 A | 4/1998 | Reilly et al. | |
| 5,742,768 A | 4/1998 | Gennaro et al. | |
| 5,757,900 A | 5/1998 | Nagel et al. | |
| 5,761,071 A | 6/1998 | Bernstein et al. | |
| 5,804,803 A | 9/1998 | Cragun et al. | |
| 5,838,906 A | 11/1998 | Doyle et al. | |
| 5,841,978 A | 11/1998 | Rhoads | |
| 5,854,897 A | 12/1998 | Radziewicz et al. | |
| 5,864,823 A | 1/1999 | Levitan | |
| 5,869,819 A | 2/1999 | Knowles et al. | |
| 5,881,230 A | 3/1999 | Christensen et al. | |
| 5,890,175 A | 3/1999 | Wong et al. | |
| 5,892,915 A | 4/1999 | Duso et al. | |
| 5,895,454 A | 4/1999 | Harrington | |
| 5,897,622 A | 4/1999 | Blinn et al. | |
| 5,902,353 A | 5/1999 | Reber et al. | |
| 5,903,729 A | 5/1999 | Reber et al. | |
| 5,905,248 A | 5/1999 | Russell et al. | |
| 5,905,251 A | 5/1999 | Knowles | |
| 5,913,040 A | 6/1999 | Rakavy et al. | |
| 5,913,210 A | 6/1999 | Call | |
| 5,918,010 A | 6/1999 | Appleman et al. | |
| 5,918,013 A | 6/1999 | Mighdoll et al. | |
| 5,918,213 A | 6/1999 | Bernard et al. | |
| 5,918,214 A | 6/1999 | Perkowski | |
| 5,930,767 A | 7/1999 | Reber et al. | |
| 5,933,811 A | 8/1999 | Angles et al. | |
| 5,933,829 A | 8/1999 | Durst et al. | |
| 5,937,390 A | 8/1999 | Hyodo | |
| 5,937,392 A | 8/1999 | Alberts | |
| 5,938,726 A | 8/1999 | Reber et al. | |
| 5,940,074 A | 8/1999 | Britt et al. | |
| 5,940,595 A | 8/1999 | Reber et al. | |
| 5,946,646 A | 8/1999 | Schena et al. | |
| 5,948,061 A | 9/1999 | Merriman et al. | |
| 5,950,173 A | 9/1999 | Perkowski | |
| 5,957,695 A | 9/1999 | Redford et al. | |
| 5,959,623 A | 9/1999 | Van Hoff et al. | |
| 5,959,630 A | 9/1999 | Takeuchi et al. | |
| 5,960,411 A | 9/1999 | Hartman et al. | |
| 5,963,916 A | 10/1999 | Kaplan | |
| 5,964,836 A | 10/1999 | Rowe et al. | |
| 5,966,696 A | 10/1999 | Giraud | |
| 5,971,277 A | 10/1999 | Cragun et al. | |
| 5,978,773 A | 11/1999 | Hudetz et al. | |
| 5,979,757 A | 11/1999 | Tracy et al. | |
| 5,986,651 A | 11/1999 | Reber et al. | |
| 5,992,752 A | 11/1999 | Wilz, Sr. et al. | |
| 5,995,105 A | 11/1999 | Reber et al. | |
| 5,996,007 A | 11/1999 | Klug et al. | |
| 5,999,912 A | 12/1999 | Wodarz et al. | |
| 5,999,914 A | 12/1999 | Blinn et al. | |
| 6,009,407 A | 12/1999 | Garg | |
| 6,009,410 A | 12/1999 | LeMole et al. | |
| 6,011,537 A | 1/2000 | Slotznick | |
| 6,012,083 A | 1/2000 | Savitzky et al. | |
| 6,012,102 A | 1/2000 | Shachar | |
| 6,021,416 A | 2/2000 | Dauerer et al. | |
| 6,027,024 A | 2/2000 | Knowles | |
| 6,029,141 A * | 2/2000 | Bezos et al. | 705/27 |
| 6,031,989 A | 2/2000 | Cordell | |
| 6,032,195 A | 2/2000 | Reber et al. | |
| 6,035,332 A | 3/2000 | Ingrassia, Jr. et al. | |
| 6,038,545 A | 3/2000 | Mandeberg et al. | |
| 6,044,218 A | 3/2000 | Faustini | |
| 6,045,048 A | 4/2000 | Wilz, Sr. et al. | |
| 6,061,659 A | 5/2000 | Murray | |
| 6,064,979 A | 5/2000 | Perkowski | |
| 6,065,024 A | 5/2000 | Renshaw | |
| 6,078,848 A | 6/2000 | Bernstein | |
| 6,081,827 A | 6/2000 | Reber et al. | |
| 6,091,411 A | 7/2000 | Straub | |
| 6,094,673 A | 7/2000 | Venkatachari et al. | |
| 6,101,510 A | 8/2000 | Stone et al. | |
| 6,108,656 A | 8/2000 | Durst et al. | |
| 6,119,165 A | 9/2000 | Li et al. | |
| 6,125,388 A | 9/2000 | Reisman | |
| 6,134,548 A | 10/2000 | Gottsman et al. | |
| 6,138,151 A | 10/2000 | Reber et al. | |
| 6,141,666 A | 10/2000 | Tobin | |
| 6,144,990 A | 11/2000 | Brandt et al. | |
| 6,152,369 A | 11/2000 | Wilz et al. | |
| 6,154,738 A | 11/2000 | Call | |
| 6,157,946 A | 12/2000 | Itakura et al. | |
| 6,178,426 B1 | 1/2001 | Klein et al. | |
| 6,189,137 B1 | 2/2001 | Hoffman | |
| 6,199,048 B1 | 3/2001 | Hudetz et al. | |
| 6,213,394 B1 | 4/2001 | Schumacher et al. | |
| 6,223,178 B1 | 4/2001 | Himmel et al. | |
| 6,247,044 B1 | 6/2001 | Gosling et al. | |
| 6,248,946 B1 | 6/2001 | Dwek | |
| 6,314,451 B1 | 11/2001 | Landsman et al. | |
| 6,314,457 B1 | 11/2001 | Schena et al. | |
| 6,317,761 B1 | 11/2001 | Landsman | |
| 6,339,438 B1 | 1/2002 | Bates et al. | |
| 6,360,215 B1 | 3/2002 | Judd et al. | |
| 6,430,554 B1 | 8/2002 | Rothschild | |
| 6,434,563 B1 | 8/2002 | Pasquali et al. | |
| 6,446,080 B1 | 9/2002 | Van Ryzin et al. | |
| 6,448,979 B1 | 9/2002 | Schena et al. | |
| 6,490,567 B1 | 12/2002 | Gregory | |
| 6,532,481 B1 | 3/2003 | Fassett, Jr. | |
| 6,542,933 B1 | 4/2003 | Durst, Jr. et al. | |
| 6,567,857 B1 | 5/2003 | Gupta et al. | |
| 6,591,247 B2 | 7/2003 | Stern | |
| 6,625,581 B1 | 9/2003 | Perkowski | |
| 6,631,357 B1 | 10/2003 | Perkowski | |
| 6,865,593 B1 | 3/2005 | Reshef et al. | |
| 6,925,495 B2 | 8/2005 | Hegde et al. | |
| 6,959,286 B2 | 10/2005 | Perkowski | |
| 2002/0129089 A1 | 9/2002 | Hegde et al. | |
| 2002/0161672 A1 | 10/2002 | Banks et al. | |
| 2003/0028483 A1* | 2/2003 | Sanders et al. | 705/40 |

FOREIGN PATENT DOCUMENTS

| | | |
|---|---|---|
| EP | 0 822 535 A3 | 2/1998 |
| EP | 0 837 406 A2 | 4/1998 |

| | | |
|---|---|---|
| EP | 0 856 812 A2 | 5/1998 |
| EP | 0 856 812 A3 | 5/1999 |
| WO | WO 95/15533 | 6/1995 |
| WO | WO 96/30864 | 10/1996 |
| WO | WO 97/01137 | 1/1997 |
| WO | WO 97/07656 | 3/1997 |
| WO | WO 97/21183 | 6/1997 |
| WO | WO 97/37319 | 10/1997 |
| WO | WO 98/02847 | 1/1998 |
| WO | WO 98/03923 | 1/1998 |
| WO | WO 98/06055 | 2/1998 |
| WO | WO 98/09243 | 3/1998 |
| WO | WO 98/19259 | 5/1998 |
| WO | WO 98/20411 | 5/1998 |
| WO | WO 98/20434 | 5/1998 |
| WO | WO 98/20440 | 5/1998 |
| WO | WO 98/21679 | 5/1998 |
| WO | WO 98/21713 | 5/1998 |
| WO | WO 98/24036 | 6/1998 |
| WO | WO 98/24049 | 6/1998 |
| WO | WO 98/25198 | 6/1998 |
| WO | WO 98/29822 | 7/1998 |
| WO | WO 98/34458 | 8/1998 |
| WO | WO 98/35297 | 8/1998 |
| WO | WO 98/38589 | 9/1998 |
| WO | WO 98/38761 | 9/1998 |
| WO | WO 98/51035 | 11/1998 |
| WO | WO 98/51036 | 11/1998 |
| WO | WO 98/51077 | 11/1998 |
| WO | WO 98/57295 | 12/1998 |
| WO | WO 98/58320 | 12/1998 |
| WO | WO 99/00756 | 1/1999 |
| WO | WO 99/33013 | 7/1999 |
| WO | WO 99/33014 | 7/1999 |
| WO | WO 00/16205 | 3/2000 |
| WO | WO 00/16211 | 3/2000 |
| WO | WO 00/28455 | 5/2000 |
| WO | WO 00/43862 | 7/2000 |
| WO | WO 00/45302 | 8/2000 |
| WO | WO 00/50844 | 8/2000 |
| WO | WO 00/63780 | 10/2000 |
| WO | WO 00/65509 | 11/2000 |
| WO | WO 00/70525 | 11/2000 |
| WO | WO 01/01586 A3 | 1/2001 |
| WO | WO 01/15019 A2 | 3/2001 |
| WO | WO 01/15021 A2 | 3/2001 |
| WO | WO 01/15035 A2 | 3/2001 |
| WO | WO 01/39001 A1 | 5/2001 |
| WO | WO 01/77838 A1 | 10/2001 |

OTHER PUBLICATIONS

U.S. Appl. No. 08/771,823, filed Aug. 21, 1997, Kraftsow et al.
Product brochure for the Open AdStream System (OAS) by Real Media, 1995, pp. 1-9.
Product brochure entitled "The Catalog" (1996) by QuickResponse Services Corporation, www.qrs.com, pp. 1-2.
Operating manual for the QRS Keystone for Vendors (1996) by QRS Corporation, www.qrs.com, pp. 1-126.
Operating manual for the QRS Keystone for Retailers (1996) by QRS Corporation, www.qrs.com, pp. 1-115.
Web-based product brochure for the Synclink Item Catalog by Vialink, Inc., http://www.vialink.com/products/products-catalog.html, 1 page.
Excerpts from the web-based publication entitled "Introduction to JDBC™" by JavaSoft, circa 1999, http://java.sun.com/docs/books/dbc/intro.html, pp. 1-4.
Scientific article entitled "Animating the Ad" by Mark Gimein, The Industry Standard, Feb. 22-Mar. 1, 1999, pp. 1-6.
Web-based product brochure for "Home Network Enliven Services" by Enliven Services, http://www.enliven.com/products/prodinfo.htm, 1999, pp. 1-8.
Web-based product brochure for "Thinking Media ActiveAds" by Thinking Media, http://thethinkingmedia.com/activeads/index.html, 1999, 1 page.
Product brochure for "NCR Web Kiosk Solutions" by NCR Corporation, www.ncr.com. 1999, pp. 1-14.
Scientific publication entitled "In-House vs. Out-Sourced Ad Serving" by Real Media, Inc., Fort Washington PA, Dec. 22, 1998, pp. 1-4.
Scientific publication entitled "IDOCs™ Linking the Worlds of Print and Electronic Media$^{SM}$" by NeoMedia Technologies, Inc., Sep. 11, 1998, pp. 1-8.
Press Release entitled ""Applied Intelligence Group Inc. Announces New Product Solution that Enhances its Core ViaLink Service"" by Investors Press Releases., http://www2.vialink.com/investors/press_releases/02_24_98.html, Feb. 24, 1998, pp. 1-2.
Web-based technical report entitled "Amended Annual Report (10KSB) for Applied Intelligence Group, Inc." http://www.edgar-online.com, Mar. 28, 1997, pp. 1-55.
Draft Technical Report entitled "The Retail Store of the Future: Crest of the Third Wave" by Robert J. Corey, Ph.D. and John R. Spears, Ed.D., Jan. 15, 1997, pp. 1-45.
Product Brochure for the PREMO WEBDOX by Premenos Corporation, Concord, CA, www.premenos.com, 1997, 1 page.
Operating manual entitled "WEBDOX General Information Manual" by Premenos Corp., Concord, CA, 1996-1997, pp. 1-20.
Scientific publication entitled "Smart Catalogs and Virtual Catalogs" by Keller, Computer Sci.Dept., Stanford University, 1995, pp. 1-11.
Scientific publication entitled "World-Wide Web: The Information Universe", 1996, by Tim Berners-Lee et al., CERN, 1211 Geneva 23, Switzerland, pp. 1-8.
Web article entitled "Macromedia Takes Stake in ePod" by Pamela Parker, Jul. 5, 2000, http://www.clickz.com/news/article/php/408081.
Web article entitled "New Ad Vehicle Fights the Banner Ad Clickthrough Dilemma" by Ann M. Mack, May 22, 2000, Brandweek, http://www.findarticles.com/p/articles/mi_m0BDW/is_21_41/ai_62661555.
Web article entitled "NBCi Signs 3-Tier Deal to Plug ePod Showcase" by Ann M. Mack, 2001, AdweekOnline, http://www.geoffclendenning.com/Adweek%20Online2.htm.
Web article entitled "e-Pod Bundles with DoubleClick", AdWeekOnline Interactive News, Jun. 15, 2000, http://www.geoffclendenning.com/Adweek%20Online.htm.
Web Article entitled "E-Commerce Report: E-Tailers Fine-Tune Affiliate Sales" by Bob Tedeschi, Nov. 6, 2000, New York Times on the Web, http://www.geoffclendenning.com/NYTimes_press.htm.
PCT/US07/15058, Sep. 1, 2008.
PCT/US00/31757, Aug. 4, 2001.
PCT/US97/19227, Feb. 27, 1998.

* cited by examiner

Definition of Terms

Advertising Agent is an Agent responsible for creating, managing, and running Advertising Campaigns for particular Brands of Products and/or Services in the marketplace.

Advertising Campaign is that portion of a Brand Marketing Campaign which seeks to build a desired Brand Image in the minds of Consumers for a particular Brand of Products and/or Services.

Brand is a mental object relating to a class of tangible and/or intangible thing(s) (e.g. Products/Services) in the world and which is:
>(1) persistent within the mind of a person (e.g. Consumer) having (i) a particular relationship with the class of things, as well as (ii) as set of expectations of meaning and value to be derived by the Consumer upon experiencing the class of things; and
>(2) recognized by the Consumer in response to the perception of particular sounds, symbols and/or other sensorial impressions communicated to the Consumer in the marketplace.

Brand Image is the Brand Image of a Brand is the composite set of impressions and perceived values persisting in the minds of Consumers in response to exposure to (i) messages produced under messages produced under a Brand Marketing Campaign carried out by the Brand Management Team including its Advertising and Promotional Agents, as well as (ii) other information items (e.g. Clutter) communicated by others in the marketplace.

Brand Knowledge Network is an information model (i.e. schema) comprising a network of Products and/or Service Data Links designed by a Brand Management Team to represent a desired Brand Image which the Brand Management Team wants to persist within the minds of Consumers regarding a particular Brand or set of Brands under their management.

Brand Management Team is a group of people including; Brand Managers, Advertising Agents, Promotional Agents, Full-Service Agents, etc. whose mission is to create, manage, and communicate a desired Brand Image for a particular Brand or set of Brands to Consumers.

Brand Marketing Campaign is an effort conducted in the marketplace by a Brand Management Team including its Advertising and Promotional Agents to build a Brand in the minds of Consumers, which creates a desired Brand Image consistent with the marketing objectives of the Marketing Team.

FIG. 4A

Data Link is a URL associated with a Product or Service Data String that may be used to build a Brand Knowledge Network.

Promotional Agent An Agent responsible for creating, managing, and running Promotional Campaigns for particular Brands of Products and/or Services in the marketplace.

Promotional Campaign is that portion of a Brand Marketing Campaign which seeks to induce consumption of a particular Brand of Products and/or Services by Consumers in the marketplace.

Product Data String is a string of data comprising a Universal Product Number (e.g. UPC/EAN) assigned to a particular Product, a Product Descriptor briefly describing the generic nature of the Product, and any number of Trademarks used in connection with the Product in the marketplace.

Service Data String is a string of data comprising a Universal Service Number (e.g. Airclic Code) assigned to a particular Service, a Service Descriptor briefly describing the generic nature of tile Service, and any number of Servicemarks used in connection with the Service in the marketplace.

FIG. 4B

BKS NETWORKS SUITE OF SERVICES
- Login
- Logout
- Forgot Password

Brandkey Manage
- User/ Account Administration Suite
    - Control Panel for Administering Users
        - Search/ Edit User
            - Search for User
            - Select User
            - Edit User Information
            - Update User Access Rights
        - Add New User
            - Add User Information
            - Configure User Access Rights
    - Control Panel for Administering Accounts
        - Update Company Info
        - Update Admin Info
            - Update Administrator Information
            - Edit Administrator Access Rights
        - Update Available Services
        - Edit Brand Entity Info
            - Add New Brand Entity
            - Select Brand Entity

FIG. 6B1

- Edit Brand Entity
- Certify Ad Agents
- Certify Promo Agents
- Control Panel for Administering Ad/ Promo Privileges
    - Select Virtual Kiosk
    - Assign Ad/ Promo Privileges
- Control Panel for Viewing Brand Metrics <u>Brandkey Create</u>
- Brand Information Network Management Suite
    - Control Panel for Managing Brand Information Networks
        - Select Brand Entity
        - Configure Control Panel
            - Select Link Options
            - Select Link Languages
            - Set Available Brand Resources
            - Set Categories
        - Manage Data Strings
            - Manage Data Strings
            - Add Data Strings
            - Import Data Strings
            - Synchronize Data Strings
        - Manage Data Links
        - Manage Brand Information Networks <u>Brandkey Deliver</u>

FIG. 6B2

- Virtual Kiosk Generation Suite
    - Control Panel for Generating Product-Specific Virtual Kiosks
        - Configure P-S Virtual Kiosks
            - Set Standard Configuration
            - Set Allowed Retailers
            - Set Allowed Industrialists
            - Set Forbidden Domains
        - Manage P-S Virtual Kiosks
            - Select Virtual Kiosk
            - Set Display Mode
            - Set Name
            - Set Skin
            - Set Options
            - Set Product
        - Deploy P-S Virtual Kiosks
            - Specify Virtual Kiosks
            - Select Virtual Kiosks
            - Deploy Virtual Kiosks
        - Activate P-S Virtual Kiosks
    - Control Panel for Generating Service-Specific Virtual Kiosks
        - Configure S-S Virtual Kiosks
            - Set Standard Configuration
            - Set Allowed Retailers
            - Set Allowed Industrialists

FIG. 6B3

- Set Forbidden Domains
- Manage S-S Virtual Kiosks
    - Select Virtual Kiosk
    - Set Display Mode
    - Set Name
    - Set Skin
    - Set Options
    - Set Service
- Deploy S-S Virtual Kiosks
    - Specify Virtual Kiosks
    - Select Virtual Kiosks
    - Deploy Virtual Kiosks
- Activate S-S Virtual Kiosks
- Control Panel for Generating Vender-Specific Virtual Kiosks
    - Configure V-S Virtual Kiosks
        - Set Standard Configuration
        - Set Allowed Retailers
        - Set Allowed Industrialists
        - Set Forbidden Domains
    - Manage V-S Virtual Kiosks
        - Select Virtual Kiosk
        - Set Display Mode
        - Set Name
        - Set Skin

FIG. 6B4

- Set Options
- Set Corporate
- Set Products
- Deploy V-S Virtual Kiosks
    - Specify Virtual Kiosks
    - Select Virtual Kiosks
    - Deploy Virtual Kiosks
- Activate V-S Virtual Kiosks
- Control Panel for Generating Service-Provider-Specific Virtual Kiosks
    - Configure S-P-S Virtual Kiosks
        - Set Standard Configuration
        - Set Allowed Retailers
        - Set Allowed Industrialists
        - Set Forbidden Domains
    - Manage S-P-S Virtual Kiosks
        - Select Virtual Kiosk
        - Set Display Mode
        - Set Name
        - Set Skin
        - Set Options
        - Set Corporate Brand
        - Set Services
    - Deploy S-P-S Virtual Kiosks
        - Specify Virtual Kiosks

FIG. 6B5

- Select Virtual Kiosks
- Deploy Virtual Kiosks
- Activate S-P-S Virtual Kiosks
- Control Panel for Generating Retailer-Specific Virtual Kiosks
  - Configure R-S Virtual Kiosks
    - Set Standard Configuration
    - Set Allowed Industrialists
    - Set Forbidden Domains
  - Manage R-S Virtual Kiosks
    - Select Virtual Kiosk
    - Set Display Mode
    - Set Name
    - Set Skin
    - Set Options
    - Set Corporate Brand
    - Set Products
  - Deploy R-S Virtual Kiosks
    - Specify Virtual Kiosks
    - Select Virtual Kiosks
    - Deploy Virtual Kiosks
  - Activate R-S Virtual Kiosks
- Control Panel for Generating Industry-Specific Virtual Kiosks
  - Configure I-S Virtual Kiosks
    - Set Standard Configuration

FIG. 6B6

- Set Allowed Industrialists
- Set Forbidden Domains
- Manage I-S Virtual Kiosks
  - Select Virtual Kiosk
  - Set Display Mode
  - Set Name
  - Set Skin
  - Set Options
  - Set Corporate Brand
  - Set Products
- Deploy I-S Virtual Kiosks
  - Specify Virtual Kiosks
  - Select Virtual Kiosks
  - Deploy Virtual Kiosks
- Activate I-S Virtual Kiosks
- Control Panel for Generating Corporate-Specific Virtual Kiosks
  - Configure C-S Virtual Kiosks
    - Set Standard Configuration
    - Set Allowed Industrialists
    - Set Forbidden Domains
  - Manage C-S Virtual Kiosks
    - Select Virtual Kiosk
    - Set Display Mode
    - Set Name

FIG. 6B7

- Set Skin
- Set Options
- Set Corporate Brand
- Set Products
- Deploy C-S Virtual Kiosks
  - Specify Virtual Kiosks
  - Select Virtual Kiosks
  - Deploy Virtual Kiosks
- Activate C-S Virtual Kiosks

- Virtual Kiosk Installation Suite
  - Control Panel for Installing Product-Specific Virtual Kiosks
    - Install Product-Specific Virtual Kiosks
      - Select Virtual Kiosks
      - Set Options
      - License Agreement
      - Installation Location Information
      - Download Virtual Kiosk Tag
  - Control Panel for Installing Service-Specific Virtual Kiosks
    - Install Service-Specific Virtual Kiosks
      - Select Virtual Kiosks
      - Set Options
      - License Agreement
      - Installation Location Information
      - Download Virtual Kiosk Tag

FIG. 6B8

- Control Panel for Installing Vendor-Specific Virtual Kiosks
    - Install Vendor-Specific Virtual Kiosks
        - Select Virtual Kiosks
        - Set Options
        - License Agreement
        - Installation Location Information
        - Download Virtual Kiosk Tag
- Control Panel for Installing Service-Provider-Specific Virtual Kiosks
    - Install Service-Provider-Specific Virtual Kiosks
        - Select Virtual Kiosks
        - Set Options
        - License Agreement
        - Installation Location Information
        - Download Virtual Kiosk Tag
- Control Panel for Installing Retailer-Specific Virtual Kiosks
    - Install Retailer-Specific Virtual Kiosks
        - Select Virtual Kiosks
        - Set Options
        - License Agreement
        - Installation Location Information
        - Download Virtual Kiosk Tag
- Control Panel for Installing Industry-Specific Virtual Kiosks
    - Install Industry-Specific Virtual Kiosks
        - Select Virtual Kiosks

FIG. 6B9

- Set Options
- License Agreement
- Installation Location Information
- Download Virtual Kiosk Tag
- Control Panel for Installing Corporate-Specific Virtual Kiosks
  - Install Corporate-Specific Virtual Kiosks
    - Select Virtual Kiosks
    - Set Options
    - License Agreement
    - Installation Location Information
    - Download Virtual Kiosk Tag Brandkey Advertise
- Virtual Kiosk Advertising Campaign Management Suite
  - Control Panel for Managing Advertising Campaigns
    - Manage Directories
    - Manage Campaigns
    - Manage Spot-Orders Brandkey Promote
- Virtual Kiosk Promotion Campaign Management Suite
  - Control Panel for Managing Promotional Campaigns
    - Manage Directories
    - Manage Campaigns
    - Manage Spot-Orders

FIG. 6B10

PLUGIN FAMILY/PLUGIN DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| PluginFamily | Desc | Optional |
|---|---|---|
| pluginFamilyID | unique id | N |
| name | name that will identify the plugin family | Y |
| downloadImageID | image that will display in the MMVK during detection, for the user to download the plugin. These images are usually mandated by a trademark or similar agreement. This only needs to be entered if the plugin is supported and will appear on the detection page. | Y |
| created | timestamp of when this row was added to database | Y |
| lastUpdated | timestamp of last update | Y |
| lastUpdatedBy | user id of who added/edited this row to the table | Y |
| Plugin | Desc | |
| pluginID | unique id | N |
| pluginFamilyID | foreign key to PluginFamily table | Y |
| name | descriptive name of this version of the plugin. it may not be the same as the pluginVersion | Y |
| pluginVersion | the actual version number | Y |
| created | timestamp of when this row was added to database | Y |
| lastUpdated | timestamp of last update | Y |
| lastUpdatedBy | user id of who added/edited this row to the table | Y |

FIG. 10F

DOWNLOAD IMAGE DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| DownloadImage | Desc | Optional |
|---|---|---|
| downloadImageID | unique id | N |
| downloadImage | name of gif or jpg file to display for the download link. This may be the name of an image in BKSKioskResources or it may be a url to an image on another web page. | N |
| url | url that will download the browser or plugin. This is often mandated by a usage or similar agreement | N |
| kioskResource | True if the image is in BKSKioskResources. | Y |
| title | text to use for "alt" tag | Y |
| width | width of the downloadImage | Y |
| height | height of the downloadImage | Y |
| notice | copyright or similar notice that appears at the bottom of a page that uses this image. This is usually mandated by a usage or license agreement | Y |
| created | timestamp of when this row was added to database | N |
| lastUpdated | timestamp of last update | N |
| lastUpdatedBy | user id of who added/edited this row to the table | N |

FIG. 10G

MIME TYPE DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| MimeType | Desc | Optional |
|---|---|---|
| mimeTypeID | unique id | N |
| name | name of mime type that the system will display | Y |
| knownDuration | indicator whether or not this mime type has a duration associated with it. For example a video clip usually has a duration from its start to finish while a static image does not. In order for the BKSMMVK to know how long to display an image, the user needs to enter a duration. If this indicator is false, then the system can look for a duration in the link table. | Y |
| created | timestamp of when this row was added to database | Y |
| lastUpdated | timestamp of last update | Y |
| lastUpdatedBy | user id of who added/edited this row to the table | Y |

FIG. 10H

HTML ENGINE DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| HTMLEngine | Desc | Optional |
|---|---|---|
| htmlEngineID | unique id | N |
| name | name of the html engine. This is for identification purposes and the system will probably not display this to a user. | Y |
| created | timestamp of when this row was added to database | Y |
| lastUpdated | timestamp of last update | Y |
| lastUpdatedBy | user id of who added/edited this row to the table | Y |

FIG. 10I

BROWSER/FAMILY/BROWSER DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| BrowserFamily | Desc | Optional |
|---|---|---|
| browserFamilyID | unique id | N |
| name | name that will identify the browser family. An example is Firefox. | Y |
| uaRegex | Java regular expression that helps identify a BrowserFamily from a browser's User Agent. These can have a slightly different syntax than regular expressions in other languages. If you enter a new BrowserFamily but don't yet know the proper regular expression to use, just fill in some unique characters, or leave it blank, and this can be updated later during testing. (It's possible that this column will be removed later if it turns out it is not useful to use the regular expression to identify the browser family) | Y |
| downloadImageID | image that will display in the MMVK during detection, for the user to download the browser. These images are usually mandated by a trademark or similar agreement. This only needs to be entered if the browser is supported and will appear on the detection page. | N (This column should probably be changed to optional Y) |
| created | timestamp of when this row was added to database | Y |
| lastUpdated | timestamp of last update | Y |
| lastUpdatedBy | user id of who added/edited this row to the table | Y |
| Browser | Desc | |
| browserID | unique id | N |
| browserFamilyID | foreign key to BrowserFamily table | Y |
| htmlEngineID | foreign key to htmlEngine table. Knowing the html engine is useful for identifying some shared behavior of browsers with the same html engine. | Y |
| uaRegex | Java regular expression that helps identify a Browser from a browser's User Agent. These can have a slightly different syntax than regular expressions in other languages. If you enter a new Browser but don't yet know the proper regular expression to use, just fill in some unique characters, or leave it blank, and this can be updated later during testing. | Y |
| browserVersion | the actual version number | Y |
| created | timestamp of when this row was added to database | Y |
| lastUpdated | timestamp of last update | Y |
| lastUpdatedBy | user id of who added/edited this row to the table | Y |

FIG. 10J

OS FAMILY/OS DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| OSFamily | Desc | Optional |
|---|---|---|
| osFamilyID | unique id | N |
| name | name that will identify the OS, or Unknown | Y |
| uaRegex | Java regular expression that helps identify a OSFamily from a browser's User Agent. These can have a slightly different syntax than regular expressions in other languages. If you enter a new OSFamily but don't yet know the proper regular expression to use, just fill in some unique characters, or leave it blank, and this can be updated later during testing. | Y |
| created | timestamp of when this row was added to database | Y |
| lastUpdated | timestamp of last update | Y |
| lastUpdatedBy | user id of who added/edited this row to the table | Y |
| OS | Desc | |
| osID | unique id | N |
| osFamilyID | foreign key to OSFamily table | Y |
| osVersion | Version of the OS. Since determining the OS currently relies on the User Agent, there are some sub-versions that cannot be distinguished. For example, it is not possible to distinguish between OS X 10.2 and OS X 10.3, so the version is shown as 10.x | Y |
| uaRegex | Java regular expression that helps identify an OS from a browser's User Agent. These can have a slightly different syntax than regular expressions in other languages. If you enter a new OS but don't yet know the proper regular expression to use, just fill in some unique characters, or leave it blank, and this can be updated later during testing. | Y |
| created | timestamp of when this row was added to database | Y |
| lastUpdated | timestamp of last update | Y |
| lastUpdatedBy | user id of who added/edited this row to the table | Y |

FIG. 10K

CPU FAMILY/PLATFORM DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| CPUFamily | Desc | Optional |
|---|---|---|
| cpuFamilyID | unique id | N |
| name | name of the CPU Family. This is for identification purposes and the system will probably not display this to a user. | Y |
| uARegex | Java regular expression that helps identify a CPUFamily from a browser's User Agent. These can have a slightly different syntax than regular expressions in other languages. If you enter a new CPUFamily but don't yet know the proper regular expression to use, just fill in some unique characters, or leave it blank, and this can be updated later during testing. | Y |
| created | timestamp of when this row was added to database | Y |
| lastUpdated | timestamp of last update | Y |
| lastUpdatedBy | user id of who added/edited this row to the table | Y |

FIG. 10L

PLATFORM DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| Platform | Desc | Optional |
|---|---|---|
| cpuFamilyID | foreign key to the CPUFamily table | N |
| osID | foreign key to the OS table | N |
| created | timestamp of when this row was added to database | Y |
| lastUpdated | timestamp of last update | Y |
| lastUpdatedBy | user id of who added/edited this row to the table | Y |

FIG. 10M

USER AGENT DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| UserAgent | Desc | Optional |
|---|---|---|
| userAgentID | unique ID | N |
| browserID | foreign key to the browser table | Y |
| cpuFamilyID | foreign key to the CPUFamily table | Y |
| osID | foreign key to the OS table | Y |
| useragent | string to match against a browser's user agent | Y |
| notes | ?? | Y |
| created | timestamp of when this row was added to database | Y |
| lastUpdated | timestamp of last update | Y |
| lastUpdatedBy | user id of who added/edited this row to the table | Y |

FIG. 10N

MMVK USER AGENT DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| MMVKUserAgent | Desc | Optional |
|---|---|---|
| userAgentID | unique ID | N |
| created | timestamp of when this row was added to database | Y |
| lastUpdated | timestamp of last update | Y |
| lastUpdatedBy | user id of who added/edited this row to the table | Y |

FIG. 10O

PLATFORM BROWSER DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| PlatformBrowser | Desc | Optional |
|---|---|---|
| browserID | foreign key to the browser table | N |
| cpuFamilyID | foreign key to the CPUFamily table | N |
| osID | foreign key to the OS table | N |
| created | timestamp of when this row was added to database | Y |
| lastUpdated | timestamp of last update | Y |
| lastUpdatedBy | user id of who added/edited this row to the table | Y |

FIG. 10P

PLATFORM BROWSER PLUGIN DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| PlatformBrowserPlugin | Desc | Optional |
|---|---|---|
| browserID | foreign key to the browser table | N |
| cpuFamilyID | foreign key to the CPUFamily table | N |
| osID | foreign key to the OS table | N |
| pluginID | foreign key to the plugin table | N |
| created | timestamp of when this row was added to database | Y |
| lastUpdated | timestamp of last update | Y |
| lastUpdatedBy | user id of who added/edited this row to the table | Y |

FIG. 10Q

MMVK PLATFORM BROWSER PLUGIN DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| MMVKPlatformBrowserPlugin | Desc | Optional |
|---|---|---|
| browserID | foreign key to the browser table | N |
| cpuFamilyID | foreign key to the CPUFamily table | N |
| osID | foreign key to the OS table | N |
| pluginID | foreign key to the plugin table | N |
| rank | rank for this plugin | Y |
| created | timestamp of when this row was added to database | Y |
| lastUpdated | timestamp of last update | Y |
| lastUpdatedBy | user id of who added/edited this row to the table | Y |

FIG. 10R

PLATFORM BROWSER PLUGIN MIME TYPE DATABASE TABLE USED TO SUPPORT THE AUTOMATIC OS/BROWSER/MEDIA-PLAYER PLUG-IN DETECTION SUBSYSTEM OF THE NETWORK OF THE PRESENT INVENTION

| PlatformBrowserPluginMimeType | Desc | Optional |
|---|---|---|
| browserID | foreign key to the browser table | N |
| cpuFamilyID | foreign key to the CPUFamily table | N |
| osID | foreign key to the OS table | N |
| pluginID | foreign key to the plugin table | N |
| mimeTypeID | foreign key to the mimeType table | N |
| created | timestamp of when this row was added to database | Y |
| lastUpdated | timestamp of last update | Y |
| lastUpdatedBy | user id of who added/edited this row to the table | Y |

FIG. 10S

METHOD OF DEPLOYING, INSTALLING AND OPERATING MMVKS ON THE BKS NETWORK WITH AUTOMATIC RETAIL TRANSACTION AND COMMISSION TRACKING SERVICES ENABLED

1.) Client Account is set up for the Vendor on the BKS Network (the Network)
2.) Vendor registers their Products/Services on the Network
3.) Vendor registers Retail trading partners on the Network
4.) Retail trading Partners are assigned Client accounts on the Brandkey® Network
5.) Vendor sets up Product/Service parameters for Retailers
6.) Vendor creates Virtual Kiosks (MMVKs) for their Products/Services
7.) Vendor sets up installation environments for their MMVKs to be used in the Affiliate Program
   i. A generic, Network-specific Transaction-Tracking Script (TTS) is generated for distribution to Retailers
   ii. The Retailer installs the TTS on each of their checkout pages in their e-commerce store
8.) Affiliate user (e.g.: blogger) installs a MMVK on their Site
9.) Consumer interacts with the MMVK on the Affiliate user Site
10.) Consumer initiates a transaction by clicking on the By Now (Action) button on the MMVK
11.) In response to the selection of the By Now button on the MMVK, the MMVK Hosting server generates "Virtual Kiosk Data" which is stored on the Network via the Brandkey Network Application server
   "Virtual Kiosk Data" includes data indicating:
   i. Which Virtual Kiosk initiated the transaction
   ii. Where the Virtual Kiosk is installed
   iii. For which Product/Service was the transaction initiated
12.) The Transaction Tracking Script (TTS) automatically executes on each page of the Retailer checkout process so as to send further Transaction Data to the Network via the Brandkey Transaction/Commission Management/Tracking Application Server
   "Transaction Data" includes:
   i. Which steps of the transaction process have been completed
   ii. Any up-selling of other items have taken place in the transaction process
   iii. Whether transaction has been completed
   iv. Complete Transaction Details
13.) The Transaction Data is processed by the Network to determine appropriate commissions for the Affiliate

FIG. 12

Flow of Events When Installing a MMVK and Conducting an
E-commerce Transaction With Affiliate Services Enabled 1.) Manufacturer / Retailer sets up Virtual Kiosk (MMVK) on the Brandkey® Network.
2.) Manufacturer / Retailer sets up Commissions for each Virtual Kiosk.
3.) Affiliate installs MMVK and can select Charities for donations:
   a) Virtual Kiosk already has unique ID for each installation so tracking is already set
   b) Unique ad/promo placements are also facilitated for this, each installation can be considered as a unique Virtual Kiosk
4.) Consumer clicks Buy Now on the Virtual Kiosk.
5.) Shopping Cart is activated on the corresponding e-commerce site.
6.) Retailer / Manufacturer tracks transaction origin on their e-commerce platform.
7.) During the transaction, the e-commerce site's server sends continuous information to the Brandkey Network regarding transaction progress. If the transaction is not completed, then the Brandkey Network can identify where shopping cart abandonment occurred.
8.) Upon transaction completion, full information about the transaction is automatically sent to the Brandkey Network.
9.) Transaction reports are available on demand from BKS Networks.

FIG. 12B

Flow of Events When Installing MMVKs
With Affiliate Services Enabled

1.) The User enters the Brandkey® Affiliate Services section of Network (e.g. Mode available via a portal, etc.)
2.) The Brandkey Network displays the list of Virtual Kiosks (MMVKs) already installed by the Affiliate, as well as a list of Virtual Kiosks available for installation
3.) The Affiliate selects a Virtual Kiosk from the Available Virtual Kiosk list
4.) The Brandkey Network displays detail information about the Virtual Kiosk
5.) The Affiliate chooses to install the Virtual Kiosk:
   a.) The Brandkey Network creates a new Installed Virtual Kiosk record for the chosen Virtual Kiosk with unique Virtual Kiosk ID
   b.) The Brandkey Network appends Product ID and Virtual Kiosk ID to the Buy Now links for the Virtual Kiosk so that feedback can be obtained for transaction completion
6.) The Affiliate selects where to place the Virtual Kiosk on their blog site.
7.) The Affiliate also chooses if they wish to make donations to any charities from the commissions they receive through the Virtual Kiosks on their blog site.
8.) No Tag installations or code updating is required to be done by the Affiliate, everything is transparent for them.

(Details Step 3 in FIG. 18A)

FIG. 13

The Charitable Blogger

< Back to Dashboard | ? Help | x Sign Out

Posting | Settings | AdSense | Template | View Blog

E-stand | Pick new

Setup Your E-Stands

First Name

Last Name

Email Address

Street Address

City

State: AL

Zip Code

Powered by Braindexy

Exit | Confirm

Done

FIG. 14B

Step 1:

The User (e.g. "Charitable Blogger"), enters the Affiliate area of E-Stand™ Program. If this is the first time, then they are asked to confirm their user information with what was provided for them by their weblog hosting site.

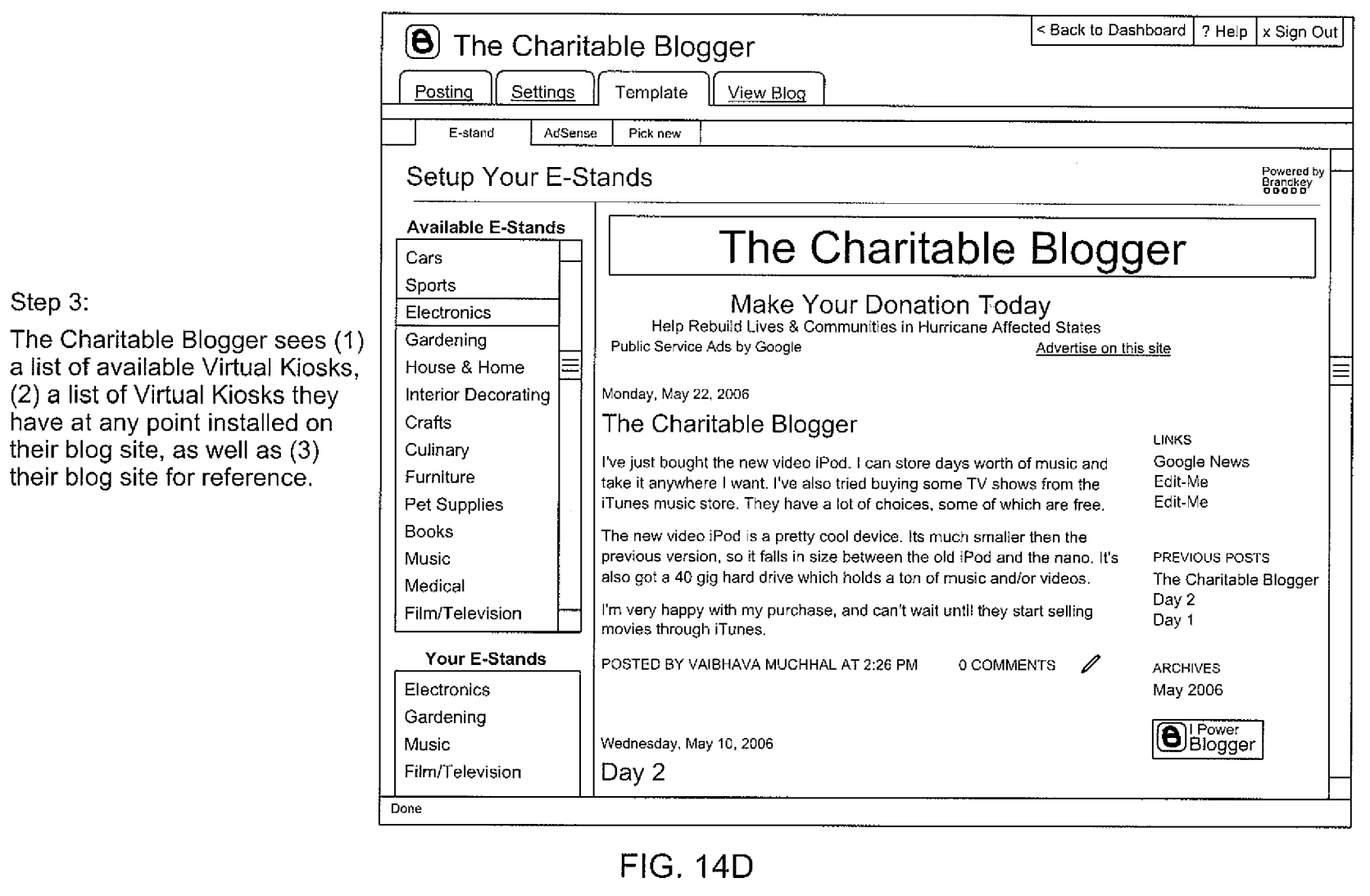

Step 3:
The Charitable Blogger sees (1) a list of available Virtual Kiosks, (2) a list of Virtual Kiosks they have at any point installed on their blog site, as well as (3) their blog site for reference.

FIG. 14D

Step 4:

When the Blogger selects a Virtual Kiosk, they are shown detail information about it. If this is a Virtual Kiosk they have already installed, then they can also see their commission information.

Your E-Stand Detail

| | |
|---|---|
| Name | The Charitable Blogger |
| I.D. | 0000-000-010-000000 |
| Sponsor | Company A Inc. |
| Product | Product A |
| Date Installed | 5/09/2006 |
| Placement | upper-right ▼ |
| | middle-right |
| | bottom-right |
| | after Blog post 1 |
| | after Blog post 2 |

Commissions Earned

| This Month | Year to Date | Last 6 months | Since Installation |
|---|---|---|---|
| $15.00 | $224.16 | $115.32 | $441.12 |

Step 8:

At any time, the Charitable Blogger can change the commission percentages to be donated to any particular charity or completely change which Charities are to receive any donations.

FIG. 14I

INTERNET-BASED E-COMMERCE NETWORK FOR ENABLING COMMISSION-BASED E-COMMERCE TRANSACTIONS ALONG THE FABRIC OF THE WORLD WIDE WEB (WWW) USING SERVER-SIDE DRIVEN MULTI-MODE VIRTUAL KIOSKS (MMVKS) AND TRANSACTION AND COMMISSION TRACKING SERVERS

RELATED CASES

This Application is a Continuation-in-Part of application Ser. No. 10/876,261 filed Jun. 24, 2004, now abandoned which is a Continuation-in-Part of application Ser. No. 10/812,341 filed Mar. 29, 2004, which is a Continuation-in-Part of application Ser. No. 10/693,856 filed Oct. 24, 2003, now abandoned which is a Continuation-in-Part of application Ser. No. 10/602,990 filed Jun. 24, 2003, now abandoned which is a Continuation-in-Part of application Ser. No. 09/716,848 filed Nov. 17, 2000 now abandoned; which is a Continuation-in-Part of application Ser. No. 09/695,744 filed Oct. 24, 2000 which is a Continuation-in-Part of application Ser. No. 09/641,908, filed Aug. 18, 2000, now abandoned which is a Continuation-in-Part of application Ser. No. 09/599,690 filed Jun. 22, 2000 now abandoned; which is a Continuation-in-Part of application Ser. No. 09/483,105, filed Jan. 14, 2000 now abandoned; application Ser. No. 09/465,859 filed Dec. 17, 1999, now abandoned; which is a Continuation-in-Part of application Ser. No. 09/447,121 filed Nov. 22, 1999 now U.S. Pat. No. 6,625,581; application Ser. No. 09/441,973 filed Nov. 17, 1999 now U.S. Pat. No. 6,961,712; each said Application is commonly owned by IPF, Inc., and is incorporated herein by reference in its entirety as if fully set forth herein.

BACKGROUND OF INVENTION

1. Technical Field

The present invention generally relates to a novel Internet-based method of and system for educating consumers and marketing branded products and services thereto within both electronic physical and retail environments.

2. Brief Description of the Prior Art

Presently, an enormous amount of time, money and effort is expended daily by thousands of manufacturers and retailers to market, brand, advertise and sell their products and services to consumers in both regional and global markets. Prior to the creation of the World Wide Web (WWW), based on the Hypertext Markup Language (HTML) and the Hypertext Transmission Protocol (HTTP) invented by Tim Berners-Lee, et al., conventional marketing and advertising systems and methods used print, radio, and television based communication mediums to communicate messages to consumers in the marketplace.

Since the development of the WWW and its enabling information file formats and communication protocols, a number of Internet-based advertising systems and networks have been developed and deployed in the world of consumer product and service advertising and promotion. Examples of commercially-available Internet-based advertising and promotion systems include: the Open Ad Stream™ (5.0) Internet Advertising Sales, Advertising-Management Software Technology And Media Services Network by RealMedia, Inc.; the DoubleClick™ Internet Advertising Sales, Advertising-Management And Media Services Network by DoubleClick, Inc. which employ its proprietary DART™ technology for collecting and analyzing audience behavior, predicting which ads will be most effective, measures ad effectiveness, and providing data for Web publishers and advertisers; the Adfusion™ Integrated Advertising Marketing, Sales and Management System by Adfusion, Inc., which integrates all phases of the media buying process including media research and planning, media inventory and yield management, secure online negotiation, the transaction execution, and tracking and post-campaign reporting; and the Promotions.com™ On-Line Promotion System by Promotions.com, Inc., formerly Webstakes.com, which develops customized online promotions for clients providing technology and consulting services necessary to run the promotions on clients' own Web sites, and offering direct marketing e-mail services using a database of customer profiles.

Recently, two principally different methods have been proposed for providing product information to consumers over the Internet.

U.S. Pat. No. 5,640,193 to Wellner discloses a system and method for accessing and displaying Web-based consumer product related information to consumers using a Internet-enabled computer system, whereby in response to reading a URL-encoded bar code symbol on or associated with a product, the information resource specified by the URL is automatically accessed and displayed on the Internet-enabled computer system. While this system and method enables access of consumer product information related information resources on the WWW by reading URL-encoded bar code symbols, it requires that custom URL-encoded bar code symbols be created, printed and applied to each and every physical product in the stream of commerce.

U.S. Pat. No. 5,978,773 to Hudetz, et al discloses a solution to the problem presented by the system and method of U.S. Pat. No. 5,640,193. This solution involves the use of a UPC/URL database in order to translate UPC numbers (and other unique codes) read from consumer products by a bar code scanner, into the URLs of published information resources on the WWW relating to the UPC-labeled consumer product.

Like U.S. Pat. No. 5,978,773 to Hudetz, et al, WIPO Publication No. WO 98/03923 discloses the use of a UPC/URL database in order to translate UPC numbers read from consumer products by a bar code scanner, into the URLs of published information resources on the WWW relating to the UPC-labeled consumer product. Current commercial realizations of this general information access technique include: the PaperClick™ Print-To-Web Information Access System by Neomedia Technologies, Inc., of Fort Meyers, Fla.; and the AirClic™ Wireless Print-to-Web Media Consumer Product and Service Information Access System by Airclic, Inc. of Blue Bell, Pa.

While U.S. Pat. No. 5,978,773 and WIPO Publication No. WO 98/03923 both provide an effective solution to the problem presented by U.S. Pat. No. 5,640,193 to Wellner, et al., these prior art references and systems completely fail to recognize or otherwise address the myriad of problems relating to UPC/URL-link collection, management, delivery, access and display along the retail supply and demand chain, which must be first solved in order deliver a technically feasible, globally-extensive, UPC-driven consumer product information system for the benefit of consumers worldwide.

For over a decade, several years before the development of the WWW, both General Electric Information Services (GEIS) formerly a division of General Electric (GE) Corporation, and Quick Response Services (QRS), Inc. of Richmond, Calif. have maintained independent consumer product information databases based on the retail industry standard Universal Product Code (UPC) numbering system. These consumer product information databases, branded as the GEIS UPC Express® Product Catalog (recently renamed the GPC Express® UPC Product Catalog), and the QRS Keystone™ UPC Product Catalog, are each maintained as a large-scale RDBMS that is connected to secure value-added networks, referred to as VANs, as well as the infrastructure of the Internet, as shown in FIG. 2B, and thus are easily accessible by retailers using Internet-enabled client computers. These UPC Product Catalogs contain "supply-side related" information records on millions of consumer products from thousands of manufacturers selling their products to retailers along the retail chain, at wholesale prices, terms conditions. The supply-side related information contained in these centralized UPC Product Catalogs are locally maintained by the manufacturers (i.e. vendors) using conventional UPC management software, as developed by Intercoastal Data Corporation (IDC) of Carrollton, Ga., and BarCode World, Inc. These manufacturer-managed UPC Product Catalogs are then periodically uploaded to GEIS's and/or QRS's centralized UPC Product Catalogs, using electronic data interchange (EDI) processes carried out between each manufacturer's UPC Product Catalog and the centralized UPC Product Catalog. The purpose of such uploading operations is to update these centralized UPC Product Catalogs with current and accurate pricing and shipping information required by retailers who visit these centralized UPC Product Catalogs, download the UPC Product Catalogs of their manufacturer trading partners (or portions thereof), to review current product offerings and wholesale prices, terms and conditions, and thereafter purchase desired products from the downloaded manufacturer's UPC Product Catalog using conventional EDI-enabled electronic-commerce (EC) transaction techniques. In essence, the primary function of these centralized UPC Product Catalogs is to enable B-2-B EC transactions between retailers and manufacturers (i.e. vendors) so that retailers can maintain a supply of products in their inventories sufficient to meet the demand for such products by consumers along the retain chain.

In addition to such centralized UPC Product Catalogs described above, these network administrators (GEIS and QRS) use information collected from B-2-B EC-transactions enabled by their centralized UPC Product Sales Catalogs, to provide a number of other solutions to problems relating to electronic commerce (EC) merchandising and logistics within the global supply chain. Such ancillary information services include, for example: Sales, Analysis and Forecasting Services providing retailers with information about what products consumers are buying; Collaborative Replenishment Services for determining what products retailers can buy in order to satisfy consumer demand at any given point of time; and Transportation and Logistics Information Services for providing retailers with information about when products purchased by them (at wholesale) will be delivered to their stores. Such information services are offered to retailers on a global basis through VANs and the Internet.

While the above-described supply-chain information management and delivery systems and services collectively cooperate to optimize the process of moving raw materials into finished products and into the hands of consumers, such supply-side information systems fail to address the information needs of the consumers of retail products who require and desire product-related information prior to, as well as after, the purchase of consumer-products. Moreover, such systems and services fail altogether to address the problems facing manufacturer marketing, brand and product managers, and their advertising and promotion agents, as well as retailer marketing and product managers and their advertising and promotion agents working along the demand-side of the retail chain.

In many respects, the Brand Marketing Communications industry has come a long way over the past twenty years. Advances in cognitive psychology and technology have helped to drive the industry forward at a very fast rate. Also, the development of Internet and the World Wide Web (WWW) has also played a major role in redefining the structure of the global marketplace and how Consumers can learn about and make their product and service purchases.

Brand managers increasingly regard the Internet as the potential 'holy grail' to communicate personalized messages to target audiences, and monitor their responses in real time. However no one has yet found online tools that capitalize on the Internet's interactivity, and allow marketers to communicate powerful, consistent brand messages and images to shoppers throughout the web.

Solutions remain elusive because marketers have a complex set of online needs. First, they must be able to collaborate with e-tailers and other Internet trading partners on marketing campaigns in order to ensure that shoppers receive consistent messages that reinforce the brand at every turn.

Unfortunately, the Internet's built-in frictions between brand managers and their trading partners often prevent this important collaboration from taking place. Because e-tailers control the amount of space and type of information the consumer views on the e-tail site, brand managers cannot present a unique brand experience to shoppers at the Internet's most critical points-of-sale. E-tailers may also discourage links to a brand's own Website that provide a shopper with more in-depth information, because they may risk losing the sale when the shopper leaves their sites. Finally, the retailer's multi-channel strategy, which caters to consumers whether they are shopping online or offline in traditional retail stores, works against the interests of pureplay e-tailers. These e-tailers receive the online traffic, but may lose sales to brick-and-mortar retail stores.

The Internet is anything but collaborative in this tense climate. Communication among trading partners is poor. Consumers may receive conflicting promotional offers from different agents, and resellers may receive outdated pricing about various products. Worse, the marketing industry lacks the dedicated technology to connect the brand manager, e-tailer and other online trading partners in a collectively beneficial network that would facilitate comprehensive changes in marketing campaigns.

Another difficult challenge brand managers face is communicating with the Internet's price-driven, task-oriented shopper who has long since tuned out the clutter and noise in the Internet marketplace. E-tailers have also worked very hard to engage the online shopper, with improved product information, site design and overall user experience. Unfortunately, shopping cart abandonment continues to be one of the most enduring problems facing e-tailers and brand managers, with unfinished online transactions projected to reach an estimated $6.3 billion in losses in 2004.

Clearly, the Internet still lacks the compelling shopping experiences that would make an impatient consumer feel a product was worth the hassle of following the checkout process through to purchase. Marketers continue to search and experiment with ways to fully engage the savvy, price-driven shopper at the point-of-sale.

Finally, brand marketers must contend with technology like comparison sites, which have rapidly grown in popularity in just the past year. These shopping tools convert brands to commodities and inhibit the marketer's brand building efforts with consumers on the Internet.

The result is that the savvy, aggressive online consumer rules a price-driven Internet marketplace, where e-tailers and brand managers are reactive. In order to gain traction in the online sales channel, brand managers and e-tailers must engage this shopper in an information-rich shopping experience that motivates the online shopper to consider purchases based on compelling brand information as well price and promotion deals.

Current dynamics in the Internet marketplace present several major challenges to brand managers in their efforts to build strong brands online:

Building Online Brands on Real Time With Consistent Messages Across Multiple Touch Points To build a strong brand presence, consumers must receive consistent messages and images about a brand, and this is extremely difficult for brand managers to control on the Web. Brand building assets created by manufacturers are commonly arranged and presented by a range of trading partners on e-tail sites and other Web touch points to deliver inconsistent brand messages and images to consumers. As a result, consumers often receive conflicting promotional offers from different agents, and resellers may receive outdated pricing about various products.

Building Collaboration Among Partners in an Inherently Divisive Environment

Brand managers must collaborate with their agents and retailer trading partners to ensure that shoppers receive consistent messages that reinforce the brand at every turn. The Internet's built-in friction between brand managers and their trading partners compounds their difficulties.

E-tailers control the amount of space and type of information the consumer views on the e-tail site, and brand managers cannot present a unique brand experience to shoppers at the point of sale. They must communicate their brands predominantly through the space they rent on e-tail sites, which is cluttered with other brands. Consumers have limited access to the information they seek before purchasing certain products on these sites, but e-tailers frequently also discourage links to a brand's own with in-depth information, because they may lose the sale when the shopper leaves their site. Finally, the retailer's multi-channel strategy, which encourages the shopper to buy the brand in a variety of sales channels, works against the interests of pureplay e-tailers. These e-tailers receive the traffic, but lose the sales to brick-and-mortar retail stores.

The Internet is anything but collaborative in this tense climate, and communication among trading partners is poor. Marketers often lack the technology that would enable them to communicate effectively with these partners. There are no specific processes and/or dedicated technology in place connecting the brand manager, the agency, and the e-tailer to make any major, comprehensive changes in marketing campaigns. As a result, outdated product information, conflicting promotional offers or other incorrect brand information are frequently circulated among trading partners.

Communicating With Savvy, Impatient Online Shopper to Develop Brand Loyalty

Although brand managers invested $7.2 billion in 2003 in online advertising, shoppers continue to gravitate to the brands they interact with offline; the bulk of the year's retail sales remained with the top brands with a strong offline presence. According to the Gartner Group, the average shopper decides what s/he wants before going online, then starts and finishes a session within fifteen minutes. Despite a continual lack of success influencing the online shopper, however, 70% of brand managers in a recent Forrester study said that they would increase their marketing budgets another 5% in 2004.

E-tailers, too, have been working very hard to engage the online shopper in the last two years with improved site design and overall user experience. Yet studies still say the second major reason online shoppers abandoned their carts, after prohibitive shipping costs, is because they changed their minds. Clearly, sites still lack the compelling shopping experience that would make an impatient consumer feel a product was worth the hassle of following the checkout process through to purchase.

Guarding Against Brand Erosion in Price-Comparison Environments

Finally, brand marketers must contend with online technology like price comparison sites that threaten to erode brand value. Consumer shopping tools such as Yahoo!'s comparison shopping site, inhibit marketers in their efforts to build brand value with consumers on the Internet, by encouraging consumers to shop for products in a category by price.

Given these major challenges, it is no surprise that brand managers have been generally unsuccessful to date building strong brands online.

Brand managers and e-tailers must create an information-rich shopping experience that motivates the online shopper to consider purchases based on compelling brand information as well price and promotion deals. Current online advertising and systems integration players in the marketplace serve various portions of this need, but no one has considered or developed a way of and a means for giving the brand manager effective online advertising tools that build brand, and the collaborative technology that enables them to communicate consistent brand building images and messaging to consumers anywhere along the WWW.

In short, brand owners need a new way of and means for addressing several problems in both electronic and physical streams of commerce, namely:

(1) Brands are frequently misrepresented or weakened online because online trading partners usually control or manage the representation of brand images and messaging;

(2) Communication between online trading partners and brand owners is frequently poor;

3. Technology that promotes communication and collaboration between brand owners and trading partners is limited and cost-prohibitive; and 4. Online price comparison environments erode brand value.

As businesses become increasingly commoditized, one of the few sustainable areas for differentiation and competitive advantage is in the customer experience created and relationship formed when a company touches its customers.

While historically most touchpoints have consisted of humans interacting with humans, as technology has evolved, and as people are more comfortable interacting with technology, more of a company's touchpoints occur as customers interact with machines (phone systems, websites, kiosks, etc.), along their sales and marketing channels, in the form of Front Office Systems.

The revolution that is currently taking place in the front office systems is making it essential that companies think holistically about their "interface systems".

This is achieved by creating the right interfaces for each customer segment and each customer situation, and aligning all of the organization's interfaces in their front office systems so that a customer's interactions are consistent, complementary, and result in deepening the customer's relationship with the company.

Retailers need to deliver same quality experiences anywhere online and in physical stores. Consequently, retailers spend $2 billion each year, in all categories on technology and third party services. In 2004, the average retail IT budget grew to $239 million.

Currently, Manufacturers are not able to efficiently manage their brand information and service interfaces at all touchpoints. Consequently, manufacturers are experiencing great difficulty differentiating their product brands online, and communicating brand value at points of display and sale.

Consequently, both manufactures and retailers are forced to compete on price alone, and their profit margins suffering.

At the same time, consumer acceptance of affiliate programs is growing, and retailers are trying to support as many affiliate programs as possible to reach as many consumers as possible online. Also, retail merchants are getting closer to their affiliates, with greater communications between each other.

In view of current market conditions, the big challenge is: HOW can Retailers deliver valuable product information and customer service at BOTH online and offline touchpoints, in a seamless manner with the retailer's environment, without incurring significant bottom line costs, while manufacturer brands are empowered to manage their brands and drive commerce anywhere along the fabric of the Web, so that:

Manufacturers and Retailers both benefit from the capacity of Manufacturers to differentiate their products and services and communicate brand value at points of display and sale, in both online and brick and mortar stores;

Consumer purchase decisions are based on Brand Value, and not price alone;

Manufacturers and Retailers enjoy premium value for their products and services in the marketplace; and Manufacturers and Retailers can drive commerce along new areas of the expanding Web, such as lifestyle sites and weblogs, via e-commerce enabled affiliate programs that they can easily track and control?

In view, therefore, of the above, it is clear that there is great need in the art for an improved method of and apparatus for enabling brand owners to manage (command) and tightly control and deliver product and service related brand merchandising and marketing communications to consumers, and enable product and service transactions anywhere along the World Wide Web (WWW) in both physical and electronic retail shopping environments, while avoiding the shortcomings and drawbacks of prior art systems and methodologies.

OBJECTS AND SUMMARY OF THE PRESENT INVENTION

Accordingly, a primary object of the present invention is to provide a novel method of and apparatus for enabling brand owners to manage (command) and tightly control product and service related brand marketing communications to consumers anywhere along the World Wide Web (WWW) in both physical and electronic retail shopping environments, while overcoming the shortcomings and drawbacks of prior art systems and methodologies.

Another object of the present invention is to provide such apparatus in the form of a novel Enterprise-Level Brand Management And Marketing Communication Network based on an innovative brand command, control and communication architecture (BC3), which gives brand owners complete command and control over the wide range of brand-building assets, messaging and promotions scattered throughout the Web, and how they are communicated to directly consumers at diverse Web touch points, with the efficiency and automation of supply-chain management solutions.

Another object of the present invention is to provide such an Enterprise-Level Brand Management And Marketing Communication Network that fuels the "front-office" revolution by allowing manufacturer and retail brands to improve the customer experience along all channels and touchpoints.

Another object of the present invention is to provide such an Enterprise-Level Brand Management And Marketing Communication Network that (1) integrates online and offline channels and touchpoints, namely; points of display and sale at online stores; points of display (e.g. shelf displays, bar code driven kiosks) in brick and mortar stores; affiliate web sites (e.g. lifestyle sites, web-logs, etc); and mobile communication devices (e.g. Web-enabled PDAs, cellphones, etc); and Interactive Television (ITV); and which (2) allows manufacturers and retailers to drive commerce over these integrated channels and touchpoints, with brand-powered (i.e. manufacturer/vendor assisted) merchandising and retailing services.

Another object of the present invention is to provide an Internet-based Brand Management And Marketing Communication Instrumentation network for deploying, installing and remotely programming brand-building server-side driven Multi-Mode Virtual Kiosks on the World Wide Web (WWW).

An object of the present invention is to provide an enterprise-level collaborative communications solution that will give brand managers and their online trading partners the power to build strong online brands, drive sales and eliminate existing friction in the retail chain through a collaborative e-marketing network.

Another object of the present invention is to provide an Internet-based Brand Management And Marketing Communication Instrumentation Network which provides brand managers, their agents and e-retail trading partners with a technology-based solution that will be able them to drive more sales online through a collaborative e-marketing communication network that delivers rich brand experiences to consumers anywhere on the Web.

Another object of the present invention is to provide an Internet-based Brand Management And Marketing Communication Instrumentation Network that will satisfy four basic needs of brand management teams in today's Internet marketplace:

1. To build strong brands online with consistent messaging and images across multiple touch points on the Web
2. To build collaboration among partners in an inherently divisive environment
3. To communicate with consumers anywhere on the Internet and build brand loyalty
4. To guard against brand erosion in price-comparison environments.

Another object of the present invention is to provide an Internet-based brand management and marketing communication instrumentation network which, for the first time, ensures brand owners that consumers receive consistent rich-media brand experiences anywhere they happen to be on the Web, in both physical and electronic streams of commerce.

Another object of the present invention is to provide an Internet-based Brand Management And Marketing Communication Instrumentation Network which enables brand management teams to communicate consistent brand messages to consumers in real-time, along with their agents and e-tailer trading partners during online brand campaigns, and also to monitor consumer activity as well throughout the Internet.

Another object of the present invention is to provide an Internet-based Brand Management And Marketing Communication Instrumentation Network which brand owners operate in-house, on an hosted application basis, to create, control, deliver and monitor the brand experience delivered to consumers throughout the Web.

Another object of the present invention is to provide an Internet-based Brand Management And Marketing Communication Instrumentation Network which enables brand owners to display rich media advertisements, the day's promotions, in-depth product information and other brand assets of their choice in online vehicles (i.e. interactive communication instruments) called "Multi-Mode Virtual Kiosks": which deliver quick, information-rich shopping (i.e. brand) experiences to consumers at the point of sale and other critical Web touch points when they are making a buying decision. Using a Web browser and a mouse, these Multi-Mode Virtual Kiosks can be quickly and inexpensively created, deployed, installed, and modified in real-time anywhere on the Web.

Another object of the present invention is to provide an Enterprise-Level Brand Management And Marketing Communication Network that is synchronized with ones supply-chain information management operations, and is capable of bringing about supply-chain efficiencies to demand chain management operations within an enterprise.

Another object of the present invention is to provide an Enterprise-Level Brand Management and Marketing Communication Network, in which Multi-Mode Virtual Kiosks are programmable through the Brand Management and marketing Communication Network, and wherein the network delivers a revolutionary ensemble of Web-based instruments that enables brand management teams to orchastrate, build and communicate intended brand images to consumers at any Internet-enabled consumer touchpoint via Multi-Mode Virtual Kiosks installed along electronic streams of commerce.

Another object of the present invention is to provide an Internet-based Brand Management And Marketing Communication Instrumentation Network which, by providing the instruments for rapidly building powerful Brand Information Networks and Advertising and Promotional Campaigns for delivery to consumers over highly controlled channels of communication less immune to destructive power of clutter, enables brand management teams to create stronger, more distinctive brands in the marketplace-translating into premium prices, greater levels of channel influence, improved levels of customer loyalty and retention, and increased profits.

Another object of the present invention is to provide an Internet-based Brand Management And Marketing Communication Instrumentation Network which provides an increased level of control over Internet-based brand marketing communications that enables brand managers and their agents to effectively manage consumers' experienced perceptions developed before, during and after consumer purchases. This improved management of consumer perception will allow consumers to have more meaningful purchase experiences and will influence their perception of a brand's value and strength.

Another object of the present invention is to provide an enterprise-level Internet-based (online) Brand Management and Marketing Communication Network that enables brand management teams perform real-time integration and delivery of complex, richly-associated networks of brand building assets, advertisements and promotions, to consumers anytime and anywhere on the Internet.

Another object of the present invention is to provide an enterprise-level Internet-based online Brand Management and Marketing Communication Network which, by supporting advanced management of Brand Information Networks and real-time generation, installation and programming of Multi-Mode Virtual Kiosks, enables brand management teams to effectively collaborate and establish brand information dominance in the mental space of consumer minds.

Another object of the present invention is to provide an enterprise-level Internet-based (online) Brand Management and Marketing Communication Network which enables brand marketers to deliver rich brand experiences to consumers consistently across all retail distribution channels over the Internet, in a highly-controlled and cost-efficient manner.

Another object of the present invention is to provide an enterprise-level Internet-based (online) Brand Management and Marketing Communication Network, offering the following benefits and advantages:

(i) a Brand Management and Marketing Communication Network that empowers brand-driven enterprises, by providing their brand marketing executives and managers with a remarkable degree of command and control over their brand building information resources, wherever they may be hosted on the infrastructure of the Internet;

(ii) a Brand Management and Marketing Communication Network that provides information management and communication superiority which allows brand marketing planners to better shape the brand knowledge and images held by consumers in the marketplace, and positively influence consumer perceptions and behavior— wherever consumer brand purchases might be contemplated on the Internet; and (iii) a Brand Management and Marketing Communication Network that enables brands to more effectively compete for a dominant position in the minds of consumers who might be considering a purchase at home, at work, on the road, or in brick and mortar retail stores.

Another object of the present invention is to provide an Enterprise-Level Brand Management And Marketing Communication Network that gives brand managers the tools to positively influence price-driven online shoppers and effectively communicate the essence of their brands through a quick, information-rich shopping experiences at the e-tail point of sale and other Web touch points.

Another object of the present invention is to provide an Enterprise-Level Brand Management And Marketing Communication Network, wherein brand management team members display richly-associated brand-building information resources, including ad and promo messages, during the choreographed display modes of a "Multi-Mode Virtual Kiosk" which consumers can launch anywhere on the Web to obtain in-depth information about a brand, as well as rich media images and the latest promotions on a real-time basis.

Another object of the present invention is to provide an Enterprise-Level Brand Management And Marketing Communication Network that enables brand management teams with a unique ability to choreograph and deliver an engaging, unprecedented rich brand experience to consumers anywhere on the WWW, with the efficiency and automation of supply chain management solutions.

Another object of the present invention is to provide an Enterprise-Level Value-Added Brand Management And Marketing Communication Network (VAN) that easily integrates with any Enterprise Resource Planning (ERP) or Supply Chain Management System, with any Content Management System (CMS), with all global Content Delivery Networks (CDNs), with any e-commerce platforms, and with all Web hosting sites.

Another object of the present invention is to provide an Enterprise-Level Brand Management And Marketing Communication Network that provides brand managers with a new way of and means for reaching and influencing the brand perceptions of the online shopper.

Another object of the present invention is to provide an Enterprise-Level Brand Management And Marketing Communication Network that enables brand managers to efficiently deliver and measure online brand marketing communications across all channels in an automated and highly efficient manner, with a measurable ROI.

Another object of the present invention is to provide an Enterprise-Level Brand Management And Marketing Communication Network which, as a centralized hosted solution, allows brand managers to link seemingly disparate online assets—rich media, promotional messages and product specifications, for example—and bring them directly to online shoppers at the point-of-purchase and any touch point on the World Wide Web, through a new interactive online shopping vehicle called a Multi-Mode Virtual Kiosk.

Another object of the present invention is to provide an Enterprise-Level Brand Management And Marketing Communication Network, wherein brand owners can place Multi-Mode Virtual Kiosks anywhere on the Web they wish to deliver an information-rich brand experience or present a multi-faceted view of their brands directly to consumers. They can place Virtual Kiosks on e-retail sites and portals the consumer visits while in a transactional mindset (e.g., shopping search engine results pages), on partner websites or any point on the Web where they wish to create or reinforce brand awareness in the mind of the consumer.

Another object of the present invention is to provide an Enterprise-Level Brand Management And Marketing Communication Network, wherein the Multi-Mode Virtual Kiosks function as the presentation layer of thereof, and which the brand owner operates in-house to tightly control and manage brand assets anywhere on the Web, and collaborative in real-time with retail trading partners, as well as advertising and promotion agents, to program the Multi-Mode Virtual Kiosks so as to ensure timely, consistent delivery of online brand marketing messages and drive sales.

Another object of the present invention is to provide an Enterprise-Level Brand Management And Marketing Communication Network which enables brand management team members to effectively and efficiently define, refine and measure online brand communication activities with a few mouse clicks from a Web-enabled browser program.

Another object of the present invention is to provide an Enterprise-Level, Industrial-Strength Brand Management And Marketing Communication Network that is sufficiently scalable to support the brand marketing communications industry in much the same way as AT&T's public telephone switching network (PTSN) serves millions of companies throughout the world.

Another object of the present invention is to provide an Enterprise-Level Brand Management And Marketing Communication Network which can be used by Brand managers and their team members (including ad and promo agents) and retail trading partners as well, with minimal technical knowledge to that they can easily create, install and modify Multi-Mode Virtual Kiosks from their own computers using five simple suites of tools, namely: the Brandkey Manage™ Subsystem which supports information services that allow brand owners to manage accounts, brands and user rights on the Brand Marketing Communication Network for organizations having any kind of collaborative arrangement; the Brandkey Create™ Subsystem which supports information services that allow users to choose the content, arrangement and "look and feel" of Brand Information Networks; the Brandkey Deliver™ Subsystem which supports information services that enable users to create and deploy Multi-Mode Virtual Kiosks anywhere on the Web; the Brandkey Advertise™ Subsystem which supports information services that provide brand managers and their advertising agents with a collaborative online network to build, track and modify Multi-Mode Virtual Kiosk based advertising campaigns in real-time; and the Brandkey Promote™ Subsystem which supports information services that, similar to Brandkey Advertise, enables brand managers to create, monitor and modify their ever-changing promotional campaigns on subnetworks of Multi-Mode Virtual Kiosks, with promotional agents in real-time.

Another object of the present invention is to provide an Enterprise-Level Brand Management And Marketing Communication Network which provides a suite of tools that enable brand management teams and their trading partners to deploy and install Multi-Mode Virtual Kiosks at points of display and purchase on the Web. With a few mouse clicks, brand managers regulate the rights and privileges of team members and trading partners on the Network.

Another object of the present invention is to provide an Enterprise-Level Brand Management And Marketing Communication Network, wherein brand management team members and trading partners build and install Multi-Mode Virtual Kiosks; then brand management team members, as well as their agents and trading partners, simply program the multiple display modes of installed Virtual Kiosks, so that rich media advertising spots, promotional spots, and brand building resources are delivered to shoppers where it counts, creating information-rich brand experiences as intended by brand owners, developing more consistent brand images across all e-tail marketing channels, while simultaneously creating great value and benefits for e-tailer trading partners, consumers and brand owners alike.

Another object of the present invention is to provide an enterprise-level brand management and marketing communication network, wherein brand management team members create a Brand Information Network (BIN) for each product, service or corporate brand, which serves as an invisible, but critical foundation for all activities on the Brand Management and Marketing Communication Network of the present invention, and a storehouse of links for the digital brand-building information assets that consumers view during the operation of each remotely-programmed Multi-Mode Virtual Kiosk.

Another object of the present invention is to provide an Enterprise-Level Brand Management And Marketing Communication Network, wherein each Brand Information Network is, in essence, a set of data comprised of the following items: (i) basic information about the product/service which function as Brand Information Search Keys: Universal Product Number (USN) or Universal Service Number (USN); Trademark (TM) or Servicemark (SM); Product Descriptor (PD) or Service Descriptor (SD); Product or Service Brand Name; and Product or Service Category; (ii) Web location or address (URL) of brand assets/content at the brand owner's disposal (e.g., product video, audio, product image, etc.—in multiple languages if applicable); and (iii) basic, practical display attributes of the brand assets (i.e., text for clickable links, icons displayed next to the links, sound files associated with the links, types of links, etc.) located at each node in the Web-based Brand Information Network of the present invention.

Another object of the present invention is to provide an Enterprise-Level Brand Management And Marketing Communication Network, wherein brand owners use combinations of these data links (e.g. UPN/TM/PD/URLs for product brands or UPS/SM/SD/URLs for service brands) to build and manage Brand Information Networks anywhere using a Web-enabled computer. Brand owners can quickly access, shift or change these components when seasonality, pre-purchase/post-purchase considerations and different target audiences require them to modify Brand Information Networks.

Another object of the present invention is to provide an Enterprise-Level Brand Management And Marketing Communication Network, wherein the same brand-related information keys (e.g., Universal Product Numbers, Trademarks, Product Descriptors, Universal Service Numbers, Servicemarks, Brand Names, etc.) are used to index each rich media advertising spot, promotional spot, and other brand asset associated with a created Brand Information Network, and these brand-related information keys represent basic building blocks of networks brand information management and communication system architecture.

Another object of the present invention is to provide an Enterprise-Level Brand Management And Marketing Communication Network, wherein once Brand Information Networks are in place, brand owners can decide how and where to showcase their brands by building and deploying Multi-Mode Virtual Kiosks.

Another object of the present invention is to provide an Enterprise-Level Brand Management And Marketing Communication Network, wherein brand images and messages can be communicated to shoppers through one or more of the three distinct display modes in each Multi-Mode Virtual Kiosk, namely: Advertising Display Mode (e.g., rich media spots intended to create emotional connection with the brand); Promotional Display Mode (e.g., for displaying time-limited offers in the form of price-based messaging, media-based offers, etc.); and a Brand Information Network Display Mode (e.g. a set of categorized links providing a wide range of information about the product or service, along with search capabilities for the brand's other offerings).

Another object of the present invention is to provide an Enterprise-Level Brand Management And Marketing Communication Network, wherein when the user clicks on a Multi-Mode Virtual Kiosk installed along the fabric of the WWW, a combination of the three display modes will play automatically for the consumer, in a sequence determined by the brand owner or trading partner who creates and deploys the Multi-Mode Virtual Kiosk to deliver an effectively choreographed brand experience to the consumer. For example, a Multi-Mode Virtual Kiosk could open with a rich media advertisement, followed by a promotional offer and finally lead the consumer to a custom set of additional brand information—all in a seamless progression.

Another object of the present invention is to provide an Enterprise-Level Brand Management And Marketing Communication Network, wherein brand marketers can rise above the clutter, by virtue of the fact that the same brand-related information keys (e.g., Universal Product Numbers, Trademarks, Product Descriptors, Universal Service Numbers, Servicemarks, Brand Names, etc.) used to index rich media advertising spots, promotional spots, and other brand assets associated with creating Brand Information Networks, are also used to program "virtual brand communication channels" in each Multi-Mode Virtual Kiosk installed on the Brand Marketing Communication Network. These brand-related information keys enable consumers to easily search for and access brand information from Multi-Mode Virtual Kiosks at diverse consumer touchpoints.

Another object of the present invention is to provide an Enterprise-Level Brand Management And Marketing Communication Network, wherein the three different modes of marketing communication and display can be either temporally or spatially multiplexed within the graphical user interface (GUI) of the Multi-Mode Virtual Kiosk so as to be able to deliver three different kinds of brand marketing communication content (i.e. Ad Spots, Promo Spots, and Brand Information Networks) at either (i) three different moments (frames) in time on the GUI (i.e. referred to as "temporal multiplexing"), and/or (ii) at three different places in space on the GUI (i.e. referred to as "spatial multiplexing).

Another object of the present invention is to provide an Enterprise-Level Brand Management And Marketing Communication Network, wherein each and every Ad Spot, Promo Spot and Brand Information Network (i.e. "brand marketing communication") is indexed with Brand-related Information Keys ("BRANDKEYS") such as (i) the UPN, TM and PD of the branded product to which such brand marketing communications relate, or (ii) the UPS, SM and SD of the branded service to which such brand marketing communications relate. Thus, all "brand marketing communications" (e.g. Ad Spots, Promo Spots and Brand Information Networks) communicated through the Network are indexed using Brand-related Information Keys ("brandkeys").

Another object of the present invention is to provide an enterprise-level brand management and marketing communication network, wherein each different type of Multi-Mode Virtual Kiosk is characterized (and thus defined) in terms of a different class of Brand-Related Information Keys (brandkeys). For example, a Product-Specific (PS) Multi-Mode Virtual Kiosk is defined (classified) by a single, unique UPN (i.e. UPC) of a particular Vendor/Brand-Owner. A Vendor-Specific (VS) Multi-Mode Virtual Kiosk is defined (classified) by a set or family of UPNs (i.e. UPCs) marketed by a particular Vendor/Brand-Owner (e.g. under one or more different Trademarks (TMs) or Brand Entities). A Service-Specific (SP) Multi-Mode Virtual Kiosk is defined (classified) by a single, unique USN of a particular Service-Provider/Brand-Owner. A Service-Provider-Specific (SPS) Multi-Mode Virtual Kiosk by a set or family of USNs marketed by a particular Service-Provider/Brand-Owner (e.g. under one or more different Servicemarks (Sms) or Brand Entities). A Retailer-Specific (RS) Multi-Mode Virtual Kiosk is defined (classified) by a set or family of UPNs (i.e. UPCs) marketed by a particular set of Vendors/Brand-Owners carried by a particular Retailer.

Another object of the present invention is to provide an Enterprise-Level Brand Management And Marketing Communication Network, wherein the Brand-Related Information Keys (i.e. brandkeys) imposed on Multi-Mode Virtual Kiosks server as virtual brand marketing communication channels (i.e. brand-related filters of sorts) for brandkey-indexed brand marketing communications conducted through the network.

Another object of the present invention is to provide an Enterprise-Level Brand Management And Marketing Communication Network, wherein all "brand marketing communications" (e.g. Ad Spots, Promo Spots and Brand Information Networks) conducted through the network are indexed using Brand-related Information Keys ("brandkeys"), only specific brand-related content gets communicated over Multi-Mode Virtual Kiosks characterized with the same Brand-Related Information Keys (brandkeys). Such indexing of brand building information resources and Multi-Mode Virtual Kiosks on the network helps to ensure that only brand marketing communications related to a particular product, service or brand gets delivered to consumers over Multi-Mode Virtual Kiosks that are brand-keyed to such branded products and services. This reduces clutter, and delivers clearer brand image building communications, with greater efficiency—increasing ROI on brand marketing communication expenditures.

Another object of the present invention is to provide an Enterprise-Level Brand Management And Marketing Communication Network, wherein brand owners have multiple options to customize every Multi-Mode Virtual Kiosk, from selecting its look-and-feel variables (including 'skin type' defined by surface texture, color, button style, etc.) and placement of the brand logo, to the type and arrangement of links in each Brand Information Network.

Another object of the present invention is to provide an Enterprise-Level Brand Management And Marketing Communication Network, wherein brand management teams can easily and inexpensively test consumer reception to the arrangement and sequence of these brand-building assets in specific Multi-Mode Virtual Kiosks, because they can create and modify these Multi-Mode Virtual Kiosks in-house.

Another object of the present invention is to provide an Enterprise-Level Brand Management And Marketing Communication Network, wherein sophisticated search capabilities are supported within the Multi-Mode Virtual Kiosk for multiple products and services from a brand owner.

Another object of the present invention is to provide an Enterprise-Level Brand Management And Marketing Communication Network, which has been designed to cater to virtually any level of brand portfolio complexity, and provides the capability for consumers to search for an unlimited number of products or services through the Multi-Mode Virtual Kiosk, as determined by the brand owner.

Another object of the present invention is to provide an Enterprise-Level Brand Management And Marketing Communication Network, wherein by experimenting with various different display schemas for Brand Information Networks as well as their presentation, brand managers can create powerful new vehicles that convey the value of their product or service brands more effectively than ever before—creating new forms of intellectual property.

Another object of the present invention is to provide an Enterprise-Level Brand Management And Marketing Communication Network, wherein once the brand owner has built the Multi-Mode Virtual Kiosk, s/he can instantly install it on the Web by placing a 'trigger point' (tag) on an online retail partner's site.

Another object of the present invention is to provide an Enterprise-Level Brand Management And Marketing Communication Network, wherein Multi-Mode Virtual Kiosks can then be 'brought to life' (launched and opened within a Web Browser program) by the user in four simple, intuitive ways: Launch button on an e-tail site or other Web touch point; Clickable image on a website; Image embedded in a document; and an Icon on a computer desktop.

Another object of the present invention is to provide an Enterprise-Level Brand Management And Marketing Communication Network, wherein the brand owner can activate/deactivate any Multi-Mode Virtual Kiosk with one click of the mouse, through the Network's easy-to-use Web-based system management interface.

Another object of the present invention is to provide an Enterprise-Level Brand Management And Marketing Communication Network, whereinonce brand owners or their trading partners have placed Multi-Mode Virtual Kiosks on the Web, they can easily manipulate the way their Multi-Mode Virtual Kiosks deliver brand communications. For example, they can create an advertising campaign (with Advertising Display Mode as the dominant user experience) for a certain length of time and monitor its outcome. They can then shift the focus of the communication to a more promotionally-oriented experience (emphasizing the Promotional Display Mode), without having to recreate the whole set-up process from scratch and spend additional time, money and resources. When important new information about the product or service changes or fresh information becomes available, they can easily add one or more links to the Brand Information Display Mode, with a maximum of ten links.

Another object of the present invention is to provide an Enterprise-Level Brand Management And Marketing Communication Network, brand management team members can collaborate with their advertising and promotional agents as well as retail trading partners, in programming deployed Multi-Mode Virtual Kiosks with brand-building marketing communications, with an unprecedented level of efficiency and accountability.

Another object of the present invention is to provide an Enterprise-Level Brand Management And Marketing Communication Network, wherein using a Web browser and a mouse, for example, brand managers can simply set and adjust the rights and responsibilities of their associates and/or agency and retail trading partners 'on the fly'.

Another object of the present invention is to provide an Enterprise-Level Brand Management And Marketing Communication Network, wherein brand owners are provided with the ability to tightly control their online brand assets, effectively collaborate with their advertising and promotional agents and e-tail trading partners during online brand marketing campaigns, as well as directly communicate with online shoppers across multiple e-tail channels, both at points-of-sale and other places on the Web. The result is that consumers have information-rich brand experiences as intended by brand owners and develop more consistent brand images across all e-tail marketing channels, while great value and benefits are simultaneously created for e-tailer trading partners.

Another object of the present invention is to provide an Enterprise-Level Brand Management And Marketing Communication Network, wherein Multi-Mode Virtual Kiosks can be deployed and installed on emerging e-commerce platforms offline as well as online, including a home computer, interactive television, mobile phone or ATM machine.

Another object of the present invention is to provide an Enterprise-Level Brand Management And Marketing Communication Network, wherein user interfaces on Multi-Mode Virtual Kiosks (MMVK) are translatable so that marketers can communicate consistent brand messages and images across all Web-enabled offline platforms, independent of the footprint of the MMVK-supporting computing platform.

Another object of the present invention is to provide an Enterprise-Level Brand Management And Marketing Communication Network, wherein Multi-Mode Virtual Kiosks can be deployed and installed on any emerging e-commerce platform because its basic architecture runs on TCP/IP, the most basic communication layer of the Internet, and all technology of the future will be built on the TCP/IP layer.

Another object of the present invention is to provide an Enterprise-Level Brand Management And Marketing Communication Network, which is compatible with developing technologies like RFID and WIFI, for example, that extend the Internet to the physical world.

Another object of the present invention is to provide an Enterprise-Level Brand Management And Marketing Communication Network, wherein Multi-Mode Virtual Kiosks can be deployed and installed on various e-commerce mediums, such as for example: Multi-Mode Virtual Kiosks on Physical Retailer-Based Bar Code-Driven Kiosks (in multiple retail store locations and showrooms) in which retailers can measure Web metrics of in-store kiosk shoppers (i.e. using image capture and processing subsystems integrated in retail display appliances (RDAs) as shown in FIGS. 15 through 17) so as to manage displays and shelf space, and brand manufacturers can compare metrics of in-store shoppers vs. online shoppers to determine mindset and type of brand information sought for purchase; Multi-Mode Virtual Kiosks on Interactive TV (i.e. Web-enabled television or DTV) in which marketers can target and deliver brand messages tailored to specific audiences, and Multi-Mode Virtual Kiosks provide a ready-made "storefront" for retailers to quickly and inexpensively ramp up in this medium, with marketers interacting with shoppers on their websites and monitoring and measuring their activities in their Multi-Mode Virtual Kiosk, or 'virtual store'; Multi-Mode Virtual Kiosks on Interactive Home Appliances, such as kitchen appliances (e.g refrigerators) allowing people to automatically inventory and order what they need by way of its Internet screen, which could easily feature recipes, e-coupons and other helpful links (e.g. showcasing coupons, recipes and other relevant information, and where marketers could arrange links between content sites (recipe and household care items) and direct purchases through online grocery stores; Multi-Mode Virtual Kiosks on M-Commerce Devices, such as Internet-enabled mobile phones and advanced third generation broadband technology (3G), which can support personalization, location-based services, and the integration of offline and online shopping experiences.

Another object of the present invention is to provide an Enterprise-Level Brand Management And Marketing Communication Network, wherein Multi-Mode Virtual Kiosks are launched on a small mobile screen at an opportune time, and brand managers and retailers can provide the real-time, targeted brand experiences to consumers who look to Multi-Mode Virtual Kiosks for quick and easy help deciding about a product or service on the road, by offering colorful, enticing brand images and messages which feature links in displayed Brand Information Networks on which users can click to enlarge.

Another object of the present invention is to provide an Enterprise-Level Brand Management And Marketing Communication Network, for deploying, installing and remotely programming brand-building server-side driven Multi-Mode Virtual Kiosks on the World Wide Web (WWW), so as to provide improved methods of brand marketing communication between brand marketers and consumers, at virtually any Web-enabled touchpoint.

Another object of the present invention is to provide an Enterprise-Level Brand Management And Marketing Communication Network that is synchronized with the supply-side information management operations of product manufacturer's enterprise.

Another object of the present invention is to provide brand managers with a revolutionary new brand management and marketing communication media designed to serve as a central control center for managing and marketing their brands everywhere on the Internet, over all Web-based consumer touch-points, now and into the future.

Another object of the present invention is to provide an Enterprise-Level Brand Management And Marketing Communication Network, wherein brand managers can visualize the Brand Images projected by Brand Information Networks created by brand management team members, by automatically previewing brand assets in the brand information networks in an automated manner.

Another object of the present invention is to provide an Enterprise-Level Brand Management And Marketing Communication Network, which gives marketers complete control over the myriad of brand assets, messaging and promotions scattered throughout the Web. For the first time, they can ensure that consumers receive consistent brand experiences anywhere on the Internet.

Another object of the present invention is to provide an Enterprise-Level Brand Management And Marketing Communication Network, wherein brand managers or authorized agents can manage the design and implementation of online interactive marketing campaigns rather than employ costly third parties. Because the technology is easy to use, anyone on the brand management team can create or update a Multi-Mode Virtual Kiosk in real time. There is no need to outsource the Multi-Mode Virtual Kiosk when changes are needed.

Another object of the present invention is to provide an Enterprise-Level Brand Management And Marketing Communication Network, wherein brand managers can deliver more effective brand-building experiences to consumers by deploying Multi-Mode Virtual Kiosks that provide non-intrusive, engaging online experiences that consumers launch when they are seeking more information about a brand. Multi-Mode Virtual Kiosks are activated by launch buttons that brand owners can strategically place at any Web touchpoint when consumers are likely to be open to information about a brand.

Another object of the present invention is to provide an Enterprise-Level Brand Management And Marketing Communication Network, which helps to increase online shopper conversion rates by providing consumers with collaboratively-programmed Multi-Mode Virtual Kiosks that provide consumers with a well-designed and easy-to-use research source, requiring a only a few clicks to find in-depth information rather than a search through endless web pages. Because a Multi-Mode Virtual Kiosk enables online shoppers to quickly find all of the information for the buying decision in one place, they are more likely to move quickly through the buying cycle and proceed to checkout. E-tailers are likely to note an increase in shopper conversions.

Another object of the present invention is to provide an Enterprise-Level Brand Management And Marketing Communication Network, which helps increase customer retention by delivering to consumers, Multi-Mode Virtual Kiosks that can be easily changed (e.g. programmed), so that customers are more likely to revisit the same products on e-tail sites, drawn by the promise of fresh, up to date, interesting information or the latest promotions about their desired products in the Kiosks. This provides another key benefit for e-tailers.

Another object of the present invention is to provide an Enterprise-Level Brand Management And Marketing Communication Network, which enables consistent brand messaging across all marketing communication and retail distribution channels on the WWW, by enabling cooperation (i.e. collaboration) of brand management team members, their agents and e-tailers and trading partners. This incents trading partners to collaborate and deliver a uniform brand experience to consumers online.

Another object of the present invention is to provide an Enterprise-Level Brand Management And Marketing Communication Network, wherein Multi-mode Virtual Kiosks are interactive online tools that marketers can use to track, test and monitor consumer behavior and attitudes toward a particular brand campaign so that brand owners can test advertising and promotional messaging and identify ideal path for purchase behavior, and so that market research about a particular brand can be used to inform the brand's television and print media advertising campaigns as well.

Another object of the present invention is to provide Multi-mode Virtual Kiosks that can be installed in Web pages and accessed and displayable with or without clicking on embedded MMVK tags.

Another object of the present invention is to provide an Internet-based brand marketing communication network for enabling commission-based e-commerce transactions along the fabric of the world wide web (WWW) using server-side driven MMVKs that are hosted by affiliates who can earn sales commissions on consumer transactions with manufacturers or retailers, that have been initiated through affiliate hosted MMVKs.

Another object of the present invention is to provide an Enterprise-Level Brand Management And Marketing Communication Network, wherein e-commerce transactions conducted through or inititated by a Multi-mode Virtual Kiosks can be tracked and monitored in real-time, and sales commissions to be paid to the hosters of such MMVKs (i.e. affiliates) on their sites or Web properties can also be tracked and managed so as to ensure payments are properly made to such affiliates.

Another object of the present invention is to provide such an Enterprise-Level Brand Management and Marketing Communication Network, wherein registered retailers or manufacturers who deploy e-commerce enabling MMVKs along the fabric of the WWW, can monitor consumer transaction conducted through or inititated by the MMVKs and well as set commissions to be paid to affiliates who host the MMVKs, and wherein the registered affiliates can track and monitor commissions earned on MMVKs installed on their Web sites or other Web properties, so as to ensure that payments due are timely made to such affiliates by the associated retailers or manufacturers.

Another object of the present invention is to provide such an Enterprise-Level Brand Management and Marketing Communication Network, wherein charities can register on the Network and receive donations paid through sales commission earned by affiliates who install e-commerce enabling MMVKs on their Web sites or other Web properties, and wherein affiliates can designate whether all or a portion of earned sales commissions are to be paid to particular charities registered on the Network.

Another object of the present invention is to provide such an Enterprise-Level Brand Management and Marketing Communication Network, wherein e-commerce enabling MMVKS can function as server-side driven storelets (i.e. sales outlets) having multiple modes of display that can be easily programmed to drive commerce using powerful Web-based content programming tools that can be implemented using visual content libraries with thumb name images of all content managed on the Network, as well as "drag-and-drop" programming principles.

Another object of the present invention is to provide such an Enterprise-Level Brand Management and Marketing Communication Network which provides manufacturer and retail brands with a powerful communication studio for dynamically programming the content of MMVKs installed along various marketing and sales channels.

Another object of the present invention is to provide a MMVK-powered Retail Display Appliance (RDA) having bar code reading capabilities to support price look up operations.

These and other objects of the present invention will become apparent hereinafter and in the Claims to Invention.

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, briefly described below.

FIGS. 4A and 4B set forth a table setting forth definitions of terms used throughout the present detailed description of the Brand Management and Marketing Communication Network of the present invention;

FIGS. 6B1 through 6B10, taken together, sets forth a table listing the numerous marketing information service suites and instruments supported by the Brand Management and Marketing Communication Network of the present invention;

FIG. 10F is a Plugin Family/Plugin Database Table used to support the automatic OS/browser/media-player plug-in detection subsystem of the network of the present invention;

FIG. 10G is a Download Image Database Table used to support the automatic OS/browser/media-player plug-in detection subsystem of the network of the present invention;

FIG. 10H is a Mime Type Database Table used to support the automatic OS/browser/media-player plug-in detection subsystem of the network of the present invention;

FIG. 10I is a HTML Engine Database Table used to support the automatic OS/browser/media-player plug-in detection subsystem of the network of the present invention;

FIG. 10J is a Browser/Family/Browser Database Table used to support the automatic OS/browser/media-player plug-in detection subsystem of the network of the present invention;

FIG. 10K is a OS Family/OS Database Table used to support the automatic OS/browser/media-player plug-in detection subsystem of the network of the present invention;

FIG. 10L is a CPU Family/Platform Database Table used to support the automatic OS/browser/media-player plug-in detection subsystem of the network of the present invention;

FIG. 10M is a Platform Database Table used to support the automatic OS/browser/media-player plug-in detection subsystem of the network of the present invention;

FIG. 10N is a User Agent Database Table used to support the automatic OS/browser/media-player plug-in detection subsystem of the network of the present invention;

FIG. 10O is a MMVK User Agent Database Table used to support the automatic OS/browser/media-player plug-in detection subsystem of the network of the present invention;

FIG. 10P is a Platform Browser Database Table used to support the automatic OS/browser/media-player plug-in detection subsystem of the network of the present invention;

FIG. 10Q is a Platform Browser Plugin Database Table used to support the automatic OS/browser/media-player plug-in detection subsystem of the network of the present invention;

FIG. 10R is a MMVK Platform Browser Plugin Database Table used to support the automatic OS/browser/media-player plug-in detection subsystem of the network of the present invention;

FIG. 10S is a Platform Browser Plugin Mime Type Database Table used to support the automatic OS/browser/media-player plug-in detection subsystem of the network of the present invention;

FIG. 12 is a description of the technical details underlying the e-commerce enabling and tracking process of the present invention that is carried out on the global communication network depicted in FIG. 11, whereby e-commerce enabling MMVK are deployed, installed and operated on the Brand Marketing Communication Network with automatic retail transaction and sales commission tracking services enabled in accordance with the principles of the present invention;

FIG. 12B is a description of the flow of events associated with the higher-level process associated with FIG. 12A;

FIG. 13 is a description of the flow of events that occur when an affiliate installs a MMVK on a Web site or property (as indicated in Step 3 of FIG. 12A) using the network of the present invention with transaction and commission tracking services enabled.

FIG. 14B is a graphical representation of a web page an exemplary weblog hosting site, wherein during Step 1 of the MMVK set up process, the User (i.e. Affiliate) enters the Affiliate Area of an Affiliate Program (e.g. e-Stand™ Affiliate Program) that is made accessible on a weblog hosting site through a branded link, and if this is the first time the affiliate has visited the Affiliate Area, then the Web hosting site will ask the affiliate to confirm his or her user information against what was provided by them to their weblog hosting site;

FIG. 14D is a graphical representation of a web page an exemplary weblog hosting site, wherein during Step 3 of the MMVK set up process, the Brand Marketing Communication Network displays to the affiliate (1) a list of available MMVKs, (2) a list of MMVKs that he or she has installed (i.e. set up) on the blog site, and (3) his or her blog site for reference purposes;

FIG. 14E is graphical representation of a web page of an exemplary weblog hosting site, wherein during Step 4 of the MMVK set up process, when the affiliate selects a MMVK, the Brand Marketing Communication Network displays detail information about the selected MMVK, and if this MMVK has been previously installed, then the network displays any commission related information relating to the MMVK, for review by the affiliate;

FIG. 14F is a graphical representation of a web page an exemplary weblog hosting site, wherein during Step 5 of the MMVK set up process, the affiliate can install the MMVK at any set location on his or her blog site (e.g. as an embedded object or embedded link), as well as remove the MMVK, without possessing any knowledge of HTML or HTML tag technology;

FIG. 14G is a graphical representation of a web page an exemplary weblog hosting site, wherein during Step 7 of the MMVK set up process, the affiliate can also make donations to charities of his or her choice from commission earned/received through sales originated through MMVKs installed on his or her blog site;

FIG. 14I is a graphical representation of a web page an exemplary weblog hosting site, wherein during Step 9 of the MMVK set up process, at any time, the affiliate can change the commission percentages to be donated to any charity, or completely change the charities to receive any commission-based donations earned through the Web-based brand marketing communication and ecommerce enabling network (i.e. Brand Marketing Communication Network) of the present invention;

DETAILED DESCRIPTION OF THE ILLUSTRATIVE EMBODIMENTS OF THE PRESENT INVENTION

Figure 1:
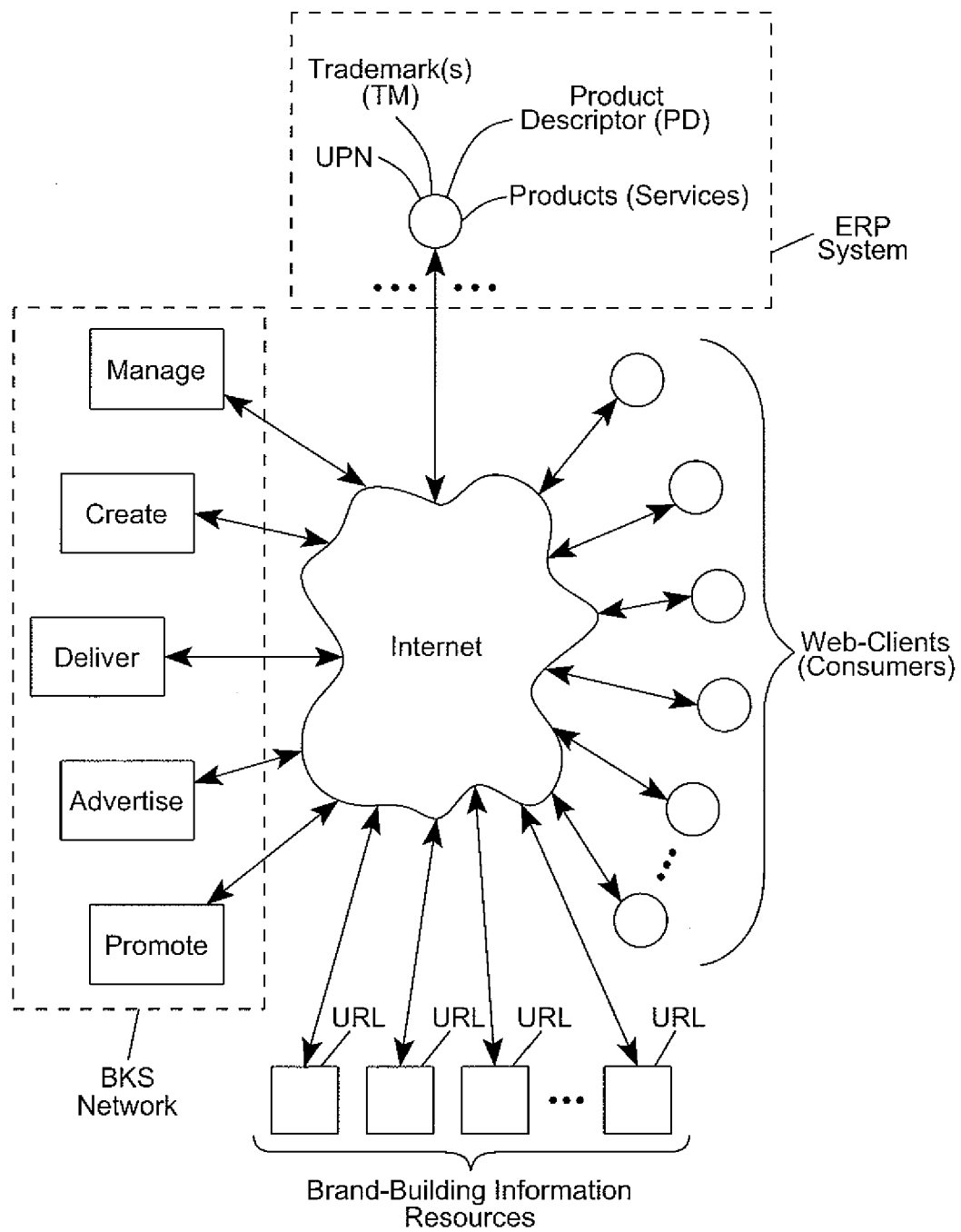
FIG. 1 is a high-level schematic representation of the Internet-based Brand Management and Marketing Communication Instrumentation Network of the present invention, realized as an industrial-strength, carrier-class Internet-based brand management and marketing communications network of object-oriented system design (OOD), implemented on a Java-based object-oriented integrated development environment (IDE) such as WebObjects 5.2 by Apple Computer Inc, Websphere IDE by IBM, or Weblogic IDE by BEA.

Referring to the accompanying Drawings, like structures and elements shown throughout the figures thereof shall be indicated with like reference numerals.

In general, the Detailed Description set forth below discloses a detailed specification of an illustrative embodiment of the enterprise-level brand management and marketing communications network of the present invention, supporting the creation, configuration, deployment, installation and programming of server-side driven brand-building Multi-Mode Virtual Kiosks (MMVKs) of various types, in accordance with the principles of the present invention. In general this illustrative embodiment employs many of the inventive principles disclosed in Applicants' International Patent Application Publication Nos. WO 98/19259 published on May 7, 1998, and WO 01/37540 A2 published on May 25, 2001, both of which are incorporated herein by reference in their entirety as if set forth fully herein.

Internet-Based Brand Management and Marketing Communication Instrumentation Network of the Present Invention Employing Remotely Programmable Server-Side Driven Brand-Building Multi-Mode Virtual Kiosks The Internet-based (inter-) enterprise-level Brand Management and Marketing Communication Instrumentation Network of the present invention will now be described in detail as a robust solution to the online brand management and marketing communication problems experienced by product, service and corporate brand marketers, world-over.

The Brand Management and Marketing Communication Network of the present invention is a powerful tool for brand managers. It captures the brand-building information currently scattered throughout the Web and places it at critical touch points where and when the consumer is considering a purchase on the Web.

Whether they are at a checkout on an e-commerce site, walking down the street on cell phones or dispensing cash at an ATM machine, consumers can instantly watch your ad, find out about the latest promotions, gain detailed product information, search the store locator or find other information through something called a "Multi-Mode Virtual Kiosk".

Multi-Mode Virtual Kiosks allow brand managers to quickly communicate a brand through three programmable display modes: Advertising Display Mode; Promotional Display Mode; and Brand Information Network Display Mode In seconds, consumers can obtain a multi-dimensional experience of a branded product or service without the influence of other brands, and consumers no longer need to wander of to other websites in search of brand-related information.

Using Multi-Mode Virtual Kiosks, brand management teams can even communicate to consumers through e-commerce sites operated by others confident that consumers will experience their brands consistently and develop brand images that are aligned with their marketing objectives.

The Brand Management and Marketing Communication Instrumentation Network of the present invention enables brand management teams of any size and arrangement to rise above the clutter in the Internet marketplace, and communicate the essence and character of their brands directly to the consumer.

Each ad, promotion or other brand building resource that is placed on the WWW, has a unique address thereon specified by a Uniform Resource Locator (URL).

Each product has three unique identifiers: a Trademark (TM), a Universal Product Number (UPN) and a Product Descriptor (PD). Together, they form a Product Data String (UPN/TM/PD).

Branded services also have three unique identifiers: a Universal Service Number (USN), a Service Mark (SM) and a Service Descriptor (SD). Together, they form a Service Data String (USN/SM/SD).

The network enables brand management team members to attach the Uniform Resource Locators (or URLs) to brand-building information resources on the Web, to these Product Data Strings (UPN/TM/PD) or Service Data Strings (USN/SM/SD), to produce Product Data Links (UPN/TM/PD/URL) or Service Data Links (USN/SM/SD/URL), as the case may be.

Using the Brand Management and Marketing Communication Instrumentation Network of the present invention, brand management team members can easily create, deploy, modify and manage a Multi-Mode Virtual Kiosk (MMVK) at any Web-enabled computer, using the following five network components, namely: the Brandkey Manage Subsystem; the Brandkey Create Subsystem; the Brandkey Deliver Subsystem; the Brandkey Advertise Subsystem; and the Brandkey Promote Subsystem, as shown in FIG. 1C1.

The Brandkey Manage Subsystem enables brand management team members to track and manage the users and brands on their brand's Multi-Mode Virtual Kiosks.

The Brandkey Create Subsystem enables brand management team members to select and set the links that consumers will see in the Ad, Promo or Brand Information Network Display modes of Multi-Mode Virtual Kiosks deployed on the Network.

The Brandkey Deliver Subsystem provides tools which enable brand management team members, trading partners (and even consumers), to deploy and install Multi-Mode Virtual Kiosks and set these interactive Web-based in motion. In a few simple steps, one can create, deploy and install the Multi-Mode Virtual Kiosk.

The Brandkey Advertise and Brandkey Promote Subsystems enable brand management team members, as well as their advertising and their promotional agents, to program and update their brand's ad spots and latest sales promotions on the Web quickly and easily.

The Brandkey Manage Subsystem enables users to perform a range of management and administration functions. The brand manager, chief marketing officer (CMO), or the like can decide who can create content for its brand's Multi-Mode Virtual Kiosks. The brand manager can track the activities of both team members and outside agents whom s/he has given the right to place advertising and promotion spots on the brand's Multi-Mode Virtual Kiosks. Using Brandkey Deliver Subsystem, the brand manager can also shut down any Multi-Mode Virtual Kiosk s/he desires. In the Brandkey Manage System, one can also monitor and measure consumer activity on the Multi-Mode Virtual Kiosks. One can find out how consumers rated the effectiveness or usefulness of an ad or resource, or identify potential new customers based on who downloads one's Multi-Mode Virtual Kiosks.

The brand manager (or its designated staff member) begins by creating a Product Data String for the branded product by entering the UPN, Trademark and Product Descriptor, or Service Data String for the branded service by entering the USN, Servicemark and Service Descriptor. This information can be entered manually, or automatically imported from a UPC Product Sales Catalogue on the product brand's supply-chain information management system, using the Import Data Strings Function supported in the Brandkey Create Subsystem.

The brand management team decides which ad, promo or other brand building links (or URLs) they wish to attach to the Data String on their Multi-Mode Virtual Kiosk.

To help reinforce the essence and character of the brand, the Brandkey Create Subsystem allow a brand management team member to select a Display Schema for visually presenting to consumers, a selected arrangement of brand information resources (i.e. nodes) in the Brand Information Network that is supported by an underlying set of Product Data Links (UPN/TM/PD/URLs) or Service Data Links (USN/SM/SD/URLs).

Once the content that will appear on the Multi-Mode Virtual Kiosk has been created and integrated within a richly-associated Brand Information Network (formed by Product or Service Data Links with a selected Display Schema, etc), the brand management team can then simply and quickly preview the composite brand image likely to be projected by the created Brand Information Network. Using the 'test link' feature, IT managers can ensure that an ad spot or other link in the Brand Information Network loads quickly.

The Brandkey Create Subsystem also includes easy-to-use tools that enable brand management teams to host content on the Web as well, e.g. on the networks own Internet information servers, or on the content data network of an affiliated global CDN such as provided by Akamai. Along with its other benefits, the Brandkey Create Subsystem can be a very useful tool to manage one online brand information resources, to ensure consistent brand image communication across all brand marketing communication channels on the Internet.

When the brand management team wishes to change information about their product, service or corporate brand, the Brand Management and Marketing Communication Network can be used modify brand building information resources linked to brand-information keys (e.g. Product Data Strings or Service Data Strings) that are automatically synchronized with the brand's information maintained on the supply side of the retail value chain.

Multi-Mode Virtual Kiosks come in a variety of types and sizes designed for the special needs of your trading partners. Multi-Mode Virtual Kiosks (MMVKs) can feature one product or several products using Product-Specific MMVKs or Vendor-Specific MMVKs, respectively. Services can be showcased in a special manner using Service-Specific MMVKs, and Service-Provider-Specific MMVKs. Retailers can create Multi-Mode Virtual Kiosks that present multiple vendors, without overwhelming their own brand, using Retailer-Specific MMVKs. Corporate Specific and Industry-Specific MMVKS are yet other types of Multi-Mode Virtual Kiosks that are supported by the Brand Management and Marketing Communication Network of the present invention.

The Brandkey Deliver Subsystem, the brand management team sets the Multi-Mode Virtual Kiosk in motion. They can rapidly configure, deploy and install a Multi-Mode Virtual Kiosk in as little as ten minutes. One can generate a Multi-Mode Virtual Kiosk by following a few simple steps: Configure; Create; Deploy; and Activate. One begins by configuring the Multi-Mode Virtual Kiosk. Select the modes and installers, and define the domains where the Multi-Mode Virtual Kiosk can and cannot be installed. Here one can ensure that Multi-Mode Virtual Kiosks will not appear on a brand-damaging site, for example. Then, one can determine the look and feel of the Multi-Mode Virtual Kiosk by choosing colors, wallpaper, textures, etc.

In step three, deployment, one decides which launch environments is needed or desired. Will the Multi-Mode Virtual Kiosk be a link embedded in an email to prospective customers? A link in a registration package for new customers? Or an image of a product that consumers might click on while shopping on an e-commerce site? The brand management team member can provide this image or s/he can insert the Default BKS button when they do not have an image. The Multi-Mode Virtual Kiosk could even be a link in a fact sheet that consumers find while browsing on the brand's website or a desktop icon which consumers can quickly install on their computer desktops, and launch anytime they want the latest sales or other information about the product, service or corporate brand. It is easy to update or otherwise modify the images or information on the Multi-Mode Virtual Kiosks.

Once deployment is complete, the Multi-Mode Virtual Kiosk is catalogued on a Web information server associated with the network. Each Multi-Mode Virtual Kiosks receives a 'tag', or launch button, which the brand management team member, or it agent, can embed throughout the Internet. Then, when a consumer clicks on a tag that has been embedded somewhere along the fabric of the Web, the Multi-Mode Virtual Kiosk launches from the Network Server, and appears on the consumer's web-enabled computer.

Once consumers launch the Multi-Mode Virtual Kiosk, it automatically plays through its three display modes, inviting them to interact with ad spots, promotional spots, and a richly-associated network of brand-building information. The Network also allows one to quickly measure the interaction between consumers and Multi-Mode Virtual Kiosks. For example, one can ask consumers to rate from 1-5 how useful a link, presented during the Brand Information Network Display Mode, was to them. The Brand Management And Marketing Communication Network of the present invention can generate detailed reports to help brand management team members analyze the effectiveness of their online brand-building campaigns.

The Brand Management and Marketing Communication Network of the present invention also simplifies the challenge of managing online advertising and promotion campaigns with the Brandkey Advertise and Brandkey Promote Subsystems. Using these subsystems, Advertising and Promotion Directories can automatically produce directory listings of all the installed Multi-Mode Virtual Kiosks, on which agents may place ad or promotion spots on the World Wide Web. Authorized agents can quickly start, stop or modify campaigns.

With the Brand Management and Marketing Communication Network of the present invention, Multi-Mode Virtual Kiosks are easy to create and deploy, and brand management teams have the opportunity to quickly reach millions of consumers on the Web, and effectively communicate a multi-dimensional picture of ones brand. Everything is within the brand manager's control to ensure that consumers receive consistent brand-building messages and images in accordance with the brand marketing objectives of the team.

The Vision behind the Brand Management and Marketing Communication Network of the present invention is to enable the creation of a global marketplace in which all brand marketers of products and services, large and small, have equal access to a relatively inexpensive, simple-to-use, yet extremely powerful set of Web-based marketing instruments that allow them to communicate directly and freely with consumers anywhere along the World Wide Web, while creating value for consumers and their retail trading partners alike. Such new forms of brand marketing communication will occur without adversely affecting the brand marketer's trading partners, while enabling the reliable delivery of the best and most valuable brand building information resources to consumers wherever they might be needed most, and regardless of where such brand building information resources may actually be hosted on the Internet, e.g. Akamia® Global Content Delivery Network (CDN), or elsewhere.

New value will be simultaneously created in the marketplace for consumers, brand owners, their agents and retail trading partners alike by providing widespread distribution of brand-building Multi-Mode Virtual Kiosks, in which their Multiple Display Modes are (i) remotely programmable through an industrial-strength carrier-class Internet-based Brand Marketing Communication Instrumentation Network, and (ii) are capable of displaying rich-media advertising spots, promotional spots, and Brand Information Networks (BINS) composed of virtually any form information media on the Internet simply indexed using brand-related information keys, e.g. Universal Product Numbers (UPNs), Trademarks, (TMs) Product Descriptors (PDs), Universal Service Numbers (USNs), Servicemarks (SMs), Brand Names, etc.—so that Brand Managers are provided complete control over their brand marketing communications on the Internet, while improving collaboration among brand management team members within and outside of the Brand's enterprise.

In general, such an Internet-based Brand Marketing Communication Instrumentation Network of the present invention should be capable of deploying server-side driven brand-building Multi-Mode Virtual Kiosks at any point along the World Wide Web, and remotely programming the display modes thereof so as to deliver advertising and promotional campaigns and brand knowledge Building Information Networks (of links) to consumers whenever and wherever they may be on the WWW. The stakeholders associated with this object-oriented system are brand managers, their advertising and promotional agents, the brand entities which the represent, and their primary interests are to build brand equity in the minds and hearts of consumers, while protecting Brands by maintaining the highest possible system integrity and security—trustworthiness. The minimal guarantees sought by the Network are to provide brand management teams, large and small, and of any possible arrangement, with the ability to simply and rapidly program and deliver brand-building information content through the multiple display modes of server-side driven Multi-Mode Virtual Kiosks launchable from numerous types of environments at virtually any touchpoint on the World Wide Web—using only simple mouse-clicks and data entry operations and without the assistance of Java programmers. By ensuring the delivery of valuable brand-building information resources to consumers through Multi-Mode Virtual Kiosks, the strength of Brand Entities in the lives of consumers should be increased.

The Brand Management and Marketing Communication Network of the present invention provides an advanced ensemble of revolutionary Internet-based Brand-Marketing Instruments (i.e. tools) which enable brand management teams (including chief brand officers, marketing officers, brand managers, staff members and their advertising and promotional agents, brand consultants, etc) to provide consumers with rich, multimedia brand experiences, based on advertisements, promotions and other information about their specific Products and Services at specific Internet-enabled point-of-sale consumer touch-points. These marketing instruments also to help brand management teams to manage the brand knowledge that consumers develop about a company's products and services in order to shape and reinforce the desired Brand Image that consumers develop in their minds before, during and after product and service purchases.

The Brand Management and Marketing Communication Network of the present invention enables brand management teams of any size and arrangement to effectively manage and communicate the essence and character of their Brands over the Internet.

As summarized in FIGS 2A through 2D, the Brand Management and Marketing Communication Network of the present invention is composed of five primary Subsystems connected to the infrastructure of the Internet; five of these Subsystems are used by Client users, whereas one Subsystem is used exclusively by Network Administrators, employees and consultants. Each of these Subsystems supports one or more Service Suites, and each Service Suite contains one or more Control Panels. These Control Panels support the delivery of the Brand Marketing Communication Network's Marketing Instruments.

The five Subsystems used by Client users are: Brandkey Manage™ Subsystem; Brandkey Create™ Subsystem; Brandkey Deliver™ Subsystem; Brandkey Advertise™ Subsystem; and Brandkey Promote Subsystem™ Subsystem. The one Subsystem used by BKS Administrators, employees and consultants is the Administration Subsystem. Notably, the Brand Marketing Communication Network is supported by a seventh subsystem, entitled the Multi-Mode Virtual Kiosk Serving Subsystem, which serves up all Multi-Mode Virtual Kiosks to Consumers anywhere the Internet, but this subsystem does not support any client user GUIs.

The Brand Management and Marketing Communication Network of the present invention allows brand management teams to rapidly configure, deploy and install Brand-Building Multi-Mode Virtual Kiosks at the various consumer touch-points.

These Consumer Touch-points include:
Desktop Computers
WiFi-enabled Portable Devices
Physical Retail Kiosks
ATMs Interactive Television Sets
PDAs and
Cell Phones At each of these consumer touch-points, brand management teams have the option of delivering their Brands' Multi-Mode Virtual Kiosks through a number of different Launch Environments. Such Launch Environments include:
BKS™ Virtual Kiosk Launch Buttons
HTML-Encoded Documents
HTML-Encoded Images
HTML-Encoded Desktop Icons
RDA-based Kiosks These brand marketing and sales Channels and Consumer Touch-points and Launch Environments allow Brand Management Teams to reach a broad range of Consumer markets over the Internet.

The Network of the present invention provides a single communication platform for integrating these online and offline channels and touchpoints of manufacturer and retailer brands, and driving commerce over these channels and touch-points with brand-powered (i.e. manufacturer/vendor assisted) merchandising and retailing services.

Multi-Mode Virtual Kiosks of the present invention support three independently programmable modes of display: (1) Advertising Spot Display Mode, in which the Multi-Mode Virtual Kiosk displays Ad Spots programmed by the Brand Management Team or their Agents; (2) Promotional Spot Display Mode during which the Multi-Mode Virtual Kiosk displays Promo Spots programmed by the Brand Management Team or their Agents; and (3) Brand Information Network Display Mode in which the Multi-Mode Virtual Kiosk displays a menu of Brand-Building Information Resource Links consistent with the Team's brand marketing objectives.

These modes of marketing communication and display cooperate with the purpose of allowing consumers to experience any product, service or corporate brand without the influence of other Brands as well as marketplace clutter (i.e. pop-ups and banner ads). Brand Management Teams may select any combination of these Modes to be displayed in their Multi-Mode Virtual Kiosks.

Multi-Mode Virtual Kiosks come in a variety of types and sizes designed for the special needs of trading partners:
Product-Specific and Vendor-Specific Virtual Kiosks can feature one product or several products, respectively.
Services can be showcased in a special manner in Service-Specific and Service-Provider-Specific Virtual Kiosks.

Retailers can create Retailer-Specific Multi-Mode Virtual Kiosks that present multiple vendors, without overwhelming their own brand.

Corporate-Specific and Industry-Specific Virtual Kiosks are yet other types of Multi-Mode Virtual Kiosks.

Figure 2A:
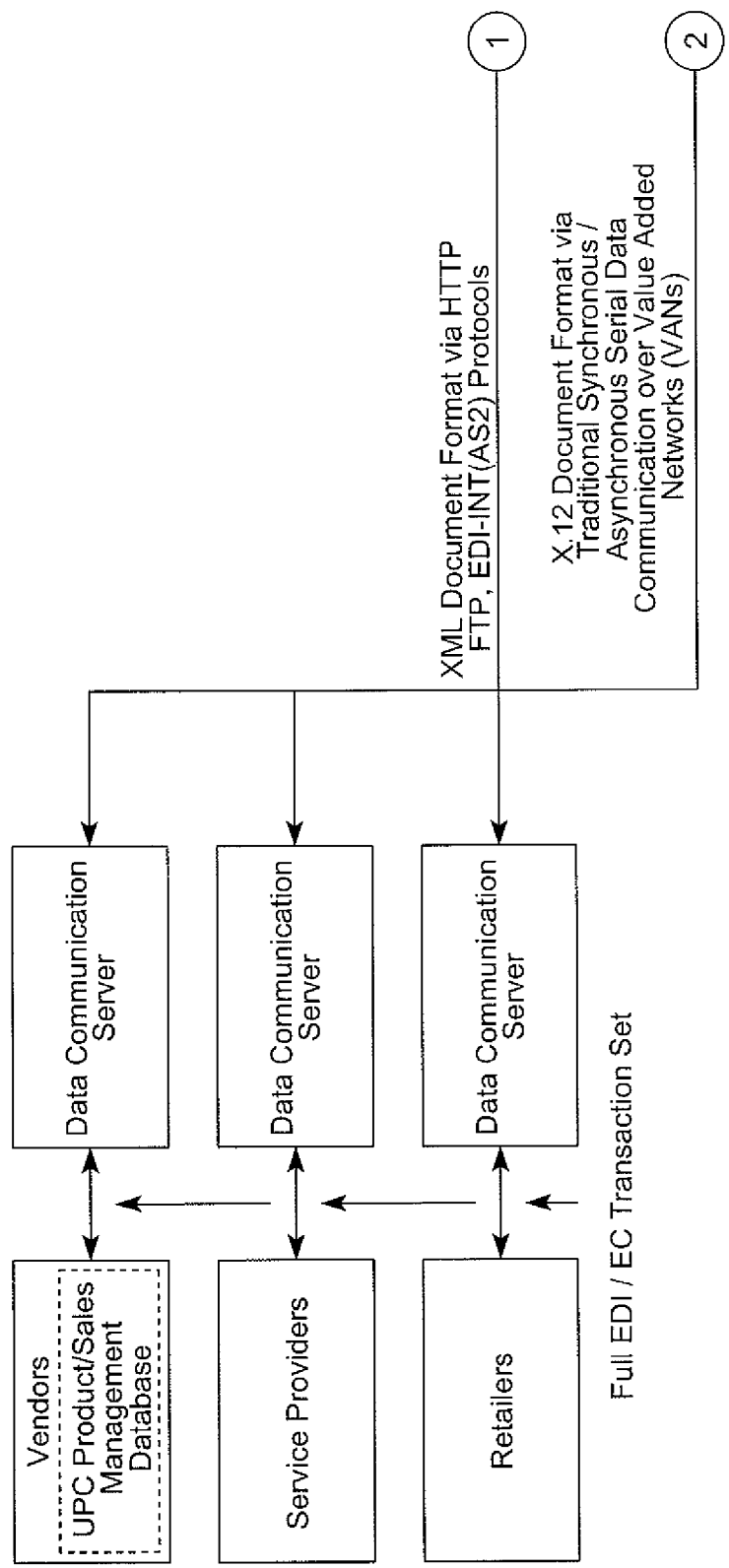
FIGS. 2A through 2D set forth a systems block diagram of the Internet-Based Brand Management, Marketing Communication and Commerce Enabling Network of the present invention (i.e. "Brand Marketing Communication Network"), deployed on the globally-extensive packet-switched information network supporting numerous industries on the planet Earth, comprising diverse kinds of subsystems and network components thereon, as shown.
Figure 2B:
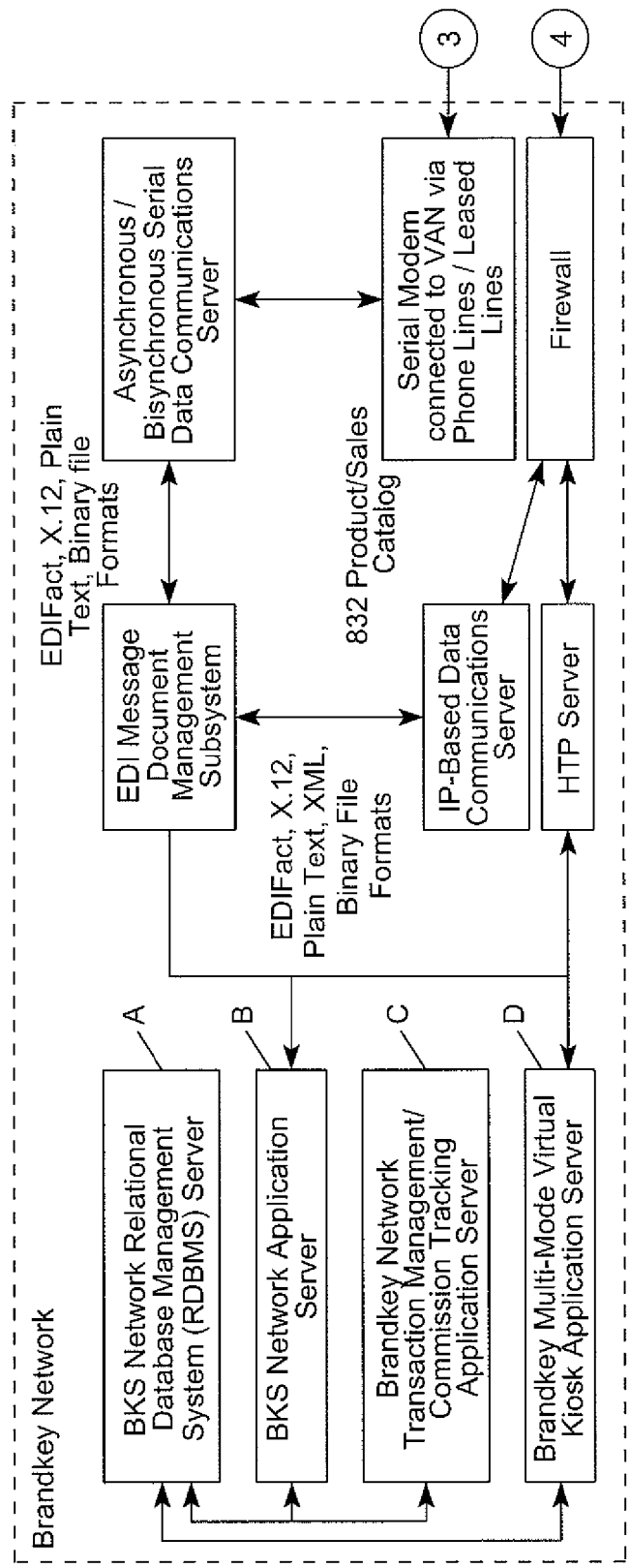
Figure 2C:
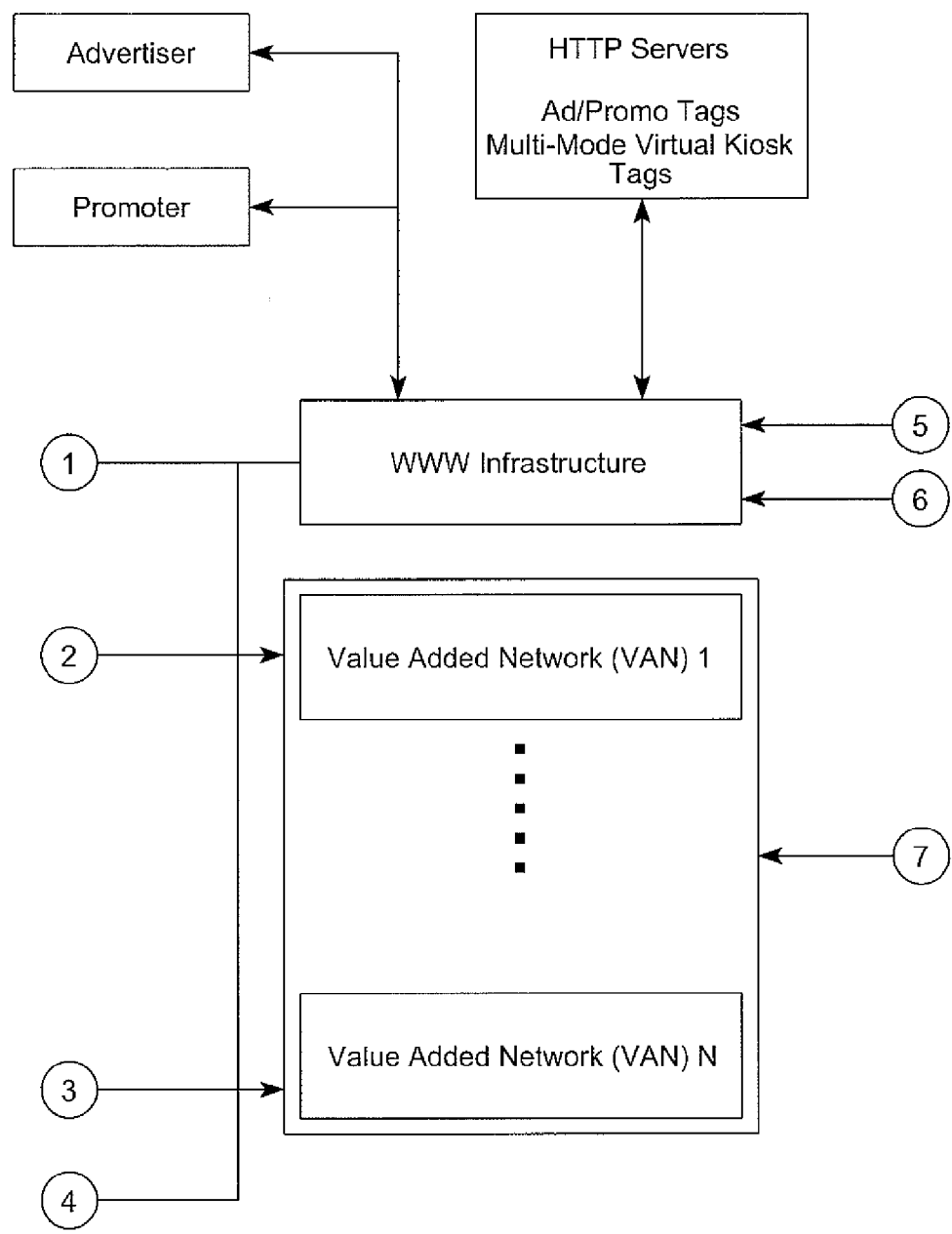
Figure 2D:
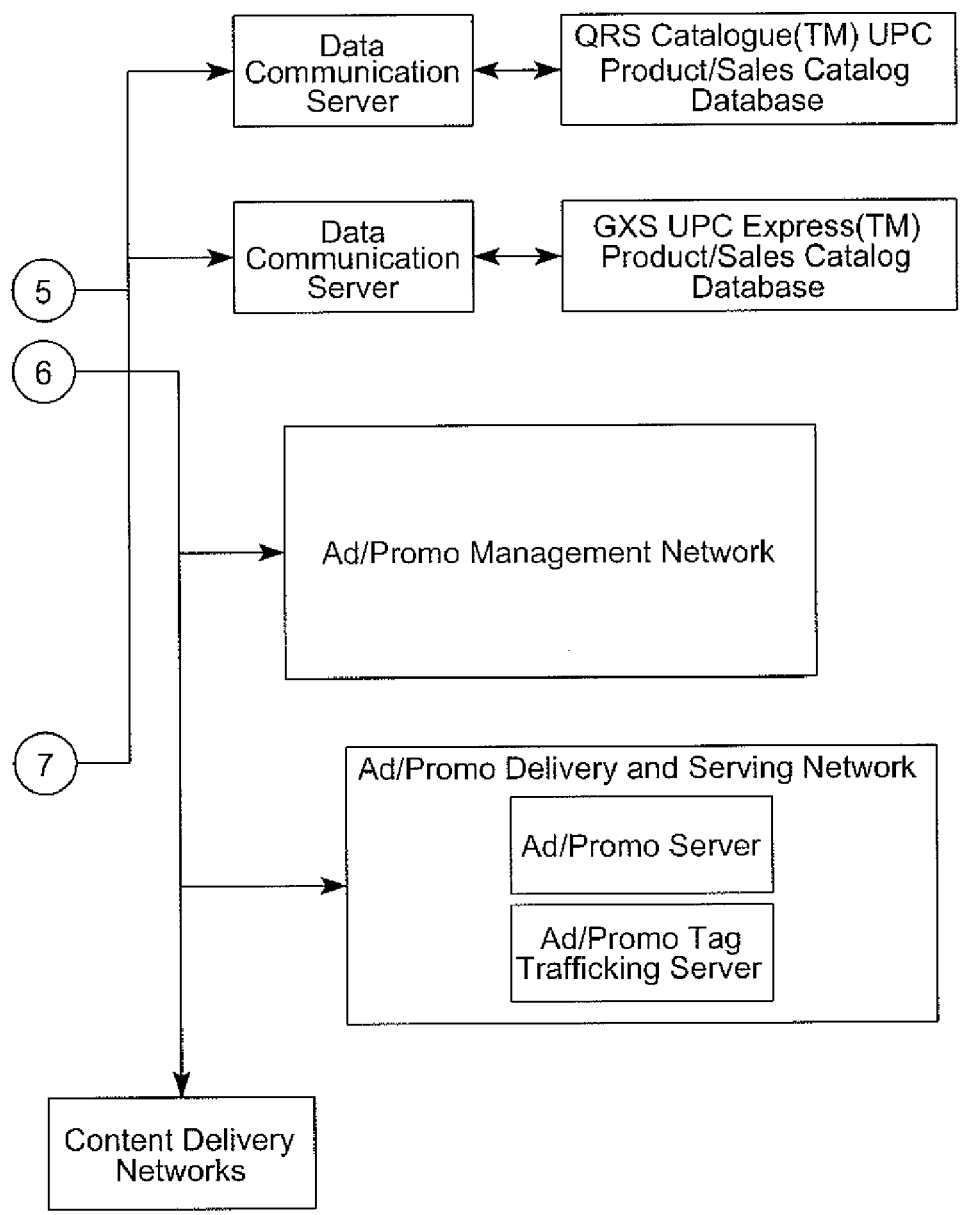

System Architecture of the Brand Management And Marketing Communication Network of the Present Invention Deployed on the Global Data Packet Information Network As shown in FIG. 2B, the Internet-based Enterprise-Level Brand Management and Marketing Communication Instrumentation Network of the present invention (i.e. Brand Marketing Communication Network) is realized as an industrial-strength, carrier-class Internet-based multi-media communications network of object-oriented system design, deployed on the global data packet information network comprising numerous information subsystems and systems and network components, as shown.

As shown in FIG. 2B, the Brand Management and Marketing Communication Network of the present invention (Brand Marketing Communication Network) is uniquely situation so as to the into two separate networks currently used to propagate Supply-Side marketing and Demand-Side marketing. EDI is a well-established technology and is widely used by manufacturing concerns and their trading partners to pass information from one to the other. The Brand Marketing Communication Network harnesses the capabilities of the EDI Network and its VANs to be able to capture the basic information required to identify Products and Services. The Brand Marketing Communication Networks also synchronized with such EDI systems to as to keep updated with any changes in the universe of Products and Services offered. Via the infrastructure of the Internet, the Brand Marketing Communication Network is also connected via the Internet to the Ad/Promo Delivery Networks (Doubleclick, etc.), Content Delivery Networks (Akamai, etc.) and Ad/Promo Management Networks (MSN, etc.) to use their services to place and monitor Virtual Kiosks throughout the Internet. Advertisers and Promoters are able to access the Brand Marketing Communication Network to place Ads and Promos on Multi-Mode Virtual Kiosks, which will then be placed on HTTP Servers over the Internet. Throughout this process, the Vendors, Service Providers and Retailers will be able to monitor and manage this process over the internet and be able to hook into their Content Management Systems (CMS) to select which brand-building assets to deliver to consumers at what point on the Internet through the installed Multi-Mode Virtual Kiosks.

Figure 3A:
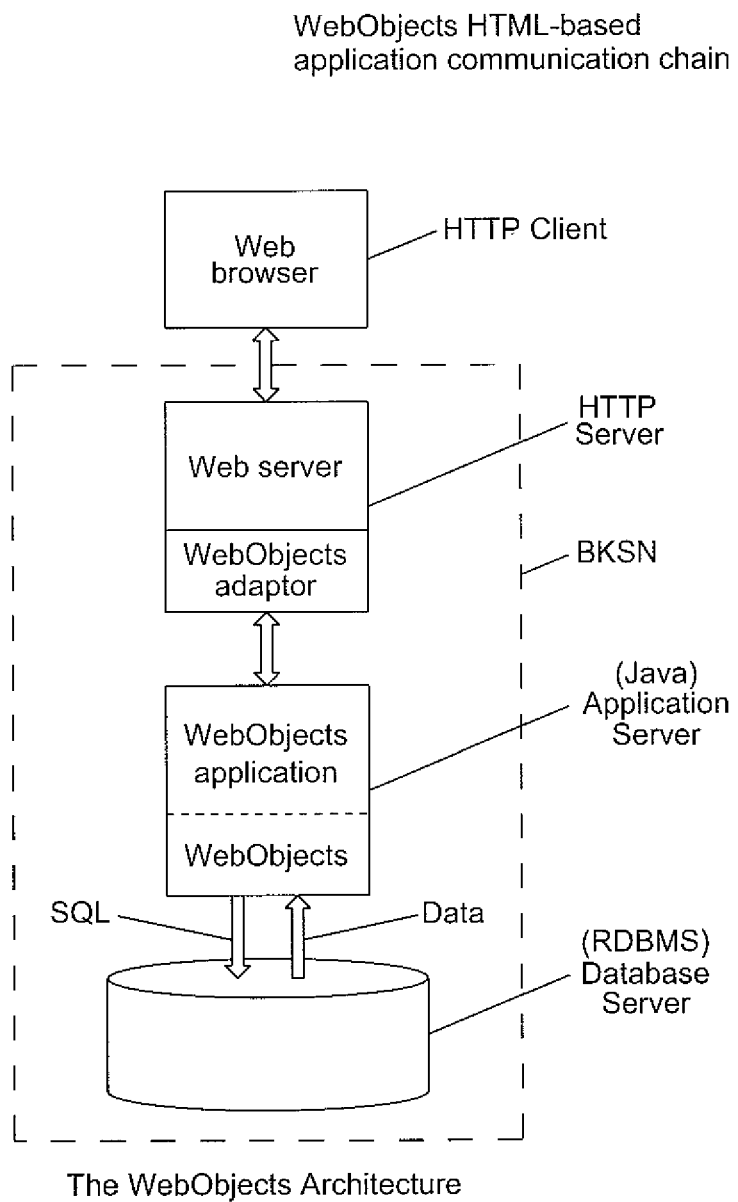
FIGS. 3A and 3B are schematic representations of two alternative implementations of the enterprise-level Brand Management and Marketing Communications Network of the present invention using the WebObjects IDE and Java Application Server.
Figure 3B:
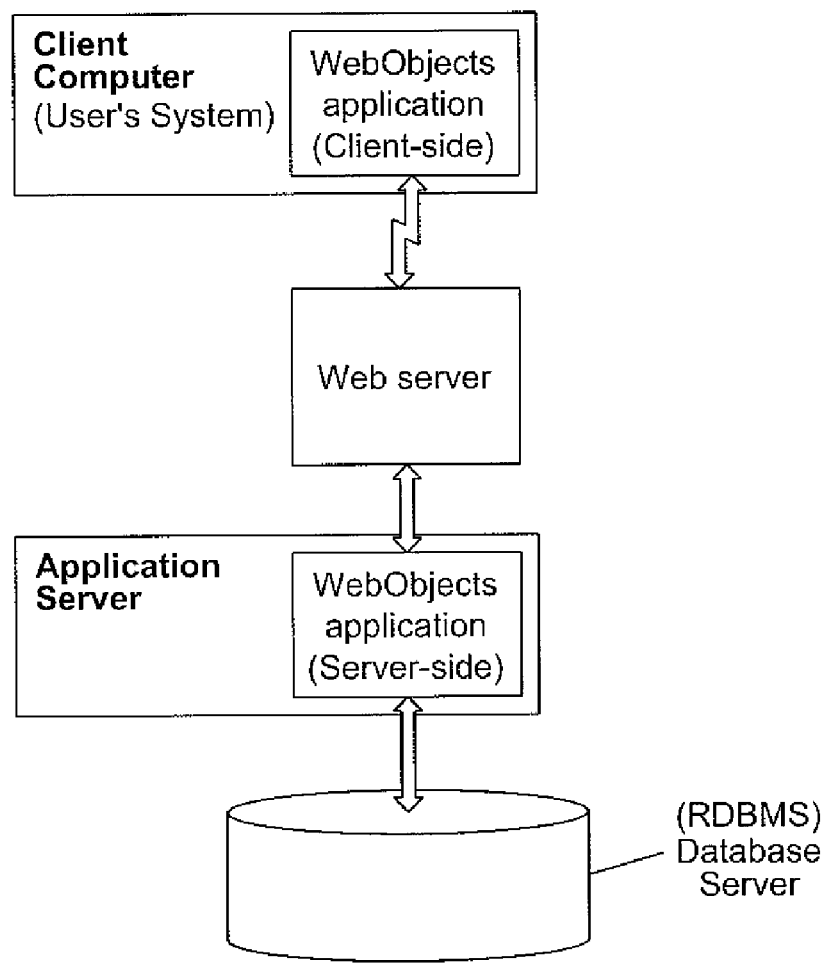
Figure 5A:
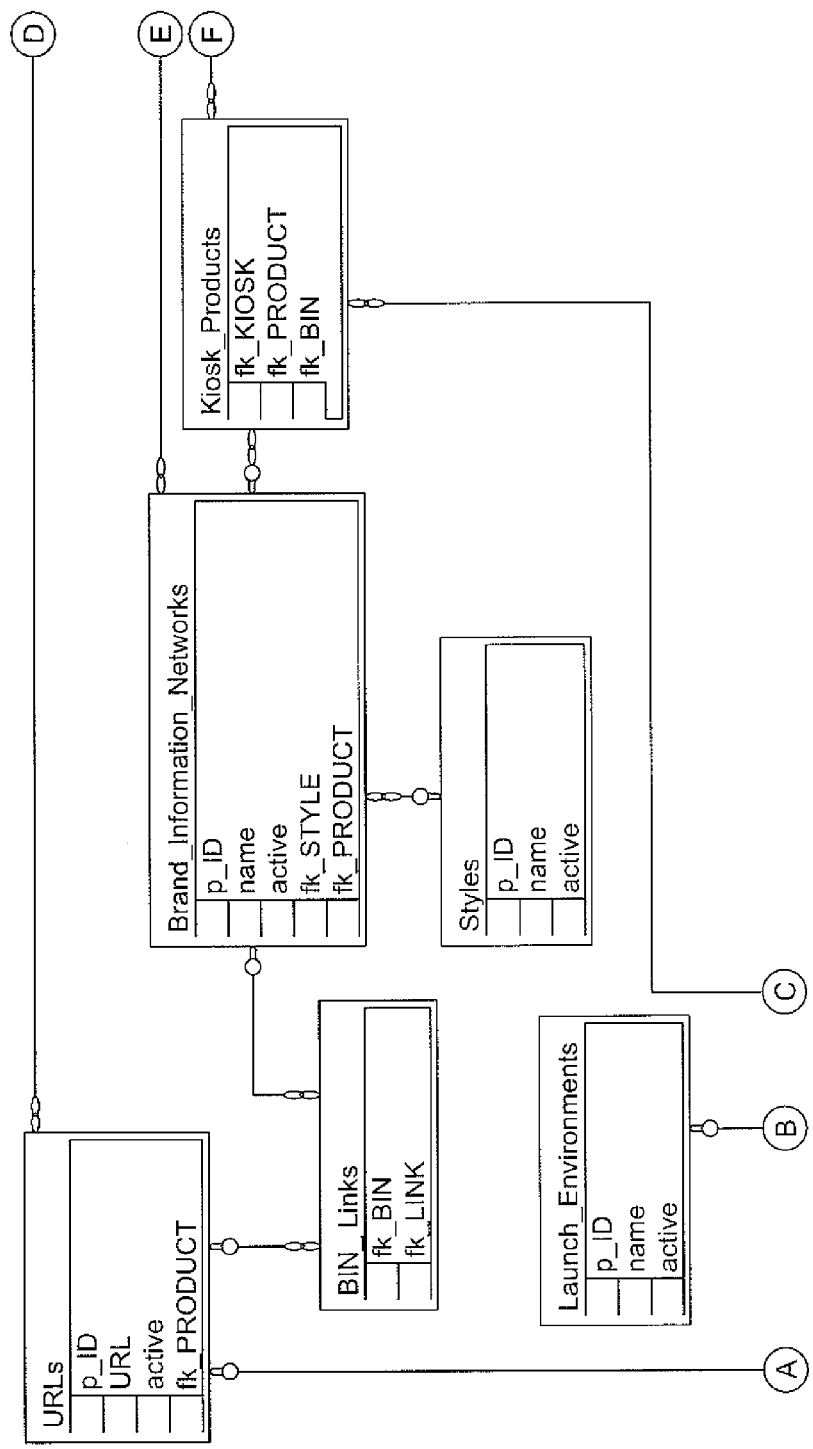
FIGS. 5A through 5E set forth a schematic diagram of the relational database management system (RDBMS) used to store the persistent enterprise objects associated with the Brand Management and Marketing Communication Network of the illustrative embodiment.
Figure 5B:
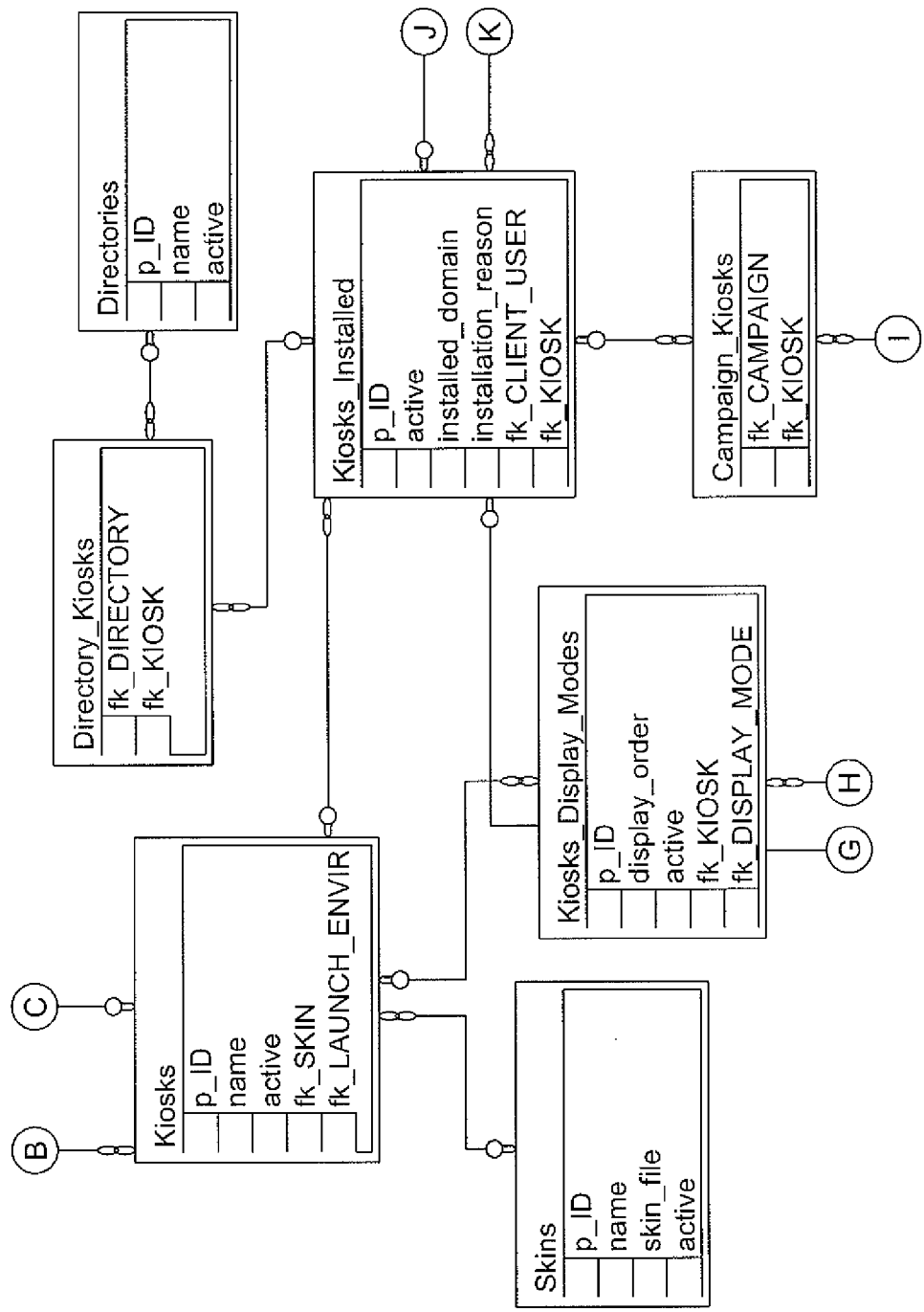
Figure 5C:
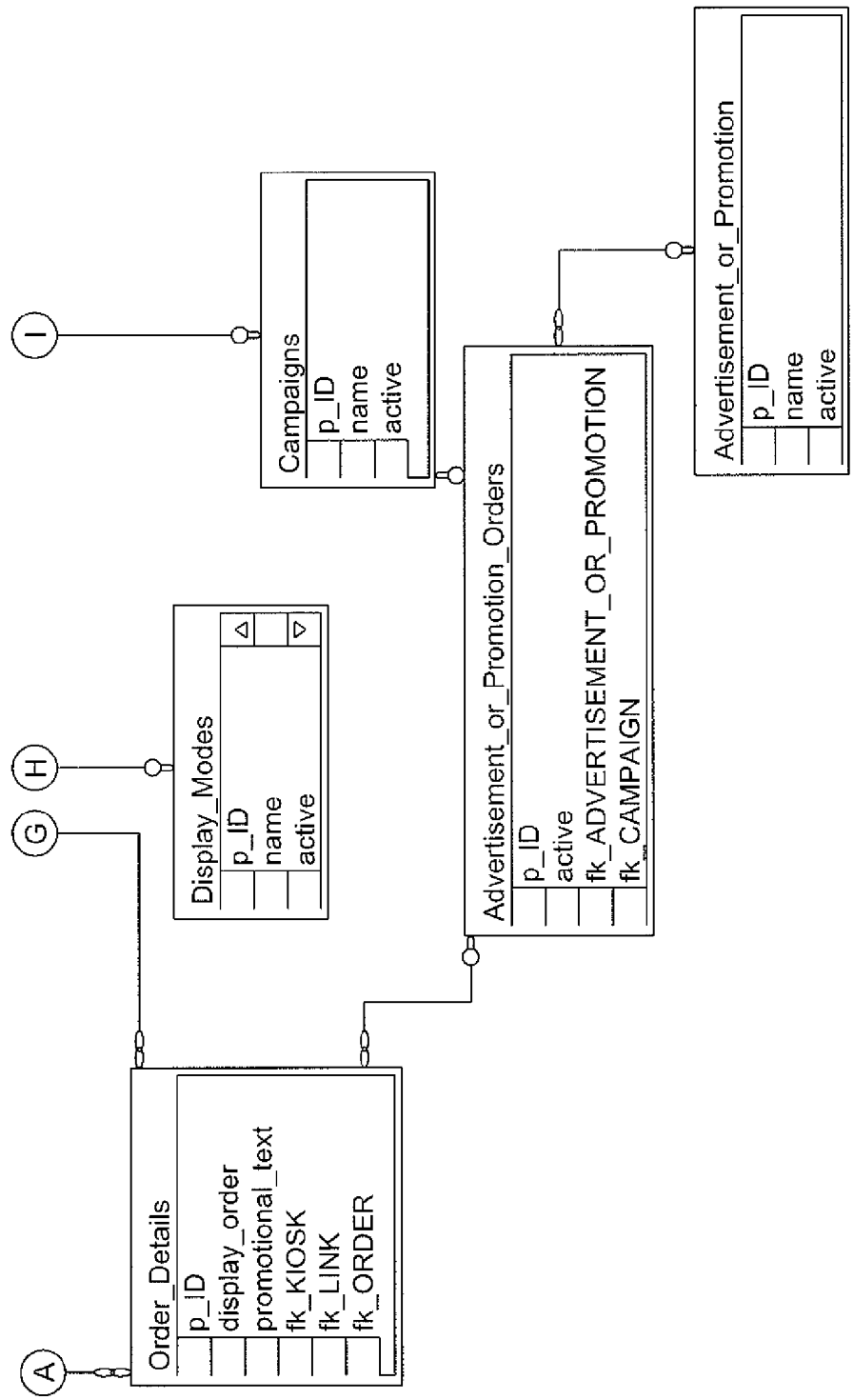
Figure 5D:
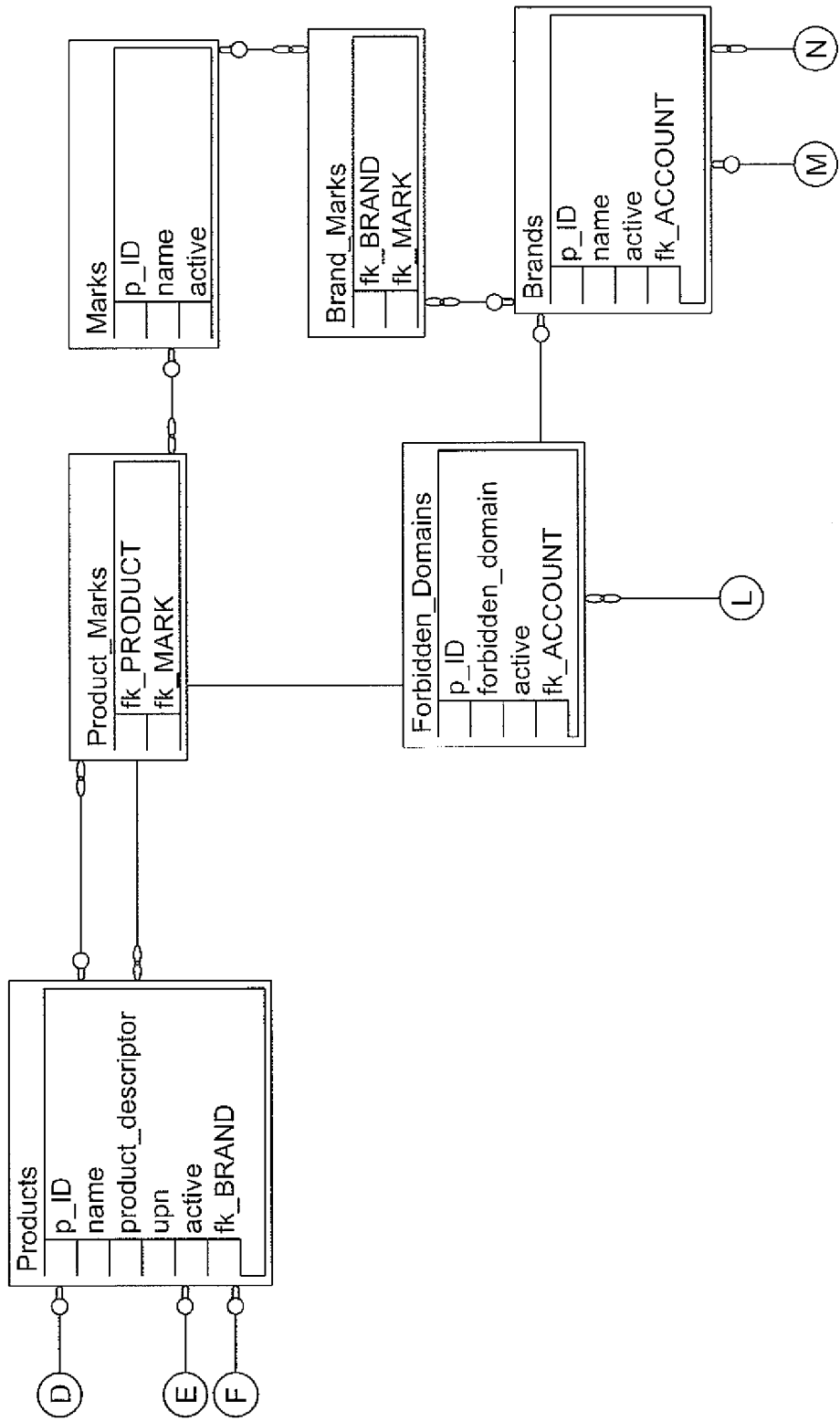
Figure 5E:
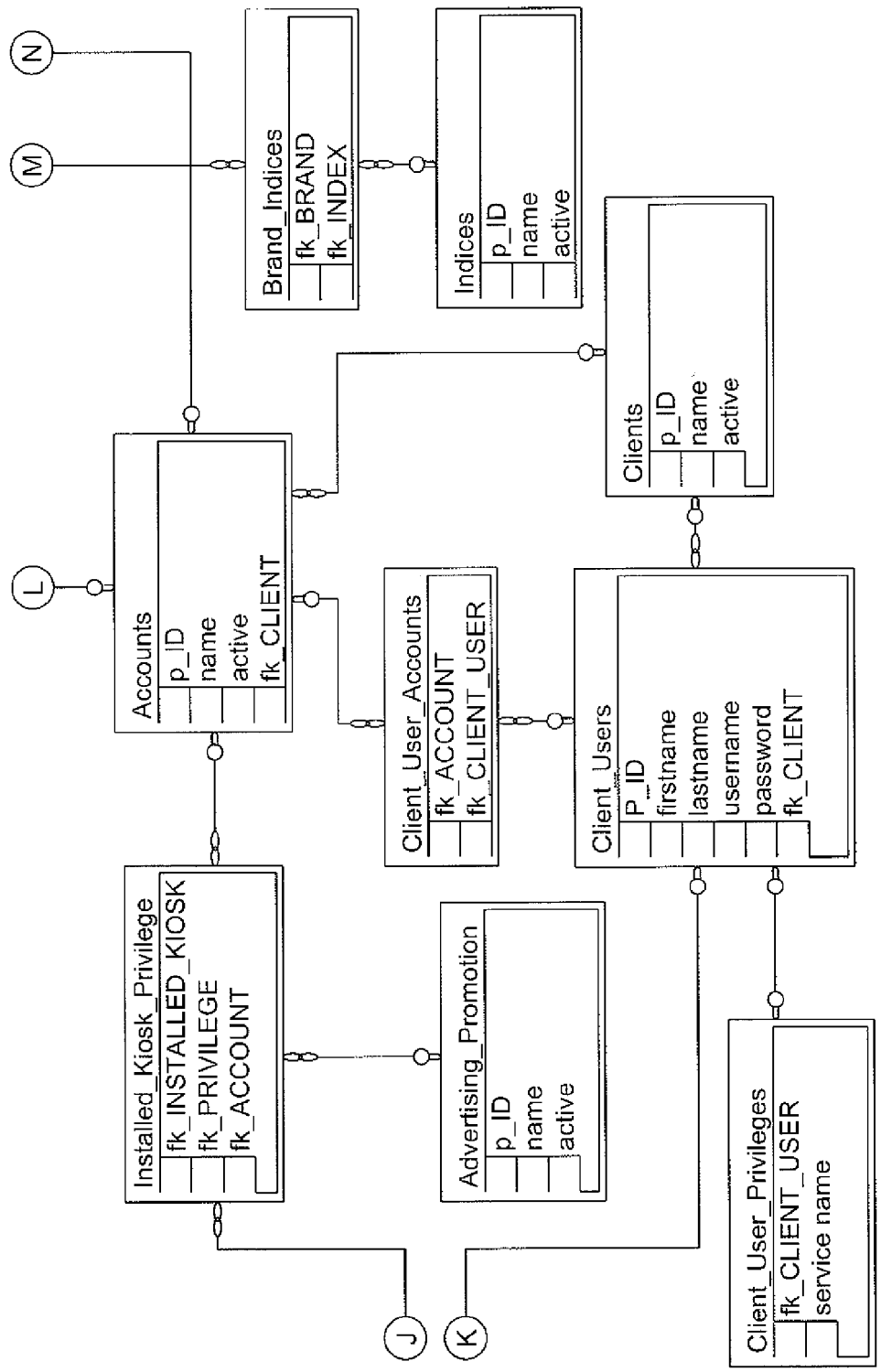

In general, the Internet-based Brand Management and Marketing Communication Instrumentation Network of the present invention can be implemented on any Java-based object-oriented integrated development environment (IDE) such as WebObjects 5.2 by Apple Computer Inc, Websphere IDE by IBM, or Weblogic IDE by BEA, or even an non-Java IDE such as Microsoft's.NET IDE. Two different Network implementations using the WebObjects IDE are illustrated in FIGS. 3A and 3B using Web-based and Java-client technology, respectively. The entire Brand Management and Marketing Communication Instrumentation Network of the present invention is designed according to object-oriented systems engineering (DOSE) methods using UML-based modeling tools such as ROSE by Rational Software, Inc. or Together by Borland Software, using the industry-standard Rational Unified Process (RUP) or Enterprise Unified Process (EUP), both well known in the art. A three-tier server architecture with double-firewall would provide a preferred deployment platform on the Internet.

In the illustrative embodiment, the Brand Management and Marketing Communication Instrumentation Network is realized as a hosted service using an application service provider (ASP) model, but is understood that some or all of the services provided by the subsystems of the Brand Management and Marketing Communication Instrumentation Network can be realized as Java clients, running behind a client/brand's enterprise firewall, and the RDBMS associated with a given client/brand can be maintained locally within the client/brand's enterprise, and synchronized with the centralized RDBMS of the Brand Management and Marketing Communication Instrumentation Network using XML and EDI techniques described in great detail in Applicant's PCT International Patent Application Publication Nos. WO 98/19259 published on May 7, 1998, and WO 01/37540 A2 published on May 25, 2001, incorporated herein by reference.

Precise definition of terms used in the analysis, design and development of the Brand Management and Marketing Communication Instrumentation Network of the present invention are set forth in the table of FIGS. 4A and 4B, and should be carefully considered while reading the present Specification.

Advantages And Benefits of the Brand Management And Marketing Communication Network of the Present Invention The Brand Management and Marketing Communication Network of the present invention enables brand management teams of any size and arrangement to rise above the clutter in the Internet marketplace and communicate the essence and character of their brands directly to the consumer. In seconds, consumers can obtain a multi-dimensional experience of a branded product or service without the influence of other brands.

With Multi-Mode Virtual Kiosks so simple and easy to access, consumers can be more effectively educated about brands than ever before online and gain a full experience of a brand so that they develop strong preferences for them. Consumer brand images are now aligned with the team's intended brand marketing objectives. And consumers no longer need to wander off to other websites in search of brand-related information. Online brand marketers can now create and deliver high-impact brand marketing campaigns. Retailers can build e-commerce sites, which communicate its vendors' intended brand images while preserving their own. Retailers can more efficiently use the virtual shelf-space on their Websites. By more efficiently using Brand Building Information Resources, marketing costs decrease, as Brand Value and Equity increase, thereby improving Profits. By creating new levels of Brand Value and Experience, the durability of all serviced Brands can be extended. By providing such benefits, the Brand Management and Marketing Communication Network helps build more distinctive, valuable, and stronger Brands in the marketplace.

Brand managers can now take full control of their online marketing communication process and direct it exactly as they wish, as their team members collaborate with each other to carry out their brand marketing objectives.

The Brand Management and Marketing Communication Network of the present invention enables Brand Management Teams to bring supply side efficiencies and process to the demand side of their businesses, and increase the accountability of dollars spent on advertising for individual products, services, and brands alike.

The Brand Management and Marketing Communication Network of the present invention provides a solution to the myriad of problems facing both the Consumers on the Internet and the Brand Manager whose message is not getting relayed effectively.

The Brand Management and Marketing Communication Network of the present invention provides a collection of finely-tuned Internet-based services that help Brand Managers manage their brand building information from the supply side to the demand side of their operations, while harnessing the power of the Brand Building Information Resources available on the Internet. With Brand Information Networks that are synchronized with their brand's supply side information management operations, Brand Managers are now be able to track each campaign for each product with up to date information on where each campaign is placed as well as how well utilized it is.

The Brand Management and Marketing Communication Network of the present invention provides brand managers with powerful tools that enable them to capture brand building information, currently scattered throughout the Web, and place it at critical touch-points not only where, and when, the consumer is considering a purchase on the Web, but also in places that can initiate the consumer purchase experience. Brand marketing communication technology of the present invention can be made available at eCommerce sites, the Checkout, cell phones or at ATM machines.

The Brand Management and Marketing Communication Network of the present invention provides consumers with a new tool for gathering the best and most accurate information about any Product or Service over the Internet at any consumer touch-point. Consumers can watch an ad, find out about the latest promotions, gain detailed product information, search the store locator or find other information through Multi-Mode Virtual Kiosks.

The Brand Management and Marketing Communication Network of the present invention is based on a revolutionary new communication system and network architecture design that allows brand managers and their agents, using point and click technology, to simply:

1. Build Brand Information Networks for their branded products and services by linking the URLs of Brand Building Information Resources on the Internet (e.g. product video, audio and consumer information) to their Product and Service Data Strings (e.g. UPNs, TMs, PDs, USNs, SMs, Brand Names, etc.) which are Synchronized with the Product's Supply Chain information operations 2. Generate and install Brand-Building Multi-Mode Virtual Kiosks Having Multiple Display Modes Of Operation and 3. Remotely-Program the Display Modes of these Multi-Mode Virtual Kiosks with Rich-Media Advertising Spots, Promotional Spots, and Brand Information Networks, using the Web-based programming network of the present invention.

The revolutionary set of tools supported by the Brand Management and Marketing Communication Network of the present invention provides brand marketing teams of all sizes with the ability to design top-grade Web-based Brand Information Networks (BINs) that may be easily placed, via Multi-Mode Virtual Kiosks, at any Web-enabled consumer touch-point, in response to immediate feedback from Consumers regarding the Brand Building Information Networks that have been placed on the Internet.

The Brand Management and Marketing Communication Network of the present invention brings value to the interactive marketing field in the following ways:

Creating Value For the Brand Management Team

Control. The technology is easy to use. It allows Brand Managers to manage the design and implementation of the interactive marketing campaigns. The control is there for the brand manager from assigning the Product or Service Data Strings to formatting the look of the Multi-Mode Virtual Kiosk to placement of the Virtual Kiosk to running the metrics gathering tools for Consumer interaction reports and basic Product/Service information gathering. Brand Management and Marketing Communication Network has engineered the engineers out of the process. The brand manager has complete control, while collaboration among brand marketing team members is improved within and outside of the Brand's Enterprise.

Variety of Content. There is no other product out there that feeds consumers eyes and ears with messages of video and sound through the delivery of rich brand-building media, to deeply burn the clients brand message in the consumer's mind while at the same time providing an avenue for research and purchase of a product.

Savings. It takes approximately ten minutes to implement a campaign under the B Brand Management and Marketing Communication Network. Traditional interactive marketing campaigns take an average of three days. The savings of time, effort and resources are clearly defined under this revolutionary system.

Brand Image Protection. These channels are less immune to the destructive power of clutter. Therefore, the Brand Management and Marketing Communication Network enables brand management teams to create stronger, more distinctive brands in the marketplace translating into premium prices, greater levels of channel influence, improved levels of customer loyalty and retention, as well as increased profits.

Scalability. The system provides the scalability Brand Managers are looking for. The network may be used within all aspects of the Brand Managers relationship channel and will always present the same message with the same "feel". The Multi-Mode Virtual Kiosks are accessible through the manufacturer's website, a retailers website or any other linkable items on the Web.

Creating Value For Consumers

Easy for Consumers. The Brand Management and Marketing Communication Network is easy for the consumer to use. Consumers want to research and shop for goods and services online, but find it cumbersome and frustrating. With Brand Marketing Communication Networks, the consumer has a well-designed and easy to use research source. Enter a brand-related search key, such as a Product Descriptor, UPC Code or Brand Name and the consumer is lead directly to the brand building information network for the product or service. A few clicks verses searching through endless number of web pages. The consumer is guaranteed quality information.

Depth. Via the Advertising & Promotion Display Modes as well as the Brand Information Display Mode the consumer receives audio, video and detailed product information to present a three dimensional view of the product.

Availability. The Brand Marketing Communication Network is available at any Internet enabled touchpoint. It is there and it is available when the consumer needs it.

Creating Value For Retailer/E-Tailer Trading Partners

In summary, the Brand Management and Marketing Communication Network of the present invention gives brand managers the tools to positively influence price-driven online shoppers and effectively communicate the essence of their brands through a quick, information-rich shopping experience at the e-tail point of sale and other Web touch points. The brand manager displays this information in something called a "Multi-Mode Virtual Kiosk" which consumers can launch anywhere on the Web to obtain in-depth information about a brand, as well as rich media images and the latest promotions on a real-time basis.

A primary advantage of the Brand Management and Marketing Communication Network of the present invention lies in its unique ability to choreograph and deliver an engaging, unprecedented brand experience with the efficiency and automation of supply chain management solutions.

In the illustrative embodiment, the Brand Management and Marketing Communication Network of the present invention is realized as a centralized application allows brand managers to link seemingly disparate online assets: rich media, promotional messages and product specifications, for example, and bring them directly to online shoppers at the point-of-purchase and any touch point on the World Wide Web, through a new interactive online shopping vehicle called a "Multi-Mode Virtual Kiosk".

Brand owners can place Multi-Mode Virtual Kiosks anywhere on the Web they wish to deliver an information-rich brand experience or present a multi-faceted view of their brands directly to consumers. They can place Virtual Kiosks on e-retail sites and portals the consumer visits while in a transactional mindset (e.g., shopping search engine results pages), on partner websites or any point on the Web where they wish to create or reinforce brand awareness in the mind of the consumer.

The Multi-Mode Virtual Kiosks are the presentation layer of a highly sophisticated Brand Management and Marketing Communication Network that the brand owner operates in-house to tightly control and manage brand assets anywhere on the Web, and collaborate in real-time with retail trading partners, as well as advertising and promotion agents in order to ensure timely, consistent delivery of online brand marketing messages and drive sales. The Network also enables brand managers to effectively and efficiently define, refine and measure online brand communication activities with a few mouse clicks.

Preferably, the Brand Management and Marketing Communication Network of the present invention is realized as an industrial-strength brand management and marketing communication network that is sufficiently scalable to support the brand marketing communications industry in much the same way as AT&Ts public telephone switching network (PTSN) serves millions of companies throughout the world. This way the Brand Management and Marketing Communication Network functions as an "inter-enterprise level" brand management and marketing communication network for the entire global brand marketing communications industry.

Detailed Description of the Enterprise Brand Management and Marketing Communication Instrumentation Network of the Illustrative Embodiment of the Present Invention In FIGS. 5A through 5E, a basic database schema diagram is shown for the RDBMS used to implement the Brand Management and Marketing Communication Instrumentation Network of the illustrative embodiment. Any SQL database program compatible with the WebObject 5.2 Java Application Server can be used to implement this network component. Notably, during object-oriented design (OOD) and system developed, the tables and relationships in the RDBMS are ultimately converted to Java class based Enterprise Object (EO) model within the WebObject 5.2 Java Application Server, whereas the GUI components for the Network are converted to a Java class based Web Objects (WO) model therewithin.

As shown in FIGS. 4A and 4B, the tables in the RDBMS comprise the following attributes and relationships:

Description of the Database Layer of the Brand Management and Marketing Communication Network of the Illustrative Embodiment (Brand Marketing Communication Network)

Account

Attributes:

p_ID→Primary Key name→Account Name active→Denotes whether the Account is active or not fk_CLIENT→Foreign Key. Holds relationship to the Client table Relationships:

clients→1-to-1 relationship. Each Account must be assigned to a single Client.

Advertisement_or Promotion

Attributes:

p_ID→Primary Key name→name of the item. In this case there will be two items in the table ('Promotion' and 'Advertisement')

active→Denotes whether the item is active or not

Relationships:

toAdvertisement_or_PromotionOrders→1-to-many relationship. Each Advertisement_or_Promotion Order must be assigned an advertisement or promotion Type.

Advertisement_or_PromotionOrders

Attributes:

p_ID→Primary Key active→Denotes whether the item is active or not fk_ADVERTISEMENT_OR_PROMOTION→Foreign Key. Holds relationship to the Advertisement_or_Promotion table fk_CAMPAIGN→Foreign Key. Holds relationship to the Campaign table Relationships:

advertisement_or_promotions→1-to-1 relationship. Each Order must be assigned an advertisement or promotion Type.

campaigns→1-to-1 relationship. Each Order must be assigned to a specific Campaign.

Advertising Promotional Privileges

Attributes:

p_ID→Primary Key name→Holds the value of the Type of Privilege. (In this case there will be only three types; 'Exclusive', 'Shared', or 'Not Allowed')

active→Denotes whether the item is active or not Relationships:

toInstalledKioskPrivileges→1-to-many relationship. The allowed Privileges for placing Advertisements and Promotions on any installed Retailer-Specific Virtual Kiosk are controlled through this relationship BIN_Links Attributes:

fk_BIN→Foreign Key. Holds relationship to the Brand Information Networks table. The links assigned to that Brand Information Network are stored in this table.

fk_LINK→Foreign Key. Holds relationship to the Link table. Which Links are to be assigned to the Brand Information Network are stored in this table Relationships:

BINs→1-to-1 relationship. Denotes which Brand Information Network is being populated by the stored Links Links→1-to-1 relationship. Denotes which Links are to be assigned to the Brand Information Networks Brand_Indices Attributes:

fk_BRAND→Foreign Key. Holds relationship to the Brand table. Denotes which Brand is assigned to the stored Indices fk_INDEX→Foreign Key. Holds relationship to the Index table. Denotes which Indices are assigned to the Brand Relationships:

Brands→1-to-1 relationship. Denotes which Brand is assigned to the stored Indices Indices→1-to-1 relationship. Denotes which Indices are assigned to the Brand.

Brand_Information_Networks

Attributes:

p_ID→Primary Key name→The name of the Brand Information Network active→Denotes whether the Brand Information Network is active or not fk_STYLE→Foreign Key. Holds relationship to the Style table. Denotes which Style is assigned to the Brand Information Network fk_PRODUCT→Foreign Key. Holds relationship to the Product table. Denotes to which Product the Brand Information Network is assigned Relationships:

Styles→1-to-1 relationship. Denotes which Style is assigned to the Brand Information Network Products→1-to-1 relationship. Denotes to which Product the Brand Information Network is assigned Brand_Marks Attributes:

fk_BRAND→Foreign Key. Holds relationship to the Brand table. Denotes to which Brand the Marks are assigned fk_MARK→Foreign Key. Holds relationship to the Mark table. Denotes which Marks are assigned to the Brand Relationships:

Brands→1-to-1 relationship. Denotes to which Brand the Marks are assigned

Marks→1-to-1 relationship. Denotes which Marks are assigned to the Brand

Brands

Attributes:

p_ID→Primary Key name→Name of the Brand active→Denotes whether the Brand is active or not fk_ACCOUNT→Foreign Key. Holds relationship to the Account table. Denotes to which Account does the Brand belong Relationships:

Accounts→1-to-1 relationship. Denotes to which Account does the Brand belong

Campaign Kiosks

Attributes:

fk_CAMPAIGN→Foreign Key. Holds relationship to the Campaign table. Denotes to which Campaign do the Kiosks belong fk_KIOSK→Foreign Key. Holds relationship to the Kiosk table. Denotes which Kiosks belong to the Campaign Relationships:

Campaigns→1-to-1 relationship. Denotes to which Campaign do the Kiosks belong

Kiosks→1-to-1 relationship. Denotes which Kiosks belong to the campaign

Campaign

Attributes:

p_ID→Primary Key name→Name of the Campaign active→Denotes whether the Campaign is active or not Relationships:

toCampaign_Kiosks→1-to-many relationship. Denotes Kiosks are assigned to which Campaigns toAdvertisement_or_PromotionOrders→1-to-many relationship. Denotes which Order belong to which Campaigns Client_User_Accounts Attributes:

fk_ACCOUNT→Foreign Key. Holds relationship to the Account table. Denotes to which Account does the Client User belong fk_CLIENT_USER→Foreign Key. Holds relationship to the Client_User table. Denotes which Client Users belong to the Account Relationships:

Accounts→1-to-many relationship. Denotes to which Account does the Client User belong Client_Users→1-to-many relationship. Denotes which Client Users belong to the Account Client_User_Privileges Attributes:

fk_CLIENT_USER→Foreign Key. Holds relationship to the Client User table. Denotes which Client User has this privilege in the System service_name→The Service to which the Client User has the privilege Relationships:

Client_Users→1-to-many relationship. Denotes which Client User has this privilege in the System Client_Users Attributes:

p_ID→Primary Key firstname→The First Name of the Client User lastname→The Last Name of the Client User username→The username the Client User uses to enter the System password→The password the Client User uses to enter the System active→Denotes whether the Client User is active or not fk_CLIENT→Foreign Key. Holds relationship to the Client table. Denotes to which Client does the Client User belong Relationships:

Clients→1-to-1 relationship. Denotes to which Client does the Client User belong toClient_User_Accounts→1-to-many relationship. Denotes to which Accounts does the Client User have access toClient_User_Privileges→1-to-many relationship. Denotes which Privileges the Client User has toKiosks_Installed→1-to-many relationship. Denotes which Kiosks the Client User has installed Clients Attributes:

p_ID→Primary Key name→Name of the Client active→Denotes whether the Client is active or not Relationships:

toClient_Users→1-to-many relationship. Denotes which Client Users are assigned to the Client toAccounts→1-to-many relationship. Denotes which Accounts are assigned to the Client Directories Attributes:

p_ID→Primary Key name→Name of the Directory active→Denotes whether the Directory is active or not Relationships:

toDirectory_Kiosks→1-to-many relationship. Denotes which Virtual Kiosks are assigned to the Directory Directory_Kiosks Attributes:

fk_DIRECTORY→Foreign Key. Holds relationship to the Directory table. Denotes to which Directory the Kiosks are assigned fk_KIOSK→Foreign Key. Holds relationship to the Kiosk table. Denotes which Kiosks are assigned to the Directory Relationships:

Directories→1-to-1 relationship. Denotes to which Directory the Virtual Kiosks are assigned Kiosks→1-to-1 relationship. Denotes which Kiosks are assigned to the Directory Display Modes Attributes:

p_ID→Primary Key name→Name of the Display Mode active→Denotes whether the Display Mode is active or not Relationships:

toKioskDisplayModes→1-to-many relationship. Denotes which Display Modes are assigned to the Kiosk Forbidden Domains Attributes:

p_ID→Primary Key forbidden_domain→The URL of the Domain that is forbidden active→Denotes whether the Forbidden Domain is active or not fk_ACCOUNT→Foreign Key. Holds relationship to the Account table. Denotes to which Account does this Forbidden Domain apply Relationships:

Accounts→1-to-1 relationship. Denotes to which Account does this Forbidden Domain apply Indices Attributes:

p_ID→Primary Key name→Name of the Index active→Denotes whether this Index is active or not Relationships:

toBrandIndices→1-to-many relationship. Denotes which Indices are assigned to a Brand Installed_Kiosk_Privileges Attributes:

fk_INSTALLED_KIOSK→Foreign Key. Holds relationship to the Installed Kiosk table. Denotes which Installed Kiosks have which Privileges for which Accounts fk_PRIVILEGES→Foreign Key. Holds relationship to the Privileges table. Denotes which Privileges are assigned to which Installed Kiosks for which Accounts fk_ACCOUNTS→Foreign Key. Holds relationship to the Accounts table. Denotes which Accounts have which Installed Kiosks with which Privileges assign to them Relationships:

InstalledKiosks→1-to-1 relationship. Denotes which Installed Kiosks have which Privileges for which Accounts Privileges→1-to-1 relationship. Denotes which Privileges are assigned to which Installed Kiosks for which Accounts Accounts→1-to-1 relationship. Denotes which Accounts have which Installed Kiosks with which Privileges assigned to them Kiosk Display Modes Attributes:

p_ID→Primary Key display_order→Denotes in which Order are the Display Modes presented when the Kiosk is launched active→Denotes whether the Display Mode for this Kiosk is active or not fk_KIOSK→Foreign Key. Holds relationship to the Kiosk table. Denotes which Kiosk is assigned the Display Mode and Order fk_DISPLAY_MODE→Foreign Key. Holds relationship to the Display Mode table. Denotes which Display Mode is assigned to the Kiosk Relationships:

toKiosks→-1-to-1 relationship. Denotes which Kiosk is assigned the Display Mode and Order toDisplayModes→1-to-1 relationship. Denotes which Display Modes are assigned to the Kiosk Kiosk Products Attributes:

fk_KIOSK→Foreign Key. Holds relationship to the Kiosk table. Denotes to which Kiosk are the Products assigned fk_PRODUCT→Foreign Key. Holds relationship to the Product table. Denotes which Products are assigned to the Kiosk fk_BIN→Foreign Key. Holds relationship to the Brand information Network table. Denotes which Brand Information Network is assigned to each Product in each Kiosk Relationships:

Kiosks→1-to-1 relationship. Denotes to which Kiosk are the Products assigned

Products→1-to-1 relationship. Denotes which Products are assigned to the Kiosk

BINs→1-to-1 relationship. Denotes which Brand Information Network is assigned to each Product in each Kiosk Kiosks Attributes:

p_ID→Primary Key name→Name of the Kiosk active→Denotes whether the Kiosk is active or not fk_SKIN→Foreign Key. Holds relationship to the Skin table. Denotes the Skin to be applied to the Kiosk fk_LAUNCH_ENVIRONMENT→Foreign Key. Holds relationship to the Launch Environment table.

Denotes in which Launch Environment the Kiosk shall launch.

Relationships:

Skins→1-to-1 relationship. Denotes which Skin is to be applied to the Kiosk

LaunchEnvironments→1-to-1 relationship. Denotes in which Launch Environment shall the Kiosk be launched toKioskDisplayModes→1-to-many relationship. Denotes to which Kiosk the Display Modes are assigned toKioskProducts→1-to-many relationship. Denotes to which Kiosk the Products are assigned toKiosksInstalled→1-to-many relationship. Denotes which Kiosk have been installed Kiosks_Installed Attributes:

p_ID→Primary Key active→Denotes whether the Installed Kiosk is active or not installed_domain→Records the Domain on which the Kiosk shall be placed installation_reason→Records the reason for the installation of the Kiosk fk_CLIENT_USER→Foreign Key. Holds relationship to the Client User table. Denotes which Client User installed the Kiosk fk_KIOSK→Foreign Key. Holds relationship to the Kiosk table. Denotes which Kiosk has been installed Relationships:

ClientUsers→1-to-1 relationship. Denotes which Client User has installed the Kiosk Kiosks→1-to-1 relationship. Denotes which Kiosks have been installed toCampaignKiosks→1-to-many relationship. Denotes which Installed Kiosks are assigned to the Campaign toDirectoryKiosks→1-to-many relationship. Denotes which Installed Kiosks are assigned to the Directory toInstalledKioskPrivileges→1-to-many relationship. Denotes which Privileges are assigned to the Installed Kiosk toOrderDetails→1-to-many relationship. Denotes which Installed Kiosk holds the Order Details Launch Environments Attributes:

p_ID→Primary Key name→Name of the Launch Environment active→Denotes whether the Launch Environment is active or not Relationships:

toKiosks→1-to-many relationship. Denotes from which Launch Environment the Kiosk will be launched Marks Attributes:

p_ID→Primary Key name→Name of the Trademark active→Denotes whether the Trademark is active or not Relationships:

toBrandMarks→1-to-many relationship. Denotes which Marks are assigned to Brands toProducts→1-to-many relationship. Denotes which Marks are assigned to Products Order_Details Attributes:

p_ID→Primary Key display_order→Denotes in which Order will the Advertisements or Promotions be displayed promotional_text→The Promotional Text to be displayed under the Promotion fk_KIOSK→Foreign Key. Holds relationship to Kiosk table. Denotes on which Kiosk will the Advertisements or Promotions play fk_LINK→Foreign Key. Holds relationship to Link table. Denotes which Link is to be used as the Advertisement or Promotion fk_ORDER→Foreign Key. Holds relationship to Order table. Denotes to which Order this Detail item belongs Relationships:

Kiosks→1-to-1 relationship. Denotes on which Kiosk will the Advertisement or Promotion play Links→1-to-1 relationship. Denotes which Link is to be used as the Advertisement or Promotion Orders→1-to-1 relationship. Denotes to which Order this Detail item belongs Product_Marks Attributes:

fk_PRODUCT→Foreign Key. Holds relationship to Product table. Denotes which Product holds which Marks fk_MARK→Foreign Key. Holds relationship to Mark table. Denotes which Marks are assigned to which Products Relationships:

Products→1-to-1 relationship. Denotes which Products hold which Marks

Marks→1-to-1 relationship. Denotes which Marks are assigned to which Products

Products

Attributes:

p_ID→Primary Key name→Name of the Product product_descriptor→Assigned Product Descriptor upn→Universal Product Number assigned to the Product active→Denotes whether the Product is active or not fk_BRAND→Foreign Key. Holds relationship to Brand table. Denotes to which Brand the Product is assigned Relationships:

Brands→1-to-1 relationship. Denotes to which Brand the Products are assigned toBrandInformationNetworks→1-to-many relationship. Denotes which Products are assigned to the Brand Information Network toKioskProducts→1-to-many relationship. Denotes which Products are assigned to the Kiosk toProductMarks→1-to-many relationship. Denotes which Products are assigned which Marks toURLs→1-to-many relationship. Denotes which URLs are assigned to which Products Skins Attributes:

p_ID→Primary Key name→Name of the Skin skin_file→File location of the Configuration File as well as the sample skin image active→Denotes whether the Skin is active or not Relationships:

toKiosks→1-to-many relationship. Denotes which Kiosks are assigned which Skins

Styles

Attributes:

p_ID→Primary Key name→Name of the Style active→Denotes whether the Style is active or not Relationships:

toBrandInformaionNetworks→1-to-many relationship. Denotes what Styles are assigned to which Brand Information Networks URLs Attributes:

p_ID→Primary Key

Figure 6A:
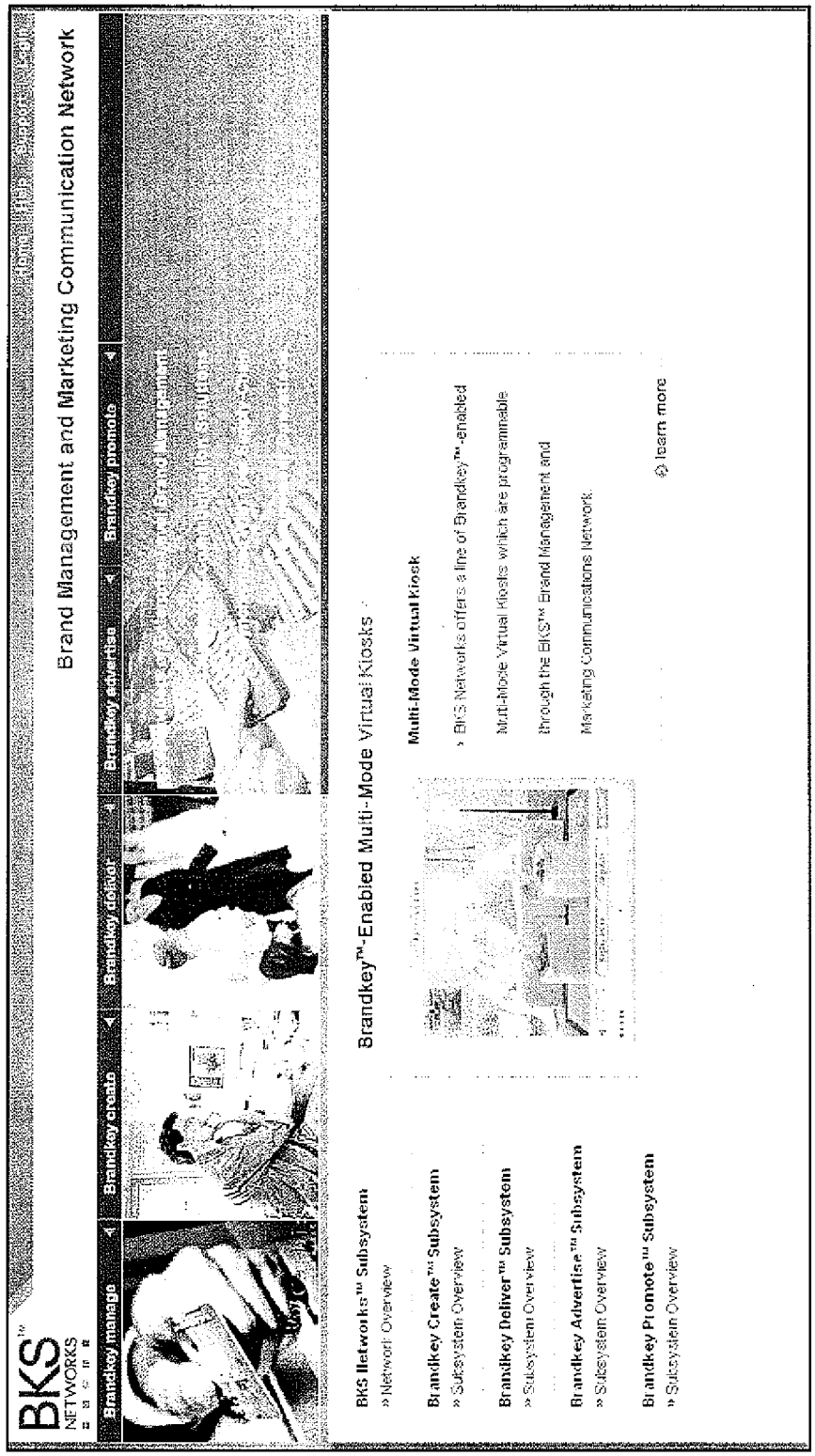
FIG. 6A is the home-page located GUI panel of the Internet-based Brand Management and Marketing Communication Network of the present invention which, as shown, comprises five separate Subsystems that support User Services, namely, Brandkey Manage™ Subsystem, the Brandkey Create™ Subsytem, Brandkey Deliver™ Subsystem, the Brandkey Advertise™ Subsystem, and the Brandkey Promote™ Subsystem.

URL→The URL string active→Denotes whether the URL is active or not fk_PRODUCT→Foreign Key. Holds relationship to Product table. Denotes to which Product the URL is assigned Relationships:

Products→1-to-1 relationship. Denotes to which Product the URL is assigned toBINLinks→1-to-many relationship. Denotes which URLs make up the Links on which Brand information Networks toOrderDetails→1-to-many relationship. Denotes which URLs make up the Advertisements or Promotions in the Order Detail record Description of the Presentation and Control Layers of the Brand Management and Marketing Communication Network of the Illustrative Embodiment (Brand Marketing Communication Network As illustrated in the GUI panel shown in FIG. 6A, the Brand Management and Marketing Communication Instrumentation Network of the present invention is divided into five customer-based Subsystems, identified by the following trademarks: Brandkey Manage™ Subsystem whose GUI panels and services are specified in FIGS. 6B1 and 6B2; Brandkey Create™ Subsystem whose GUI panels and services are specified in FIG. 6B2; Brandkey Deliver Subsystem whose GUI panels and services are specified in FIGS. 6B2 through 6B10; Brandkey Advertise™ Subsystem whose GUI panels and services are specified in 6B10; Brandkey Promote™ Subsystem whose GUI panels and services are specified in FIG. 6B10; and Brandkey Admin™ Subsystem whose GUI panels and services are described below.

The Brandkey Deliver™ Subsystem provides Brand Management Teams the ability to rapidly configure, deploy, and install Multi-Mode Virtual Kiosks anywhere on the Internet.

The Brandkey Advertise™ Subsystem enable Brand Managers and their Agents to program the Advertising Spot Display Mode of their Multi-Mode Virtual Kiosks in a simple an convenient manner. These operations are carried out by creating, executing and managing Advertising Campaigns designed to run on networks of Multi-Mode Virtual Kiosks.

Using the Brandkey Promote™ Subsystem, Brand Managers and their Agents can program the Promotional Spot Display Mode of their Multi-Mode Virtual Kiosks. These programming operations are carried out by creating, executing and managing Promotional Campaigns designed to run on networks of Multi-Mode Virtual Kiosks.

The Brandkey Create™ Subsystem enables Brand Managers and their Agents to program the Brand Information Network Display Mode of their Multi-Mode Virtual Kiosks using simple mouse-clicks and data-entry operations. Programming operations are carried out by creating and deploying interactive models of Product and Service Brands represented in the form of richly-associated Brand-Building Information Networks. These Information Networks create and reinforce the intended Brand Image of Products and Services within the minds of Consumers.

As discussed above, Web-based Brand-Building Information Networks (BINs) can be constructed for Product-type Brands by linking the Uniform Resource Locators (URLs) of Brand Building Information Resources to Product Data Strings (UPN/TM/PD) consisting of the Universal Product Number (UPN), Trademark (TM) and Product Descriptor (PD) of branded products. For Service-type Brands, these Brand Information Networks can be created by linking the Uniform Resource Locators (URLs) to Service Data Strings (USN/SM/SD) consisting of the Universal Service Number (USN), Servicemark (SM) and Service Descriptor (SD) of branded services. Similarly, for Corporate-type Brands, these Brand Information Networks can be created by linking the Uniform Resource Locators (URLs) to Service Data Strings (USN/SM/SD) consisting of the Universal Service Number (USN), Servicemark (SM) and Service Descriptor (SD) of branded services.

The Brandkey Systems™ Administration Subsystem enable Users to perform basic management and administration functions relating to Client Accounts, Brands, and User Rights and Privileges.

Using the Multi-Mode Virtual Kiosks supported by the Network, consumers can learn about brands in a more effective and enjoyable manner, and develop strong preferences for them.

As will be described in detail below, each of these Subsystems has one or more service suites, and each suite supports one or more Control Panels, which may be realized as either Web-based clients or Java clients. As shown in FIGS. 6B1 through 6B10, these Control Panels and related services (i.e. Marketing Instruments) are identified in hierarchical order as they are provided within the Brand Management and Marketing Network of the illustrative embodiment, namely.

The purpose of these Control Panels is to perform specific operations that support the revolutionary ensemble of brand marketing communication instruments of the present invention, in a manner quite independent of the other Subsystems. The back-end relational database management subsystem (RDBMS) used by the Brand Marketing Communication Network (i.e. "BKS Network" or "BKSN") schematically depicted in FIGS. 2A through 2D, 3A and 3B, is the common item that integrates together the subsystems of the entire the Brand Management and Marketing Communication Instrumentation Network.

The Brandkey Admin Subsystem

In the illustrative embodiment, the Brandkey Admin Subsystem is reserved for use by Brandkey Systems (BKS) Employees, and preferably is realized as a standalone WebObjects Application on an Application Server, as is the Multi-Mode Virtual Kiosk (MMVK) Serving Subsystem shown in FIGS. 2A through 2D. The Admin Subsystem will contain all the back-end functionality network service providers will use to maintain the network and the accounts that make up the Brand Marketing Communication Network. The Admin Subsystem shall be divided into six Service Suites; the Administrator Management Suite, the Marketing Management Suite, the Account Management Suite, the Revenue Management Suite and the Technical Management Suite.

All Brandkey Employee administration will occur in the Administrator Management Suite. There will be six (6) levels of BKS Employees; SuperUsers, Account Supervisors, Marketing Managers, Account Managers, Revenue Managers and Technical Managers. SuperUsers have full access throughout the system. Account Supervisors report to SuperUsers and are responsible for certain assigned Accounts. Account Manager. Account Managers, Revenue Managers and Technical Managers report to Account Supervisors and are responsible for certain aspects of assigned Accounts.

The primary marketing functions for Prospective Client Accounts occur in the Marketing Management Suite. Only SuperUsers, Account Supervisors and Marketing Managers have access to this Suite.

The primary management functions for BKS Accounts occurs in the Account Management Suite. Only SuperUsers, Account Supervisors and Account Managers have access to this Suite.

The primary revenue management functions for BKS Accounts occur in the Revenue Management Suite. Only SuperUsers, Account Supervisors and Revenue Managers have access to this Suite.

The primary technical and user-support management function for BKS Accounts occur in the Technical Management Suite. Only SuperUsers, Account Supervisors and Technical Managers have access to this Suite.

The following describes briefly the functions provided in each of the five core Subsystems of the Brand Marketing Communication Instrumentation Network of the present invention.

The Brandkey Manage Subsystem

The Brandkey Manage™ Subsystem is the central location where Brand Managers and Client Account Administrators can manage their Client Accounts and Brands, set User Rights to access the Brand Marketing Communication Network as well as program the Advertisement and Promotion Display modes of Multi-Mode Virtual Kiosks.

This Subsystem allows the Brand Managers to:
Register with Brand Marketing Communication Networks to set up client Accounts
Manage users assigned to the account as well as their rights to use specific services delivered by the Brand Marketing Communication Network
Manage Accounts, the Trade/Servicemarks associated with the Brand Entities, account Access rights to the Brand Marketing Communication Network and certify Ad/Promo Agents.
Assign business associates privileges to place Ad/Promo Spots on the installed Multi-Mode Virtual Kiosks
View Brand Metrics relating to services delivered by the Brand Marketing Communication Network.

The Brandkey Manage™ Subsystem is an extension of the overall Brand Marketing Communication Network from the front page of its Web-based GUI. There are Administrative instruments as well as Demonstration and Tutorial instruments designed to instruct and illuminate the User in the workings of the Brand Information Management and Marketing Communication Network of the present invention as a whole.

The Brandkey Manage™ Subsystem is divided into the following Suites; the Demonstration Suite, the Tutorial Suite, the Registration Suite, and the User/Account Administration Suite.

The Demonstration Suite contains Flash and other types of Demonstration materials for the various parts of the Brand Marketing Communication Network. These demonstrations are designed to give the User a bird's eye (10,000 foot) view of the System and its capabilities.

The Tutorial Suite contains Flash Tutorials for every part of the Brand Marketing Communication Network. These tutorials are designed to give the User an in-depth understanding of the functionality of the every aspect of the Brand Marketing Communication Network and how to best utilize its revolutionary Brand Marketing Communications Instruments.

The Registration Suite contains the Registration Control Panel, which new Users use to register with the Brand Marketing Communication Network. Generally these Registrants will be Brand Managers, Advertising or Promotional Agents, etc., or those people with certain high-level responsibilities for Brands. The Registration Process asks the Registrant for their Personal Information, then their Brand Entity Information, then their relationship with the Owner of the Brand. Once this information is filled in, it is recorded to the database and sent to the BKS Administrators to verify. If the Registrant is a Consumer, they will be given immediate access to the System. However, they will only have access to the Virtual Kiosk Installation Suite in the Brandkey Deliver™ Subsystem.

Once a User's Registration has been approved, they will gain access to the User/Account Administration Suite. This Suite is accessible only to those Users who are the Administrators of their Client Account. By default the Registrant is initially set as the default Administrator of the Client Account. This can be changed with a request to the Client Account's Brandkey Administrator.

In the User/Account Administration Suite, there are four Control Panels for the User to select; the Control Panel for Administering Users, the Control Panel for Administering Accounts, the Control Panel for Administering Ad/Promo Privileges, and the Control Panel for Viewing Brand Metrics.

The Control Panel for Administering Users allows the Administrator to edit the personal information for any User associated with their Client Account and to mange that User's Access Rights for the Network. The Administrator can also add new Users and configure their Access Rights for the Network.

The Control Panel for Administering Accounts allows Administrators to manage their Client Account Information. They may update their Company Information, their own personal information and access rights; they may also edit the list of Brand Entities associated with their Client Account or add new Brand Entities to their Client Account. Along with these Brand Entities the Administrator is allowed to manage or add new Trademarks or Servicemarks associated with those Brand Entities. Finally in this Control Panel, the Administrator is also able to Certify or Decertify any Advertising and Promotional Agents associated with their Client Account. When an Advertising or Promotional Agent signs up with the Brand Marketing Communication Network, they are asked which Brands they work for. Once that information is received from the Agent, they are put into the queue of pending Agents for certification by the Administrator of those Brands. If the Administrator certifies those Agents, then they are added to the Certified Agents list. If the Administrator does not certify those Agents, then they are deleted from the Database for that relationship. Likewise, if a Certified Agent is then decertified, their relationship with that Client Account is deleted from the Database.

The third Control Panel is the Control Panel for Administering Ad/Promo Privileges for installed Virtual Kiosks. Each Multi-Mode Virtual Kiosk can support Advertisements and/or Promotions. It is up to the Virtual Kiosk owner to decide which Vendors, Service Providers, etc. have access to which Virtual Kiosks containing their Products, Services, or Brands. The Administrator will select a Virtual Kiosk from the list and see which Vendors, Service provider, etc. have Products, Services, and Brands associated with that Multi-Mode Virtual Kiosk. They may then assign Shared privileges or Exclusive privileges for that Client to place Advertising or Promotional spots on that Virtual Kiosk. If the Administrator chooses a Shared privilege for a Client on a Virtual Kiosk, this means that the Administrator may add other Clients to share the Advertising space on that Virtual Kiosk. However, if the Administrator chooses an Exclusive privilege for a Client on a Virtual Kiosk, then that Virtual Kiosk is blocked for any other Client to place Advertising or Promotional spots on it. If a Virtual Kiosk had Shared privileges, then a Client gains Exclusive privileges, then that Exclusive privilege trumps any Shared privilege previously configured for the Virtual Kiosk.

The fourth Control Panel is the Control Panel for Viewing Brand Metrics for installed MMVKs. A brief overview of such metrics is in order.

Every action in the Virtual Kiosk is saved to the Brandkey Metrics tables as raw data keyed to the unique, individual session for each User who launches a Virtual Kiosk.

The reporting functionalities of the Network of the present invention allows the easy reporting of collected Brand Metrics for specific views as requested by the Client. Ypical Views that would be supported by the Network include, for example:

1. Basic data for each installed in MMVK, including:
   a. Date of creation of the MMVK
   b. Which Products/Services are deployed on the MMVK
   c. Number of Launches of the MMVK
   d. Number of Ads assigned to the MMVK
   e. Number of Promos assigned to the MMVK
   f. Date and location the MMVK was installed
   g. Other installations of the MMVK (e.g. along other sales and marketing channels)

2. Totals for the installed MMVK:
   a. Number of Launches of the MMVK
   b. Number of Downloads from the MMVK
   c. Number of times Viral Marketing was initiated on the MMVK
   d. Number of people to which the MMVK was sent
   e. Number of Conversions on the MMVK (i.e. selections of the BUY NOW button)

3. Advertisement/Promotion detailed information for each Advertisement and Promotion:
   a. Number of Total Views (Starts−Skips+Repeats)
   b. Number of Starts
   c. Number of Skips
   d. Number of Repeats 4. Number of Views for each Link in the BIN (Brand Information Network) of the MMVK 5. Average Duration of viewing the MMVK 6. Average of Most Common User Paths within the MMVK.

By using these Control Panels and Suites, the Administrator and other Users can safely navigate the Brand Marketing Communication Network and set up accurate representations of their Brand Account and access rights and ad/Promo spot placement privileges for their Multi-Mode Virtual Kiosks, as well as view Brand Metrics collected on installed MMVKs anywhere along the Network.

The Brandkey Create Subsystem

The Brandkey Create™ Subsystem employs the latest advances in cognitive science and learning theory to enable Brand Managers and their team members to create and deploy multi-level interactive audio-visual models of product, service and corporate brands represented in the form of Brand Information Networks supported by brand-building information resources on the Internet (e.g. WWW, ftp sites, etc).

These Brand Information Networks are constructed upon a network of Brand-Building Information Links located at the nodes of the Brand Information Network. Each node in the Network can be encoded with brand-identifying graphics and audio clips selected by the Brand Manager's team and build and reinforce the Brand Image intended by the Brand Managers.

By strengthening the intended Brand Image associated with their Brand Entity, Brand Managers can effectively combat the forces of brand-related confusion, erosion, and dilution created by marketplace clutter.

The results of delivering Brand Information Networks to Consumers at Internet-based touchpoints before, during and after purchases are consumers learn about and remember what is relevant and important about the particular Brand Entities represented by the delivered Brand Information Network; brand managers build stronger, more powerful Brands in the minds and hearts of Consumers; and stronger, more powerful Brands increase the level of influence brand managers have along their distribution channels.

The Brandkey Create™ Subsystem enable Brand Managers to manage their list of Products and Services and to create the networks of richly associated Brand-Building Resources used on the Multi-Mode Virtual Kiosks to build stronger, more powerful Brands in the minds and hearts of Consumers. The Brandkey Create™ Subsystem consists of one Suites; the Brand Information Network Management Suite.

Brandkey Create Subsystem also supports a mechanism for visualizing brand images projected by brand information networks created by brand management team members, as described below.

A first illustrative embodiment of this composite brand image viewing mechanism supports the following steps:

Step 1: Create Brand Information Network based on UPN/TM/PD/URL Data Link Sets;

Step 2: For each node within the Brand Information Network, catalog the URLs referenced therein, and for each Web Page referenced by these URLs, catalog the URLs referenced therein. Perform this for N number of levels of nodes within the Brand Information Network.

Step 3: Based on the Number of Nodes in the Brand Information Network, N, generate an N faceted three-dimensional polytope, and assign the corresponding URL thereto.

For each nth facet, divide the same into a number of subfacets equal to the number of URLs referenced in the URL, and then assign to each subfacet the corresponding URL.

Step 4: The result here is 3-D Polytope-based Model of a Brand Information Network, having as many facets and subfacets as URLs referenced in the nodes of the Brand Information Network. Each facet and subfacet provides a different "aspect" of the composite Brand Image projected by the Brand Information Network, supported on the WWW.

Step 5: Then, sequentially display the Brand Building Information Resources associated with each facet and subfacets of the with 3-D Polytope-based Model of a Brand Information Network. Preferably, this brand image visual process can best occur using a display panel, in which the Trademark (TM) and Product Descriptor associated with the Brand Information Network is displayed on the upper portion of a display panel, simultaneously with the sequential display of the Brand Building Information Resources associated with the Brand Information Network. Notably, during the display of such Brand Building Information Resource associated with a node (or subnode) in the Brand Information Network, the URL corresponding to the node or subnode will be displayed along with the Node Category Label associated with the parent node.

Notably, the display of Brand Building Information Resources associated with the node and subnodes of a Brand Information Network can be automated. Prior to the commencement of a sequential animated display process, the brand management team member will simply selected the Level of nodes within the Brand Information Network to be displayed, and thereafter, the Brand Building Information Resources residing at such nodes and subnodes will be automatically displayed to project a composite Brand Image that might be experienced or developed within the mind of a consumer interacting with the Brand Information Network during the Brand Information Network Display Mode of a Multi-Mode Virtual Kiosk.

A second illustrative embodiment of this composite brand image viewing mechanism supports the following steps:

Step 1: Create Brand Information Network based on UPN/TM/PD/URL Data Link Sets.

Step 2: For each node within the Brand Information Network, catalog the URLs referenced therein, and for each Web Page referenced by these URLs, catalog the URLs referenced therein. Perform this for N number of levels of nodes within the Brand Information Network (i.e. the subnodes of the Brand Information Network).

Step 3: Then, using the catalog of URLs ascertained above, sequentially display the Brand Building Information Resources associated with each node and subnode in a Brand Information Network. Preferably, this brand image visual process can best occur using a display panel, in which the Trademark (TM) and Product Descriptor associated with the Brand Information Network is displayed on the upper portion of a display panel, simultaneously with the sequential display of the Brand Building Information Resources associated with the Brand Information Network. Notably, during the display of such Brand Building Information Resource associated with a node (or subnode) in the Brand Information Network, the URL corresponding to the node or subnode will be displayed along with the Node Category Label associated with the parent node.

Notably, the display of Brand Building Information Resources associated with the node and subnodes of a Brand Information Network can be automated. Prior to the commencement of a sequential animated display process, the brand management team member will simply selected the Level of nodes within the Brand Information Network to be displayed, and thereafter, the Brand Building Information Resources residing at such nodes and subnodes will be automatically displayed to project a composite Brand Image—that might be experienced or developed within the mind of a consumer interacting with the Brand Information Network during the Brand Information Network Display Mode of a Multi-Mode Virtual Kiosk.

Brandkey Deliver Subsystem

The Brandkey Deliver™ Subsystem is the component of the Brand Management and Marketing Communication and Commerce Enabling Network where the User is allowed to Create, Customize, Deploy, and Install Brand Building Multi-Mode Virtual Kiosks across various Consumer Touchpoints through a number of different Launch Environments. Generally, the Brand Managers or full-service Agents will be the ones who will use this Subsystem.

Once the Brand Information Networks are programmed in the Brandkey Create™ Subsystem, they need to be associated with Multi-Mode Virtual Kiosks. This will be accomplished in the Brandkey Deliver™ Subsystem.

The Brand Marketing Communication Network supports several different types of Multi-Mode Virtual Kiosks for each of the different kinds of trading partners along the retail value chain:

Product-Specific (PS)
Service-Specific (SP)
Vendor-Specific (VP)
Service-Provider-Specific (SPS)
Retailer-Specific (RS)
Industry-Specific (IS)
Corporate-Specific (CS)

In general, Multi-Mode Virtual Kiosks (MMVKs) of the present invention have a number of similar characteristics in common, namely:

(1) the ability to display information in any combination of 3 Modes; Advertising, Promotion, and Brand Information;

(2) the ability to be launched from any Internet-enabled touchpoint; The ability to have a programmed "Call to Action" button (e.g. Buy Now, Order Now, etc.);

(3) the ability to support e-commerce transactions, and support the generation and tracking of sales commissions earned by affiliates on the transactions initiated by (or conducted through) MMVKs having affiliate services of the present invention enabled;

(4) the ability to facilitate viral marketing in the form of "Send this Kiosk" button;

(5) the ability to collect metrics regarding consumer interaction with the interface objects in the GUI screens of the MMVK; and (6) the ability to initiate e-commerce transactions at manufacturer or retailer sponsored e-commerce sites, and for network affiliates who host such MMVKs on their Web sites and properties, to automatically track transactions initiated by the such MMVKs, as well as sales commission earned by such affiliates under agreement with manufacturers and retailers.

Product-Specific MMVKs

Product-Specific Virtual Kiosks (MMVKs) are used to showcase a single Product. These Virtual are created by the Vendor (Manufacturer). However, these Virtual Kiosks may be installed by either the Vendor or the Retailer. Retailers may only install those Virtual Kiosks from Vendors who they have a relationship, and only for those products of the Vendor that they carry. Vendors have the ability to update the contents of the Brand Information Network (BIN) that may be in the Virtual Kiosk. Retailers may only use those BINs that have already been created by the Vendor for the selected product. One product must be selected to be showcased in the Virtual Kiosk. Any combination of Display Modes may be programmed for the Virtual Kiosk. For example, if the Vendor wants a Virtual Kiosk that simply plays an Advertisement and Promotion when launched, they may program the Virtual Kiosk to have only those 2 Display Modes.

Vendors have de-facto rights to place Advertisements and Promotions on these Virtual Kiosks. If the Virtual Kiosk is created by the Retailer, then it is up to the Retailer and the Vendor to work out which Advertisements and Promotions are to be placed on that Virtual Kiosk. Retailers may not usurp the right to place Advertisements and Promotions on Product-Specific Virtual Kiosks unless specifically allowed by the Vendor.

Vendor-Specific MMVKs

Vendor-Specific Virtual Kiosks are used to showcase a group of products that belong to a single Vendor. These Virtual Kiosks may only be created by a Vendor. These Kiosks may be installed by either the Vendor or the Retailer. Retailers may only install those Virtual Kiosks from Vendors who they have a relationship, and only for those products of the Vendor that they carry. Vendors have the ability to update the contents of the BINs that may be in the Virtual Kiosk. Retailers may only use those BINs that have already been created by the Vendor for the selected products. At least one product must be selected to be showcased in the Virtual Kiosk. The Vendor's corporate brand may also be showcased in this Kiosk. Any combination of Display Modes may be programmed for the Virtual Kiosk. For example, if the Vendor wants a Virtual Kiosk that simply plays an Advertisement and Promotion when launched, they may program the Virtual Kiosk to have only those 2 Display Modes.

Vendors have de-facto rights to place Advertisements and Promotions on these Virtual Kiosks. If the Virtual Kiosk is created by the Retailer, then it is up to the Retailer and the Vendor to work out which Advertisements and Promotions are to be placed on that Virtual Kiosk. Retailers may not usurp the right to place Advertisements and Promotions on Product-Specific Virtual Kiosks unless specifically allowed by the Vendor.

When the Kiosk launches, the Vendor's corporate brand is first displayed if programmed by the Vendor. The Kiosk goes through all programmed modes of the corporate brand. If no corporate brand is programmed, then the Kiosk loops the initial Advertisements and Promotions while showing the list of products available in the Kiosk. The Consumer may select any product displayed in the list. When the product is selected, the Display Modes for that product are launched. The Kiosk goes through the programmed Display Modes. The Consumer may return to the product list at any time, in which case the original set of Advertisements and Promotions will run again.

Service-Specific MMVKs

Service-Specific Virtual Kiosks are used to showcase a single Service. These Virtual Kiosks may be created by either the Service Provider or the Trading Partner. These Kiosks may be installed by either the Service Provider or the Trading Partner. Trading Partners may only install those Virtual Kiosks from Service Providers who they have a relationship, and only for those services of the Service Provider that they provide. Service Providers have the ability to update the contents of the BIN that may be in the Virtual Kiosk. Trading Partners may only use those BINs that have already been created by the Service Provider for the selected service. One service must be selected to be showcased in the Virtual Kiosk. Any combination of Display Modes may be programmed for the Virtual Kiosk. For example, if the Service Provider wants a Virtual Kiosk that simply plays an Advertisement and Promotion when launched, they may program the Virtual Kiosk to have only those 2 Display Modes.

Service Providers have de-facto rights to place Advertisements and Promotions on these Virtual Kiosks. If the Virtual Kiosk is created by the Trading Partner, then it is up to the Trading Partner and the Service Provider to work out which Advertisements and Promotions are to be placed on that Virtual Kiosk. Trading Partners may not usurp the right to place Advertisements and Promotions on Product-Specific Virtual Kiosks unless specifically allowed by the Service Provider.

Service-Provider-Specific MMVKs

Service-Provider-Specific Virtual Kiosks are used to showcase a group of Services. These Kiosks may only be created by the Service Provider. These Kiosks may be installed by either the Service Provider or the Trading Partner. Trading Partners may only install those Virtual Kiosks from Service Providers who they have a relationship, and only for those services of the Service Provider that they provide. Service Providers have the ability to update the contents of the BIN that may be in the Virtual Kiosk. Trading Partners may only use those BINs that have already been created by the Service Provider for the selected service. At least one service must be selected to be showcased in the Virtual Kiosk. The Service Provider's corporate brand may also be showcased in this Kiosk. Any combination of Display Modes may be programmed for the Virtual Kiosk. For example, if the Service Provider wants a Virtual Kiosk that simply plays an Advertisement and Promotion when launched, they may program the Virtual Kiosk to have only those 2 Display Modes.

Service Providers have de-facto rights to place Advertisements and Promotions on these Virtual Kiosks. If the Virtual Kiosk is created by the Trading Partner, then it is up to the Trading Partner and the Service Provider to work out which Advertisements and Promotions are to be placed on that Virtual Kiosk. Trading Partners may not usurp the right to place Advertisements and Promotions on Product-Specific Virtual Kiosks unless specifically allowed by the Service Provider.

When the MMVK launches, the Service Provider's corporate brand is first displayed if programmed by the Service Provider. The Virtual Kiosk goes through all programmed modes of the corporate brand. If no corporate brand is programmed, then the Virtual Kiosk loops the initial Advertisements and Promotions while showing the list of services available in the Virtual Kiosk. The Consumer may select any service displayed in the list. When the service is selected, the Display Modes for that service are launched. The Virtual Kiosk goes through the programmed Display Modes. The Consumer may return to the service list at any time, in which case the original set of Advertisements and Promotions will run again.

Service-Provider-Specific MMVKs can function as an service information portal wherein consumers can search for Service-Specific MMVKs (essentially programmed into Service-Provider-Specific MMVKs) using brand-related search keys such as USNs, SMs, SDs, and category descriptors.

Retailer-Specific Virtual Kiosks

Retailer-Specific Virtual Kiosks, which is one kinds of Multi-Product MMVK, are typically used to showcase a group of consumer products that are carried by a Retailer. These Virtual Kiosks may only be created by a Retailer or its agent. These Kiosks may only be installed by a Retailer. Retailers may only select those products of the Vendor that they carry to showcase in the Kiosk. Vendors have the ability to update the contents of the BINs that may be in the Virtual Kiosk. Retailers may only use those BINs that have already been created by the Vendor for the selected products. At least one product must be selected to be showcased in the Virtual Kiosk. The Vendor's corporate brand may also be showcased in this Kiosk. Any combination of Display Modes may be programmed for the Virtual Kiosk. For example, if the Vendor wants a Virtual Kiosk that simply plays an Advertisement and Promotion when launched, they may program the Virtual Kiosk to have only those 2 Display Modes.

By default, Vendors have rights to place Advertisements and Promotions on these Virtual Kiosks. However, since the Virtual Kiosk is created by the Retailer, the Retailer retains the absolute right to decide which Vendors are allowed to place Advertisements and Promotions on the Virtual Kiosk. Retailers may assign Shared access, No access, or Exclusive access to any Vendor for the Virtual Kiosk. The Vendor's Advertising Directory and Promotion Directory will reflect on which Virtual Kiosks they have the rights to place Advertisements and Promotions.

When the Virtual Kiosk launches, the Retailer's corporate brand is first displayed if programmed by the Retailer. The Kiosk goes through all programmed modes of the corporate brand. If no corporate brand is programmed, then the Kiosk loops the initial Advertisements and Promotions while showing the list of products available in the Kiosk. The Consumer may select any product displayed in the list. When the product is selected, the Display Modes for that product are launched. The Kiosk goes through the programmed Display Modes. The Consumer may return to the product list at any time, in which case the original set of Advertisements and Promotions will run again.

Retailer-Specific MMVKs can function as an product information portal wherein consumers can search for Product-Specific MMVKs (essentially programmed into the Retailer-Specific MMVKs) using brand-related search keys such as UPNs, TMs, PDs, and category descriptors.

Corporate-Specific MMVKs

Corporate-Specific Virtual Kiosks (MMVKs) are used to showcase a group of products and/or services that are carried or purveyed by a particular vendor/manufacturer/service-provider. In many respects, the behavior of Corporate-Specific MMVKs is similar to Vendor-Specific MMVKs, and Service-Provider Specific MMVKs, with the exception that both product and service brands can be communicated through Corporate-Specific MMVKs.

Industry-Specific MMVKs

Industry-Specific Virtual Kiosks (MMVKs) are used to showcase a group of products and/or services that are carried by a plurality of Retailers and/or Service Providers. In some embodiments, Industry-Specific MMVKs can function as an product/service information portal wherein consumers can search for Product-Specific MMVKs or Service-Specific MMVKs using brand-related search keys such as UPNs, USN, TMs, SMs, PDs, SDs, and category descriptors.

The Brandkey Deliver™ Subsystem is divided into two Suites; the Virtual Kiosk Generation Suite and the Virtual Kiosk Installation Suite. As the titles represent, the former Suite allows Users to Create, Customize and Deploy Brand Building Multi-Mode Virtual Kiosks while the latter Suite allows Users to Install Brand Building Multi-Mode Virtual Kiosk tags at different Consumer Touchpoints.

There are six Control Panels available in the Virtual Kiosk Generation Suite. Each Control Panel's instruments are specialized for a different type Multi-Mode Virtual Kiosk. In general, no single User will have access to all of these Control Panels.

The Virtual Kiosk Installation Suite of the Brandkey Deliver™ Subsystem contains six similar Control Panels. The difference is that these Control Panels allow Users to install the Tags for the Virtual Kiosks that are created and deployed in the Virtual Kiosk Generation Suite. Only Consumers will have the ability to install all six types of Virtual Kiosk Tags. Other types of Users will only be able to install the Tags for those Virtual Kiosks they are associated with.

Each Control Panel in the Virtual Kiosk Generation Suite allows Users to Create, Customize, Modify, and deploy different types of Multi-Mode Virtual Kiosks.

When a User first enters a Control Panel they will have the opportunity to set the basic configuration of the Virtual Kiosks they create.

User will be asked to specify the following items:
If they wish to have the Brand Marketing Communication Network automatically create default Virtual Kiosks for all their registered Products, Services, and Brands.
If they wish to allow Consumers to install the tags for their Multi-Mode Virtual Kiosks.
The list of Retailers and/or Industrialists who have permission to install the tags for their Virtual Kiosks.
The list of Domains that are forbidden from launching their Virtual Kiosks.

Users will be able to update these items whenever they wish by re-entering this area in the Control Panel.

Once the User has set the configuration for the Multi-Mode Virtual Kiosks, they can create the Virtual Kiosks. The creation process for Product-Specific and Service-Specific Virtual Kiosks is different from the rest of the Virtual Kiosks to the degree that Users can create multiple Product-Specific and Service-Specific Virtual Kiosks at one time, whereas they can only create one of all the other types of Virtual Kiosks at a time.

To create a Multi-Mode Virtual Kiosk, the User first must select the display mode that the Virtual Kiosk will run. There are at least three possible display modes for each Multi-Mode Virtual Kiosk, namely; a First Mode, a Second Mode, and Third-Mode. The First Mode allows the displaying of Advertising Spots, Promotional Spots and the Brand Information Network. The Second Mode allows the displaying of Advertising-Spots and the Brand Information Network. The Third Mode allows the display of only the Brand Information Network. Once the running mode of the Virtual Kiosk is selected, the User must select the Product(s), Service(s), or Brand(s) that will be available in the Virtual Kiosk. Once those have been selected, the User is asked to give the Virtual Kiosk a significant name. The name of the Virtual Kiosk is collected in order to give Users a chance to give their Virtual Kiosks a meaningful identification. With the name taken care of, the User can then customize the Virtual Kiosk. The Brand Marketing Communication Network allows for detailed customization of the Virtual Kiosks. Users can change their Logo at the top of the Virtual Kiosk, the geometric shape, surface texture, surface color, button style set, and button set color for the Virtual Kiosk being created. During the customization process the User is able to view a sample of what the Virtual Kiosk may look like with the selected customizations employed.

Customizing the Multi-Mode Virtual Kiosk is the last step in the Virtual Kiosk creation process. With this done, the Virtual Kiosk is ready for either further modification or deployment.

Users are able to modify any created Virtual Kiosk whenever they wish. After selecting the Virtual Kiosk they wish to modify, the User will be able to modify the mode in which the Virtual Kiosk is set to operate. They may also delete the Virtual Kiosk if they wish to. If the Virtual Kiosk is of type; Vendor-Specific, Service-Provider Specific, Retailer Specific, Industry Specific, or Corporate Specific, then the User will also be able to edit the list of Products, Services, or Brands that are associated with the Virtual Kiosk. Users may add new Products, Services, or Brands and remove any that are currently associated.

After creating the Multi-Mode Virtual Kiosk, if the User is satisfied with it, they can deploy it. Deploying a Virtual Kiosk is the process the User goes through to select the Launch Environment and set the Virtual Kiosk up to be downloaded and installed in the Virtual Kiosk Installation Suite.

There are four launch environments for the User to choose from; HTML-Encoded BKS™ Button, HTML-Encoded Document, HTML-Encoded Image, and an HTML-Encoded Desktop Icon. Each of the launch environments have a different setup procedure the User must walk through to set them up.

To set up the HTML-Encoded BKS™ Button, the User simply selects the Virtual Kiosks they wish to deploy and the System does the rest.

To set up the HTML-Encoded Document, the User must first select only one Virtual Kiosk. Once the Virtual Kiosk has been selected, the User must go through the process of creating the Document and encoded the HTML tag for the Virtual Kiosk into it. Once that has been done, the System will prepare the Virtual Kiosk for Deployment.

To set up the HTML-Encoded Image, the User must first select only one Virtual Kiosk. Once the Virtual Kiosk has been selected, the User must go through the process of creating the composite image for the Virtual Kiosk tag. Once that has been done, the System will prepare the Virtual Kiosk for Deployment.

To set up the HTML-Encoded Desktop Icon, the User must first select only one Virtual Kiosk. Once the Virtual Kiosk has been selected, the User must go through the process of setting up the Desktop Icon. Once that has been done, the System will prepare the Virtual Kiosk for Deployment.

These different launch environments can be adopted to serve as different marketing and sales channels which can be realized as online as well as offline channels.

Once the Virtual Kiosk has been deployed, the last step to allow Users to install the tags for that Virtual Kiosk is to activate it. Users are also able to deactivate any Virtual Kiosks that have been previously activated, even if they have been installed on the Internet. If the User deactivates any installed Virtual Kiosks, then the next time that Virtual Kiosk is launched, the end-user will get a message saying the selected Virtual Kiosk is no longer available.

With all the Virtual Kiosks created and deployed, the next step is to get them installed on the Internet. The Virtual Kiosk Installation Suite handles this process. Like the Virtual Kiosk Generation Suite, the Virtual Kiosk Installation Suite is also divided up into six Control Panels, one for each type of Virtual Kiosk. Depending on who you are, you will have access to only certain Installation Control Panels, unless you are a Consumer, in that case you will have access to all the Installation Control Panels.

Each Virtual Kiosk Installation Control Panel works in the same manner, just customized for the specific type of Virtual Kiosks to which they cater.

The User first is allowed to select the Virtual Kiosks they wish to download and install. If the User is a Consumer, they may select from a list of all the virtual Kiosks whose owners have designated as being available for Consumers. If the User is a Vendor or Service Provider, they are only allowed to install those Virtual Kiosks belonging to their account. If the User is a Retailer or Industrialist, then they are allowed to install only those Virtual Kiosks whose owners have specified that these Retailers and Industrialists have permission to install their Virtual Kiosks.

Using the Alphabetic and Numeric search bar at the top of the table, the User may search for the Virtual Kiosks of Vendors, Service Providers, etc. beginning with that letter or number. The User also has the ability to search for specific Vendors, Service Providers, etc. by clicking the Search button. This will take them to the Search from where they can search for specific Vendors, Service Providers, Retailers, etc. depending on the Control Panel they are in. From the Search form they will be able to select Vendor, etc. whose listing of Virtual Kiosks they wish to view.

Once the User has selected the Virtual Kiosks to download and install they will be asked where the Virtual Kiosk will be installed. This information is required by the System in order for it to provide the most accurate data to the Brand Managers about where their Virtual Kiosks are being installed. This enables Brand Managers and their Agents to customize the Advertising and Promotions campaigns in the most useful manner.

After the User has entered the installation location information they are able to download the Virtual Kiosk tags along with the accordant instructional files and needed images. The User may download up to four sets of Virtual Kiosks depending on the different launch environments for the Virtual Kiosks selected.

The download file for the Virtual Kiosks contain the full instructions on how to install the Virtual Kiosk tags.

It is then up to the User to place the tags in the appropriate websites or disseminate them via email to propagate the Virtual Kiosks through the Internet.

The Multi-Mode Virtual Kiosks will be downloadable from the Installation Suite in this Subsystem. Once they are downloaded and installed in the appropriate place, they shall be functional for Consumers and other general users to launch.

To launch the Multi-Mode Virtual Kiosk from any launch environment, the user shall click on the Tag that will launch the Multi-Mode Virtual Kiosk. The Tag shall contain information used by the Brand Marketing Communication Network when the request is made for a Multi-Mode Virtual Kiosk to determine the type of the Multi-Mode Virtual Kiosk, the style of the requested Multi-Mode Virtual Kiosk, the layout of the requested Multi-Mode Virtual Kiosk and the Brand Entity(s) that is to be displayed.

When a user clicks on the Multi-Mode Virtual Kiosk Tag a request shall be sent to the Brand Marketing Communication Network for the appropriate type of Multi-Mode Virtual Kiosk. When the request comes into the Brand Marketing Communication Network, the Network shall respond to the request by launching a new stripped-down browser window on the desktop of the user. This window shall be displayed over the current location of the user, thereby saving that location for the user to return to later on with ease if they so wish.

This new window containing the Multi-Mode Virtual Kiosk shall be a completely stripped-down browser. Inside the window the Brand Marketing Communication Network shall display graphics having the basic look and feel of one of three formats. FIGS. 7A through 7G illustrate an exemplary MMVK, and how it may play through its mode of display operation. The Brand Marketing Communication Network shall find and play any relevant advertisements in the Advertisement-Display window of the Multi-Mode Virtual Kiosk. The Multi-Mode Virtual Kiosk shall have a set of buttons to skip the current Advertisement and to replay the current Advertisement. The Multi-Mode Virtual Kiosk shall also have a set of buttons to control the volume for the Advertisement that is currently being played. The Multi-Mode Virtual Kiosk shall also display the time that has lapsed for the current Advertisement. The BKS Network can play Advertisements in the Multi-Mode Virtual Kiosks using the JavaMediaFramework (JMF), from Sun Microsystems, Inc., in an Applet on the Virtual Kiosk. The JavaMediaFramework can take multiple video and audio formats and play them in a customized program applet. Different MMVK design implementation are described in FIGS. 10A through 10E. The list of Advertisements shall be processed on the server, possibly using SMIL technology and then passed to the Virtual Kiosk Applet to play in the prescribed order. Details regarding JMF API can be found at, incorporated herein by reference.

Once the Advertisements have been played, the Multi-Mode Virtual Kiosk shall check to see if there are any Promotions that are associated with this Virtual Kiosk. If there are Promotions that need to be displayed then the Kiosk shall resize itself to show the Promotions Window. The Promotions shall be displayed along with their corresponding videos. The Multi-Mode Virtual Kiosk shall have a set of buttons to skip the current Promotion and to replay the current Promotion. The Multi-Mode Virtual Kiosk shall also have a set of buttons to control the volume for the Promotional video that is currently being played. The Multi-Mode Virtual Kiosk shall also display the time that has lapsed for the current Promotion. The Brandkey Systems Network shall play the Promotions in the Multi-Mode Virtual Kiosks using the JavaMediaFramework in an Applet on the Virtual Kiosk. The JavaMediaFramework can take multiple video and audio formats and play them in a customized applet that we program. The list of Promotions shall be processed on the server, possibly using SMIL technology and then passed to the Virtual Kiosk Applet to play in the prescribed order.

Once the Advertisement and Promotions have completed then the Multi-Mode Virtual Kiosk shall display the related brand knowledge network as described by the Brand Manager in Brandkey Create. One of the three schemas shall be displayed that were specified in Brandkey Create; Pre-Post Purchase Schema, Simplex Schema and Complex Schema. When the user clicks on a specific node in any of the schemas, the system shall display the link from that node within the display window in the frame above the Brand Information Network display window. The system shall provide the user with the ability to enlarge this window causing the entire browser window to enlarge in proportion. The system shall also resize the Brand Information Network in proportion with the link display window. The system shall maintain a nice look-and-feel to the Brand Information Network display during the resizing. A suggested method for achieving this is using Scaling Vector Graphics (SVG). All links from any node in the Brand Information Network shall be displayed in this link display screen, thereby allowing the user to remain inside the Brandkey Virtual Kiosk Environment. There shall be a Search button to allow the User to search for Products/Services/Brands depending on the type of Multi-Mode Virtual Kiosk they are in.

Once the Advertisements and Promotions (if any) have completed, the system shall then resize the existing window to show the Search Screen, if the Virtual Kiosk is a Vendor-Specific, Service-Provider-Specific, Retailer-Specific, Industry-Specific, or Corporate-Specific Virtual Kiosks. Product-Specific and Service-Specific Virtual Kiosks do not have a Search function.

In the Brand Information Network display window, the system shall first display a search screen that provides the user with the ability to search for products/brands for the particular Vendor who is sponsoring the Virtual Kiosk. In this search screen the user shall be able to search for products/brands based on UPN/USN, TM/SM, PD/SD or Product/Service Category. When the user presses the "search" button, the system shall perform a search and display the results list of all products/services/brands that matched the search criteria. Since each Virtual Kiosk shall be associated with a specific language, the search shall only bring back the results of products/brands that have Brand Information Networks with Brandkey Data Links in that language. The user shall click on the UPN/USN in order to have the Brand Information Network displayed for that product/brand.

The system shall also provide a button on the Search Screen to launch a virtual keyboard. When the user presses this button, the system shall launch a virtual keyboard in a small stripped-down browser window on top of the current search window. When the user clicks on any of the keyboard buttons on this screen, the system shall display the corresponding letters or numbers in the search text box on the search window.

When the user selects the product/brand from the Search Results list the system shall first the Advertisements and Promotions associated with the selected Product/Service/Brand Entity. The Advertisements and Promotions shall be displayed in the same manner as the Advertisements and Promotions that were displayed when the Multi-Mode Virtual Kiosk was launched. Once the Advertisement and Promotions have completed then the Multi-Mode Virtual Kiosk shall display the related brand knowledge network as described by the Brand Manager in Brandkey Create. One of the three schemas shall be displayed that were specified in Brandkey Create; Pre-Post Purchase Schema, Simplex Schema and Complex Schema. When the user clicks on a specific node in any of the schemas, the system shall display the link from that node within the display window in the frame above the Brand Information Network display window. The system shall provide the user with the ability to enlarge this window causing the entire browser window to enlarge in proportion. The system shall also resize the Brand Information Network in proportion with the link display window. The system shall maintain a nice look-and-feel to the Brand Information Network display during the resizing. A suggested method for achieving this is using Scaling Vector Graphics (SVG). All links from any node in the Brand Information Network shall be displayed in this link display screen, thereby allowing the user to remain inside the Brandkey Virtual Kiosk Environment.

The system shall maintain a counter for each Virtual Kiosk. The counter shall be updated whenever a user activates a Virtual Kiosk at a consumer touch-point and also whenever a user clicks on a link from the Brand Information Network.

Users shall be able to vote for certain links, rating whether or not they found the link useful. The system shall display a series of radio button numbered 1 through 5 next to the link. The user shall select a radio button based on the usefulness of the link (1 being least useful and 5 being the most useful) and then click on the "submit" button to register their vote. The system shall tally the votes internally to get a "Usefulness Quotient" that is displayed to users of the Brandkey Create subsystem.

Brandkey Advertise Subsystem

The Brandkey Advertise™ Subsystem, illustrated in FIGS. 10A through 10H, is the central location where all Advertising Spots are placed on installed Multi-Mode Virtual Kiosks on the Internet. With The Brandkey Advertise™ Subsystem enables Brand Managers and their Agents to advertise branded products and services by building and managing Advertising Campaigns on Multi-Mode Virtual Kiosks delivered to the consumer. The user may customize Advertising Directories that specify which Multi-Mode Virtual Kiosks are sanctioned by the Brand Manager or retail trading partner to run an Advertising Campaign. The user may also register the Brand's Advertising Campaign to be run on specified networks of Multi-Mode Virtual Kiosks, as well as build an Advertising Campaign by placing ad spot orders on installed networks of Multi-Mode Virtual Kiosks. The highlights of this service are that with simple point and click technology the user may:

Register a Campaign to be run on specified networks of Multi-Mode Virtual Kiosks Flexibly add or delete Multi-Mode Virtual Kiosks at any time to Modify a Campaign Run/Stop Campaigns in a flexible manner to meet marketing objectives View up-to-date metrics kept by the Brand Marketing Communication Network to Monitor Campaigns In order for the Advertisement Display Mode of any Virtual Kiosk to be fully enabled, the Advertisements to be played on those Virtual Kiosks need to be configured.

The Brandkey Advertise™ Subsystem provides Users with a central area where they can see where their available Virtual Kiosks have been installed. Users can create Directories of their Virtual Kiosks by Virtual Kiosk type and even Brand. This enables them to locate Virtual Kiosks and create Advertising Campaigns in a more efficient manner.

These Advertising Campaigns are made up of a sub-network of Multi-Mode Virtual Kiosks that the User selects. Users can then place Advertisements on any combination of Virtual Kiosks and order those Advertisements any way they wish for each individual Virtual Kiosk.

Using the Brandkey Advertise™ Subsystem, Users can also monitor, modify, run and stop any of their Advertising Campaigns. These features allow the User to determine which Campaigns are working well for them and what combination of Advertisements and Virtual Kiosks are the most effective and which do not work at all.

The Brandkey Advertise™ Subsystem consists of one Suite; the Virtual Kiosk Advertising Campaign Management Suite. This Suite contains one Control Panel; the Control Panel for Managing Advertising Campaigns.

The three main services offered in the Control Panel for Managing Advertising Campaigns are; Directory Management, Campaign Management, and Ad-Spot Management.

In Directory Management, Users are allowed to create and manage the Virtual Kiosk Advertising Directories they use to populate their Advertising Campaigns with Multi-Mode Virtual Kiosks.

To create an Advertising Directory the User must first select the type of Directory they wish to create. There are two types of Directories that the User can create; the General Type Advertising Directory and the Brand-Specific Advertising Directory.

If the User selects the General Type Advertising Directory then the next step for them is to select the types of Virtual Kiosks they wish to include in this Directory. They may select all the Virtual Kiosks that are available to them. Available Virtual Kiosks means any Virtual Kiosks on which their Product, Services, or Brands are displayed and on which they have permission to place Advertising Spots. Only those types of Virtual Kiosks that are available to the User are displayed.

Once the User has selected the Virtual Kiosk types, they are asked to name the Directory. This gives the User an opportunity to give the Directory a name that will be relevant to them. The System is then ready to generate the Virtual Kiosk Directory for the User. When the User clicks the Generate Directory button, the System will pull together all the information requested by the User into a table of the available Virtual Kiosks and display it to the User. The User will also have the opportunity to download a PDF version of the Directory if they want. The Virtual Kiosk Advertising Directory is now created and ready for use.

The only difference between the General Type Virtual Kiosk Advertising Directory and the Brand-Specific Virtual Kiosk Advertising Directory is that at the start of the creation process, the User is asked to search for and select the Brand Entities they wish to filter for in the Directory. Only those available Virtual Kiosks displaying the selected Brand Entities will be listed in the Directory.

When modifying any Virtual Kiosk Advertising Directory, the User will be able to select different types of Virtual Kiosks to be included in the Directory and different Brand Entities to be filtered for in the Directory.

Once the Virtual Kiosk Advertising Directories have been created, the User can then register the Advertising Campaigns.

After filling out the basic information needed for the Campaign such as; its name, registration number, start date, and end date, the User must select a Virtual Kiosk Directory from where to pull the Virtual Kiosks to include in this Campaign. The User must first select Virtual Kiosk Directory type, General or Brand-Specific. Then the User is presented with the list of Directories for the selected type. The User must select one Directory from the list and the System will pull in all the Virtual Kiosks from that Directory to include in this Campaign.

When modifying an Advertising Campaign, the User will first select the Campaign to modify, and then they will get a chance to modify the list of Virtual Kiosks included in the Campaign. They may remove Virtual Kiosks from the list or include Virtual Kiosks from the list in the Campaign.

All Campaigns that have ever been run or are presently running are stored with Brandkey Systems Network. The User may select any Advertising Campaign that has previously been run to run it again if they wish. They may also select any Advertising Campaign that is currently running to stop it before the due date. They may wish to do this if they feel that the Campaign is not reaching the audience they wanted it to reach, or is not as effective as they thought it would be. This gives the User a better level of control over the Advertising Campaign they put together and propagate through the Multi-Mode Virtual Kiosks.

In order to tell how effective a Campaign is, the User would monitor the Campaign. When monitoring the Campaign, the Subsystem presents the user with a wide variety of data such as; number of Advertisements placed, number of Advertisements run, number of Advertisement-Spot interruptions, and number of Brand Information Networks accessed, etc. This information will give the User a clear picture of the activity behind the Virtual Kiosk and the Advertising Campaign.

The third and arguably the central instrument in this Control Panel is to place Advertising Spot Orders on the Virtual Kiosks in Campaigns. To place these ad-spot orders, the User must first select the Advertising Campaign on whose Virtual Kiosks to place the Advertising Spots.

When the User has selected the Campaign, the list of available Advertisements is displayed for the User to select which Advertisements they want to place on the Campaign. This list of Advertisements is pulled from the list of nodes in the all the Brand Information Networks associated with the selected Virtual Kiosks. The User is also given the opportunity to view the actual Advertisement by clicking on the Advertisement URL in the table.

Once the User has selected the Advertisements to place on the Campaign, the System requires them to configure the Advertisements for each of the Virtual Kiosks they wish to place it on. The User is allowed to select the Virtual Kiosks on which the Advertisement will play, the data on which the Advertisement will become available, and the frequency at which the Advertisement will play when the Virtual Kiosk is left running. Once each Advertisement has been configured, the User will be allowed to set the order in which the Advertisements will play on each of the Virtual Kiosks. Even if there are several Virtual Kiosks, which play the exact same list of Advertisements, they may still play them in different orders, thus allowing for more granular control.

The Order will be placed once the Advertisement order has been set by the User.

When modifying Advertising Spot Orders, the User may modify all aspects of the Order. In this case they move backwards through the section, starting with the Advertisement ordering and going back to the Virtual Kiosk Directory that was selected.

Once an Advertising Spot Order has been placed, then those Advertisements are placed on installed Virtual Kiosks and the full functionality of the Advertisement Display Mode of the Virtual Kiosks is realized.

Brandkey Promote Subsystem

The Brandkey Promote™ Subsystem, illustrated in 11A through 11G, is the central location where all Promotional Spots are placed on installed Multi-Mode Virtual Kiosks on the Internet. With the use of the Brandkey Promote™ Subsystem, Brand Managers and their Agents can program the Promotional Spot Display Mode of their Multi-Mode Virtual Kiosks. Similar to the service offered for Advertisers the user may also register the Brand's Promotional Campaign to be run on specified Networks as well as build a Promotional Campaign by placing promo spot orders on installed networks of Multi-Mode Virtual Kiosks. Also similar to the Brandkey Advertise Subsystem, the highlights of this service are that with simple point and click technology the user may:

Register a Campaign to be run on specified networks of Multi-Mode Virtual Kiosks Flexibly add or delete Multi-Mode Virtual Kiosks at any time to Modify a Campaign Run/Stop Campaigns in a flexible manner to meet marketing objectives View up-to-date metrics kept by the Brand Marketing Communication Network to Monitor Campaigns In order for the Promotion Display Mode of any Virtual Kiosk to be fully enabled, the Promotions to be played on those Virtual Kiosks need to be configured.

The Brandkey Promote™ Subsystem provides Users with a central area where they can see where their available Virtual Kiosks have been installed. Users can create Directories of their Virtual Kiosks by Virtual Kiosk type and even Brand. This enables them to locate Virtual Kiosks and create Promotional Campaigns in a more efficient manner.

These Promotional Campaigns are made up of a sub-network of Multi-Mode Virtual Kiosks that the User selects. Users can then place Promotions on any combination of Virtual Kiosks and order those Promotions any way they wish for each individual Virtual Kiosk.

Using the Brandkey Promote™ Subsystem, Users can also monitor, modify, run and stop any of their Promotional Campaigns. These features allow the User to determine which Campaigns are working well for them and what combination of Promotions and Virtual Kiosks are the most effective and which do not work at all.

The Brandkey Promote™ Subsystem consists of one Suite; the Virtual Kiosk Promotional Campaign Management Suite. This Suite contains one Control Panel; the Control Panel for Managing Promotional Campaigns.

The three main services offered in the Control Panel for Managing Promotional Campaigns are; Directory Management, Campaign Management, and Promo-Spot Management.

In Directory Management, Users are allowed to create and manage the Virtual Kiosk Promotional Directories they use to populate their Promotional Campaigns with Multi-Mode Virtual Kiosks.

To create a Promotional Directory the User must first select the type of Directory they wish to create. There are two types of Directories that the User can create; the General Type Promotional Directory and the Brand-Specific Promotional Directory.

If the User selects the General Type Promotional Directory then the next step for them is to select the types of Virtual Kiosks they wish to include in this Directory. They may select all the Virtual Kiosks that are available to them. Available Virtual Kiosks means any Virtual Kiosks on which their Product, Services, or Brands are displayed and on which they have permission to place Promotional Spots. Only those types of Virtual Kiosks that are available to the User are displayed.

Once the User has selected the Virtual Kiosk types, they are asked to name the Directory. This gives the User an opportunity to give the Directory a name that will be relevant to them. The System is then ready to generate the Virtual Kiosk Directory for the User. When the User clicks the Generate Directory button, the System will pull together all the information requested by the User into a table of the available Virtual Kiosks and display it to the User. The User will also have the opportunity to download a PDF version of the Directory if they want. The Virtual Kiosk Promotional Directory is now created and ready for use.

The only difference between the General Type Virtual Kiosk Promotional Directory and the Brand-Specific Virtual Kiosk Promotional Directory is that at the start of the creation process, the User is asked to search for and select the Brand Entities they wish to filter for in the Directory. Only those available Virtual Kiosks displaying the selected Brand Entities will be listed in the Directory.

When modifying any Virtual Kiosk Promotional Directory, the User will be able to select different types of Virtual Kiosks to be included in the Directory and different Brand Entities to be filtered for in the Directory.

Once the Virtual Kiosk Promotional Directories have been created, the User can then register the Promotional Campaigns.

After filling out the basic information needed for the Campaign such as; its name, registration number, start date, and end date, the User must select a Virtual Kiosk Directory from where to pull the Virtual Kiosks to include in this Campaign. The User must first select Virtual Kiosk Directory type, General or Brand-Specific. Then the User is presented with the list of Directories for the selected type. The User must select one Directory from the list and the System will pull in all the Virtual Kiosks from that Directory to include in this Campaign.

When modifying a Promotional Campaign, the User will first select the Campaign to modify, and then they will get a chance to modify the list of Virtual Kiosks included in the Campaign. They may remove Virtual Kiosks from the list or include Virtual Kiosks from the list in the Campaign.

All Campaigns that have ever been run or are presently running are stored with Brandkey Systems Network. The User may select any Promotional Campaign that has previously been run to run it again if they wish. They may also select any Promotional Campaign that is currently running to stop it before the due date. They may wish to do this if they feel that the Campaign is not reaching the audience they wanted it to reach, or is not as effective as they thought it would be. This gives the User a better level of control over the Promotional Campaign they put together and propagate through the Multi-Mode Virtual Kiosks.

In order to tell how effective a Campaign is, the User would monitor the Campaign. When monitoring the Campaign, the System presents the user with a wide variety of data such as; number of Promotions placed, number of Promotions run, number of Promotion-Spot interruptions, and number of Brand Information Networks accessed, etc. This information will give the User a clear picture of the activity behind the Virtual Kiosk and the Promotional Campaign.

The third and arguably the central instrument in this Control Panel is to place Promotional Spot Orders on the Virtual Kiosks in Campaigns. To place these promo-spot orders, the User must first select the Promotional Campaign on whose Virtual Kiosks to place the Promotional Spots.

When the User has selected the Campaign, the list of available Promotions is displayed for the User to select, which Promotions they want to place on the Campaign. This list of Promotions is pulled from the list of nodes in the all the Brand Information Networks associated with the selected Virtual Kiosks. The User is also given the opportunity to view the actual Promotion by clicking on the Promotion URL in the table.

Once the User has selected the Promotions to place on the Campaign, the System requires them to configure the Promotions for each of the Virtual Kiosks they wish to place it on. The User is allowed to select the Virtual Kiosks on which the Promotion will play, the data on which the Promotion will become available, and the frequency at which the Promotion will play when the Virtual Kiosk is left running. Once each Promotion has been configured, the User will be allowed to set the order in which the Promotions will play on each of the Virtual Kiosks. Even if there are several Virtual Kiosks, which play the exact same list of Promotions, they may still play them in different orders, thus allowing for more granular control.

The Order will be placed once the Promotion order has been set by the User.

When modifying Promotional Spot Orders, the User may modify all aspects of the Order. In this case they move backwards through the section, starting with the Promotion ordering and going back to the Virtual Kiosk Directory that was selected.

Once a Promotional Spot Order has been placed, then those Promotions are placed on installed Virtual Kiosks and the full functionality of the Promotion Display Mode of the Virtual Kiosks is realized.

For a detailed use-case based description of subsystems, functions and services supported within the Internet-Based Brand Management and Marketing Communication Network of the Present Invention (i.e. "Brand Marketing Communication Network"), please refer to FIGS. 6A through 11G and corresponding sections of U.S. patent application Ser. No. 10/876,261 filed Jun. 24, 2004, which is incorporated herein by reference in its entirety.

Tracking Web Metrics

The Network offers invaluable insights for brand owners into the way their online marketing programs perform. By continuously monitoring user activity in collaboration with the brand management team, upcoming online communication initiatives can be planned more effectively and efficiently.

The most critical metrics offered for ROI calculations are:
   Most typical user paths/behaviors within the Virtual Kiosks
   Relative popularity of content within the Virtual Kiosks
   Sales where the Virtual Kiosk played a role
   How multiple Virtual Kiosks perform against each other within the same campaign How a brand owner's Virtual Kiosk measures up against other Virtual Kiosks competing in the same category (with all information confidential and anonymous)

The Brand Management and Marketing Communications Network will be filling a critical need for brand managers, e-tailers, advertising agents promotion partners who will need to work even harder in the years to come to communicate rich brand experiences to the impatient consumer on a variety of Web-enabled devices when and where they decide to make a purchase decision. With its ability to target messages to online shoppers, modify content in real-time, and monitor and measure consumer buying behavior in both online and offline platforms, the Brand Management and Marketing Communications Network of the present invention is set to become an indispensable tool to marketers worldwide.

Brief Overview of Brandkey™ Metrics

Every action in a launched MMVK is saved to the Brandkey Metrics tables (in the Network RDBMS Server) as raw data keyed to the unique individual session for each User who launches the MMVK. Brandkey Metric's reporting functionality allows easy reporting of collected metrics for specific views as requested by the Client. Views supported by the Network include:

(1) Basic data for each Virtual Kiosk, including:
   Date of MMVK creation
   Which Products/Services are deployed on the MVK
   Number of Launches of the MMVK
   Number of Ads assigned to the MMVK
   Number of Promos assigned to the MMVK
   Date and location the MMVK was installed
   Other installations of the MMVK (2) Totals for the MMVK:
   Number of Launches of the MMVK
   Number of Downloads of the MMVK
   Number of times Viral Marketing was initiated on the MMVK
   Number of people to which the MMVK was sent
   Number of Conversions on the MMVK (i.e. selection of BUY NOW)

(3) Detailed Information for each Advertisement and Promotion running on the MMVK:
   Number of Total Views of Ad or Promo (i.e. Starts−Skips+Repeats)
   Number of Starts of Ad or Promo
   Number of Skips of Ad or Promo
   Number of Repeats of Ad or Promo (4) Number of Views for each Link in the Brand Information Network (BIN) of the MMVK;

(5) Average Duration of viewing the MMVK; and (6) Average of Most Common User Paths within the MMVK.

Figure 10A:
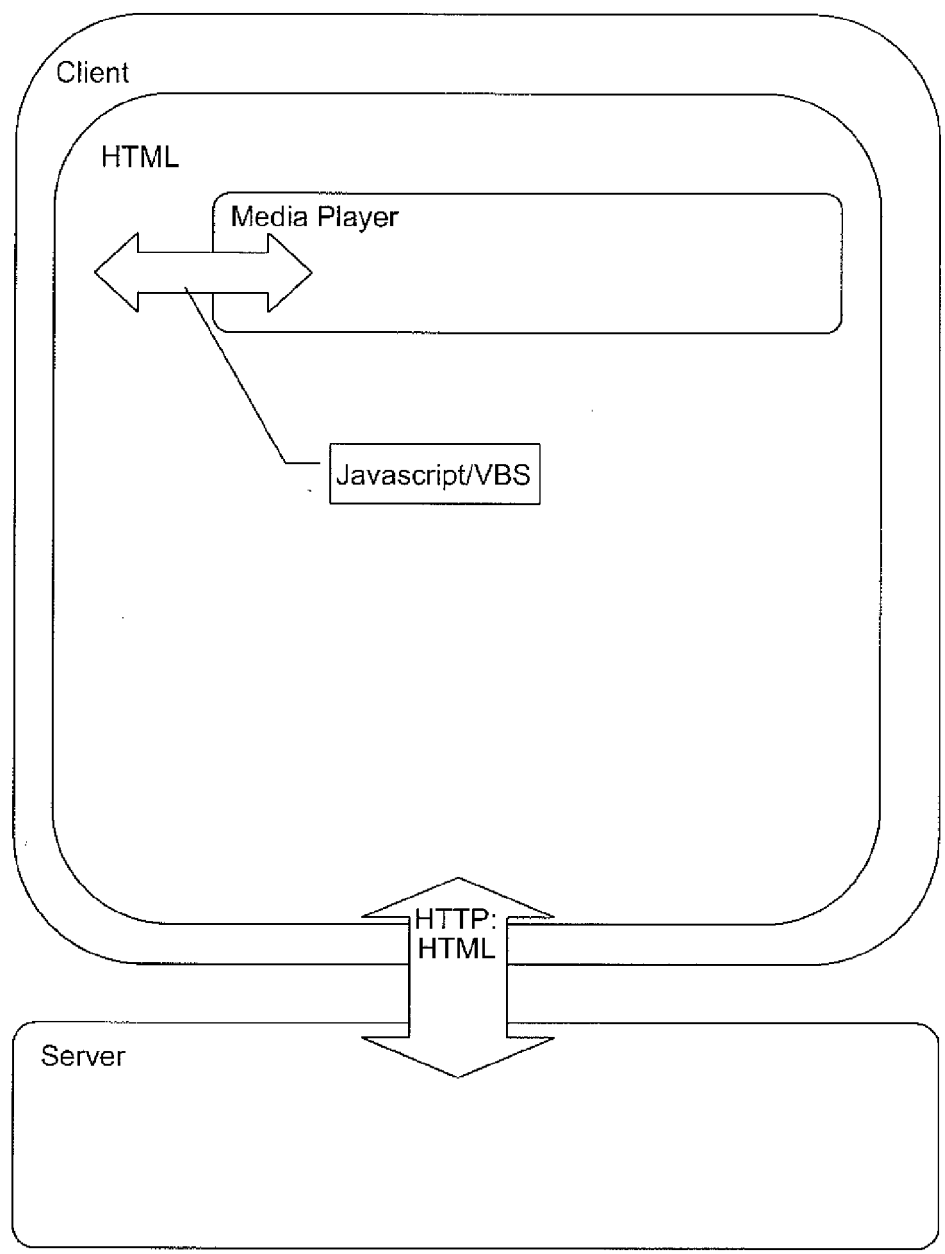
FIG. 10A is a first implementation of a Multi-Mode Virtual Kiosk of the present invention, employing HTML, and an Embedded Media Player.
Figure 10B:
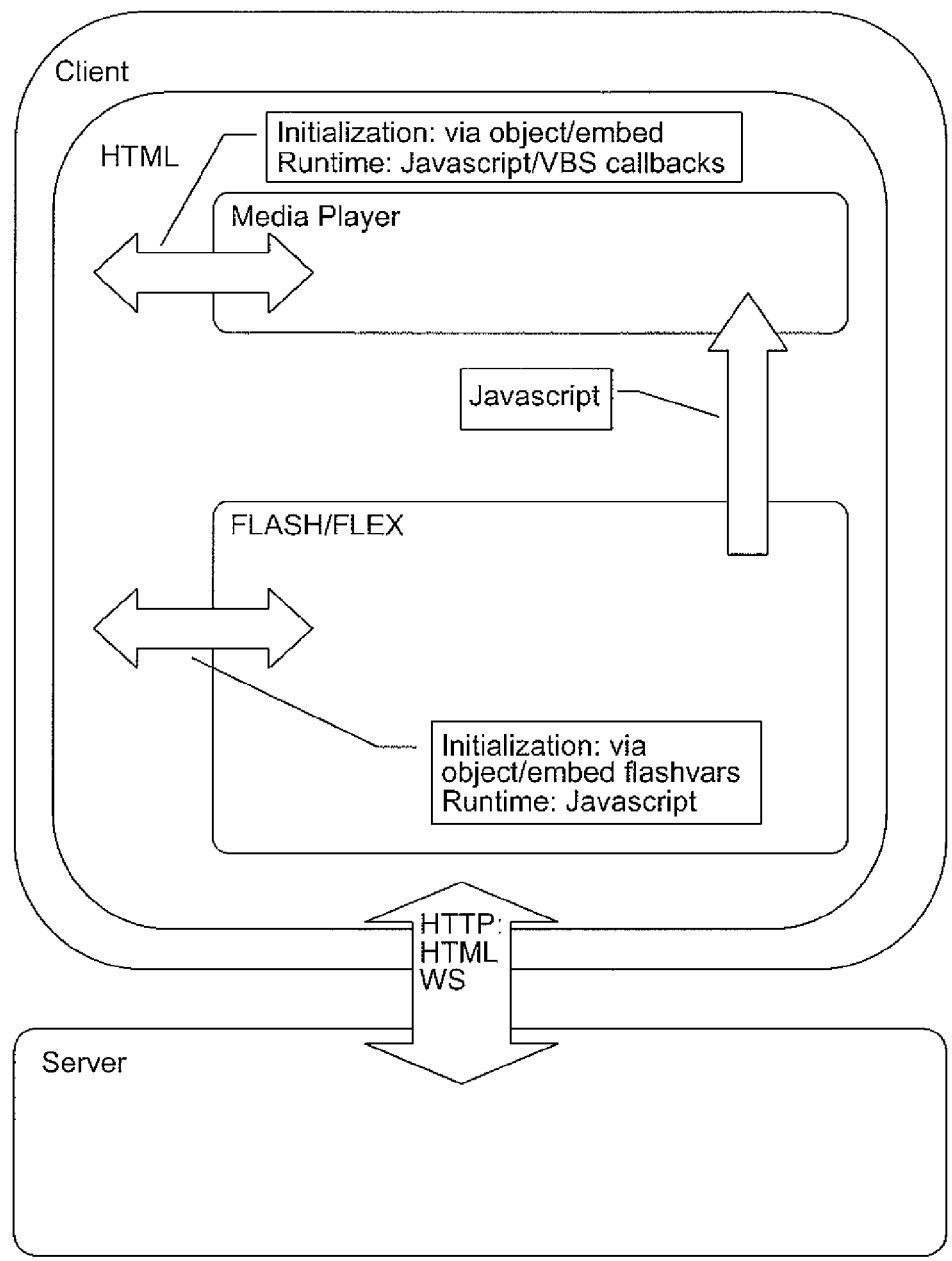
FIG. 10B is a second implementation of a Multi-Mode Virtual Kiosk of the present invention, employing HTML, Flash and an Embedded Media Player.
Figure 10C:
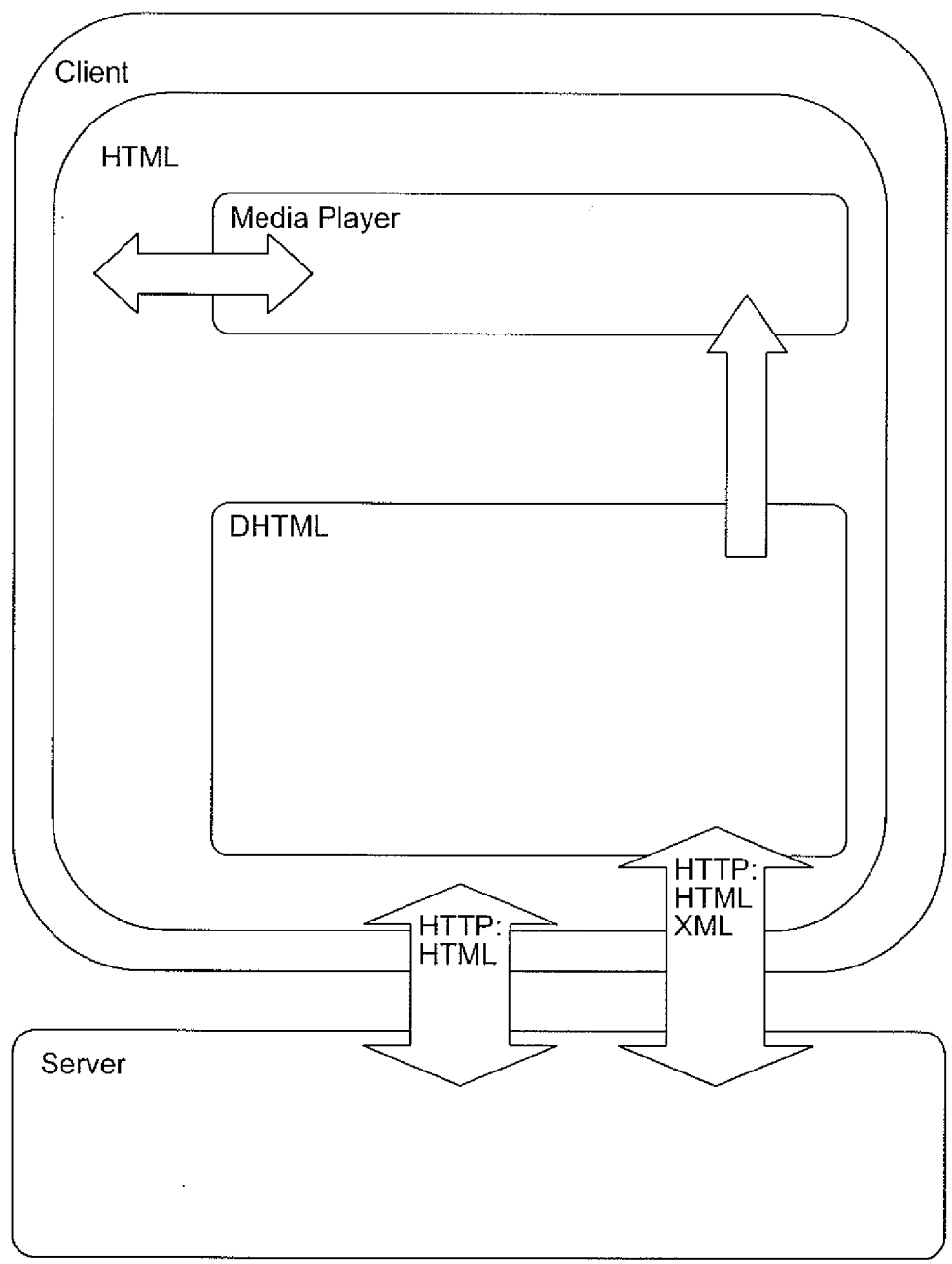
FIG. 10C is a third implementation of a Multi-Mode Virtual Kiosk of the present invention, employing D/HTML, and an Embedded Media Player.
Figure 10D:
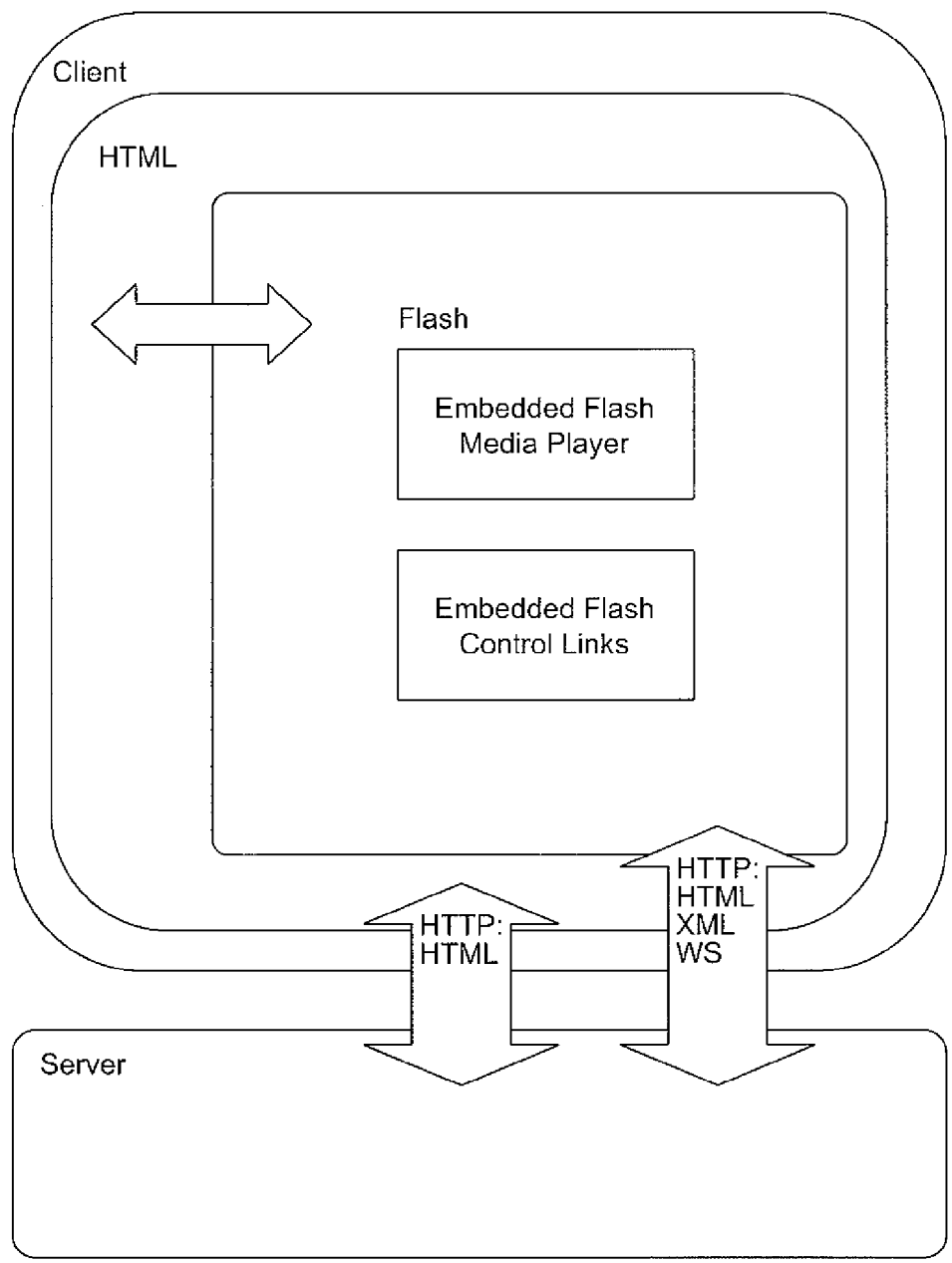
FIG. 10D is a fourth implementation of a Multi-Mode Virtual Kiosk of the present invention, employing an Applet.

Description of Design of Multi-Mode Virtual Kiosks (MMVKs) of the Present Invention HTML & Embedded Media Player In this configuration, shown in FIG. 10B, the basic layout of the Multi-Mode Virtual Kiosk is created in HTML. All components are also done in HTML with the Media Player part of the Virtual Kiosk as the media layer components of the individually supported players, such as Windows Media Player, QuickTime, etc. Control over the Media Player is held by the base Virtual Kiosk using JavaScript and VBScript.

The Virtual Kiosk will communicate with the Server using HTTP and HTML. The SVG application will communicate with the Server using HTTP and HTML HTML, Flash & Embedded Media Player In this configuration, shown in FIG. 10B, the basic layout of the Multi-Mode Virtual Kiosk is again done in HML. The difference is that the Brand Information Network part of the Virtual Kiosk is programmed in Flash. The Media Player portion of the Virtual Kiosk is composed of the individually supported players. Control over the Media Player section of the Virtual Kiosk is held by the base Virtual Kiosk component as well as the Flash component through JavaScript and VBScript.

The Virtual Kiosk will communicate with the Server using HTTP and HTML. The SVG application will communicate with the Server using HTTP, HTML and WS (Web Services).

DHTML & Embedded Media Player

Figure 10E:
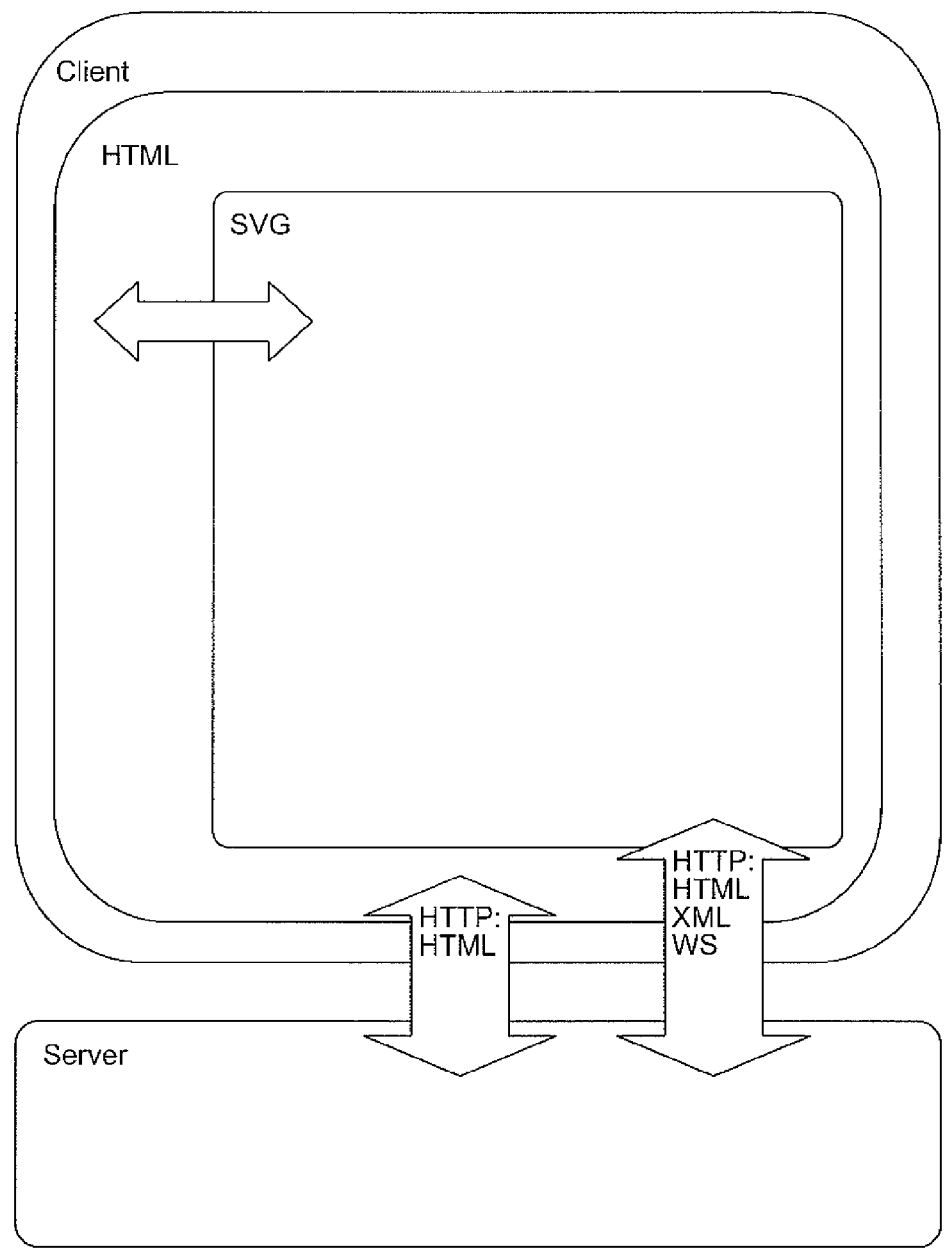
FIG. 10E is a fifth implementation of a Multi-Mode Virtual Kiosk of the present invention, employing Scalable Vector Graphics (SVG)

In this configuration, shown in FIG. 10E, the base layout of the Multi-Mode Virtual Kiosk is done in HTML with the Brand Information Network done in DHTML. He Media Player portion of the Virtual Kiosk is composed of the individually supported players. Control over the Media Player section of the Virtual Kiosk is held by the base Virtual Kiosk as well as the DHTML section through JavaScript and VBScript.

The Virtual Kiosk will communicate with the Server using HTTP and HTML. The SVG application will communicate with the Server using HTTP, HTML and XML (Extensible Markup Language).

Applet

In this configuration, shown in FIG. 10E, the base layout of the Virtual Kiosk is again in HTML, but all of the internal components form an Applet. Each internal Applet component such as the Media Player and Brand Information Network communicate internally to provide the User Experience.

The Virtual Kiosk will communicate with the Server using HTTP and HTML. The SVG application will communicate with the Server using HTTP, HTML, XML (Extensible Markup Language) and WS (Web Services).

SVG

In this configuration, shown in FIG. 10E, the base layout of the Virtual Kiosk is again in HTML, but all of the internal components are done in SVG (Scalar Vector Graphics). Each internal component such as the Media Player and Brand Information Network communicate internally to provide the User Experience.

The Virtual Kiosk will communicate with the Server using HTTP and HTML. The SVG application will communicate with the Server using HTTP, HTML, XML (Extensible Markup Language) and WS (Web Services).

Figure 9:
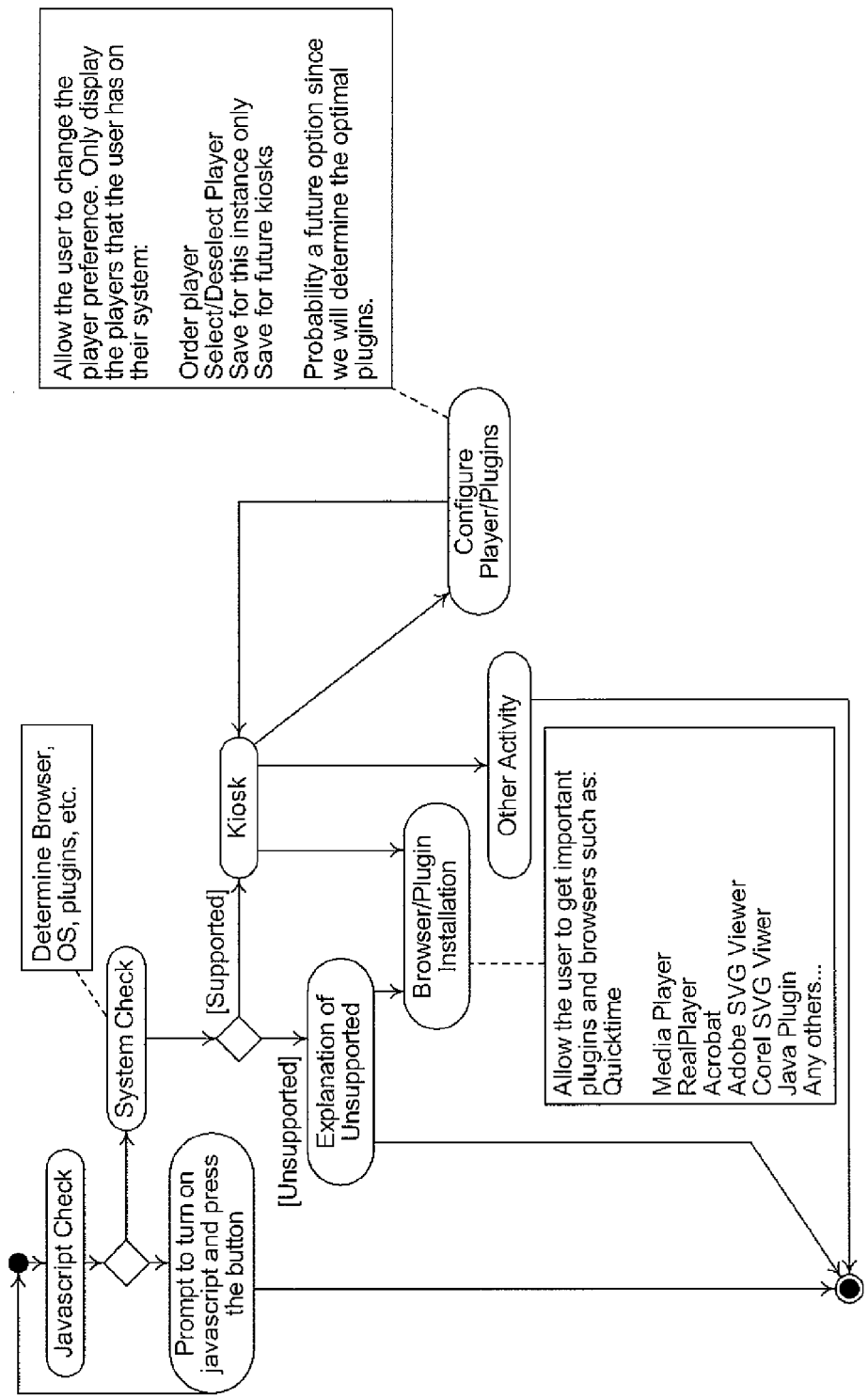
FIG. 9 is a schematic state diagram illustrating the operation of the automatic client browser and media player detection subsystem of the present invention, embodied with both the client side (i.e. MMVK) and server side of the Brand Management and Marketing Communication Network.

Automatic Client Browser and Media Player Plug-In Detection Mechanism For Automatically Configuring Multi-Mode Virtual Kiosks of the Present Invention Referring to FIG. 9, the automatic client browser and media player detection mechanism for use in automatically configuring MMVKs of the present invention upon launch (on any Web-enabled client computer) will now described in detail below.

Upon launch, the Multi-Mode Virtual Kiosk shall first check on the client-side of the Network whether JavaScript is turned on within the Client computer supporting the MMVK. If JavaScript is not turned on, then the Multi-Mode Virtual Kiosk shall display a message prompting the User to turn on JavaScript and to then re-launch the Virtual Kiosk.

If JavaScript was already enabled, then the Multi-Mode Virtual Kiosk shall continue to detect which Browser and Operating System the Client is operating on. If an unsupported configuration is detected, then the Multi-Mode Virtual Kiosk shall display a message detailing the reason for the stoppage and listing which platforms are supported. The list of supported platforms and browsers follows;

Internet Explorer 5.0 and up;
Netscape 7.0 and up;
AOL 6.0 and up;
Safari;
Firefox;
Mozilla; and
Opera.

On the server-side of the Network, the Multi-Mode Virtual Kiosk uses the Request Headers provided by all Browsers and Operating System to determine which platform it is running on. The Request Header is parsed for the information specific to each platform.

If the Multi-Mode Virtual Kiosk is running on a supported platform, then it progresses to check whether all required plug-ins are available. This can be done by polling the Client computer to determine its setup. If any plug-in is missing, the Multi-Mode Virtual Kiosk shall display a notification page regarding the missing plug-in, and if the plug-in is critical, then it will direct the User to download the plug-in. If the plug-in is not critical, it will give the User a choice to download the plug-in or continue with their experience. Once the platform is accepted and all plug-ins are in place, the Virtual Kiosk shall immediately proceed through its programmed modes.

Description of the Automatic OS/Browser/Media-Player Plug-In Detection Subsystem of the Network of the Present Invention The Brand Marketing Communication Network and MMVK applications are Web browser-based and supported on more than one operating system. There are certain situations where knowing information about the user's operating environment can be used to tailor and enhance the user's experience. For example, if a user wants to download and install a Multi-Mode Virtual Kiosk (MMVK) that can be launched from the computer Desktop, the system/network needs to know the user's operating system (OS) so that the appropriate launch files can be downloaded. If the system can detect the operating system, then the correct launch files can be downloaded without having to prompt the user to select their operating system from a list.

The MMVK usually includes video clips or other media that may require that certain plugins have been installed on the user's computer before before viewable. Some media cannot play or have limited capabilities on some operating system, browser, or plugin versions. In any of these cases, the user could have a poor experience using a MMVK. Part of the detection design implementation is to warn the user if the Virtual Kiosk contain files which cannot be played with the user's current operating environment.

The Automatic OS/Browser/Media-Player Plug-In Detection Subsystem of the present invention is realized using both server-side and client-side components that cooperate to support a robust set of functional capabilities, including:

The ability to detect the operating system\version, browser\version, and plugin\version of all environments supported by Brand Marketing Communication Network or the MMVK (Virtual Kiosk).

The ability to detect the most popular operating systems\versions and browsers\versions even if it is not supported by the Brand Marketing Communication Network or the MMVK.

The ability to detect if the user is using Brand Marketing Communication Network or the Virtual Kiosk from an unsupported operating system or version.

The ability to detect if the user is using Brand Marketing Communication Network or the MMVK from a browser/version that is not supported for the current operating system and version.

The ability to detect if the user does not have all the plugins/versions that may be required for the current MMVK to operate properly.

The MMVK must include a feature where a user can be advised if the system has detected an unsupported operating environment, i.e., the system has detected that current operating system/version are not supported or are unknown, or the system has detected that the current browser/version are not supported or are unknown, or the system has detected that at least one of the required plugins/version are missing.

The MMVK must also include a feature to help a user to determine which operating environments are supported and, where possible, assist a user with downloading/installing incorrect or missing software.

The design must be flexible enough to be enhanced when new features are introduced to the Brand Marketing Communication Network or to the MMVK. The implementation of the design must allow different supported environments for different applications, e.g., the design must allow the MMVK to support different operating environments from the Brand Marketing Communication Network or future browser based applications.

Javascript

In the illustrative embodiment, the design of the Automatic OS/Browser/Media-Player Detection Subsystem uses JavaScript to detect if the plugins that the Network supports are installed for the current browser and when possible, to detect the installed plugin version. The JavaScript is called when a form is submitted, and sends two hidden fields to the server. One of the hidden fields contains a formatted string with the plugin identifier and version. The other hidden field contains the user agent from the browser.

User Agent

The browser's user agent is retrieved from the useragent property of a browser. By examining the user agent it is generally possible to distinguish one browser from another and usually other information as the Operating System. This document includes a more in depth explanation in the section where the UserAgent table is described under "Detailed Database Table Information" toward the end of this document.

Plugin Detection

Part of the job of the detection javascript is to try to determine if the user's browser has certain plugin installed. There are two distinct methods to determine if a browser plugin is installed for a particular browser. Most browsers will return an array of plugins that are installed for the browser.

Internet Explorer does not have this feature. Instead you must query the browser for each plugin in which you are interested and Internet Explorer will reply whether or not that plugin is installed or not.

Usually additional information associated with a plugin can be parsed to find the plugin version. The rules for doing this vary from plugin to plugin. This logic is part of the code in detection.js.

Java Classes

Several Java classes provide the framework for applications such as BKSMMVK or BKSNetwork to query whether or not a user's environment is supported. The base class for detection is UserEnvironment in BKSFoundation. HTMLBrowserUserEnvironment in BKSLookNFeel is a subclass of UserEnvironment. MMVKHTMLUserEnvironment in BKSMMVK is a subclass of HTMLBrowserUserEnvironment.

Database

Additional tables described below are added to the Network's database (RDBMS) for supporting the Automatic OS/Browser/Media-Player Plug-In Detection Subsystem of the Present invention. A detailed description of these tables is described below. These tables can be maintained by hand or by an automated mechanism.

Description of Component Cooperation in the Automatic OS/Browser/Media-Player Plug-In Detection Subsystem of the Present invention When the user launches a browser, a form is submitted that runs the detection javascript. Currently the subsystem only looks for specific plugins. When one of these plugins is found, the system formats a plugin identifier followed by a pipe '|' and a plugin version number. These are concatenated into a string with a caret "^" separating one plugin from another. The javascript fills in a hidden field with the user agent string, and another hidden field with the delimited list of plugin/version information. Once the server reads the browser header, it will be able to process this information.

On the server, an application creates a subclass and saves it in the User's session. During this process, the system creates a PlatformBrowser object, either by matching the browser's userAgent to one of the rows in the UserAgent table, or by piecing together the PlatformBrowser by matching different regular expressions against the browser's userAgent. These regular expressions are from the uaRegex columns in the detection tables.

The system also parses the string of plugin information and tries to find a matching plugin in the database. If one of the strings does not find an exact match, the system creates a local plugin using the name and version passed from the javascript. An array of these plugins, along with the PlatformBrowser object, are saved in the database as part of the subclass, and will always be available.

Once the system makes sure that the requested Virtual Kiosk is active and it passes all the other criteria for being launchable, the system checks if the user's PlatformBrowser is supported. It and also tries to determine what plugins will be needed by checking all Ad/Promo links for all the products in the Virtual Kiosk that the user is loading. The system then checks in the user's plugins support all of the mime types associated with all of the Ad/Promo links.

If either the PlatformBrowser object is not supported or if any required plugins are missing, the BKSMMVK displays a series of pages that provides information such as whether the Operating System or Browser is supported or if any plugins are missing. These pages also guide the user through downloading missing software. At each step of the way the user is allowed to continue with the detection process, to quit, or to continue anyway.

Once the Virtual Kiosk launches, each time an Ad or Promo is ready display, the system checks the mime type associated with that link and loads the best available plugin. Enhanced detection will be added later that will turn on or off features based on the plugin. For example, if a plugin does not support adjusting the volume, the volume control will not display.

Operation of the Product-Specific Multi-Mode Virtual Kiosk of the Illustrative Embodiment The following use case describes the operation of a Product-Specific Multi-Mode Virtual Kiosk (MMVK) from a launch environment. When the user clicks to launch the Product-Specific Virtual Kiosk from a launch environment, the follow flow of occurs occur:

Launch Multi-Mode Virtual Kiosk with BIN, Ad, and Promo Modes Respectively

The use case begins when the user clicks on the HTML-Encoded Brandkey™ Button to launch the Product-Specific Multi-Mode Virtual Kiosk. The embedded URL tag contains the encrypted identification number of the installed Product-Specific Virtual Kiosk to be launched. The tag sends a request to the system for the virtual kiosk. The system searches for the installed virtual kiosk id, and the system responds by sending back a "Loading . . . . " splash screen to the requestor. When the system finds the virtual kiosk id, the system then determines whether or not the requested virtual kiosk is still active and deployed. If the virtual kiosk is active and deployed, the system shall check whether the requesting domain (website where the virtual kiosk is launched from) is an allowed domain. If the virtual kiosk is launched from an allowed domain, the system shall determine the type of virtual kiosk that is being requested. The system shall determine the layout, color, button set style, and surface texture (skin) to be used in displaying the requested Product-Specific Virtual Kiosk. The system shall determine which display modes and the order they play on the specific Product-Specific Virtual Kiosk. The system shall replace the opened splash screen with the actual Product-Specific Virtual Kiosk. If the Brand Information Network (BIN) Mode was selected first when installing the virtual kiosk, the system shall display the BIN Mode under the "Info" tab to the right of the "Home" tab followed by the "Ads" tab. The BIN Mode layout shall contain a Content Display window near the top, all associated links (BIN) in the middle, and an information text bar near the bottom. If the "Send to Friend" feature has been enabled, the system shall display the "Send to Friend" button at the bottom of the BIN Mode layout. As long as a desktop icon has been uploaded, and if the "Download" feature has been enabled, the system shall display the "Download" button at the bottom of the BIN Mode layout. The system shall display the "Buy Now" feature at the bottom of the BIN Mode layout if it is enabled and an associated link has been specified. The system shall display a default image supplied by the virtual kiosk owner in the Content Display window whenever the virtual kiosk is in an idle state. The system checks if the multi-mode virtual kiosk has been installed by a retailer. If so, the system checks if there are any purchase-enabling links within the BIN. If true, the system shall not display the purchase-enabling links in the BIN. The Content Display window shall serve as a web browser whenever an associated BIN link is clicked. The system shall display the contents of the link in the Content Display window. In addition, if any of the associated BIN links contains a video clip, the system shall display the virtual kiosk video components while the specific link is clicked and viewed. The virtual kiosk video components shall consist of a graphical mute button, "+" and "−" volume control buttons, a "<<Replay" button, a "Skip>>" button, and a time-lapse meter. After viewing the video clip contained in the link, if the user clicks another BIN link that contains no video clip, the system shall hide the video components from the BIN Mode layout. Within the BIN, the system shall display the associated links of the brand as either Simple Tabular format or Pre-Post Purchase format. If there are more than 3 associated links for the BIN, the system shall display the batch navigation bar at the bottom of the Simple Tabular or Pre-Post Purchase table. If the creator of the MMVK had previously selected the "Enable Voting for Link" feature in Brandkey Create™, the system shall display the "Rating" Indicator pull-down list along with the "Vote" button when an associated link in the BIN is clicked. When the user votes for the selected link: The system shall save the vote in the database. The system re-calculates the "Rating" Indicator. The system shall refresh the "Rating" Indicator if needed. If the Ad Mode was selected second when creating the virtual kiosk, the system shall determine the Ad Mode as the next mode and display the Ad Mode under the "Ads" tab to the right of the "Info" tab. If the play list is empty for the Ad Mode, the system shall not display "Ads" tab in the virtual kiosk. If the user clicks the "Ads" tab, the system shall generate a list of ad-spot video clips previously selected in Brandkey Advertise™. If the Promo Mode was selected third when creating the virtual kiosk, the system shall determine the Promo Mode as the next mode and display the Promo Mode under the "Promos" tab to the right of the "Ads" tab when the "Ads" tab is clicked the first time. If the play list is empty for the Promo Mode, the system shall not display the "Promos" tab in the virtual kiosk. For the Ad Mode, the system shall resize, display, and run the generated list of ad-spot video clips in the Ad-Spot Display window. The system shall display the video components below the Ad-Spot Display window, an information text bar near the bottom, and three buttons at the bottom, namely, "Send to Friend", "Download", and "Buy Now" as long as they each have been enabled and there has been a desktop icon image uploaded for the Download button and there has been a link specified for the Buy Now button. While the ad-spot video clips are playing, the user may click the "<<Replay" or "Skip>>" button at any time. If the user clicks the "<<Replay" button, the system shall replay the currently playing ad-spot video clip. If the user clicks the "Skip>>" button, the system shall interrupt the ad-spot video clip currently playing, advance to the next video, and start playing. When the last ad-spot video in the list has played, the system shall display the contents of the "Promos" tab automatically. If the user clicks the "Promos" tab prior to the last ad-spot video completing, the system shall generate a list of promo-spot video clips previously selected in Brandkey Promote™. The system shall resize, display, and run the generated list of promo-spot video clips in the Promo-Spot Display window. The system shall display the video components below the Promo-Spot Display window, and a promotions-related text bar near the bottom. If the "Send to Friend" feature has been enabled, the system shall display the "Send to Friend" button at the bottom of the Promo Mode layout. As long as a desktop icon has been uploaded, and if the "Download" feature has been enabled, the system shall display the "Download" button at the bottom of the Promo Mode layout. The system shall display the "Buy Now" feature at the bottom of the Promo Mode layout if it is enabled and an associated link has been specified. The system shall display a default image supplied by the virtual kiosk owner in the Content Display window whenever the virtual kiosk is in an idle state. While the promo-spot video clips are playing, the user may click the "<<Replay" or "Skip>>" button at any time. If the user clicks the "<<Replay" button, the system shall replay the currently playing promo-spot video clip. If the user clicks the "Skip>>" button, the system shall interrupt the promo-spot video clip currently playing, advance to the next video, and start playing. When the last promo-spot video in the list has played, the system shall remain in that state until the user clicks a button. The system shall display the default image, if one has been defined for the BIN, in the Content Display window. If the user clicks the "Home" tab at anytime, the system shall reset the virtual kiosk to the original order while the system re-displays the "Loading . . . " splash screen. When the reset is complete, the system shall replace the splash screen with the Product-Specific Virtual Kiosk displaying the "Info" tab section, the "Ads" tab, and the "Promos" tab to the right of the "Info" tab.

Launch Multi-Mode Virtual Kiosk with BIN, and Ad Modes

After the system has displayed the BIN Mode and Ad Mode, the system shall check for the next mode. The system determines there is no Promo Mode, and the system shall remain in Ad Mode state until the user clicks a button. If the user clicks the "Home" tab at anytime, the system shall reset the virtual kiosk to the original order while the system re-displays the "Loading . . . " splash screen. When the reset is complete, the system shall replace the splash screen with the Product-Specific Virtual Kiosk displaying the "Info" tab section, and the "Ads" tab to the right of the "Info" tab.

Launch Multi-Mode Virtual Kiosk with BIN Only

After the system has displayed the BIN Mode, the system shall check for the next mode. The system determines there is neither Ad Mode nor Promo Mode, and the system shall remain in the BIN Mode. If the user clicks the "Home" tab at anytime, the system shall reset the virtual kiosk to the original order while the system re-displays the "Loading . . . " splash screen. When the reset is complete, the system shall replace the splash screen with the Product-Specific Virtual Kiosk displaying the "Info" tab section.

Launch Multi-Mode Virtual Kiosk with Ad and Promo Modes

If the Ad Mode was selected first when creating the virtual kiosk, the system determines there is no BIN Mode and displays the Ad Mode under the "Ads" tab to the right of the "Home" tab (See FIG. 1). The system shall check for the next mode. The system determines the Promo Mode is next and displays the Promo Mode under the "Promos" tab to the right of the "Ads" tab (See FIG. 2). If the user clicks the "Home" tab at anytime, the system shall reset the virtual kiosk to the original order while the system re-displays the "Loading . . . " splash screen. When the reset is complete, the system shall replace the splash screen with the Product-Specific Virtual Kiosk displaying the "Ads" tab section, and the "Promos" tab to the right of the "Ads" tab.

Launch Multi-Mode Virtual Kiosk with only Ad or Promo Mode

If either the Ad Mode or Promo Mode was selected as the only mode when creating the virtual kiosk, the system determines there is neither a BIN Mode nor Ad/Promo Mode and displays the Ad/Promo Mode under the "Ads"/"Promos" tab to the right of the "Home" tab. If the user clicks the "Home" tab at anytime, the system shall reset the virtual kiosk to the original order while the system re-displays the "Loading . . . " splash screen. When the reset is complete, the system shall replace the splash screen with the Product-Specific Virtual Kiosk displaying either the "Ads" or "Promos" tab section to the right of the "Home" tab.

The Replay Button is Clicked

If the system is in Ad Mode, the system shall replay the currently playing ad-spot video clip. If the system is in Promo Mode, the system shall replay the currently playing promo-spot video clip. If the system is in BIN Mode, and if any of the associated BIN links contains a video clip, the system shall play the video contained in the BIN link from the beginning.

The Skip Button is Clicked

If the system is in Ad Mode, the system shall interrupt the ad-spot video clip currently playing, advance to the next video, and start playing. If the system is in Promo Mode, the system shall interrupt the promo-spot video clip currently playing, advance to the next video, and start playing. If the system is in BIN Mode, and if any of the associated BIN links contains a video clip, the system shall advance the video to the end and stop.

The Volume Control (+) Button is Clicked

The system increases the volume.

The Volume Control (−) Button is Clicked

The system decreases the volume.

The Send to Friend Button is Clicked

If the user clicks the "Send to Friend" button, the system shall display a small form in the Content Display window that contains a "From:" section comprised of a "Name:" text field, an "E-mail:" text field, and a "Message" text area, a "To:" section comprised of an "E-mail1:" text field, an "E-mail2:" text field, an "E-mail3:" text field, an "E-mail4:" text field, an "E-mail5:" text field, a "Send" button, and a "Cancel" button (See FIG. 5). If the user fills the information on the form and clicks the "Send" button, the system shall send the message via the system SMTP server. The message is sent and the system shall replace the message form with a confirmation page. The confirmation page shall display the following message, "A link to this virtual kiosk has been sent, and a confirmation e-mail has also been sent to your e-mail address. Click here to re-launch this Virtual Kiosk." If the user clicks the "Cancel" button, the system shall replace the message form with the contents of the previously selected tab. If the User clicks the link to re-launch the Virtual Kiosk, then the system shall reset the virtual kiosk to the original order while the system re-displays the "Loading . . . " splash screen.

The Download Button is Clicked

If the user clicks the "Download" button, the system shall replace the contents of the Content Display window with the "Download Multi-Mode Virtual Kiosk" form. The "Download Multi-Mode Virtual Kiosk" page shall contain user instructions at the top, a "Name" text field, "City" text field, "State" text field, "Zip/Postal Code" text field, "Country" text field, an "Operating System" pull-down list, a "Purpose of Installation" text area, a "Cancel" button, and a "Next" button. All required fields shall be denoted by an asterisk next to the field name. If the user omits a required field, the system shall display a message indicating the required field is blank. If the user clicks the "Cancel" button, the system shall redisplay the default mode in the Content Display window. If the user clicks the "Next" button, the system shall start the download process and display the second "Download Multi-Mode Virtual Kiosk" page. The second "Download Multi-Mode Virtual Kiosk" page shall contain information indicating the actual download is in progress, instructions for an alternate method, "click here", to download, a "Back" button, and a "Re-Launch Virtual Kiosk" button. If the user clicks the "Back" button, the system shall reload the first "Download Multi-Mode Virtual Kiosk" page If the user clicks the "Re-Launch Virtual Kiosk" button, the system shall reset the virtual kiosk and display the default mode. During the download process, the system shall display a download dialog window. The user shall choose where to save the zipped virtual kiosk package on their computer through the download dialog window.

The Buy Now Button is Clicked

If the user clicks the "Buy Now" button, the system shall determine where to open the "Buy Now" associated link. If the creator of the virtual kiosk originally selected to open the associated link in the virtual kiosk, the system shall open the "Buy Now" link in the Content Display window. If the creator of the virtual kiosk originally selected to open the associated link outside of the virtual kiosk, the system shall determine whether there is a parent window to open the virtual kiosk in or open the virtual kiosk in a new window.

Requested Virtual Kiosk is no longer Active or Deployed

The system shall display the following error message on the screen, "The requested Virtual Kiosk is no longer available from [Virtual Kiosk Sponsor's Name]."

The Launching Domain is a Forbidden Domain

The system shall display the following error message on the screen, "This website is not authorized to launch the requested Virtual Kiosk. Please contact admin@bksnetworks.com to inform them of any illegal use of the requested Virtual Kiosk. Thank you."

One or More Visual Attributes of the Requested Virtual Kiosk are Not Available

The system shall display the following error message on the screen, "The requested Virtual Kiosk is currently not available. Please try back again later."

Operation of the Vendor-Specific Multi-Mode Virtual Kiosk of the Illustrative Embodiment This use case describes the operation of a Vendor-Specific Virtual Kiosk from a launch environment. When the user clicks to launch the Vendor-Specific Virtual Kiosk from a launch environment, the following flow of events occur:

Launch Multi-Mode Virtual Kiosk with BIN, Ad, and Promo Modes Respectively

The use case begins when the user clicks on the HTML-Encoded Brandkey™ Button to launch the Vendor-Specific Multi-Mode Virtual Kiosk. The embedded URL tag contains the encrypted identification number of the installed Vendor-Specific Virtual Kiosk to be launched. The tag sends a request to the system for the virtual kiosk. The system searches for the installed virtual kiosk id, and the system responds by sending back a "Loading" splash screen to the requestor. When the system finds the virtual kiosk id, the system then determines whether or not the requested virtual kiosk is still active and deployed. If the virtual kiosk is active and deployed, the system shall check whether the requesting domain (website where the virtual kiosk is launched from) is an allowed domain. If the virtual kiosk is launched from an allowed domain, the system shall determine the type of virtual kiosk that is being requested. The system shall determine the color to be used in displaying the requested Vendor-Specific Virtual Kiosk. The system shall determine which display modes and the order they play on the specific Vendor-Specific Virtual Kiosk. The system shall replace the opened splash screen with the actual Vendor-Specific Virtual Kiosk. If the Brand Information Network (BIN) Mode was selected first when creating the virtual kiosk, the system shall display the BIN Mode under the "Info" tab to the right of the "Home" tab followed by the "Ads" tab. The BIN Mode layout shall contain a Content Display window near the top, all associated links (BIN) in the middle, and an information text bar near the bottom. The system shall check how many products are associated with this virtual kiosk. If there is more than one product associated, the system shall display the "Search" tab to the right of all other tabs. If there are no products associated, the "Search" tab will not be displayed. If there is only one product associated with the virtual kiosk, the system shall not display the "Search" tab. As soon as the "Promo" tab is selected, the system shall display the "Info" tab. If the "Send to Friend" feature has been enabled, the system shall display the "Send to Friend" button at the bottom of the BIN Mode layout. As long as a desktop icon has been uploaded, and if the "Download" feature has been enabled, the system shall display the "Download" button at the bottom of the BIN Mode layout. The system shall display the "Buy Now" feature at the bottom of the BIN Mode layout if it is enabled and an associated link has been specified. The system shall display a default image supplied by the virtual kiosk owner in the Content Display window whenever the virtual kiosk is in an idle state. The system checks if a retailer has installed the multi-mode virtual kiosk. If so, the system checks if there are any purchase-enabling links within the BIN. If true, the system shall not display the purchase-enabling links in the BIN. The Content Display window shall serve as a web browser whenever an associated BIN link is clicked. The system shall display the contents of the link in the Content Display window. In addition, if any of the associated BIN links contains a video clip, the system shall display the virtual kiosk video components while the specific link is clicked and viewed. The virtual kiosk video components shall consist of a graphical mute button, "+" and "−" volume control buttons, a "<<Replay" button, a "Skip>>" button, and a time-lapse meter. After viewing the video clip contained in the link, if the user clicks another BIN link that contains no video clip, the system shall hide the video components from the BIN Mode layout. Within the BIN, the system shall display the associated links of the brand as either Simple Tabular format or Pre-Post Purchase format. If there are more than 3 associated links for the BIN, the system shall display the batch navigation bar at the bottom of the Simple Tabular or Pre-Post Purchase table. If the creator of the MMVK had previously selected the "Enable Voting for Link" feature in Brandkey Create™, the system shall display the "Rating" Indicator pull-down list along with the "Vote" button when an associated link in the BIN is clicked. When the user votes for the selected link: The system shall save the vote in the database. The system re-calculates the "Rating" Indicator. The system shall refresh the "Rating" Indicator if needed. If the Ad Mode was selected second when creating the virtual kiosk, the system shall determine the Ad Mode as the next mode and display the Ad Mode under the "Ads" tab to the right of the "Info" tab. If the play list is empty for the Ad Mode, the system shall not display "Ads" tab in the virtual kiosk. If the user clicks the "Ads" tab, the system shall generate a list of ad-spot video clips previously selected in Brandkey Advertise™. If the Promo Mode was selected third when creating the virtual kiosk, the system shall determine the Promo Mode as the next mode and display the Promo Mode under the "Promos" tab to the right of the "Ads" tab when the "Ads" tab is clicked the first time. If the play list is empty for the Promo Mode, the system shall not display the "Promos" tab in the virtual kiosk. For the Ad Mode, the system shall resize, display, and run the generated list of ad-spot video clips in the Ad-Spot Display window. The system shall display the video components below the Ad-Spot Display window, an information text bar near the bottom, and three buttons at the bottom, namely, "Send to Friend", "Download", and "Buy Now" as long as they each have been enabled and there has been a desktop icon image uploaded for the Download button and there has been a link specified for the Buy Now button. While the ad-spot video clips are playing, the user may click the "<<Replay" or "Skip>>" button at any time. If the user clicks the "<<Replay" button, the system shall replay the currently playing ad-spot video clip. If the user clicks the "Skip>>" button, the system shall interrupt the ad-spot video clip currently playing, advance to the next video, and start playing. When the last ad-spot video in the list has played, the system shall display the contents of the "Promos" tab automatically. If the user clicks the "Promos" tab prior to the last ad-spot video completing, the system shall generate a list of promo-spot video clips previously selected in Brandkey Promote™. The system shall resize, display, and run the generated list of promo-spot video clips in the Promo-Spot Display window. The system shall display the video components below the Promo-Spot Display window, and a promotions-related text bar near the bottom. If the "Send to Friend" feature has been enabled, the system shall display the "Send to Friend" button at the bottom of the Promo Mode layout. As long as a desktop icon has been uploaded, and if the "Download" feature has been enabled, the system shall display the "Download" button at the bottom of the Promo Mode layout. The system shall display the "Buy Now" feature at the bottom of the Promo Mode layout if it is enabled and an associated link has been specified. The system shall display a default image supplied by the virtual kiosk owner in the Content Display window whenever the virtual kiosk is in an idle state. While the promo-spot video clips are playing, the user may click the "<<Replay" or "Skip>>" button at any time. If the user clicks the "<<Replay" button, the system shall replay the currently playing promo-spot video clip. If the user clicks the "Skip>>" button, the system shall interrupt the promo-spot video clip currently playing, advance to the next video, and start playing. When the last promo-spot video in the list has played, the system shall remain in that state until the user clicks a button. The system shall display the default image, if one has been defined for the BIN, in the Content Display window. If the user clicks the "Home" tab at anytime, the system shall reset the virtual kiosk to the original order while the system re-displays the "Loading . . . " splash screen. When the reset is complete, the system shall replace the splash screen with the Vendor-Specific Virtual Kiosk displaying the "Info" tab section, the "Ads" tab, the "Promos" tab, and if there is more than one product associated with the Vendor-Specific Virtual Kiosk, the "Search" tab to the right of the other tabs.

Launch Multi-Mode Virtual Kiosk with BIN, and Ad Modes

After the system has displayed the BIN Mode and Ad Mode, the system shall check for the next mode. The system determines there is no Promo Mode, and the system shall remain in Ad Mode state until the user clicks a button. If the user clicks the "Home" tab at anytime, the system shall reset the virtual kiosk to the original order while the system re-displays the "Loading . . . " splash screen. When the reset is complete, the system shall replace the splash screen with the Vendor-Specific Virtual Kiosk displaying the "Info" tab section, the "Ads" tab, and if there is more than one product associated with the Vendor-Specific Virtual Kiosk, the "Search" tab to the right of the other tabs.

Launch Multi-Mode Virtual Kiosk with BIN Only

After the system has displayed the BIN Mode, the system shall check for the next mode. The system determines there is neither Ad Mode nor Promo Mode, and the system shall remain in the BIN Mode. If the user clicks the "Home" tab at anytime, the system shall reset the virtual kiosk to the original order while the system re-displays the "Loading . . . " splash screen. When the reset is complete, the system shall replace the splash screen with the Vendor-Specific Virtual Kiosk displaying the "Info" tab section, and if there is more than one product associated with the Vendor-Specific Virtual Kiosk, the "Search" tab to the right of the "Info" tab.

Launch Multi-Mode Virtual Kiosk with Ad and Promo Modes

If the Ad Mode was selected first when creating the virtual kiosk, the system determines there is no BIN Mode and displays the Ad Mode under the "Ads" tab to the right of the "Home" tab. The system shall check for the next mode. The system determines the Promo Mode is next and displays the Promo Mode under the "Promos" tab to the right of the "Ads" tab. If the user clicks the "Home" tab at anytime, the system shall reset the virtual kiosk to the original order while the system re-displays the "Loading . . ." splash screen. When the reset is complete, the system shall replace the splash screen with the Vendor-Specific Virtual Kiosk displaying the "Ads" tab section, the "Promos" tab to the right of the "Ads" tab, and if there more than one product associated with the Vendor-Specific Virtual Kiosk, the "Search" tab to the right of the "Promos" tab.

Launch Multi-Mode Virtual Kiosk with only Ad or Promo Mode

If either the Ad Mode or Promo Mode was selected as the only mode when creating the virtual kiosk, the system determines there is neither a BIN Mode nor Ad/Promo Mode and displays the Ad/Promo Mode under the "Ads"/"Promos" tab to the right of the "Home" tab. If the user clicks the "Home" tab at anytime, the system shall reset the virtual kiosk to the original order while the system re-displays the "Loading" splash screen. When the reset is complete, the system shall replace the splash screen with the Vendor-Specific Virtual Kiosk displaying either the "Ads" or "Promos" tab section to the right of the "Home" tab, and if there is more than one product associated with the Vendor-Specific Virtual Kiosk, the "Search" tab to the right of either the "Ads" or "Promos" tab.

The Replay Button is Clicked

If the system is in Ad Mode, the system shall replay the currently playing ad-spot video clip. If the system is in Promo Mode, the system shall replay the currently playing promo-spot video clip. If the system is in BIN Mode, and if any of the associated BIN links contains a video clip, the system shall play the video contained in the BIN link from the beginning.

The Skip Button is Clicked

If the system is in Ad Mode, the system shall interrupt the ad-spot video clip currently playing, advance to the next video, and start playing. If the system is in Promo Mode, the system shall interrupt the promo-spot video clip currently playing, advance to the next video, and start playing. If the system is in BIN Mode, and if any of the associated BIN links contains a video clip, the system shall advance the video to the end and stop.

The Volume Control (+) Button is Clicked

The system increases the volume.

The Volume Control (−) Button is Clicked

The system decreases the volume.

The Search tab is Clicked

If the user clicks the "Search" tab, the system shall display the Search page of the Vendor-Specific Virtual Kiosk (See FIG. 6). The Search page shall contain a Content Display window under the "Search" tab, and a Product Search section near the bottom. If the "Send to Friend" feature has been enabled, the system shall display the "Send to Friend" button at the bottom of the Search layout. As long as a desktop icon has been uploaded, and if the "Download" feature has been enabled, the system shall display the "Download" button at the bottom of the Search layout. The system shall display the "Buy Now" feature at the bottom of the Search layout if it is enabled and an associated link has been specified. The system shall display a default image supplied by the virtual kiosk owner in the Content Display window whenever the virtual kiosk is in an idle state. The Product Search section shall contain a "Search For:" textfield for the search criteria, a "By:" pull-down list for the search parameter, an "In:" pull-down list also for the search parameter, and a Search button. The user types the search criteria and selects the search parameters from the pull-down lists. The user can select from the following available parameters in the "By" pull-down list:

Universal Product Number
    Product Descriptor
    Trademark
    Brand Name
    Product Name. The user can also select from available product categories in the "In" pull-down list.

The User Clicks the Search Button to Initiate the Product Search in the Vendor-Specific Virtual Kiosk If a search criterion has been entered, the system shall initiate the search of all products associated with the Vendor-Specific Virtual Kiosk. If the system found results, the system shall display the "Results" tab to the right of the "Search" tab (See FIG. 7). The system shall return only active products associated with the Vendor-Specific Virtual Kiosk in the search results. The Results page shall contain a Content Display window near the top, and the search results in a tabular layout near the bottom. If there are more than 3 products to be displayed, the system page shall display the batch navigation bar below the search results table. If the "Send to Friend" feature has been enabled, the system shall display the "Send to Friend" button at the bottom of the Results layout. As long as a desktop icon has been uploaded, and if the "Download" feature has been enabled, the system shall display the "Download" button at the bottom of the Results layout. The system shall display the "Buy Now" feature at the bottom of the Results layout if it is enabled and an associated link has been specified. The system shall display a default image supplied by the virtual kiosk owner in the Content Display window whenever the virtual kiosk is in an idle state.

The User Clicks on a Specific Product in the Search Results

The user clicks on the "Results" tab at the top. The user clicks a link for a specific product on the Results page. The system shall check which display modes are valid for the Vendor-Specific Virtual Kiosk and the order of the display modes. The system shall determine which tabs should be visible. The "Home," "Search," and "Results" tabs should be visible. Based on which display modes are valid for the virtual kiosk and will display in the selected display mode order, the system shall display the "Ads," "Promos," and "Info" tabs to the right of the "Results" tab. Even if the kiosk has an Ad Mode, however, if the product does not have any advertisements, the system shall not display the "Ads" tab. Also, even if the kiosk has a Promo Mode, if the product does not have any promotions, the system shall not display the "Promos" tab. The system shall refresh the virtual kiosk with the correct tabs displayed along the top. The first tab following the "Results" tab will be shown in the selected state. The system shall cycle through the valid modes in the defined order. The virtual kiosk shall reset just as it did when the kiosk first opened, except that Ads, Promos, and BIN will be related to the selected product. The kiosk will cycle through the modes until the Brand Information Network display mode is reached. The system shall display the Brand Information Network for the selected product, initialized with links for that product. The system shall then wait for user input.

The Send to Friend Button is Clicked

If the user clicks the "Send to Friend" button, the system shall display a small form in the Content Display window that contains a "From:" section comprised of a "Name:" text field, an "E-mail:" text field, and a "Message" text area, a "To:" section comprised of an "E-mail1:" text field, an "E-mail2:" text field, an "E-mail3:" text field, an "E-mail4:" text field, an "E-mail5:" text field, a "Send" button, and a "Cancel" button (See FIG. 5). If the user fills the information on the form and clicks the "Send" button, the system shall send the message via the system SMTP server. The message is sent and the system shall replace the message form with a confirmation page. The confirmation page shall display the following message, "A link to this virtual kiosk has been sent, and a confirmation e-mail has also been sent to your e-mail address. Click here to re-launch this Virtual Kiosk." If the user clicks the "Cancel" button, the system shall replace the message form with the contents of the previously selected tab. If the user clicks the link to re-launch the Virtual Kiosk, then the system shall reset the virtual kiosk to the original order while the system re-displays the "Loading . . . " splash screen.

The Download Button is Clicked

If the user clicks the "Download" button, the system shall replace the contents of the Content Display window with the "Download Multi-Mode Virtual Kiosk" form. The "Download Multi-Mode Virtual Kiosk" page shall contain user instructions at the top, a "Name" text field, "City" text field, "State" text field, "Zip/Postal Code" text field, "Country" text field, an "Operating System" pull-down list, a "Purpose of Installation" text area, a "Cancel" button, and a "Next" button. All required fields shall be denoted by an asterisk next to the field name. If the user omits a required field, the system shall display a message indicating the required field is blank. If the user clicks the "Cancel" button, the system shall redisplay the default mode in the Content Display window. If the user clicks the "Next" button, the system shall start the download process and display the second "Download Multi-Mode Virtual Kiosk" page. The second "Download Multi-Mode Virtual Kiosk" page shall contain information indicating the actual download is in progress, instructions for an alternate method, "click here", to download, a "Back" button, and a "Re-Launch Virtual Kiosk" button. If the user clicks the "Back" button, the system shall reload the first "Download Multi-Mode Virtual Kiosk" page If the user clicks the "Re-Launch Virtual Kiosk" button, the system shall reset the virtual kiosk and display the default mode. During the download process, the system shall display a download dialog window. The user shall choose where to save the zipped MMVK package on their computer through the download dialog window.

The Buy Now Button is Clicked

If the user clicks the "Buy Now" button, the system shall open the "Buy Now" associated link in the parent window.

Requested Virtual Kiosk is not Active or Deployed and the Installed Virtual Kiosk is active The system shall display the following error message on the screen, "The requested Virtual Kiosk is no longer available from [Virtual Kiosk Sponsor's Name]."

The Launching Domain is a Forbidden Domain

The system shall display the following error message on the screen, "This website is not authorized to launch the requested Virtual Kiosk. Please contact admin@bksnetworks.com to inform them of any illegal use of the requested Virtual Kiosk. Thank you."

One or More Visual Attributes of the Requested Virtual Kiosk are Not Available

The system shall display the following error message on the screen, "The requested Virtual Kiosk is currently not available. Please try back again later."

No Search Criteria are entered in the Vendor-Specific Virtual Kiosk Product Search Page The system shall display the following error message on the screen, "A value must be entered in the Search Criteria in order to initiate the Product Search."

No Search Results were Returned from the Product Search in the Vendor-Specific Virtual Kiosk The system shall display the following error message on the screen, "No products were found matching your search criteria. Please try another search."

Figure 7A:
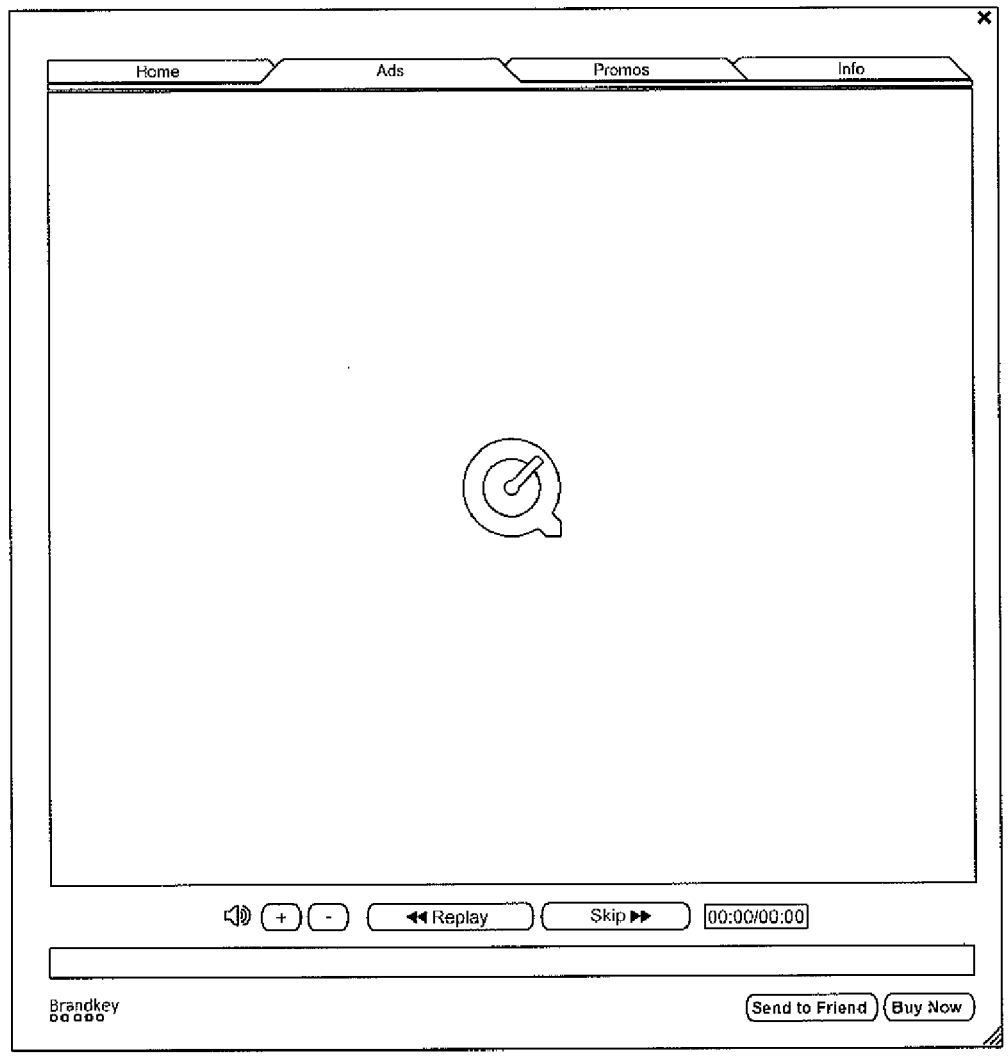
FIGS. 7A through 7G, taken collectively, set forth GUI panels supported by a Product-Specific (PS) Multi-Mode Virtual Kiosk (MMKV) deployed and remotely programmed by the enterprise-level, collaboration-enabling Brand Management and Marketing Communication Network of the present invention.
Figure 7B:
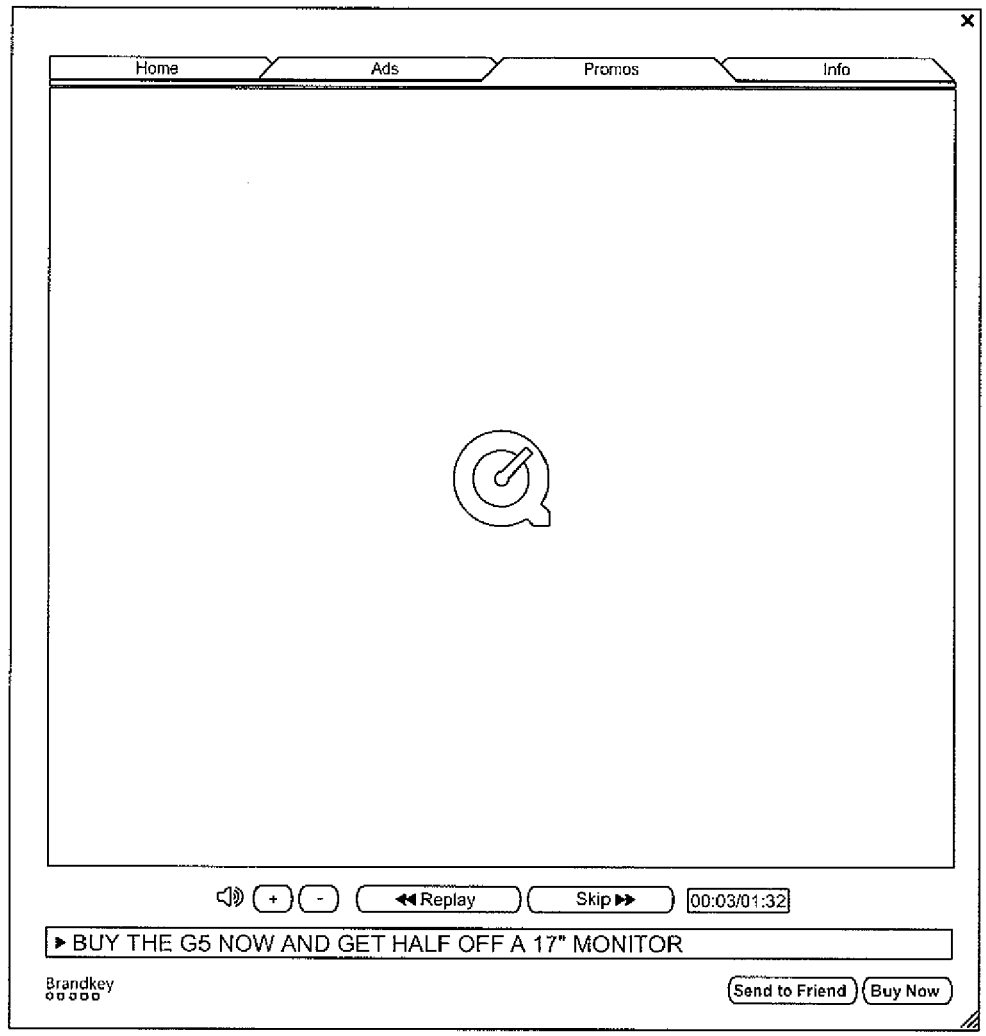
Figure 7C:
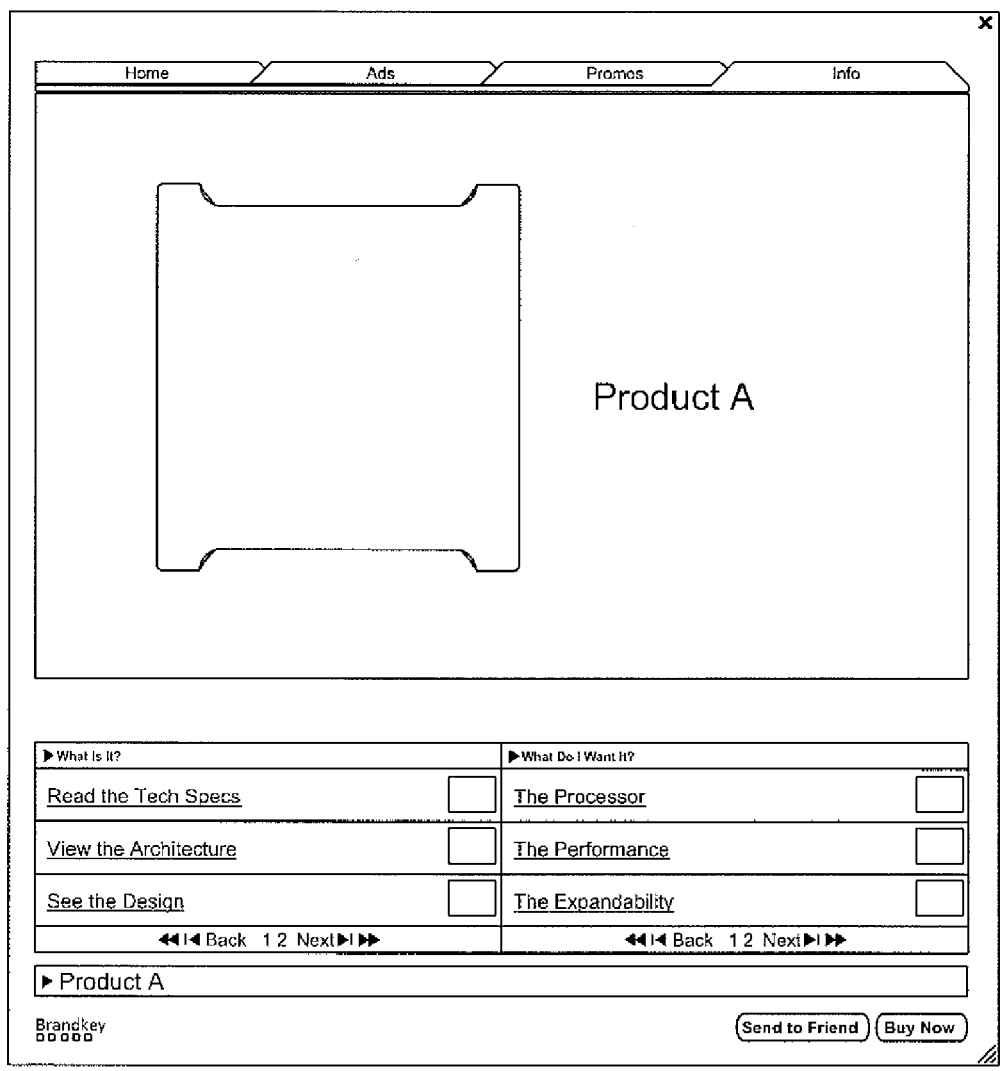
Figure 7D:
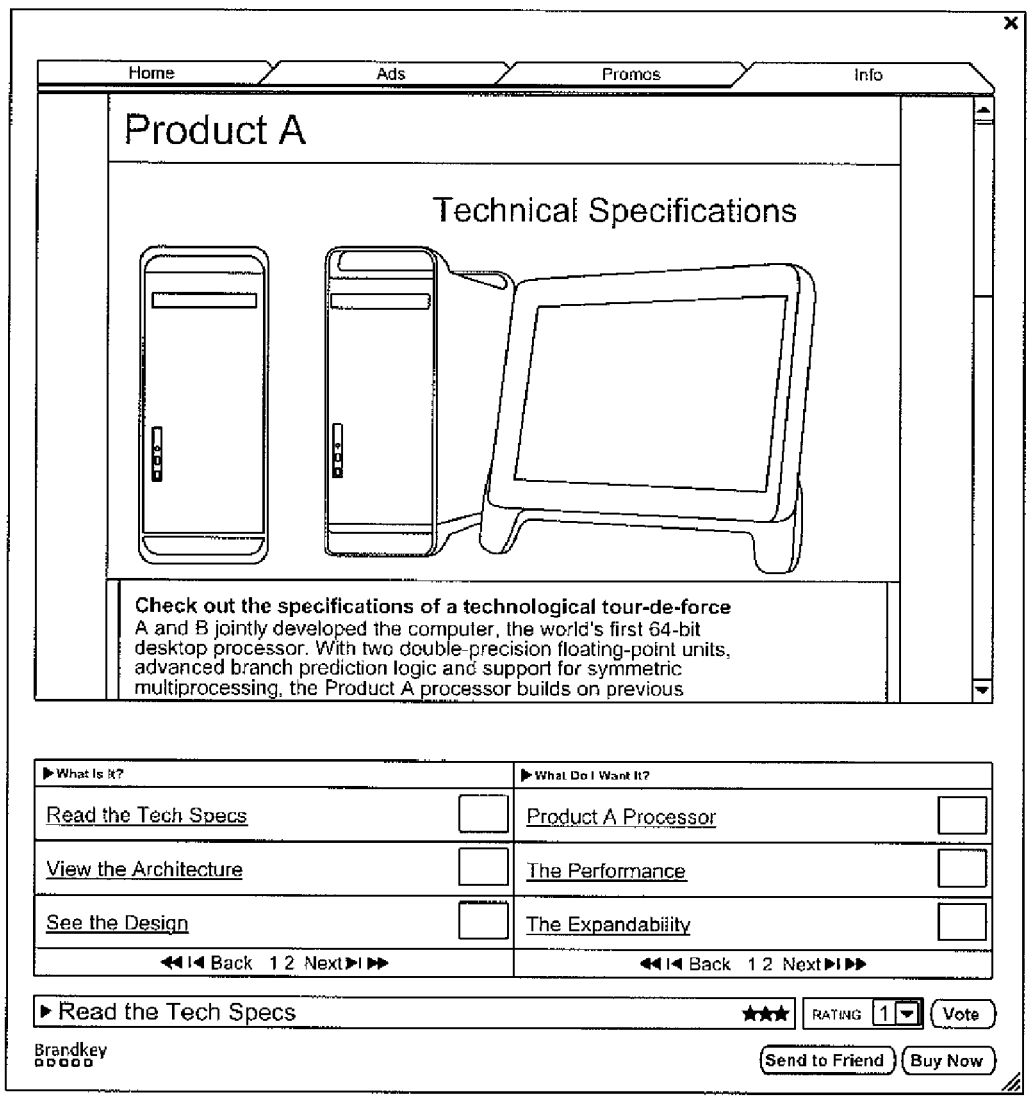
Figure 7E:
Figure 7F:
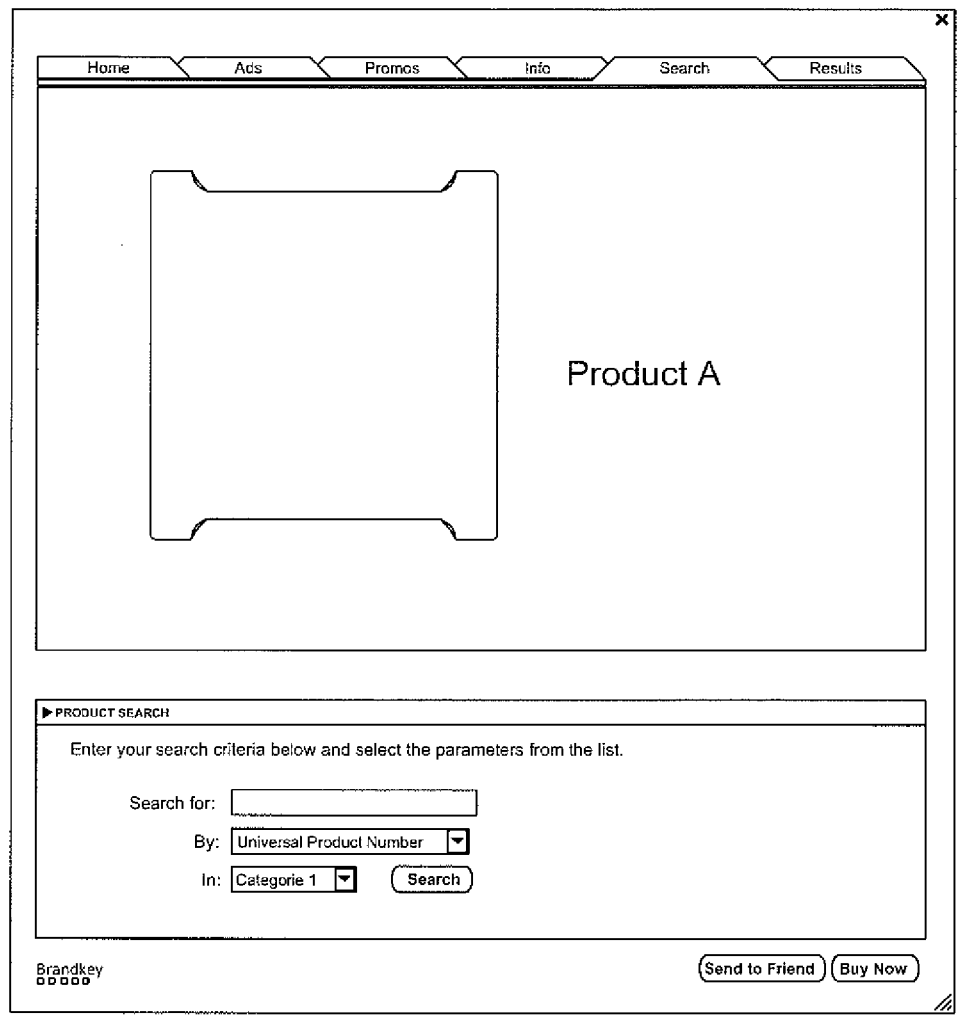
Figure 7G:
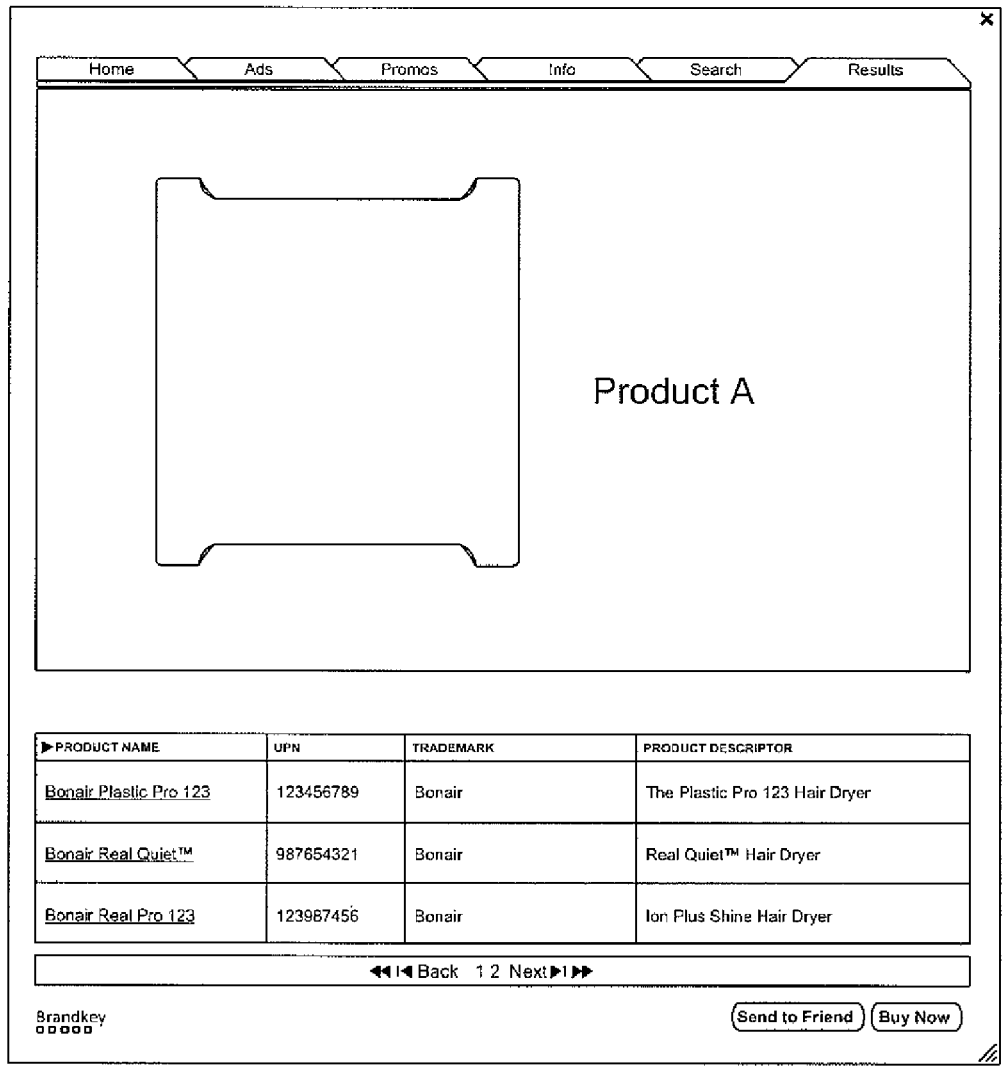
Figure 8A:
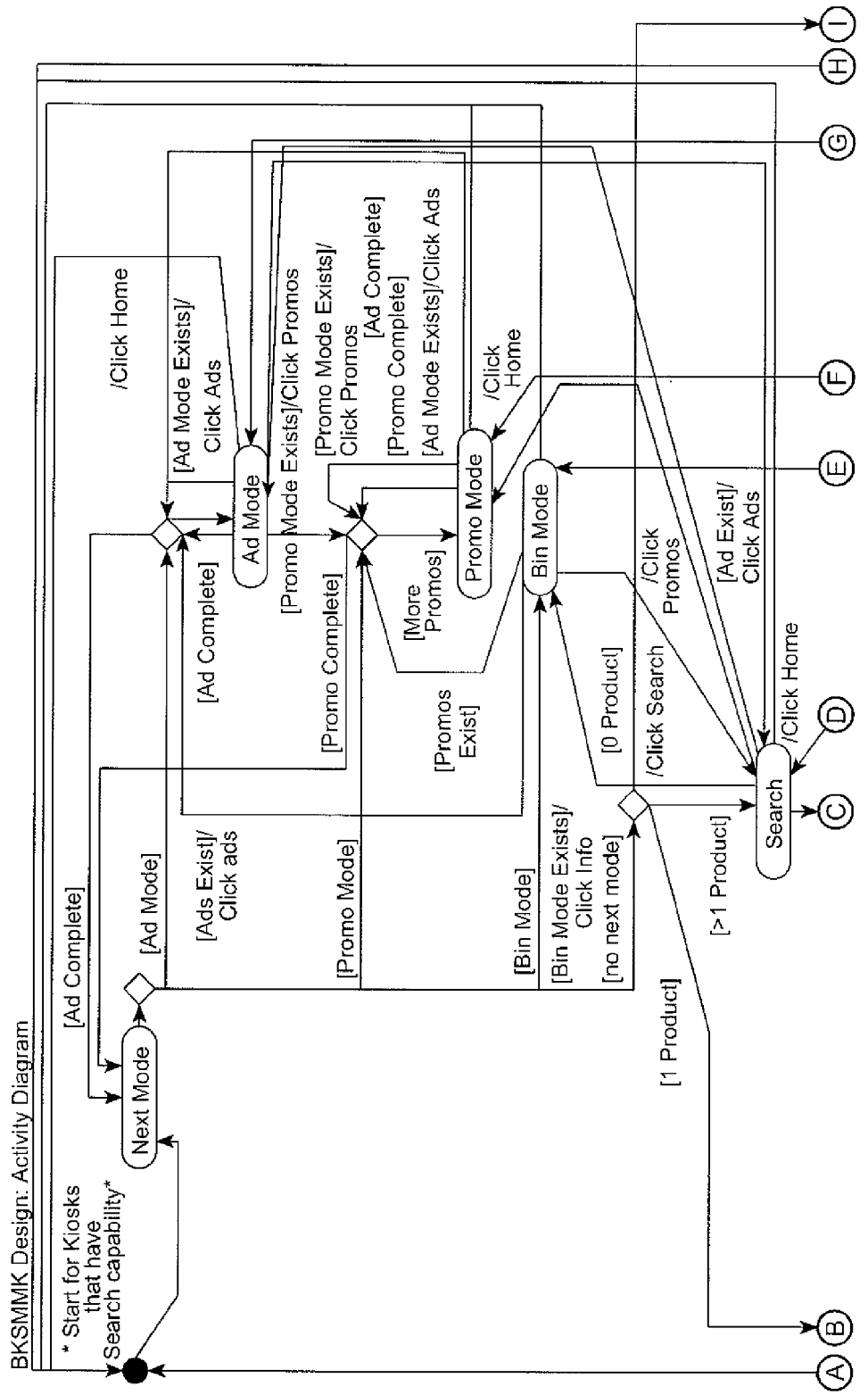
FIGS. 8A and 8B set forth a schematic state diagram of the Product-Specific (PS) Multi-Mode Virtual Kiosk (MMKV) shown in FIGS. 7A through 7G, illustrating the various states of operation thereof in response to interaction by a consumer with the GUIs of the MMVK.
Figure 8B:
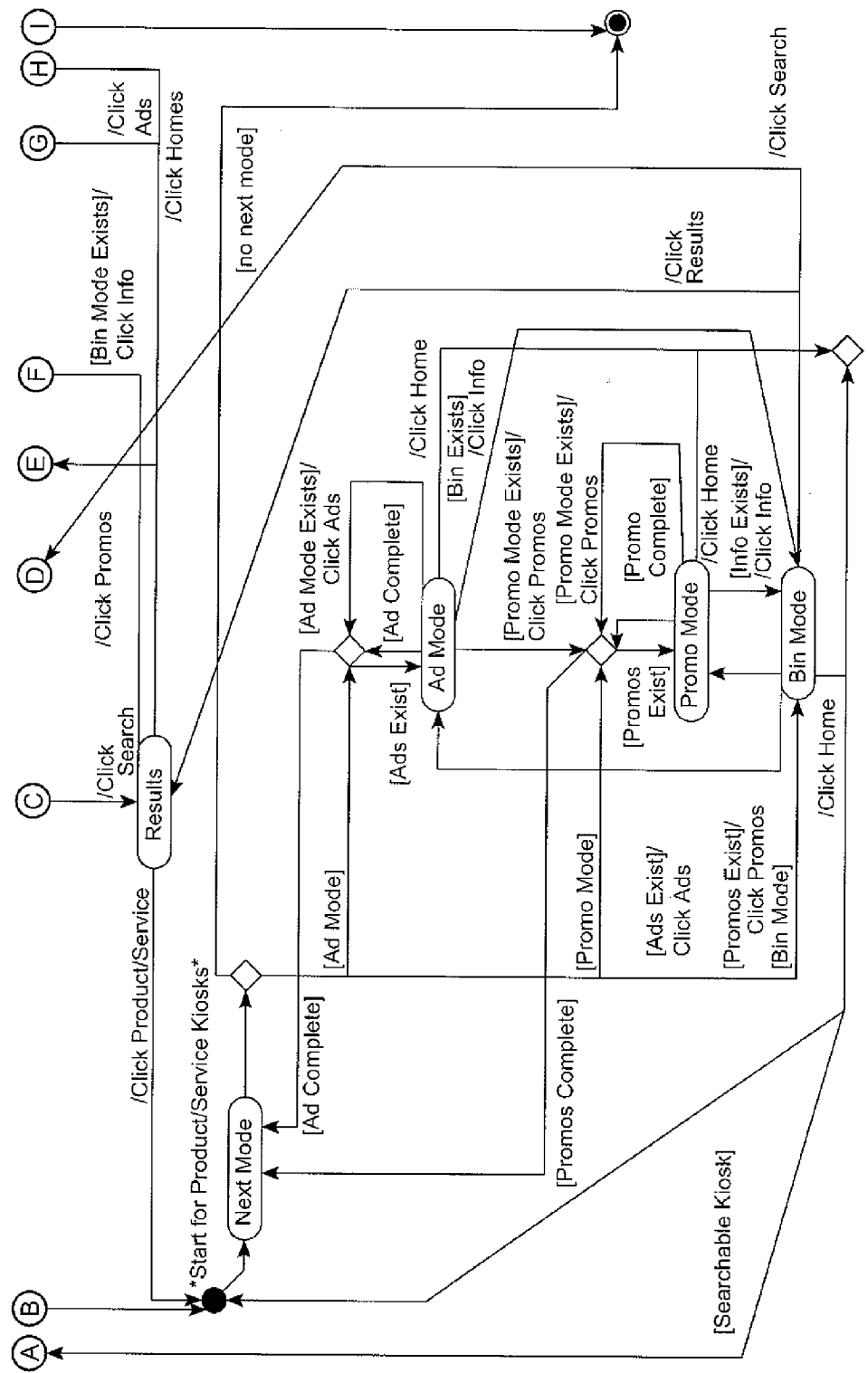

Description of the Operation of the Multi-Product Multi-Mode Virtual Kiosk (MMVK) of the Illustrative Embodiment of the Present Invention The behavior of an illustrative embodiment of a Multi-Product MMVK of the present invention is shown. In general, the Multi-Product MMVK can be either a Vendor-Specific MMVK that is programmed with multiple branded products, from a single manufacturer/vendor (e.g. Apple Computer Corp), or a Retailer-Specific MMVK that is programmed by a retailer, with the BINs associated with multiple UPN-indexed branded products, from one or more manufacturers/vendors. The MMVK is formulated as a Retailer-Specific MMVK that is programmed by a retailer, with the BINs associated with multiple UPN-indexed branded products, under a single brand from a single manufacturer/vendor. And while this MMVK is similar in many ways to the Multi-Product (i.e. Vendor-Specific) MMVK described in FIGS. 7A through 7G, there are some notable differences, namely: instead of providing a Search Tab, as shown in FIGS. 7F and G, the MMVK design includes a horizontally-scrollable Product Selection Menu, in which each branded product(programmed into the MMVK) is graphically represented by an image of the product and this graphical menu can be displayed at any time by selecting the Product Search Tab.

A user at an exemplary Web page of a retailer's e-commerce site (i.e. e-store) selects the MMVK tag associated with a (Multi-Product) Retailer-Specific Multi-Mode Virtual Kiosk (MMVK) of the present invention, that has been embedded within a banner ad on the retailer's e-commerce site. In the illustrative embodiment, the Retailer-Specific MMVK is programmed with a number of different products (i.e. UPNs), falling under a particular manufacturer brand (i.e. Trademark). When the MMVK is launched, it automatically runs an ad spot for the manufacturer brand in the content display panel of the MMVK GUI, while the different models of MP3 player product available for selection are shown in a horizontally-scrollable product menu section of the GUI of the MMVK.

The user's mouse is used to scoll through the horizontally-scrollable product menu section of the Retailer-Specific MMVK, showing all of the UPN-indexed products programmed into the MMVK while the ad spot for the manufacturer brand is running.

The ad spot for the product brand running is interrupted when the user selects a particular product from the product menu stage section of the MMVK GUI, at which time, the MMVK plays the preprogrammed ads, promos and brand information links for the selected branded product.

A particular brand information link has been selected from the brand information menu section of the MMVK GUI, and in response thereto, the product information page is displayed in the display area of the Retailer-Specific MMVK.

The user scolls the product information page displayed in the display area of the Retailer-Specific MMVK.

The user scrolls forward through the brand information link scoll bar in the MMVK GUI, so as to make other programmed information links viewable and accessible to the user.

The user selects a rich-media video link from the brand information link scoll bar.

The user scrolls in reverse through the brand information link scoll bar in the MMVK GUI, so as to make other programmed information links once again viewable and accessible to the user, while the rich media video link continues to be displayed in the content display section (i.e. window) of the MMVK GUI.

The user scolls through the content display area after having selected a different brand information link from the MMVK GUI.

The user selects a different product from the product menu selection section of the MMVK GUI;

The Retailer-Specific MMVK displays, in the content display area of its dynamically-generated GUI, a particular brand information link from the brand information display area of the MMVK GUI.

The Retailer-Specific MMVK displays, in the content display area of its GUI, another particular brand information link from the brand information display area of the MMVK GUI.

The Retailer-Specific MMVK displays, in the content display area of its GUI, a promo spot that has been programmed for the currently selected product.

The user selects the Shop Now (i.e. Buy Now) button on the MMVK GUI which automatically (and seamlessly) takes the consumer/user to the Check Out page of the retailer's ecommerce site, so as to enable the consumer to consummate the purchase of the selected product.

Summary of Services offered to Retailer Brands on the Network of the Present Invention Using the Brand Marketing Communication Network, Retailers and other trading partners can rapidly create and deploy Retailer-Specific MMVKs for the products of the retailer's manufacturers/vendors.

Retailer-Specific MMVKs are simply programmed by importing product/brand content managed by the manufacturers/vendors for their products.

Each Retailer-Specific MMVK has ad and promo display modes that can be easily programmed by the Retailer, or its ad and promo agencies.

Retailer-Specific MMVKs can be installed across all of the retailer's marketing and sales channels, both online and in brick and mortar stores.

Each Retailer-Specific MMVK can be e-commerce triggered with a Buy Now button that links to the retailer e-commerce shopping cart.

Retailers can enable Affiliated Service for each of its Retailer-Specific MMVKs, allowing Affiliates to earn commissions on MMVKs which they host on their Web sites and properties.

Retailer-Specific MMVKs can function as virtual product showcases that allow Retailers to deliver consistent brand merchandising and service to consumers present anywhere in electronic and physical streams of commerce.

Retailer-Specific MMVKs can also function as turnkey e-commerce stores to support e-commerce transactions anywhere along the fabric of the WWW.

The Brand Marketing Communication Network enables manufacturers to manage their product brand information with an unprecedented level of efficiency and strategic advantage along the retail value chain.

The Brand Marketing Communication Network also allows any manufacturer/vendor to rapidly generate and deploy powerful Web-based communication instruments (i.e. Multi-Mode Virtual Kiosks or MMVKs) for each and every product that is maintained in the its supply-chain management system or ERP system, and to simply install and manage these MMVKs across all of its Web-based marketing and sales channels, at points of display and sale, BOTH online and in brick and mortar stores.

The Ability to "Buy Later" on a Multi-Mode Virtual Kiosk (MMVK)

In alternative illustrative embodiments of the present invention, Multi-Mode Virtual Kiosks (MMVKs) can be programmed to give consumers the option to purchase an item of interest later. This objective is accomplished by the use of a "Buy Later" button on an MMVK. The "Buy Later" button can be programmed by the product brand manager to appear at a certain time on any installed MMVK. The button can appear either as an actual button at the bottom of the MMVK, or it can also appear as a link in the Brand Information Display Mode of the MVK.

The Brand Manager will be able to select at point in the Consumer-interaction with the MMVK will the "Buy Later" button appear. Under normal circumstances, the "Buy Later" will be shown after the Consumer has clicked on all available links. The System tracks which links the consumer visits every time one is clicked for metrics reasons. This functionality can also be used to determine when to display the Buy Layer button.

When the Consumer clicks the "Buy Later" button, the System (i.e. network) first checks if there is a Network Cookie on the consumer's computer. This will allow the system to determine if the consumer is a returning User. If the consumer is a returning User of the system, then we already know their user information and can log them in to the system automatically. If no cookie if found, then the consumer is asked to either Log In or Register with the Network. If the consumer registers with the Network, then we collect some basic information about the consumer, and then log them in. If the Consumer already has registered, then they can directly log into the system. Once the Consumer is logged in, then the system will save the "Buy Later" version of the MMVK to the consumer's personal MMVK Directory Page.

An email is sent to the consumer informing them that their Personal Page has been updated and giving them the URL once again. The consumer can go to their Personal page at any time to view the MMVKs they have saved. The brand manager will be given the ability to update the Advertisement and Promotions on any MMVK that they install, for consumer saving. In case they wish to display a different Advertisement of Promotion to the consumer when they pull up their saved MMVK, then they will be able to do that. This will keep the content fresh in the minds of the consumer and reinforce the need to return to the store or e-tail site to complete the transaction.

Using Computational Intelligence To Automatically Update (i.e. Program) Brand-Building Content Inside MMVKs of the Present Invention In accordance with principles of the present invention, computational intelligence (e.g. AI, neural networks, computational algorithms etc) can be used to automatically update and program the informational links (i.e. URLs) display in the Brand Information Network mode of any particular MMVK. Such automated programming can be triggered upon the occurrence of particular conditions, For example, in the event that no action is taken by the Consumer with regard to purchase intent (i.e. the BUY NOW button is activated on the MMVK, but the consumer does not select it within a predetermined amount of time). Specifically, if the Consumer does not click the "Buy" or "Buy Now" or other Action button once he or she has received all information links in the Brand Information Display Mode of the MMVK, then the system/network will update the list of Links in the Brand Information Network, either adding new links (URLs) to the current list of active links (URLs) or substituting links that are currently placed in the Brand Information Network display mode. In a preferred embodiment, the Brandkey Create Subsystem will support services that enable a member of the brand management team Brand Manager to specify a second set of Links to be displayed in the Brand Information Display Mode, in the event that the consumer fails to undertake a particular course of action/behavior with respect to the MMVK in a particular period of time, or performs a particular action within a predetermined situation represented in the RDBMS of the Brand Marketing Communication Network.

Using CRM Databases to Automatically Configure (i.e. Program) BINS and MMVKs According to Consumer Profiles In accordance with principles of the present invention, the actual content associated with any particular Brand Information Network (BIN) and/or programmed MMVK, including its ad and promo spots, can be automatically programmed using intelligent customer relationship management (CRM) database systems. In such embodiments of the present invention, information profiles are maintained on particular consumers, reflecting their desires, tastes, interests and preferences. Such CRM databases can be integrated with the subsystem architecture of the Network of the present invention, and used to automatically update BINS and MMVK configurations for particular consumers whose identity has been automatically detected using cookie files that have placed on within their Web-browsers, by information servers maintained within the Network. Once a particular consumer has been detected by the Brand Marketing Communication Network, e.g using cookie management technique, a custom-programmed MMVK can be automatically and dynamically configured "on the fly" using consumer profile information maintained in the CRM database(s) associated with the Brand Marketing Communication Network. This MMVK programming technique can provide brand managers with a high degree of control over their product and/or service brands, yet provide a high degree of personalization to the consumer through custom-programmed MMVKs delivered to each consumer whose identity is determined using this system technique on the Brand Marketing Communication Network.

Maintaining Personalized Virtual Kiosk Directory Pages For Consumers

According to this aspect of the present invention, once a consumer has registered with the Brand Marketing Communication Network, they are automatically assigned a sub-domain under bksnetworks.com domain which is made up of [username].bksnetworks.com. Then, whenever the consumer goes to this domain, he or she will access a Personal Virtual Kiosk Directory page that has been particularly assigned him or her.

This Personal Virtual Kiosk Directory page will pull the full list of MMVKs that the Consumer has saved. The list of MMVKs will be displayed to the Consumer ordered by SIC Category. The Consumer may click on any MMVK to launch it. If any Virtual Kiosk has been deactivated, then the MMVK will still appear in the Directory page, but there will be a message next to it, informing the Consumer that the MMVK has been deactivated and listing any new MMVKs that have been created since, for the same Product or Service.

Consumers will be able to log into the Brand Marketing Communication Network to update their Personal pages. They will be able to personalize the pages in terms of layout, color, text, font, messaging. They will also be able to email their pages to their friends as well as remove any MMVKs they no longer wanted. Consumers may also download a desktop icon for this page. This will allow the Consumer to be able to access this page of Virtual Kiosks directly from their desktops. It will also allow Brand Managers to have an always-open channel to Consumers via this desktop icon and page. They could also search the Brand Marketing Communication Network to find new or other Virtual Kiosks to add to their Personal pages. Consumers may also opt-into or opt-out-of consumer research and further mailings from the brands whose MMVKs they have. Depending on the amount of personal information that the Brand Marketing Communication Network receives from the consumer, the Brand Marketing Communication Network can furnish this information to manufacturer and retailer brands to help them shape their campaigns and target consumers more effectively.

A primary benefit associated with the Personal Virtual Kiosk Directory is to provider one central resource for consumers to access all their MMVKs. Thus, the Personal Virtual Kiosk Directory serves as a MMVK storage and organizing area for Consumers. The Personal Virtual Kiosk Directory is dynamically generated for each Consumer when it is requested. That way, there can be no spidering of the pages for anyone to find out which Virtual Kiosks are saved on whose pages, unless that information comes directly from the Brand Marketing Communication Network.

Driving E-Commerce Through MMVKs on the Brand Marketing Communication Network of the Present Invention, with Transaction and Commission Tracking Services Enabled The Brand Marketing Communication Network of the present invention supports a powerful suite of affiliate supporting services which benefits manufacturers, retailers, web-hosting sites, and other end-users on the Web. Such affiliate services include the tracking and management of sales transactions conducted through MMVKs on the Network, as well as commissions earned by affiliates (e.g. consumers, Web site publishers et al) who install and host e-commerce-enabling MMVKs. Transaction and commission tracking services according to the present invention (i.e. affiliate services) can help drive e-commerce transactions anywhere along the fabric of the Web, in both electronic and physical streams of commerce, by ensuring that affiliates earn commissions on all e-commerce transactions derived from MMVK's hosted on their Web spaces and having affiliate services (i.e. transaction and commission tracking and management services) running. Affiliate supporting services in accordance with the present invention also allow affiliates to donate a portion, or all of the sales commissions (earned through MMVKs) to Charities of their choice who have registered with the Brandkey Network and satisfy IRS requirements. Using the affiliate services of the present invention, manufacturer's can sell their branded products outside of conventional retail sales channels, and retailers can sell branded merchandise to consumers who are outside of their online stores, and anywhere the expanding fabric of the WWW extends (e.g. lifestyle sites, weblogs, etc.). Webs sites which host MMVKs having affiliate services (i.e. transaction and commission tracking and management services) running, can earn substantial sales commissions from retailers or manufacturers, thereby adding to the profit margins of such websites.

Figure 11:
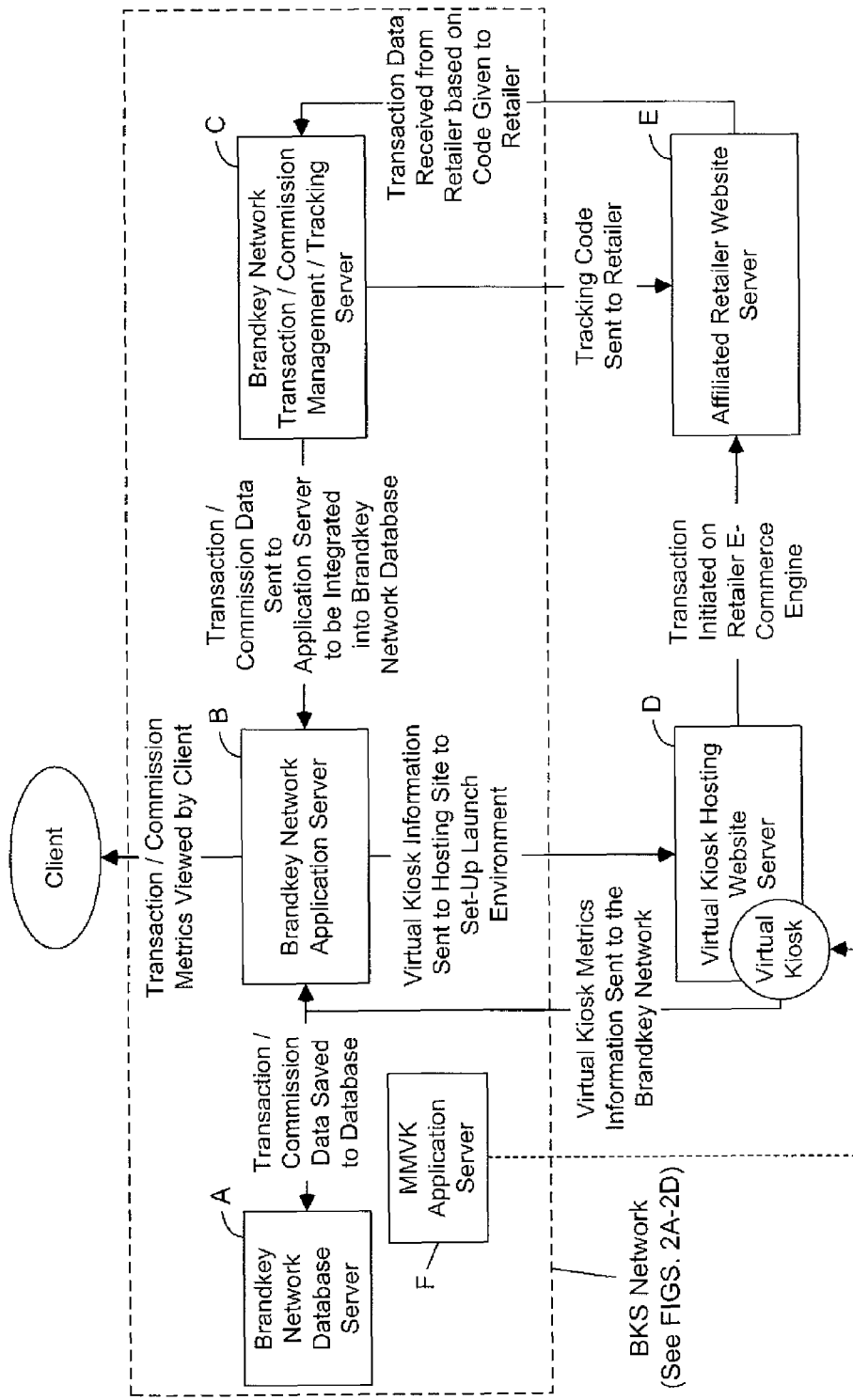
FIG. 11 is a schematic representation of Web-based brand information management and MMVK-driven marketing communication and e-commerce enabling network of the present invention (i.e. Brand Marketing Communication Network), illustrated in FIGS. 2A through 2D, and showing how its Web, Application and Database Servers are integrated with the Web servers associated with retailer e-commerce sites as well as Web sites hosting e-commerce transaction enabling MMVKs of the present invention (i.e. provided with a "Buy Now" or like button and having network affiliate services enabled), and further illustrating how e-commerce transactions enabled by MMVKs installed on affiliate Web sites and other properties, as well as sales commissions earned therethrough by network affiliates, are automatically tracked and managed by the Brand Marketing Communication Network, wherein Java-enabled Application Server B hosts the Brand Marketing Communication Network Application, wherein Java-enabled Application Server D hosts the MMVK Serving Application, wherein the Application Server B also provides registered affiliate Web sites with the necessary MMVK tags to launch sponsored MMVKs (using Application Server D), and once launched, installed MMVKs automatically send detailed consumer metric data back to the Application Server B, and the MMVK allows the consumer to begin a transaction in the specified retailer's shopping cart, wherein the retailer's e-commerce process is customized with a Transaction Tracking Script (TTS) so that the Brand Marketing Communication Network is able to track all MMVK-initiated transactions from beginning to completion, wherein the Transaction Tracking Script (TTS) is provided to tetailers via the Transaction/Commission Management/Tracking Server, C, and wherein Transaction/Commission Management/Tracking Server receives data from the Retailers' e-commerce engines regarding all MMVK-initiated transactions, and the Transaction/Commission Management/Tracking Server C processes all transaction data received from the e-commerce engines, generates commissions data for all affiliates, and transfers that commission data to the Application Server B for storage on the Database Server A.

In FIG. 11, the e-commerce transaction enabling and sales commission tracking system of the present invention is illustrated, showing how e-commerce retail transactions enabled by, and sales commissions earned through MMVKs installed on an affiliate site are automatically tracked and managed by the Brand Marketing Communication Network. The BKS network is also described in FIGS. 2A through 2D. At this juncture, additional services supported by the Brand Marketing Communication Network will now be described, including consumer product transaction tracking services, and sales commission tracking and management services. As shown in FIG. 11, these additional services are enabled by integrating an Internet-enabled transaction and commission tracking and management server C with the Java Application and Database Servers employed on the Network of the present invention.

As shown in FIG. 11, Java-enabled Application Server B hosts the MMVK Serving Application as well as the Brand Marketing Communication Network Application described in great detail above, and wherein the Application Server provides registered affiliate Web sites with the necessary MMVK tags to launch sponsored MMVKs. Once launched, installed MMVKs automatically send detailed consumer metrics (i.e. consumer/MMVK interaction data) back to the Application Server B for storage in the Database Server A, and the MMVK allows the consumer to commence a transaction in the specified retailer's shopping cart which is linked to the Buy Now button on the MMVK, or to a link in any one of the display modes of the MMVK, launched from MMVK hosting Web site D.

As shown in FIG. 11, a Transaction Tracking Script (TTS) is provided to each retailer for maintaining communication between the retailer's ecommerce server (i.e. supporting e-commerce from any particular MMCK) and the Transaction/Commission Management/Tracking Server C. The function of the TTS is to customize the e-commerce process on the retailer's E-Commerce Server E so that the Network Transaction/Commission Tracking and management Server C is able to track all MMVK-initiated transactions from beginning to completion, i.e. once initiated on the retailer's ecommerce site via an MMVK hosted on an affiliate Web Site D. An example of a transaction tracking script code that that would be put into e-commerce pages is as follows:

```
<script       src="http://www.brandkey.net/mmvktracker.js" type="text/javascript">
</script>
<script>
_mmvkid="BKS-xxxx-x";
mmvkTracker( )
</script>
<body on Load="javascript:_initTrans( )">
```

The Transaction/Commission Management/Tracking Server C receives Transaction Data from the retailers' e-commerce server E regarding all MMVK-initiated transactions, and the Transaction/Commission Management/Tracking Server C processes all Transaction Data received from the retailer's e-commerce Web Server E, generates Commissions Data for all affiliates who installed the MMVKs, and transfers the Commission Data to the Application Server B for storage on the BKS Database Server A. At any time, clients (e.g. affiliates) can view Transaction and Commission Data stored on the Database Server A, via a Web browser pointed to a Web-based GUI generated by Network Application Server B or its associated cluster of Web Servers (not explicitly shown).

In the illustrative embodiment of the present invention, the Transaction/Commission Tracking and Management Server C performs the following functions:

(1) to record all consumer transactions in e-commerce environments that were generated from Affiliate sites;

(2) to process all data received from embedded scripts placed in e-commerce environments;

(i) Which Virtual Kiosk originated the transaction, (ii) For which product was the transaction originated, and (iii) Which Affiliate partner hosted this Virtual Kiosk;

(3) to determine whether any further up-selling occurs in the Shopping Cart of the e-commerce provider;

(4) to determine whether the transaction proceeded to fulfillment and if not, where was the transaction dropped;

(5) to determine what was the total transaction (amount and items) that was completed;

(6) to provide data records pertaining to commissions earned by Affiliate partners on all embedded MMVKs;

(7) to provide data records pertaining to commissions payable by Retailers/Manufacturers to Affiliate partners; and (8) to provide Auditing capabilities to third-party firms to view scrubbed transaction records pertaining to the use and installation of MMVKs on Affiliate sites.

Deploying, Installing and Operating MMVKs on the Brand Marketing Communication Network With Automatic Retail Transaction And Commission Tracking Services Enabled For Affiliate Driven E-Commerce FIG. 12 describes many of the primary technical details underlying the e-commerce enabling and tracking process of the present invention that is carried out on the global Brand Marketing Communication Network depicted in FIG. 11. In this network configuration, e-commerce enabling MMVKs are deployed, installed and operated, with automatic retail transaction and sales commission tracking services enabled conducted in accordance with the principles of the present invention. This will process will now be described in greater detail.

As indicated at Step 1 in the flow chart of FIG. 12, a Client Account is set up for the vendor (i.e. manufacturer) on the Brand Marketing Communication Network depicted in FIG. 11 (the Network).

As indicated at Step 2 in the flow chart of FIG. 12, the manufacturer/vendor registers its Products/Services on the Network.

As indicated at Step 3 in the flow chart of FIG. 12, the manufacturer/vendor registers its retail trading partners on the Network.

As indicated at Step 4, in the flow chart of FIG. 12, retail trading partners are assigned Client accounts on the Network.

As indicated at Step 5 in the flow chart of FIG. 12, the manufacturer/vendor sets up product/service parameters for retailers.

As indicated at Step 6 in the flow chart of FIG. 12, manufacturer/vendor creates MMVKs for its registered Products/Services.

As indicated at Step 7 in the flow chart of FIG. 12, manufacturer/vendor sets up installation environments for its MMVKs to be used in an Affiliate Program, where registered affiliates agree to install e-commerce enabling MMVKs on affiliate owned or control Web properties, in exchange for a sales commission typically based on a percentage of each sales transaction initiated by the affiliate-hosted MMVK deployed on the Network of the present invention. At this time of the process, a generic, network-specific Transaction-Tracking Script (TTS) is generated for distribution to retailers (as well as manufacturers who are operating e-commerce sites and operating as retailers). These transaction tracking scripts (TTS) are provided by the Network Administrator (e.g Brand Marketing Communication Networks, Inc.) to all retailers and manufacturers who maintain e-commerce sites that are possible targets of an e-commerce initiating MMVK deployed on the Network. Once received, the retailer (or manufacturer) installs its TTS on each of the checkout pages on its e-commerce store generated by the retailer's e-commerce site servers E. Such TTSs enable the Network Transaction/Commission Tracking and Management Server C to automatically track each transaction originating from a MMVK that goes through the retailer's or manufacturer's e-commerce platform.

As indicated at Step 8 in the flow chart of FIG. 12, an affiliate user (e.g. the publisher/owner of a Website, the owner of a Web-log hosting site, a person maintaining a Web site, a person maintaining a web-log, et al) registers with the Network as an "Affliate" and installs one or more e-commerce enabling MMVKs on his or her Web site or property (e.g. Web log, etc) as the case may be.

As indicated at Step 9 in the flow chart of FIG. 12, the consumer then interacts with the MMVK installed by the Affiliate on a Web site or property owned or controlled by the registered affiliate.

As indicated at Step 10 in the flow chart of FIG. 12, a consumer initiates a consumer transaction through an affiliated-hosted MMVK, at an e-commerce site (of a retailer or manufacturer) by clicking on the Buy Now (Action) button on the MMVK, or any e-commerce initiating link displayed in any of the display modes of the MMVK.

As indicated at Step 11 in the flow chart of FIG. 12, in response to the selection of the Buy Now button on the MMVK (or any e-commerce initiating link displayed in any of the display modes of the MMVK), the MMVK Hosting Website Server D automatically generates "Virtual Kiosk Data" which is sent to the Network Application Server B, for storage on the Network Database Server A, as shown in FIG. 11. "Virtual Kiosk Data" includes data indicating: (i) which Virtual Kiosk initiated the transaction; (ii) where the Virtual Kiosk is installed; and (iii) for which Product/Service was the transaction initiated.

As indicated at Step 12 in the flow chart of FIG. 12, the Transaction Tracking Script (TTS) automatically executes on each page of the Retailer's checkout process (i.e. e-commerce store) so that its e-commerce server E automatically sends further Transaction Data to Transaction/Commission Management/Tracking Application Server D for storage on the Network Application Server B. "Transaction Data" includes: (i) which steps of the transaction process have been completed; (ii) any up-selling of other items have taken place in the transaction process; (ii) whether transaction has been completed; and (iii) complete Transaction Details.

As indicated at Step 13 in the flow chart of FIG. 12, the Transaction Data is processed by the Network Transaction/Commission Tracking and Management Server C so as to determine appropriate commissions for the Affiliate, and this Commission Data is then transmitted to the Network Application Server B for storage on the Network Database Server A, as shown in FIG. 11.

Figure 12A:
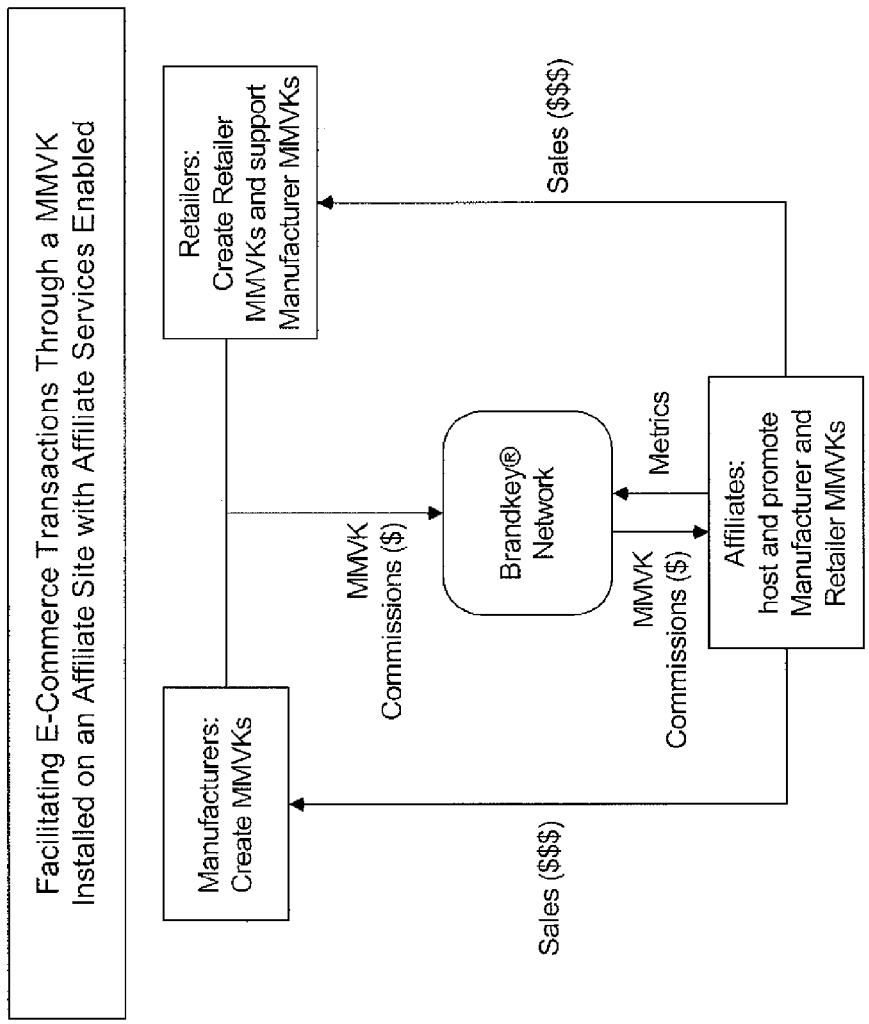
FIG. 12A is schematic representation indicating the higher-level process that occurs among retailers, manufacturers, affiliates and consumers during the execution of the e-commerce enabling and tracking process of the present invention carried out on the global communication network depicted in FIG. 11, including the installation of e-commerce enabling MMVKs by affiliates on Web sites and/or related properties, the initiation of e-commerce transactions through these MMVKS by consumers, the automatic tracking of e-commerce transaction initiated through installed MMVKs, and the automatic tracking of commission earned by affiliates through such transactions, in accordance with the principles of the present invention.

Description of Events That Occur Among Retailers, Manufacturers And Affiliates When Installing A MMVK of the Present Invention, And Conducting An E-Commerce Transaction With E-Commerce Affiliate Services of the Present Invention Enabled FIG. 12A schematically illustrates a high-level process that occurs among retailers, manufacturers, affiliates and consumers during the execution of the e-commerce enabling and tracking process of the present invention carried out on the global communication network depicted in FIG. 11. As will be described in detail below, with reference to the flow chart shown in FIG. 12B, this process includes the installation of e-commerce enabling MMVKs by affiliates on Web sites and/or related properties, the initiation of e-commerce transactions through these MMVKS by consumers, the automatic tracking of e-commerce transaction initiated through installed MMVKs, and the automatic tracking of commission earned by affiliates through such transactions, in accordance with the principles of the present invention.

As indicated at Step 1 in the flow chart shown in FIG. 12B, the manufacturer or retailer sets up (i.e. creates and deploys) the MMVK on the Network of the present invention. This step is carried out usin Brandkey Create, Brandkey Deliver, Brandkey Advertise and Brandkey Promote Subsystems, as described in great detail below.

As indicated at Step 2 in the flow chart of FIG. 12B, manufacturer or retailer sets up Commissions for each MMVK. At the same time, charities need to register with the network so that they can be made available for application As indicated at Step 3 in the flow chart of FIG. 12B, the affiliate (e.g. web-logger) installs a MMVK, and optionally, can select charities for donations based on all or part of sales commissions earned on transaction initiated through an e-commerce powered MMVK. At this stage, the MMVK already has been assigned a unique ID for each installation so tracking is already enabled on the Network.

As indicated in Step 4 of FIG. 12B, the consumer clicks the "Buy Now" button on the installed MMVK, or a link in any of the display modes of the MMVK inititating an e-commerce transaction on a manufacturer's or retailer's e-commerce site.

As indicated in Step 5 of FIG. 12B, in response to the clicking upon the Buy Now button on the MMVK, the shopping cart associated with retailer's or manufacturer's programmed e-commerce site is automatically activated by the Retailer Web Server E.

As indicated in Step 6 of FIG. 12B, the e-commerce platform on the retailer's or manufacturer's Web server E automatically tracks the origin of the transaction initiated by the affiliate-hosted MMVK.

As indicated in Step 7 of FIG. 12B, during the transaction, the e-commerce site's Web server E sends continuous information to the Network Transaction/Commission Tracking and Management Server C informing the Network of transaction progress. If the transaction is not completed for any reason, then the Network Transaction/Commission Tracking and Management Server C can identify where shopping cart abandonment occurred along the e-commerce process.

As indicated in Step 8 of FIG. 12B, upon transaction completion, full information about the transaction is automatically sent from the Retailer Web Server E to the Network Transaction/Commission Tracking and Management Server C, for generation of commission data, and transfer of transaction and commission data to the Network Application Server B, for storage on the Network Database Server A, as illustrated in FIG. 11.

As indicated in Step 9 of FIG. 12B, complete transaction and commission reports are available on demand from the Network Database Server A using a Web browser pointing to the Web Server clusters associated with the Network Application Server B, in the multi-tier network architecture completed in FIG. 11.

Figure 17:
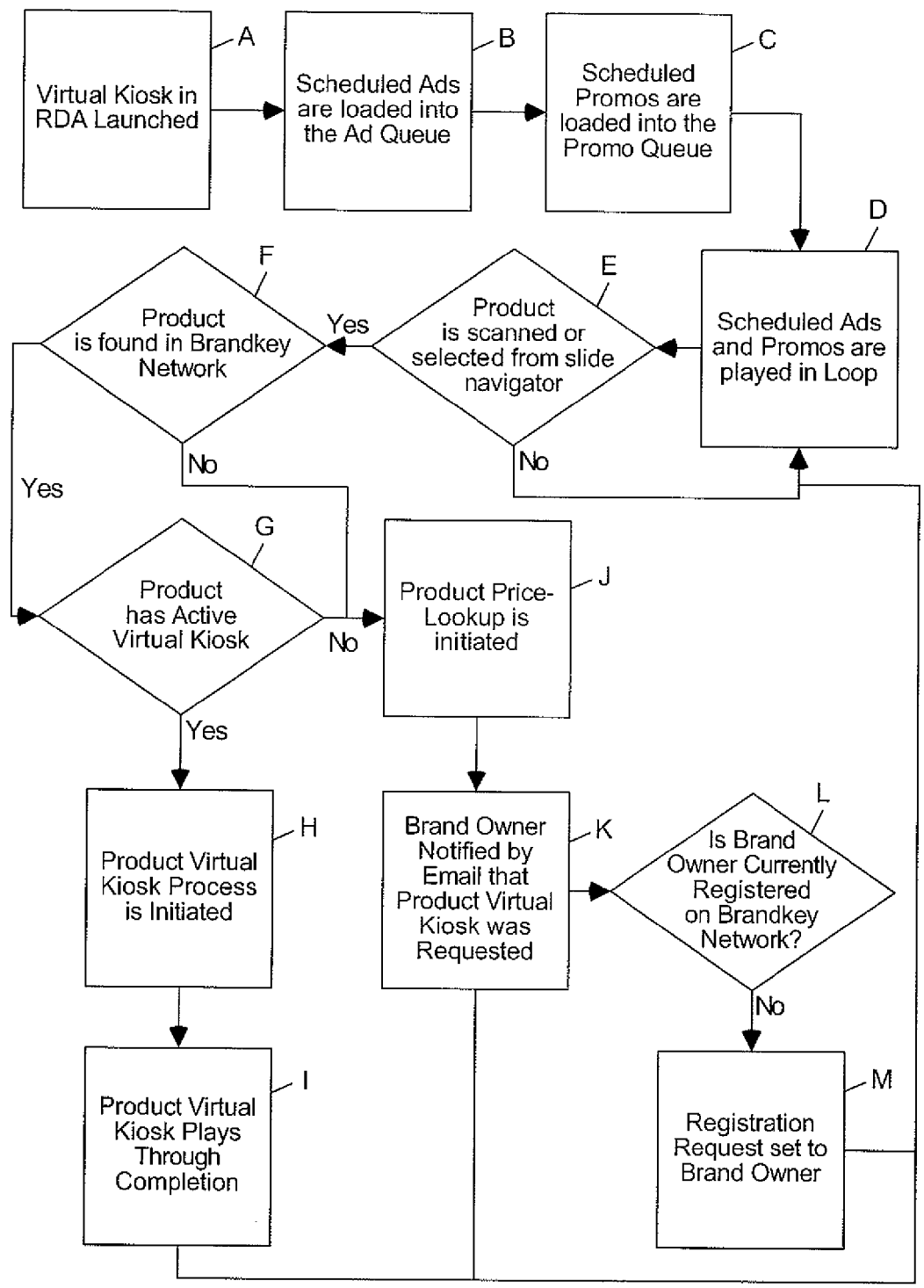
FIG. 17 is a high-level flow chart describing the various states of operation supported by the Multi-Product MMVK of the present invention, which can be executed on the RDA of FIGS. 16A and 16B, and installed in a retail store environment and having bar code reading capabilities for reading UPC symbols on consumer products during price look-up operations.

Description of the Process of Installing E-Commerce Enabling MMVKs on an Affiliate's Web Site or Property with Transaction/Commission-Tracking Services Enabled FIG. 13 is a description of the flow of events that occur when an affiliate installs an e-commerce enabling MMVK on a Web site or property owned or controlled by the affiliate (i.e. as indicated in Step 3 of FIG. 12A) using the Brand Marketing Communication Network of FIG. 17, with automatic transaction and commission tracking services enabled. In this As indicated at Step 1 in FIG. 13, the User (i.e. affiliate) enters the Affiliate Services section on an affiliate Web site (e.g. Web Log Hosting Site) using a Web browser. At this Affiliate Service Section (e.g affiliate portal) on the Web-hosting Site, the affiliate can (i) install e-commerce enabling MMVKs, (ii) select registered charities of choice to which to make donations based on earned sales commissions, (iii) track and manage earned commissions earned on transactions inititated by affiliate-hosted MMVKs, etc.

As indicated at Step 2 in FIG. 13, the Network Application Server B displays the list of MMVKs that are already installed by the affiliate, as well as a list of MMVKs that are currently available for installation.

As indicated at Step 3 in FIG. 13, the affiliate selects a MMVK from the available MMVK list.

As indicated at Step 4 in FIG. 13, the Network Application Server B displays detail information to the affiliate about the selected MMVK, who is using a Web browser.

As indicated at Step 3 in FIG. 13, the affiliate chooses to install the MMVK on the Web site.

As indicated at Step 4 in FIG. 13, the Network Application Server B creates a new installed MMVK record for the chosen MMVK having a unique MMVK ID.

As indicated at Step 5 in FIG. 13, the Network Application Server B automatically appends Product ID and a MMVK ID to the "Buy Now" links associated with the MMVK so that the Network Application Server B can obtain feedback for completing the transaction.

As indicated at Step 6 in FIG. 13, the affiliate selects where to place the MMVK on his or her web site (e.g. lifestyle site, Web-log etc.).

As indicated at Step 7 in FIG. 13, the affiliate is provided an opportunity make donations to any charities based on the sales commissions earned on completed sales transaction initiated through affiliate hosted MMVKs.

As indicated at Step 8 in FIG. 13, the affiliate is not required to install any tags or update any code during the installation of e-commerce enabling MMVKs, so that all aspects of MMVK installation are essentially transparent to the affiliate.

Description of Process For Deploying E-Commerce Enabling MMVKs on an Affiliate Web Hosting Site So as to Enable Affiliates to Earn Commissions While Visiting Consumers Purchase Products at E-Commerce Sites of Retailers And Manufacturers Through the Affiliate-Hosted MMVKs FIGS. 14A through 14G describes the flow of events that occurs when the Brand Marketing Communication Network of the present invention is used by a web-logger when deploying e-commerce enabling MMVKS on his or her web-log site so as to enable the web-logger to earn commissions while visitors purchase products at e-commerce sites of retailers and manufacturers through the installed MMVKS.

Figure 14A:
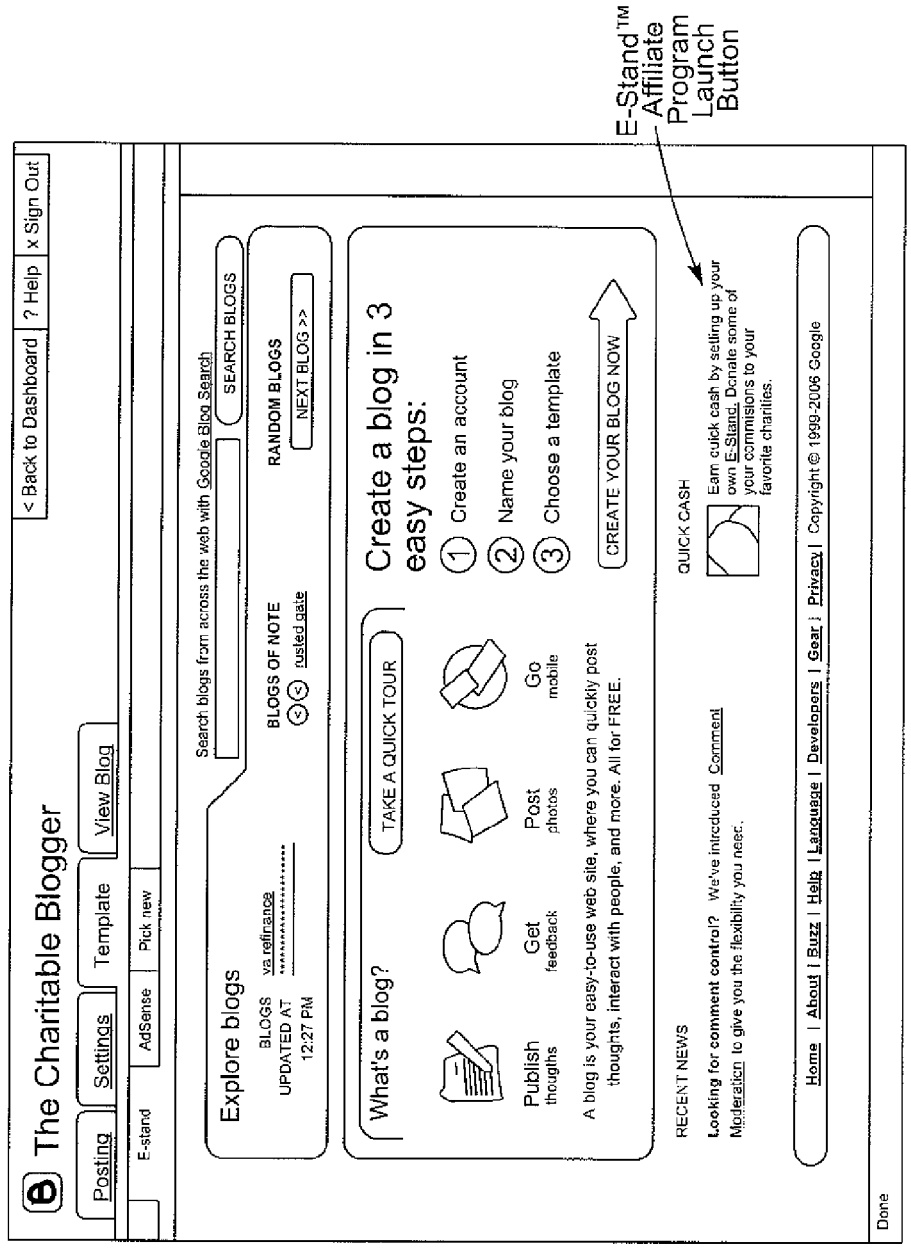
FIG. 14A is a graphical representation of the home page of an exemplary weblog hosting site which is driven by the Web-based MMVK-driven marketing communication and e-commerce enabling communication network of the present invention, depicted in FIGS. 1 and 11, wherein transaction and commission tracking services enabled so as to enable affiliates can earn sales commissions by installing e-commerce enabling MMVKs (e.g. E-stands™) of manufacturers and/or retailers, on affiliate web sites and/or properties (e.g. web-log sites)

As indicated by the GUI screen of FIG. 14A, an affiliate user comes to a Web hosting site (e.g. a Lifestyle Web Site or a WeB-Log Hosting Site) having an e-commerce enabling Affiliate Area or portal (e.g. e-Stand™ e-commerce affiliate program), accessible by clicking on an image embedded in the home page of the Web Hosting Site, as indicated in FIGS. 14A through 14G. In accordance with the principles of the present invention, the e-commerce enabling portal will recognize the affiliate user (e.g. blogger) based on the Username/Password forwarded by the Blog Site when the affiliate user enters the portal. In the illustrative embodiment, the e-commerce enabling portal shall operate as an independent site within the Blog Hosting Site. The e-commerce enabling Affiliate portal, indicated in FIG. 14A, can easily be hooked into the Blog Hosting site using the <IFRAME> tag in HTML 4.0. In the source code, the User's username and password can be passed along for verification by the Affiliate Services application. In the illustrative embodiment, the application will be a WebObjects application, based on the Network but using a different GUI. Different GUIs can be created for different Web Hosting Sites so that the Affiliate Services application of the present invention can blend in completely with the look and feel of the Web Hosting Site. The Affiliate Services application will be supported by the Network as well as by a separate Transaction and Commission Tracking software package installed on Server C shown in FIG. 11. Such software packages are generally known in the art and can be modified in accordance with the teaching disclosed herein, and then integrated into the Network of the present invention so as to be able to fully and automatically track transactions and commissions and activity for all e-commerce initiating MMVKs.

As indicated in Step 1 in FIG. 14B, the affiliate user (e.g. "Charitable Blogger") enters the Affiliate Area of the web-hosting site, and if this is the first time they have entered the area, then they are asked to confirm their user information with what was provided for them by the web-log hosting site.

Figure 14C:
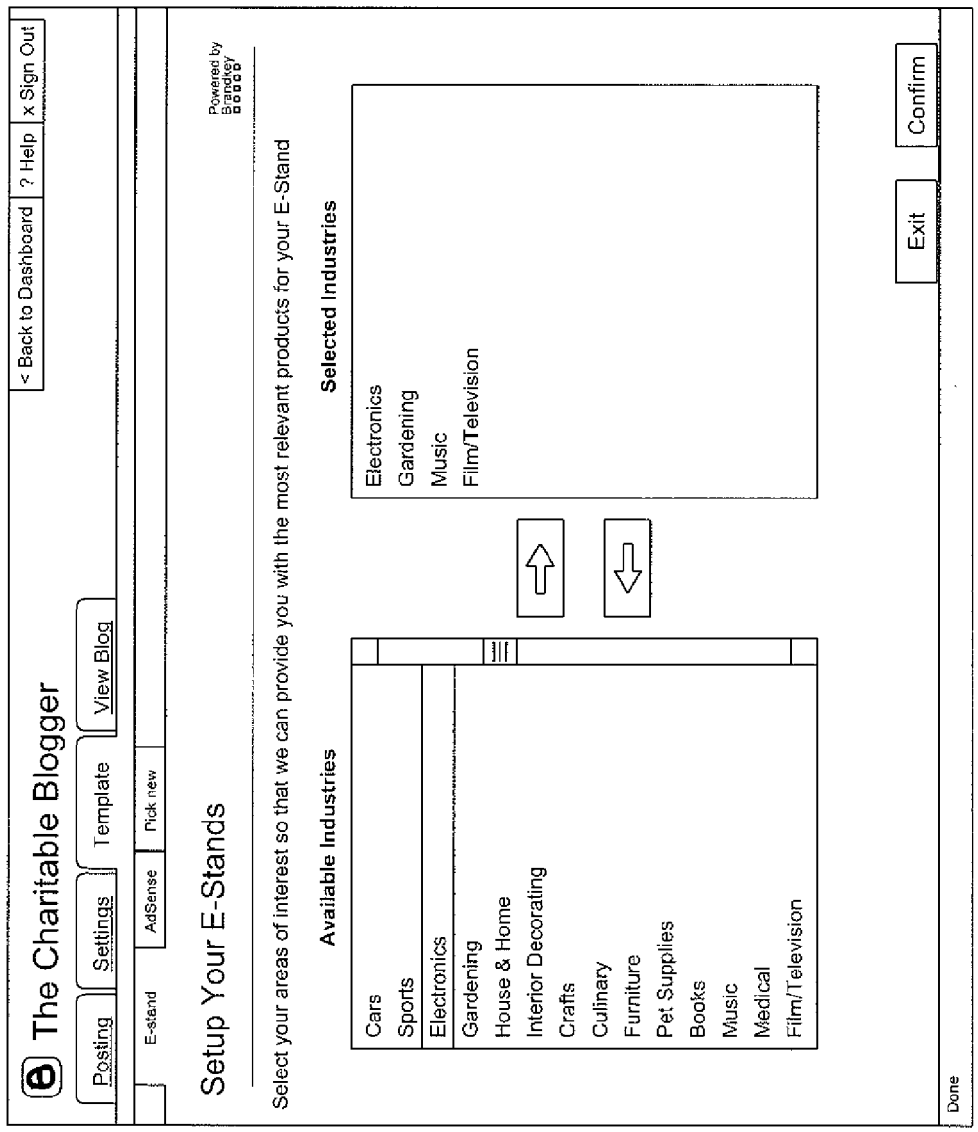
FIG. 14C is a graphical representation of a web page for an exemplary weblog hosting site, wherein during Step 2 of the MMVK (e.g. e-Stand™) set up process, to make things easier for the affiliate, the affiliate is asked to select an area of interest on which he or she would like to see or view a list of available MMVKs, and only those MMVKs on the list will be displayed to the affiliate when logging back onto the system at a future date.

As indicated in Step 2 in FIG. 14C, to make things easier for the affiliate, the affiliate is asked to select an area of interest on which he or she would like to see or view a list of available MMVKs, and only those MMVKs on the list will be displayed to the affiliate when logging back onto the system at a future date.

As indicated in Step 3 in FIG. 14D, the Network Application Server B (and its cluster of Web Servers) displays to the affiliate (1) a list of available MMVKs, (2) a list of MMVKs that he or she has installed (i.e. set up) on the blog site, and (3) his or her blog site for reference purposes.

As indicated in Step 4 of FIG. 14E, when the affiliate selects a MMVK, the Network Application Server displays detail information about the selected MMVK, and if this MMVK has been previously installed, then the network displays any commission related information relating to the MMVK, for review by the affiliate. As shown on this page, the affiliate user is presented with the detailed information about the selected MMVK, such as; Name of the MMVK, Sponsor (Creator) of the MMVK, Product showcased in the MMVK, Date the MMVK was installed, and full commission information for the MMVK such as; amount of commissions received this month, year-to-date, last 12 months, and since installation. The affiliate user will also be able to set the placement area of the MMVK.

Figure 14F:
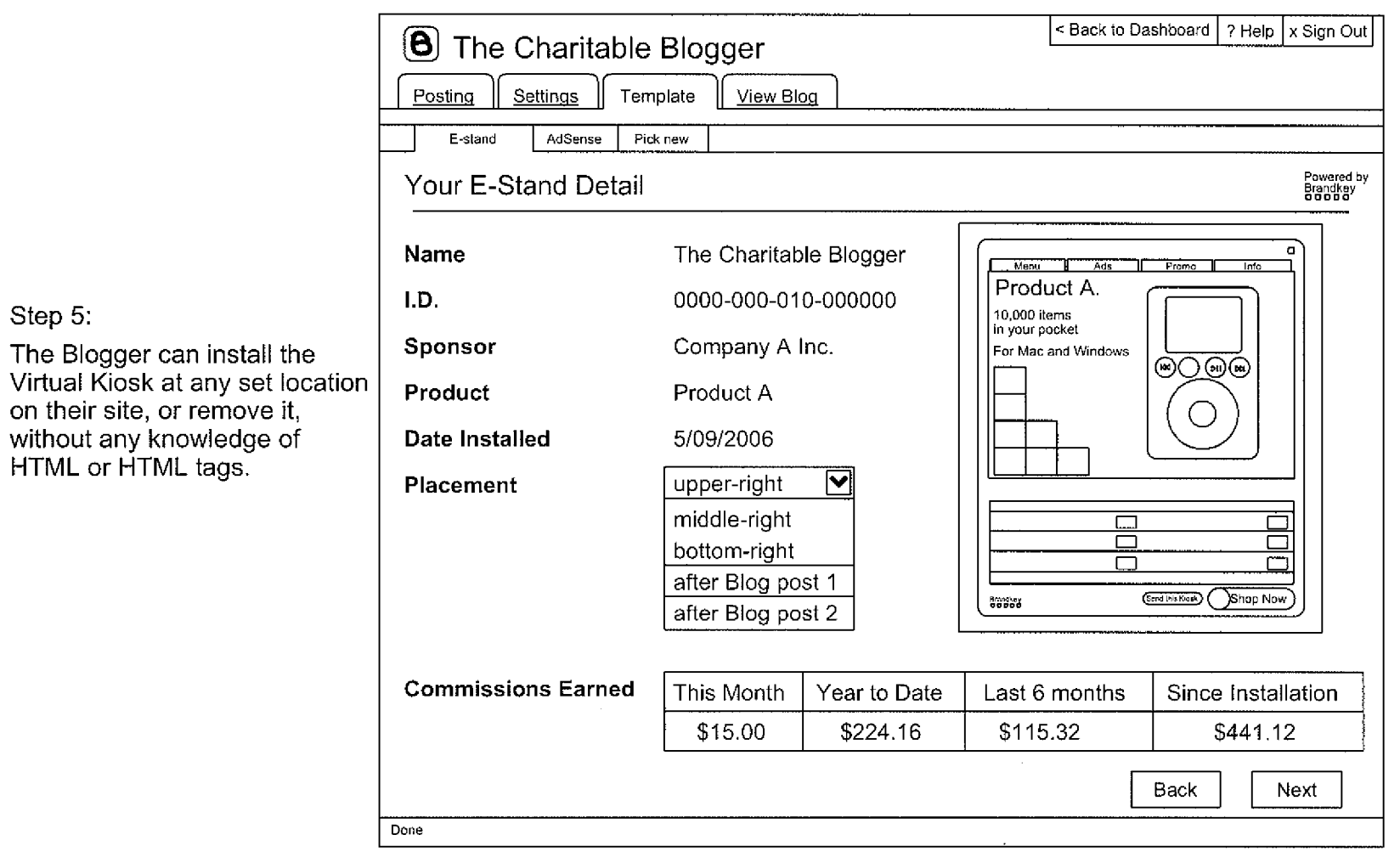

As indicated in Step 5 of FIG. 14F, the affiliate can install the MMVK at any set location on his or her blog site (e.g. as an embedded object or embedded link), as well as remove the MMVK, without possessing any knowledge of HTML or HTML tag technology. In the illustrative embodiment shown, all MMVKs available to the affiliate user can be automatically placed in the following locations within his or her Blog Site, e.g. Top, Right-Side Top, Right-Side Middle, Right-Side Bottom, After specific Posts, and Bottom. The affiliate user can also choose to remove it or not place it at this time. The system shall automatically check to make sure that no MMVKs have been placed in the same location on the affiliate's Web site. Once the affiliate user accepts these settings, then he or she will move to the next page. Each MMVK can be easily integrated into the HTML layer of a Blog page, again by using the <IFRAME> tag. Size and position of each MMVK GUI can be easily controlled with this tag. There will be a script run a each of the possible installation points on the Blog page using the <IFRAME> tag to determine if MMVK is to be shown in that area, based on the setup done by the User. Alternatively, each MMVK ca be installed as pop-up by simply installing its MMVK tag into the fabric of the Web site.

Figure 14G:
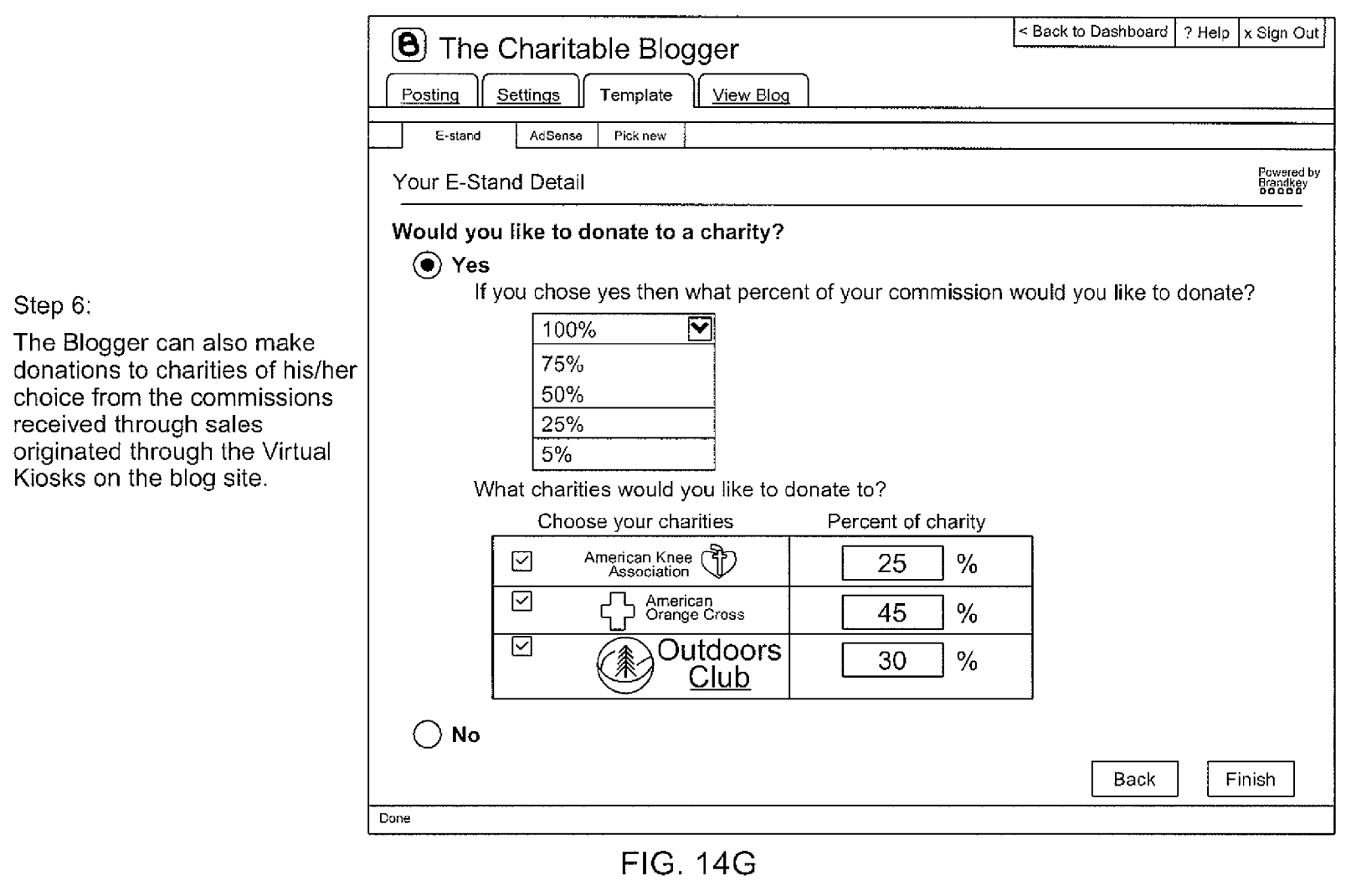

As indicated in Step 6 of FIG. 14G, the affiliate can also make donations to registered charities of his or her choice based on commissions earned/received through sales originated through MMVKs installed on his or her blog site. If the affiliate wishes to donate an amount of his or her eame commissions, then he or she are asked how much of their commission wish to donate, and then whic charities and in what percentages shall the donation amount be distributed. Donation to charities is strictl optional. Available charities will be those charities registered on the Network.

Figure 14H:
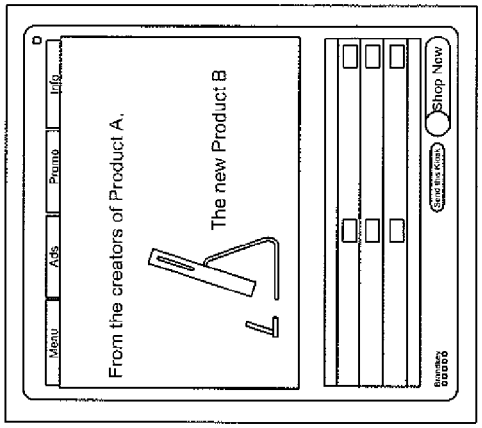
FIG. 14H is a graphical representation of a web page an exemplary weblog hosting site, wherein during Step 8 of the MMVK set up process, at any time, the affiliate can change the position or location of a MMVK set up on his or her blog site.

As indicated in Step 7 of FIG. 14H, at any time, the affiliate can change the position or location of a MMVK set up on his or her blog site.

As indicated in Step 8, FIG. 14I, at any time, the affiliate can change the commission percentages to be donated to any charity, or completely change the charities to receive any commission-based donations earned through the Web-based Brand Marketing Communication Network of the present invention.

Commissions will be tracked by the Affiliate Services application running on the Network Transaction/Commission Tracking and Management Server C shown in FIG. 11. Monthly bills will be sent to manufacturers and/or retailers to collect commissions earned by the affiliates for distribution. In a preferred embodiment, commissions owed to affiliates will be wired from the manufacturer or retailer to a bank account managed by a group of trustees for the benefit of affiliates, retailers, manufacturers et al. Commissions and donations will be sent to the appropriate parties on a monthly basis as long as the amount is greater than a predetermined limit (e.g. $10.00). If the amount is less than this limit for the month, then it will be carried forward to the next month. Commissions and donation will begin to be paid after the second month of sign-up.

Figure 15:
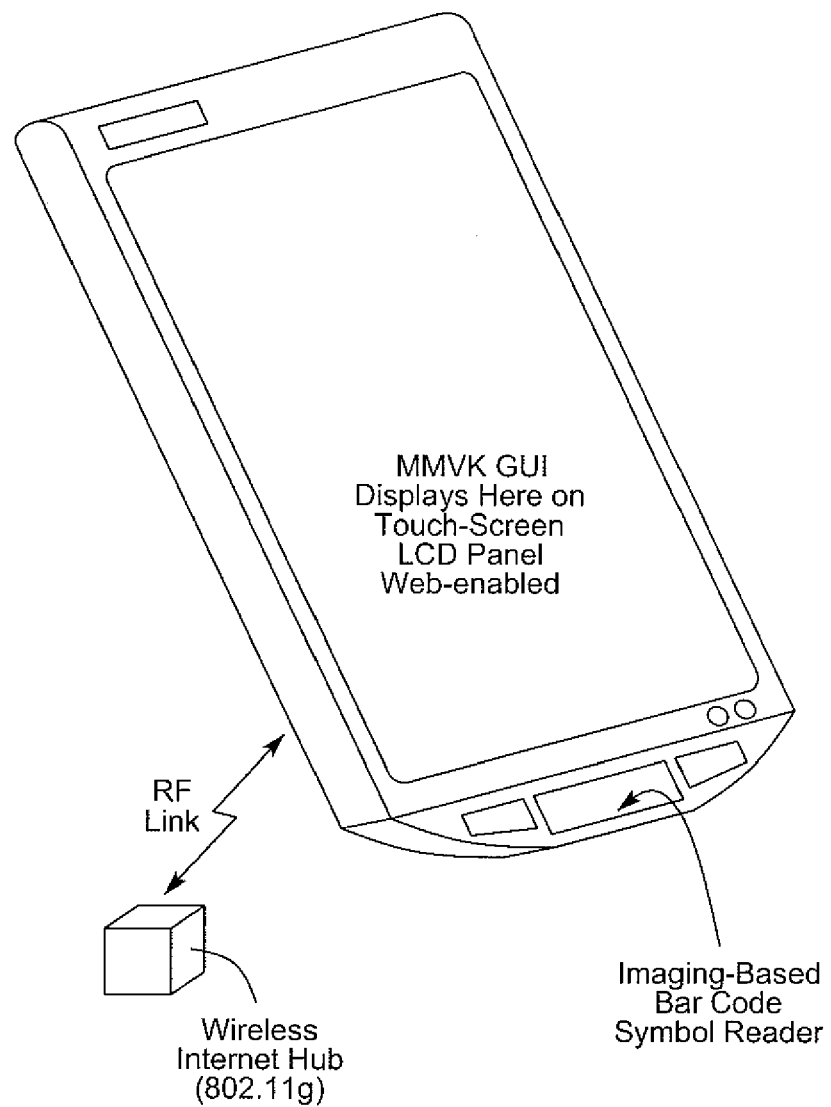
FIG. 15 is a perspective view of a Web-enabled retail display appliance (RDA) of the present invention having a LCD touchscreen panel mounted in an ultra-thin, lightweight housing, and having an integrated imaging-based bar code symbol reader for reading UPC symbols on consumer products, and capable of supporting MMVKs of the present invention, including the multi-product MMVK illustrated in FIGS. 16A through 17.

Description of MMVK-Powered Retail Display Appliance (RDA) Having Bar Code Reading Capabilities to Support Price Look Up Operations Referring to FIGS. 15 through 17, a Multi-Product MMVK of the present invention executed on Web-based physical retail display appliance (RDA), with wireless network connectivity to the Internet, will now described.

Figure 16A:
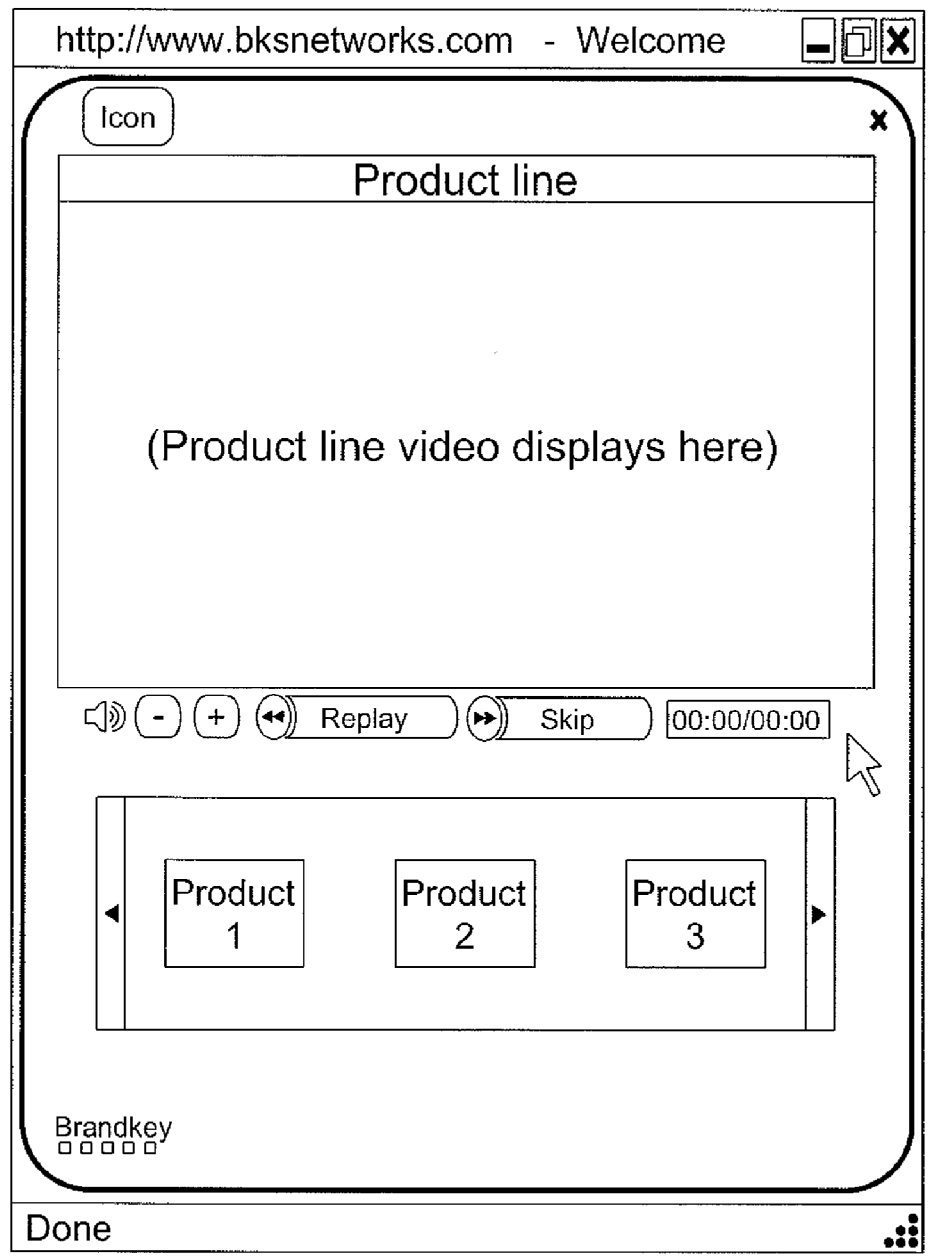
FIG. 16A is a GUI screen displayed by the Multi-Product MMVK of the present invention described in FIG. 17, wherein the MMVK is shown playing ads in loop with products selectable in lower scroll bar menu.

As shown in FIG. 15, the Web-enabled retail display appliance (RDA) of the present invention comprises: a LCD touchscreen panel mounted in an ultra-thin, lightweight housing and having a integrated imaging-based bar code symbol reader for reading UPC symbols on consumer products, and capable of supporting MMVKs of the present invention, including the multi-product MMVK illustrated in FIGS. 16A through 17. In the illustrative embodiment, the Web-enabled RDA of the present invention further comprises a computing platform having a microprocessor, a memory architecture, a system bus, and input/output subsystem supported on a motherboard, as well as an operating system (e.g. OSX, Linux, or MS XP), and software drivers for supporting the LCD touchscreen panel, an imaging-based bar code symbol reader (e.g. Metrologic Focus Digital Imaging Bar Code Symbol Reader), network interface card adapter that supports the IEEE 802.11(g) (WiFi) wireless network protocol, and a pair of Web-cameras for detecting the presence of consumers in the field of view (FOV) of the LCD touchscreen display screen. Preferrably, the LCD touchscreen display is 8"×10", which will support at least 800×600 resolution. The computing platform can carry either conventional/flash-based hard drive, adequate memory. The second camera is used to keep track of the number of people who pass by the MMVK on the RDA. By keeping track of not only the number of people interacting with the MMVK, but also the number of people passing the MMVK, the retailer and manufacturer will be able to see how effective the RDA is in any particular retail store environment, and learn from such brand metrics. The system can also interact with the Retailer's inventory control system to calculate the number of products sold in relation to the number of times that product was requested on an RDA.

Once installed and setup, the RDA-hosted MMVK Application is started on this retail appliance. As shown in FIG. 16A, programmed advertisements and promotional messages are looped through MMVK on a continual basis. The Brand Marketing Communication Network will be used to enable the retailer to program the initial ad/promo loop, if necessary, free of charge for the retailer.

In the illustrative embodiment, the shopper, when interacting with the MMVK/RDA, can break the ad/promo loop in one of three possible ways:

a) By approaching the RDA to a set distance close to the RDA so that it recognizes that someone is close enough to break the display loop;

b) By taking a consumer product from the shelf and scanning it using its built-in bar-code symbol reader;

c) By selecting a product displayed on the MMVK.

In order for the RDA to automatically recognize that a shopper has approached it to a sufficient distance that the loop should break, the RDA uses one of the built-in cameras mounted on top of the touchscreen display panel. This camera continually captures, buffers and processes images of the FOV of the panel, searching for specific patterns in the captured images that approximate the basic shape of a shopper standing at a specific distance or closer to the RDA and faced in its general direction. Capture and buffered images need only be stored for a short while during image processing and can then be erase thereafter, in the interests of privacy to consumer/shoppers who happen to walk within the FOV of the RDA.

Figure 16B:
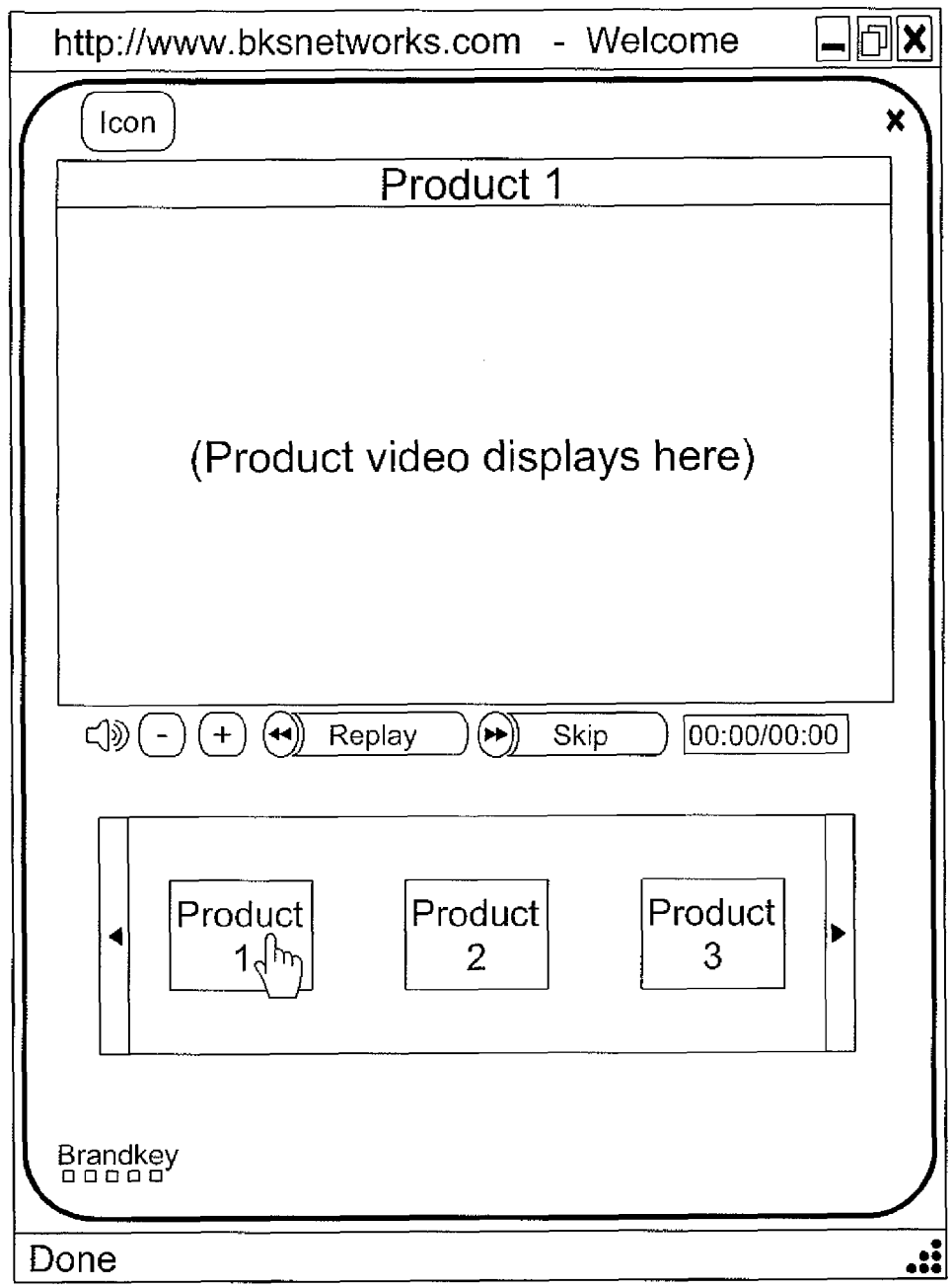
FIG. 16B is a GUI screen displayed by the Multi-Product MMVK of the present invention described in FIG. 17, wherein the ad loop is interrupted when a product selected from scroll-bar menu, or the UPC symbol on a consumer product is read by the bar code reader integrated in the RDA shown in FIGS. 16A and 16B.
Figure 16C:
FIG. 16C is a GUI screen displayed by the Multi-Product MMVK of the present invention described in FIG. 17, wherein the price of the scanned product is displayed along with a programmed image for the selected or scanned consumer product.

In FIG. 16B, the Multi-Product MMVK is shown with its ad/promo loop being interrupted when a product is selected from scroll-bar menu, or when the UPC symbol on a consumer product is read by the bar code reader integrated in the RDA shown in FIGS. 16A and 16B. Once the ad/promo loop is broken in this instance, the RDA displays a list of available products in its display. This list can be the full list of products in the general shelf area, a set of products of a particular brand, or other set of products selected on a different criteria. The shopper may select a displayed product by touching its image on the LCD touchscreen display panel. If the shopper swipes the bar-code for a specific product, then the RDA will break the loop of ads/promos currently playing. The system then automatically searches for the selected or swiped product in the RDBMS of the Network. The system will link to the Retailer store database to pull the current price for the selected product. The system will then look for any MMVK that can be displayed for the selected product. In FIG. 16C, the Multi-Product MMVK is shown with the price of the scanned product being displayed along with a programmed image for the selected or scanned consumer product.

If a MMVK has been created for the selected product, then that MMVK is shown to the shopper. However, in the event that no MMVK has been created for the selected product, then the system can display a set of questions for the shopper to answer. The system can also let the shopper know that a further discount can be available to the shopper for answering the questions. The system will then ask the shopper specific questions regarding why they were looking for information on the selected product, what specific information they may have been looking for and possibly any other relevant questions that can be programmed. The System will store the information and on a weekly or monthly basis, a detailed email will be sent to the Retailer as well as all affected Manufacturers that a Virtual Kiosk for these accumulated items was requested, along with the detailed questionnaire answers as filled out by the shoppers.

Figure 16D:
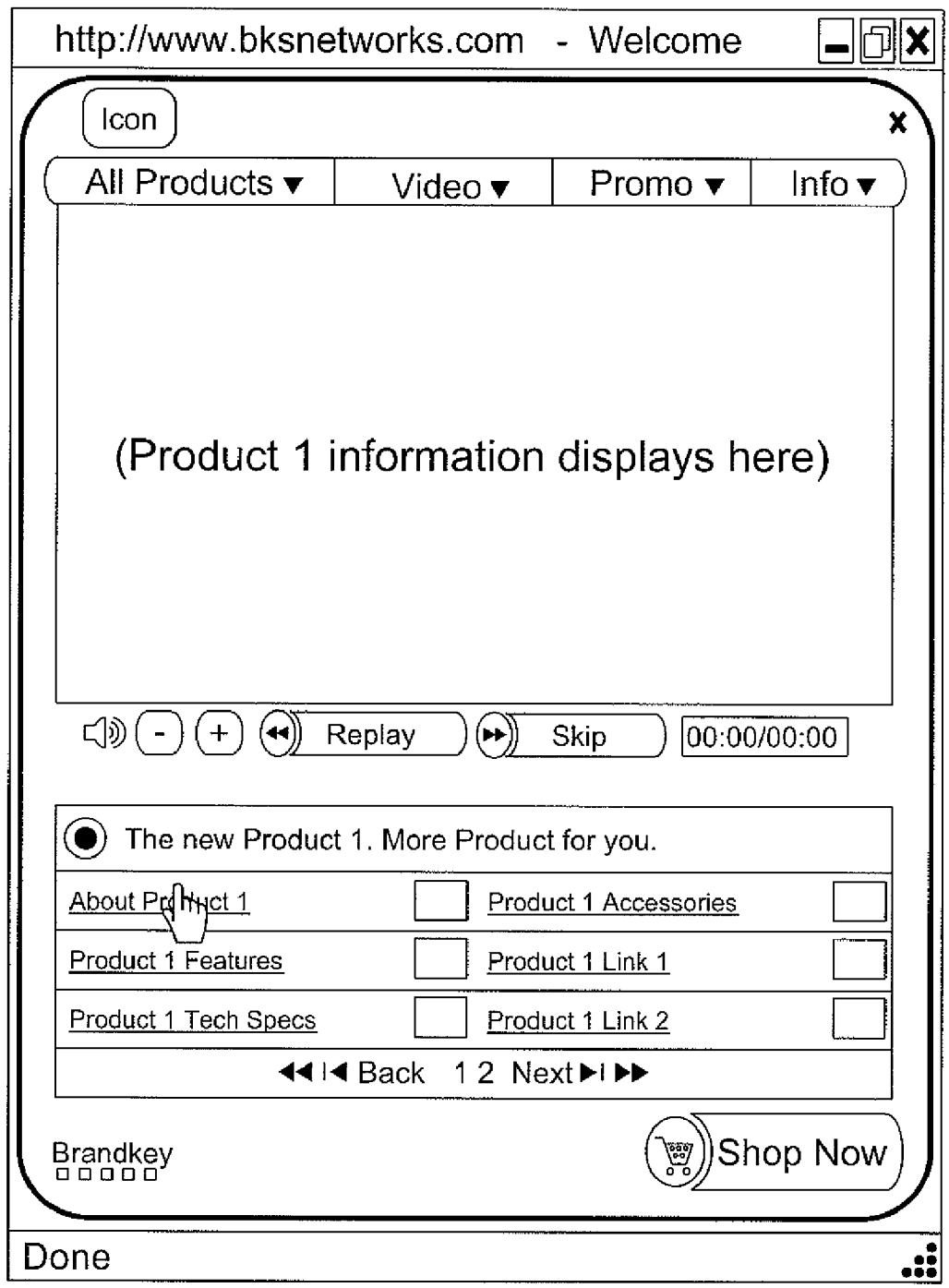
FIG. 16D is a GUI screen displayed by the Multi-Product MMVK of the present invention described in FIG. 17, wherein the brand information links for the consumer product are displayed.
Figure 16E:
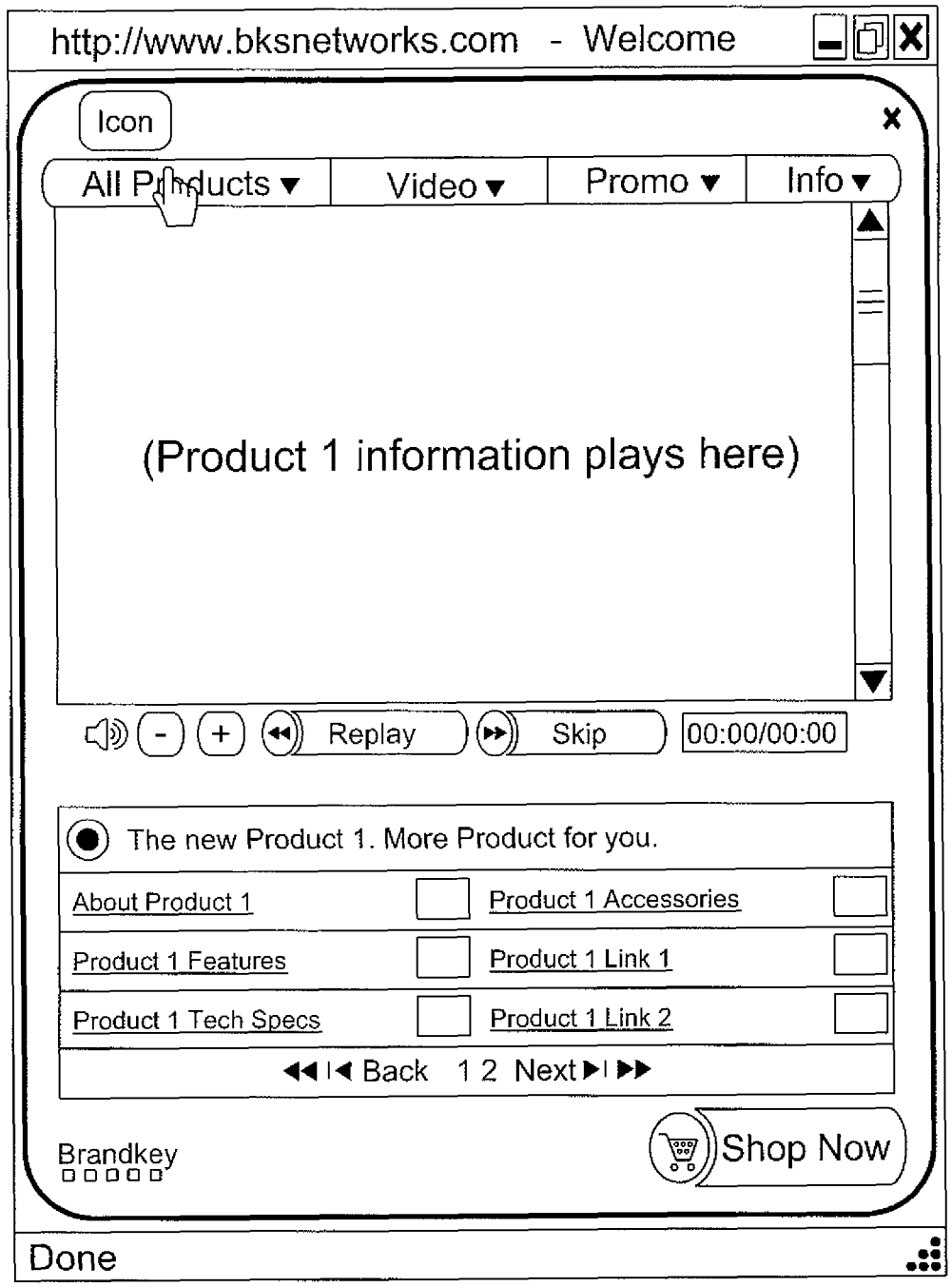
FIG. 16E is a GUI screen displayed by the Multi-Product MMVK of the present invention described in FIG. 17, wherein a brand information link is selected from the brand information network (BIN) menu for the selected consumer product.
Figure 16F:
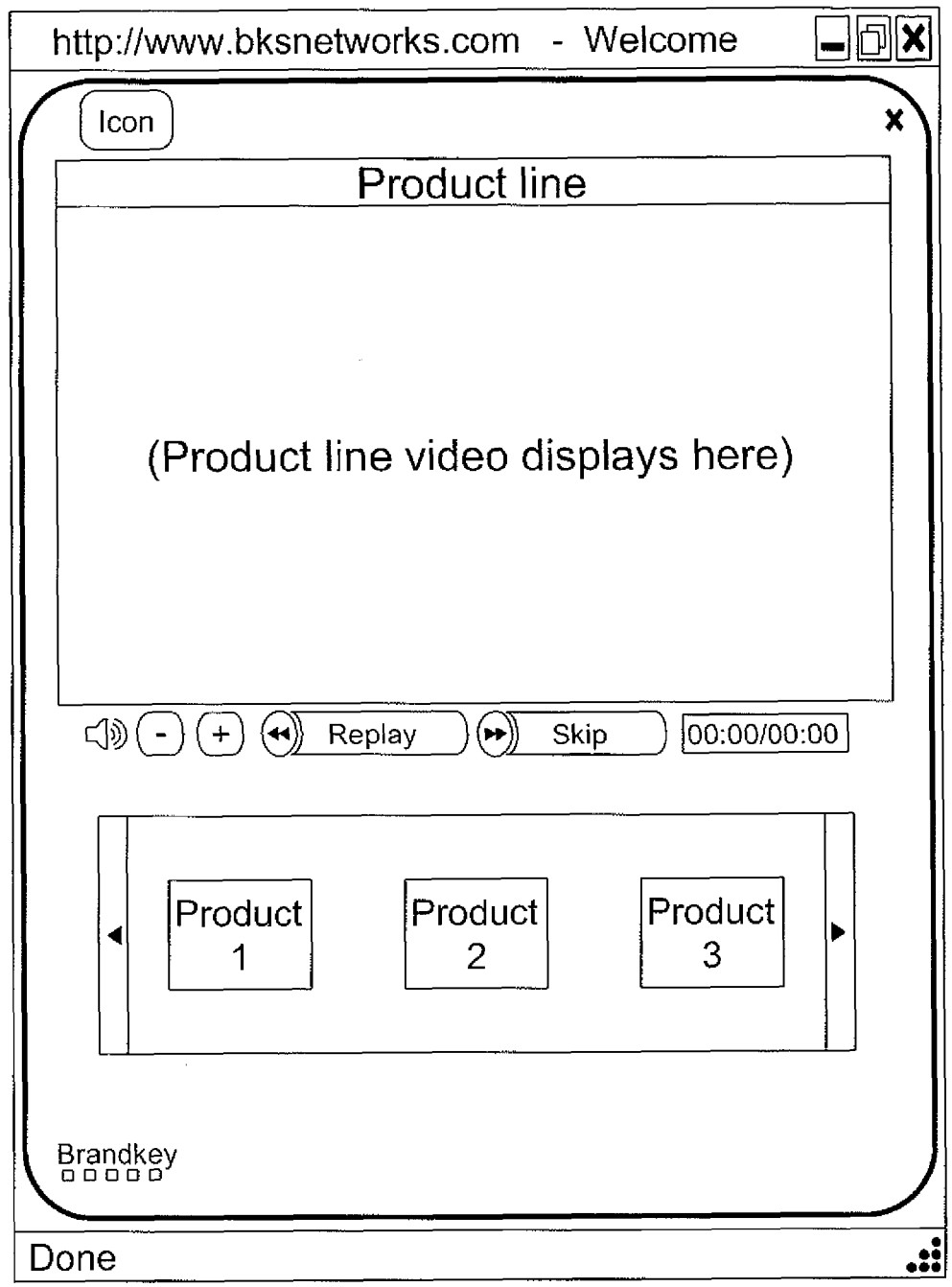
FIG. 16F is a GUI screen displayed by the Multi-Product MMVK of the present invention described in FIG. 17, wherein after a timeout, the MMVK returns to its Ad loop, as shown in FIG. 16A.

In FIG. 16D, the Multi-Product MMVK is shown with the brand information links for the consumer product being displayed. In FIG. 16E, the Multi-Product MMVK is shown with a brand information link selected from the brand information network (BIN) menu for the selected consumer product. In FIG. 16F, the Multi-Product MMVK is shown after a timeout (e.g. after 10 minutes of inactivity), wherein the MMVK returns to it's a d/promo loop, as shown in FIG. 16A.

In FIG. 17, the various states of operation supported by the Multi-Product MMVK are described. As indicated at Block A in FIG. 17, the MMVK ("Virtual Kiosk") is launched in the RDA of FIG. 15. As indicated at Block B, scheduled ads are loaded into the ad queue of the MMVK running on the RDA. Also, as indicated in Block C, scheduled promos are loaded into the promo queue of the MMVK. At Block D, the MMVK determines whether or not scheduled ads and promos are played in the loop of the MMVK. At Block E, the system determines whether or not a consumer product is scanned by the bar code reader, or selected from the consumer product menu on the MMVK. If not, then the system returns control back to Block D. If a product is scanned or selected at Block E, then the system determines whether or not the product is found in the network RDBMS (i.e. is a registered product on the network). If the scanned product is registered on the network, then at Block H the system initiates the MMVK process for the selected product. Then at Block I, the MMVK plays through completion, and then control returns back to Block D. However, if the scanned or selected product is not registered in the network RDBMS, then the price of the product is looked up in the retailer's price database, and at Block K, the product manufacturer is automatically notified (e.g. by email) that its product has been requested on the Network, but that it is not yet registered thereon, and is therefore invited to register the same on the Network and enjoy the benefits of registration and activation. Thereafter, the system returns to Block D, as shown, Also, if at Block G the system determines that the product is registered on the Network, but that there is no active MMVK for the product (i.e. no programmed BIN for the registered product), then the system proceeds to Block J and looks up the product's price in the price look up database maintained by the retailer.

These and all other such modifications and variations are deemed to be within the scope and spirit of the present invention as defined by the accompanying Claims to Invention.

What is claimed is:

1. An Internet-based e-commerce network configured to allow members of a brand management team and authorized parties to compose and deliver consumer product marketing communications to consumers browsing HTML-encoded documents along on the fabric of World Wide Web (WWW), and engaging in e-commerce transactions for the purchase of consumer products, said Internet-based e-commerce network comprising:

one or more Web servers, operably connected to the WWW, for serving HTML-encoded documents to consumers on the WWW using a Web browser, wherein each HTML-encoded document contains one or more images and text;

a first Web-based subsystem configured to allow members of a brand management team as well as authorized parties associated with one or more consumer products, to create and manage a brand information network (BIN) link structure for each said consumer product to be marketed using said Internet-based e-commerce network, wherein said BIN link structure comprises the following items:

(i) a unique product identifier assigned to the consumer product; and (ii) a set of URLs for a plurality of brand information resources stored on Web-based information servers operably connected to the WWW;

a second Web-based subsystem configured to allow brand management team members and authorized parties, associated with a consumer product, to create and deploy one or more Multi-Mode Virtual Kiosks (MMVKs) for each said consumer product for which said BIN link structure has been created;

wherein each said MMVK comprises (i) a computer-executable server-side component stored on a first Internet-enabled information server operably connected to the WWW and including code specifying the unique product identifier assigned to said consumer product, and (ii) a MMVK tag embodying a unique URL that references said computer-executable server-side component and is embedded within at least one of said HTML-encoded document on the WWW;

wherein said first Internet-enabled information server is configured to generate and serve each said MMVK to the Web browser of a consumer, and wherein said Web browser is configured to display a graphical user interface (GUI) that is characterized by a plurality of programmable display modes selected from the group consisting of (i) an advertising display mode for displaying one or more advertising spots, (ii) a promotional display mode for displaying one or more promotional spots, and (iii) a brand information display mode for displaying a set of brand information resources for the consumer product specified by said unique product identifier;

a plurality of Web-based information servers operably connected to the WWW, storing and configured to serve said one or more advertising spots, said one or more promotional spots and said set of brand information resources to said Web browser, for display to the consumer through said plurality of programmable display modes of each said MMVK;

wherein said set of URLs included with said BIN link structure for one said consumer product, specify the location of corresponding brand information resources stored on said Web-based information servers; and wherein said first Web-based subsystem is further configured to allow the brand management team members and authorized parties to select a plurality of said brand information resources and program one or more of said advertising, promotional and brand information display modes of the MMVK created and deployed for the consumer product associated with said BIN link structure;

a third Web-based subsystem is configured to allow the brand management team members and authorized parties to independently program the advertising display mode of each MMVK with one or more advertising spots, and the promotional display mode of the MMVK with one or more promotional spots;

an e-commerce store server operably connected to the WWW, and configured to serve an e-commerce store, offering one or more of said consumer products for sale to consumers;

a second Internet-enabled information server configured to (i) track an e-commerce transaction initiated on each said MMVK and supported by said e-commerce store, and (ii) track sales commissions earned by an affiliate hosting said MMVK;

wherein said first Web-based subsystem is configured to allow said brand management team members and authorized parties to independently program said brand information display mode of each said MMVK; and wherein the Web-browser of the consumer is configured to process said MMVK tag embedded within said HTML-encoded document, and said first Internet-enabled information server is configured to automatically execute the computer-executable server-side component corresponding to the installed MMVK tag and generate and serve the corresponding MMVK to the Web browser, for display by the Web browser and review by the consumer at the HTML-encoded document.

2. The Internet-based e-commerce network of claim 1, wherein said unique product identifier is a unique product number.

3. The Internet-based e-commerce network of claim 1, wherein the computer-executable server-side component associated with each said MMVK comprises a consumer product information requesting servlet loaded onto said first Internet-enabled information server.

4. The Internet-based e-commerce network of claim 1, wherein said BIN link structure further comprises, for each consumer product,
(iii) a Trade Mark (TM) assigned to the consumer product;
(iv) a Product Descriptor (PD) associated with the consumer product; and
(v) a set of display attributes associated with each brand information resource in said BIN link structure.

5. The Internet-based e-commerce network of claim 1, wherein said set of brand information resources are selected from the group consisting of service videos, audio files, service images, service specifications, service advertisements, and service promotions.

6. The Internet-based e-commerce network of claim 4, wherein said set of display attributes are selected from the group consisting of text for said URLs, graphical icons displayed next to said URLs, and sound files associated with said URLs.

7. The Internet-based e-commerce network of claim 1, wherein the Web browser of the consumer is supported on a client computing machine selected from the group consisting of a desktop computer, a portable computer, a portable digital assistant (PDA), and a mobile computer.

8. The Internet-based e-commerce network of claim 1, wherein said Web browser of the consumer is configured to respond to the consumer clicking on a graphical component at which said MMVK tag is embedded in said HTML-encoded document.

9. The Internet-based e-commerce network of claim 1, wherein said other authorized parties include agents of said brand management team.

10. The Internet-based e-commerce network of claim 1, which further comprises a third Internet-enabled information server configured to allow brand management team members and said authorized parties, to monitor consumer transactions conducted through or initiated by said MMVKs, as well as set commissions to be paid to affiliates hosting said MMVKs.

11. The Internet-based e-commerce network of claim 10, which further comprises a fourth Internet-enabled information server configured to allow said affiliate to track and monitor sales commissions earned on each MMVK hosted on its HTML-encoded document, to ensure commission payments due are timely made to said affiliate.

12. The Internet-based e-commerce network of claim 1, wherein said e-commerce store is configured to be operated by an online-retailer, or authorized party thereof.

13. The Internet-based e-commerce network of claim 12, wherein said e-commerce store is operated by a manufacturer of one or more of said consumer products, or an authorized party thereof, who pays said sales commission to said affiliate hosting said MMVK on said HTML-encoded document.

14. The Internet-based e-commerce network of claim 1, where said HTML-encoded document comprises an HTML-encoded Webpage.

* * * * *